United States Patent
Coleman et al.

(10) Patent No.: US 7,493,077 B2
(45) Date of Patent: Feb. 17, 2009

(54) SYSTEM AND METHOD FOR PROCESSING TEST REPORTS

(75) Inventors: David Coleman, New York, NY (US); Steve Delvecchio, Seattle, WA (US); Ben Fishman, New York, NY (US); Patrick Haugh, New York, NY (US); Mark Malaspina, Brooklyn, NY (US); Kito Mann, New York, NY (US); David Waxman, New York, NY (US); Jason Zimba, New York, NY (US)

(73) Assignee: Grow.Net, Inc., New York, NY (US)

( * ) Notice: Subject to any disclaimer, the term of this patent is extended or adjusted under 35 U.S.C. 154(b) by 50 days.

(21) Appl. No.: 11/280,466

(22) Filed: Nov. 17, 2005

(65) Prior Publication Data

US 2006/0078863 A1   Apr. 13, 2006

Related U.S. Application Data

(63) Continuation of application No. 11/231,975, filed on Sep. 22, 2005, now abandoned, which is a continuation of application No. 10/072,820, filed on Feb. 8, 2002, now abandoned.

(60) Provisional application No. 60/267,840, filed on Feb. 9, 2001.

(51) Int. Cl.
*G09B 3/00* (2006.01)
(52) U.S. Cl. ........................... 434/350; 434/353
(58) Field of Classification Search .................. 434/350, 434/353

See application file for complete search history.

(56) References Cited

U.S. PATENT DOCUMENTS 5,433,615 A   7/1995   Clark (Continued)

OTHER PUBLICATIONS

U.S. Appl. No. 60/244,714 (Geshwind) Provisional, Internet Mediated Collaborative Technique for the Motivation of Student Test Preparation, Oct. 31, 2000, p. 1-26.

*Primary Examiner*—Cameron Saadat
(74) *Attorney, Agent, or Firm*—Rothwell, Figg, Ernst & Manbeck, PC

(57) ABSTRACT

A system and method enable processing and displaying of test results in accordance with information and specifications provided by the client requiring such services. Skills examined by a test are identified, and skill-by-skill analysis of test results is provided. Performance within constituent skill categories are compared to applicable standards, thereby providing criterion-referenced conclusions about a student's performance within each skill category tested. Evaluation and recommendation statements are generated for students or groups of students based on their test performance and procedures for automatically generating such statements are provided. Test results are also used to identify skills in which individual students and groups have the greatest potential for growth. Test reports are produced in print and electronically using the same electronic document structures and data source files to ensure consistency between the two display mechanisms. The analyses and reports generated provide instructional information tailored to the student's or group's needs, as identified by analysis of test performance. Teachers and administrators can track the progress of students and groups through useful, accurate, and easily accessible test reports.

6 Claims, 52 Drawing Sheets

U.S. PATENT DOCUMENTS

| | | | |
|---|---|---|---|
| 5,597,312 A * | 1/1997 | Bloom et al. | ................ 434/362 |
| 5,752,836 A | 5/1998 | Clark et al. | |
| 5,779,486 A | 7/1998 | Ho et al. | |
| 5,934,909 A | 8/1999 | Ho et al. | |
| 6,099,320 A | 8/2000 | Papadopoulos | |
| 6,144,838 A | 11/2000 | Sheehan | |
| 6,146,148 A | 11/2000 | Stuppy | |
| 6,159,018 A | 12/2000 | Clark et al. | |
| 6,270,351 B1 | 8/2001 | Roper | |
| 6,275,812 B1 | 8/2001 | Haq et al. | |
| 6,289,340 B1 * | 9/2001 | Puram et al. | ................... 707/5 |
| 6,524,109 B1 | 2/2003 | Lacy et al. | |
| 6,633,742 B1 | 10/2003 | Turner et al. | |
| 6,658,412 B1 | 12/2003 | Jenkins et al. | |
| 6,666,687 B2 | 12/2003 | Stuppy | |
| 2002/0052860 A1 | 5/2002 | Geshwind | |
| 2003/0118978 A1 | 6/2003 | L'Allier et al. | |
| 2003/0129575 A1 | 7/2003 | L'Allier et al. | |

* cited by examiner

FROM FIG.1-1

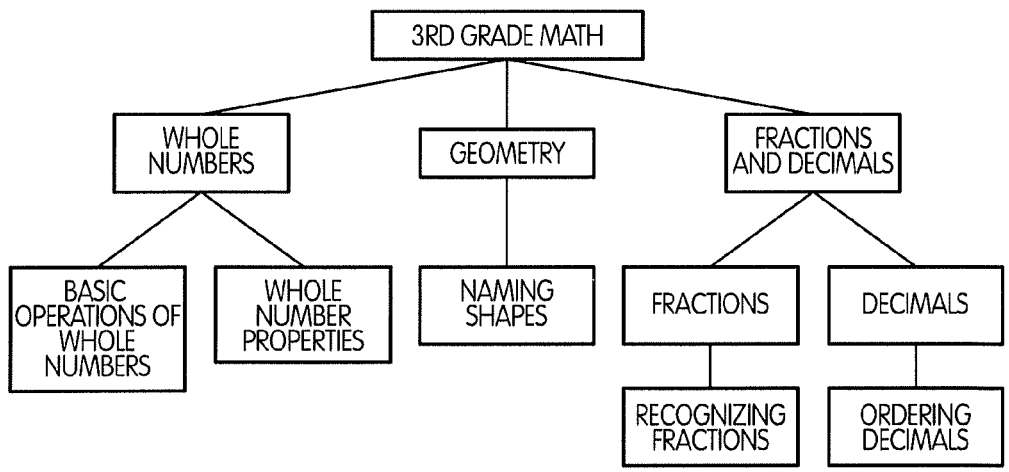
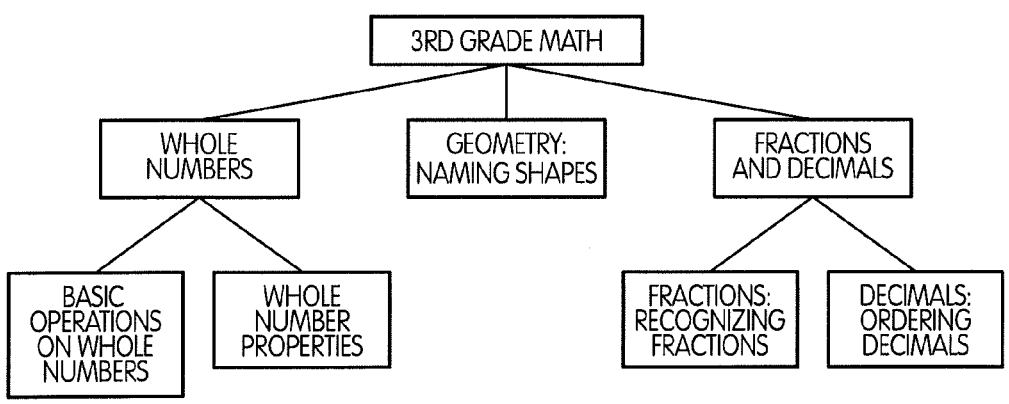
FIG. 8

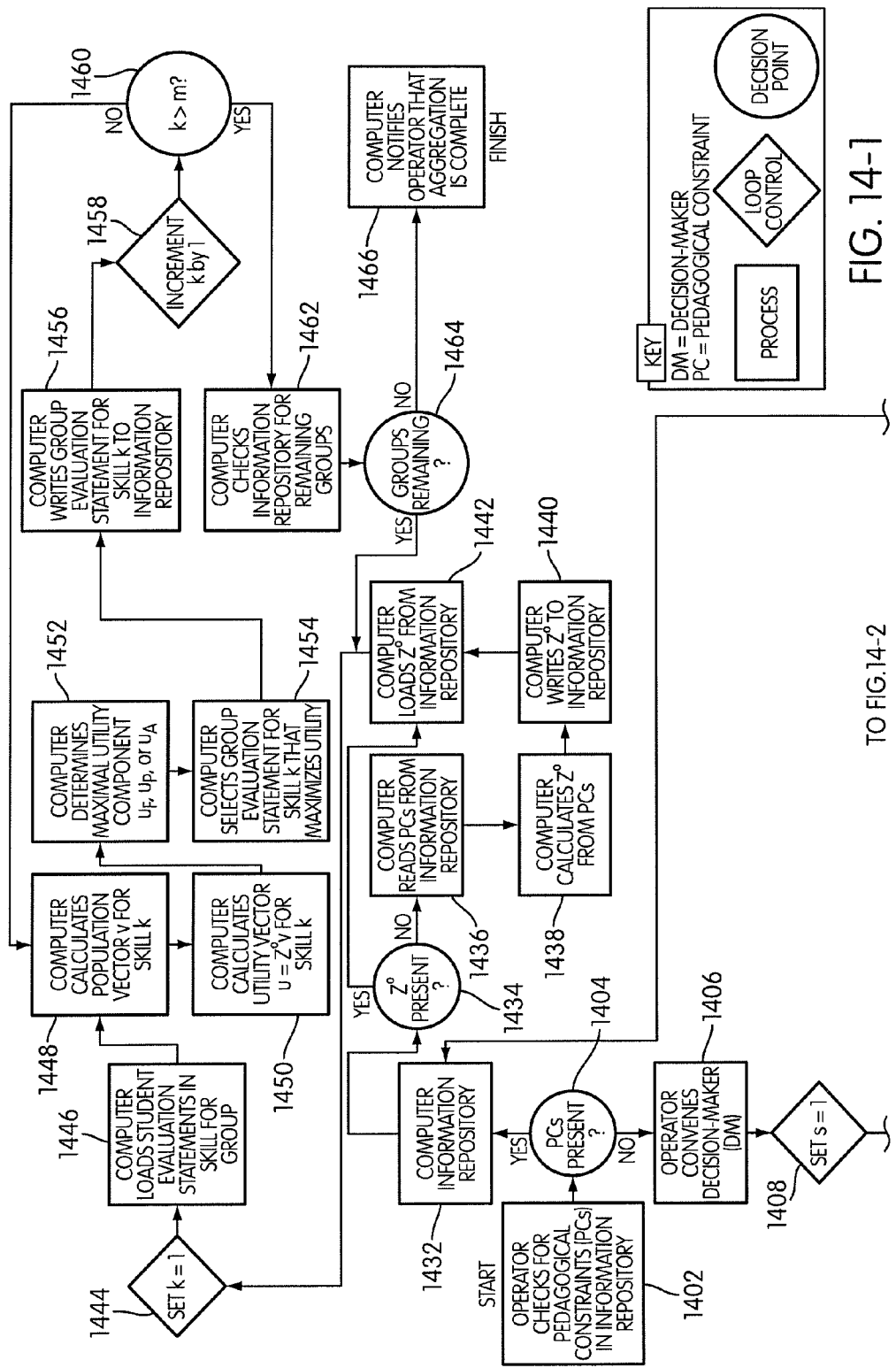

```
-<strategies>
   + <fundamentals>————1804
   - <practice>————1806
      - <introduction>
         <p>If your students need some additional instruction and practice, you can try some of
            the activity ideas listed below.</p>
      </introduction>
      - <activity>
         - <description>
            <p>Ask students to think of a few situations in which they might want to add the
               same number over and over. Some ideas to get them stated might be:</p>
            - <list>
               <listItem>counting the total number of wheels in a group of 8 cars</listItem>
               <listItem>counting the total number of keys on 5 calculators of the same
                  type</listItem>
               <listItem>counting the total number of pencils in 10 boxes of pencils</listItem>
            </list>
            <p>Then have them make up a word problem to go with each situation, and
               solve a few of these problems.</p>
         </description>
      </activity>
      - <activity>
         - <description>
            <p>Ask students to think of a few situations in which they might count things in
               arrays. Here are some arrays they might use.</p>
            - <list>
               <listItem>seats on a bus</listItem>
               <listItem>windows on a building</listItem>
            </list>
            <p>Then have them make up a word problem to go with each situation, and
               solve a few of these problems.</p>
         </description>
      </activity>
      - <activity>
         - <description>
            <p>Ask students to think of few "times as many" situations. Here are some ideas
               to get them started.</p>
            - <list>
               <listItem>One store has 5 times as many customers as another store.</listItem>
               <listItem>One team has 3 times as many points as another team.</listItem>
               <listItem>One car costs 4 times as much as another car.</listItem>
            </list>
            <p>Then have them make up a word problem to go with each situation, and solve a
               few of these problems.</p>
         </description>
      </activity>
      - <activity>
         - <description>
            <p>Ask students to think of a few situations in which they might break a big
               group into smaller groups. Here are some ideas to get them started.</p>
            - <list>
               <listItem>Spread 100 seeds evenly along 10 rows in the garden.</listItem>
               <listItem>Split the class into 4 equal teams to play a game.</listItem>
            </list>
            <p>Then have them make up a word problem to go with each situation, and
               solve a few of these problems.</p>
         </description>
      </activity>
   </practice>
   + <advanced>————1808
</strategies>
```

PAGE 2      1904

1 How Did My Students Do?

| FAR BELOW STANDARDS (LEVEL 385-571) | BELOW STANDARDS (LEVEL 572-606) | MEETING STANDARDS (LEVEL 607-637) | FAR ABOVE STANDARDS (LEVEL 638-740) |
|---|---|---|---|
| Gupta, Anita 567<br>Thoreau, James 553 | Gottlieb, Matt 606<br>Sandies, Dan 605<br>Ormond, Nancy 602<br>Allen, John 601<br>Roberts, Mike 600<br>Martinez, Tom 597<br>Moleson, Rachel 595<br>Davis, Latoyah 595<br>Cass, Mary 592<br>Cass, Arla 590<br>Collier, Edward 590<br>Reese, Nelson 589<br>Miller, James 587<br>Rosado, Juan 585<br>Roebuck, Lila 584<br>Barda, Willy 580<br>Marshall, Gary 576<br>Latham, Hal 574 | Allsopp, Victoria 634<br>Traveras, Rosa 633<br>Cavanaugh, Kate 627<br>Munoz, Maria 621<br>Navarez, Esteban 617<br>Sanchez, Jose 616<br>Bochamps, Martin 612<br>Nunez, Sunny 611<br>Crowe, Amir 610<br>Reid, Jesse 607 | Moses, Michael 650<br>Chester, Jane 642 |

We have done our best to include all of your students here. Based on currently available ATS data, these are the students in your class who took the 3rd grade Citywide CTB* Math test (standard and Spanish-language forms) in April 2001. Additional information is available on our website.

HOW THE GROW TOPICS EXPRESS THE STANDARDS

| UNDERSTANDING AND WORKING WITH NUMBERS<br>Whole Numbers:<br>Addition/Subtraction - Problem Solving<br>Multiplication/Division - Problem Solving | Number Numeration; Operation; Mathematical Representation | Arithmetic and Number Concepts xxxxxxxx, Number and Operation Concepts (middle) |
|---|---|---|
| GEOMETRY AND MEASUREMENT<br>Time and Units of Measure<br>Geometric Terms and Shapes | Measurement Modeling/ Multiple Representation | Geometry and Measurement Concepts |
| PATTERNS AND EARLY ALGEBRA<br>Numbers and Shape Patterns<br>Using Number Sentences | Patterns/Functions; Mathematical Reasoning | Function and Algebra Concepts |
| DATA AND PROBABILITY<br>Interpreting Tables and Graphs | Measurement Modeling/ Multiple Representation; Uncertainty | Statistics and Probability Concepts |
| OPEN-ENDED PROBLEMS<br>Problem Solving Strategies | Mathematical Reasoning | Problem Solving and Reasoning |

PAGE 3

2 What Do They Need To Learn?

These scores are based on the standard form of this exam. For other forms, see our website.

Average Percent Correct

| | Your Class | NYC Students |
|---|---|---|
| Understanding and Working with Numbers | | |
| Whole Numbers | 92 | 90 |
| Addition/Subtraction - Problem Solving | 66 | 67 |
| Multiplication/Division - Problem Solving | 39 | 62 |
| Geometry and Measurement | | |
| Time and Units of Measure | 39 | 60 |
| Geometric Terms and Shapes | 71 | 79 |
| Patterns and Early Algebra | | |
| Number and Shape Patterns | 70 | 78 |
| Using Number Sentences | 80 | 68 |
| Data and Probability | | |
| Interpreting Tables and Graphs | 71 | 80 |
| Open-Ended Problems | | |
| Problem Solving Strategies | Assessed in 4th Grade | |

Based on this data, your class is likely to need..

Help with Fundamentals
  Multiplication/Division -
  Problem Solving
  Time and Units of Measure

Additional Instruction and Practice
  Addition/Subtraction -
  Problem Solving
  Numbers and Shape Patterns
  Interpreting Tables
  and Graphs
  Geometric Terms and Shapes

Advance Work
  Using Number Sentences
  Whole Numbers

You can find out how class determinations were made, as well as how topics relate to standards, at www.grownetwork.com

A NOTE ON USING TEST DATA THOUGHTFULLY

The information here is based on one exam. While no single test or list of topics can fully capture how your student learn, the Grow Report offers helpful leads for further instruction and assessment.

3 Help Them Grow...

A. Go to our website
Location: http://www.grownetwork.com

B. Enter your file number to the "Login ID" box
Login ID: File Number Here

C. Enter your password to the "Password" box
Password: Unique Password Here

D. Click "OK" → OK   E. Learn more ▷

| The Grow Teacher Report™ | LOGOUT ☒ |
|---|---|

BOARD OF EDUCATION • THE CITY OF NEW YORK

Welcome, Janet Lee, to your Grow Report™ Online!

On this website, you can find in-depth information about your class and individual students, as well as instructional tools designed to help address their strengths and weaknesses. To begin, select a report from the list below.

[-Choose a class & subject- ▽] [GO]

All of your classes with currently available data are listed above.

© Copyright 2002 The Grow Network. All rights reserved.

| The Grow Teacher Report™ | | LOGOUT ☒ |
|---|---|---|
| BOARD OF EDUCATION • THE CITY OF NEW YORK | | |

| You have selected a report for:<br><br>[99999-Class 402-Math (4) ▽] [GO]<br><br>To view another report, select from the menu above. | MAIN MENU<br>99999 - Grade 4 - MATH<br>Choose from the options below:<br><br>1 [See Class Performance]<br>2 [Focus on a Student]<br>3 [Get Teaching Tools] | February 4, 2002<br>We have updated the Site Information page. Click here to go there now.<br><br>Help & Support<br>Modify password<br>Change e-mail address |

Help & Support : About the Grow Network : Terms of Service : Security & Policy : Contact Us © Copyright 2002 The Grow Network. All rights reserved.

FIG. 24

| MAIN MENU | The Grow Teacher Report™ | LOGOUT |
|---|---|---|

BOARD OF EDUCATION • THE CITY OF NEW YORK

Focus on a Student:
Class 402 - MATH (4)            -See another class & subject- ▾  GO Select a student to see his or her performance by topic.

| Far Below Standards<br>Level One (385-571) | Below Standards<br>Level Two (572-606) | Meets Standards<br>Level Three (607-637) | Far Above Standards<br>Level Four (638-740) |
|---|---|---|---|
| Tiwari, Satya  570 | Supple, Adam  603 | Razon, Christopher  620 | Desoma, Margaret  644 |
| Tiongson, Armando  570 | Thomas, Jeffrey  603 | Walsh, Devun  616 | |
| | Santos, Patricia  600 | Malarkey, Don  616 | |
| | Mendoza, Maria  596 | Rahman, Abdul  612 | |
| | Karamazov, Alex  592 | Williams, Tanya  612 | |
| | Tran, Hung  592 | Li, Si-Mui  607 | |
| | Popodopolous Magdaline  592 | | |
| | Pangit, Helen  588 | | |
| | Castillo, Blesilda  588 | | |
| | White, Brandy  585 | | |
| | Lukaziac, Thomaz  585 | | |
| | Reubin, Mark  581 | | |
| | Santos, Heidee  581 | | |
| | Jones, Heather  573 | | |

What if students are missing from this list?

Help & Support : About the Grow Network : Terms of Service : Security & Policy : Contact Us © Copyright 2002 The Grow Network. All rights reserved.

FIG. 25

⊟ MAIN MENU     The Grow Teacher Report™     LOGOUT ⊠

BOARD OF EDUCATION • THE CITY OF NEW YORK

Focus on a Student:
Satya Tiwari
Class 402 - Math (4)

-Choose another student- ▽ GO

| | Average % Correct | |
|---|---|---|
| | This Student | NYC Students |
| Understanding and Working with Numbers | | |
| Whole Numbers | 100 | 90 |
| Addition/Subtraction - Computation | 44 | 68 |
| Addition/Subtraction - Problem Solving | 33 | 67 |
| Multiplication/Division - Problem Solving | 64 | 62 |
| Geometry and Measurement | | |
| Time and Units of Measure | 14 | 60 |
| Geometric Terms and Shapes | 48 | 79 |
| Patterns and Early Algebra | | |
| Number and Shape Patterns | 90 | 78 |
| Using Number Sentences | 100 | 68 |
| Data and Probability | | |
| Interpreting Tables and Graphs | 41 | 80 |

Click on a topic below to see your class's breakdown in that topic.

Based on this exam, this student is likely to need:

Help with Fundamentals
   Addition/Subtraction - Computation
   Addition/Subtraction - Problem Solving
   Time and Units of Measure
   Geometric Terms and Shapes
   Interpreting Tables and Graphs

Additional Instruction and Practice
   Multiplication/Division - Problem Solving

Advanced Work
   Whole Numbers
   Number and Shape Patterns
   Using Number Sentences Averages are based on students who took the primary form of the exam.

Some topics are not shown here because too few questions on the 2001 test addressed them. You can get Teaching Tools for these topics from the Main Menu by clicking "3. Get Teaching Tools."

You can also get Teaching Tools for Writing in ELA and Problem Solving in Math. Go to the Main Menu, select a subject, and click "3. Get Teaching Tools."

Teaching to the Standards
What do the numbers mean?

Help & Support : About the Grow Network : Terms of Service : Security & Policy : Contact Us © Copyright 2002 The Grow Network. All rights reserved.

FIG. 26

| | MAIN MENU | The Grow Teacher Report™ | LOGOUT ☒ |

BOARD OF EDUCATION • THE CITY OF NEW YORK

Performance by Topic
Class 402 - MATH (4)

-See another class & subject- ▼ GO

| | Average % Correct | |
|---|---|---|
| | This Class | NYC Students |
| Understanding and Working with Numbers | | |
|   Whole Numbers | 78 | 77 |
|   Addition/Subtraction - Problem Solving | 60 | 67 |
|   Multiplication/Division - Problem Solving | 55 | 59 |
| Geometry and Measurement | | |
|   Time and Units of Measure | 66 | 67 |
|   Geometric Terms and Shapes | 84 | 80 |
| Patterns and Early Algebra | | |
|   Number and Shape Patterns | 91 | 87 |
|   Using Number Sentences | 88 | 86 |
| Data and Probability | | |
|   Interpreting Tables and Graphs | 85 | 79 |

Click on a topic below to see your class's breakdown in that topic.

Based on this exam, this student is likely to need:

Help with Fundamentals
  Addition/Subtraction - Problem Solving

Additional Instruction and Practice
  Whole Numbers
  Multiplication/Division - Problem Solving
  Time and Units of Measure
  Using Number Sentences

Advanced Work
  Geometric Terms and Shapes
  Number and Shape Patterns
  Interpreting Tables and Graphs Averages are based on students who took the primary form of the exam.

Some topics are not shown here because too few questions on the 2001 test addressed them. You can get Teaching Tools for these topics from the Main Menu by clicking "3. Get Teaching Tools."

You can also get Teaching Tools for Writing in ELA and Problem Solving in Math. Go to the Main Menu, select a subject, and click "3. Get Teaching Tools."

Teaching to the Standards
What do the numbers mean?

Help & Support : About the Grow Network : Terms of Service : Security & Policy : Contact Us © Copyright 2002 The Grow Network. All rights reserved.

| ⊞ MAIN MENU | The Grow Teacher Report™ | LOGOUT ⊠ | 2808
BOARD OF EDUCATION • THE CITY OF NEW YORK Flexible Grouping for
Multiplication/Division - Problem Solving    -Choose another topic-  ▽ GO
Class 402 - MATH (4)

See Teaching Tools for Multiplication/Division - Problem Solving —2806

| Likely to Need Help with Fundamentals | Likely to Require Additional Instruction and Practice | Likely to Be Ready for Advance Work |
|---|---|---|
| Jones, Heather | Li, Si-Mui | Walsh, Devun |
| Castillo, Blesilda  2804 | Santos, Heidee  2804 | 2804 |
| Tiongson, Armando | Tiwari, Satya | |
| Razon, Christopher | Rahman, Abdul | |
| Popodopolous, Magdaline | Desoma, Margaret | |
| Karamazov, Alex | White, Brandy | |
| Lukaziac, Thomaz | Pangit, Helen | |
| Tran, Hung | Reubin, Mark | |
| Thomas, Jeffrey | Supple, Adam | |
| | Mendoza, Maria | |
| | Santos, Patricia | |
| | Malarkey, Don —2810 | |
| | Williams, Tanya | |

How were these groupings determined?
What if students are missing from flexible groupings?

Help & Support : About the Grow Network : Terms of Service : Security & Policy : Contact Us © Copyright 2002 The Grow Network. All rights reserved.

FIG. 28

```
                                            3002
                                            /
┌─────────────────────────────────────────────────────────────┐
│ ⊟ MAIN MENU      The Grow Teacher Report™       LOGOUT ⊠    │
│ ┌─────────────────────────────────────────────────────────┐ │
│ │         BOARD OF EDUCATION • THE CITY OF NEW YORK       │ │
│ ├─────────────────────────────────────────────────────────┤ │
│ │ Teaching Tools for                                      │ │
│ │ Fractions and Decimals         -Choose another topic- ▽ GO│
│ │ Class 402 - Math (4)                                    │ │
│ │ ┌─────────────────────────────────────────────────────┐ │ │
│ │ │                                 🔒 printer-friendly version│
│ │ │                                    of tools for this topic│
│ │ │                                                     │ │ │
│ │ │ Contents           Introduction                     │ │ │
│ │ │ Introduction                                        │ │ │
│ │ │ Essentials         As students learn more and more about numbers, they │
│ │ │                    recognize the need for numbers in between whole │
│ │ │   1. Understanding numbers. What if you want to share one cookie between │
│ │ │      Fractions     two friends? How much should each person get? When │
│ │ │   2. Understanding we break groups or whole items into equal parts, we can │
│ │ │      Decimals      create fractions and decimals. What part of the pizza has │
│ │ │   3. Ordering Fractions been eaten? What portion of the picture is shaded? │
│ │ │      and Decimals  Initially, students' experiences with fractions and │
│ │ │ Activities         decimals center around exploring part of a whole. The │
│ │ │   • Help with      ability to work with fractions and decimals will expand the │
│ │ │     Fundamentals   range of problems that students can solve.  │ │ │
│ │ │   • Additional                                      │ │ │
│ │ │     Instruction and The Essentials of Fractions and Decimals │ │ │
│ │ │     Practice          1. Understanding Fractions    │ │ │
│ │ │   • Advanced Work     2. Understanding Decimals     │ │ │
│ │ │ Resource Problems     3. Ordering Fractions and Decimals │ │ │
│ │ │   • For Essential 1                                 │ │ │
│ │ │   • For Essential 2                                 │ │ │
│ │ │   • For Essential 3                                 │ │ │
│ │ │   • For All Essentials                              │ │ │
│ │ │ Resources                                      NEXT>│ │ │
│ │ │   • Curriculum                                      │ │ │
│ │ │     Resources                                       │ │ │
│ │ │   • Online Resources                                │ │ │
│ │ │   • The Standards                                   │ │ │
│ │ └─────────────────────────────────────────────────────┘ │ │
│ │                                                         │ │
│ │ Help & Support : About the Grow Network : Terms of Service : Security & Policy : Contact Us │ │
│ │ © Copyright 2002 The Grow Network. All rights reserved. │ │
│ └─────────────────────────────────────────────────────────┘ │
└─────────────────────────────────────────────────────────────┘
```

(3004 labels point to: Help with Fundamentals; Additional Instruction and Practice; Advanced Work)

FIG. 30

| ☐ MAIN MENU | The Grow Teacher Report™ | LOGOUT ☒ |
|---|---|---|

CHICAGO PUBLIC SCHOOLS

Ongoing Assessments: Reading

<u>Update Flexible Groupings</u>

Contents

- Author's Purpose
- Cause and Effect
- <u>Character</u> ─ 3504
- Fact and Opinion
- Genre and Literary Terms
- Main Idea and Theme
- Predicting Outcomes
- Sequence
- Setting
- Words and Phrases in Context

What are Ongoing Assessments? ─ 3502

The Grow Network's Ongoing Assessments in Reading are a good way to "take the pulse" of your class in important topic areas. You can give an Ongoing Assessment at the start of a unit, at the end of a unit, or whenever you want to find out quickly "where your class stands" in any given area.

When you finish grading an Ongoing Assessment for any given student in your class, you can update the student's Flexible Grouping information in your Grow Report Online.

Format of Ongoing Assessments

Ongoing Assessments include sample questions, an answer sheet, and a teacher reference guide with scoring suggestions.

Each Ongoing Assessment in Reading is made up of two multiple choice and two short answer questions. These questions are chosen to test your students' ability to comprehend key details from a brief reading passage.

Ongoing Assessments are designed to be easy to grade. Scoring on the multiple choice questions is always 1 point for a correct answer and 0 points for an incorrect answer. Scoring on the short answer questions is 2 points for a correct response, 1 point for a partially correct response, and 0 points for an incorrect response.

Here is a suggested way to update the Flexible Groupings in your Grow Report Online, based on how your students perform on the Ongoing Assessment:

0-1 points Fundamentals column
    2-4 points Practice column
    5-6 points Advanced Work column <u>Help & Support</u> : <u>About the Grow Network</u> : <u>Terms of Service</u> : <u>Security & Policy</u> : <u>Contact Us</u>

© 2002 The Grow Network. All Rights Reserved.

FIG. 35

| ⊞ MAIN MENU | The Grow Teacher Report™ | LOGOUT ⊠ |
|---|---|---|
| | CHICAGO PUBLIC SCHOOLS | |

Flexible Grouping for Character  
Room 410 - Reading

-Choose another Topic- ▽ GO  — 3602

See Teaching Tools for Character  
Ongoing Assessments in this topic —3604  
Update Flexible Groupings in this topic —3606

Flexible Groupings for ISAT 2002

| Likely to Need Help with Fundamentals | Likely to Require Additional Instruction and Practice | Likely to Be Ready for Advance Work |
|---|---|---|
| Allen, John | Allsopp, Victoria | Cavanaugh, Kate |
| Barda, Willy | Bochamps, Martin | Collier, Edward |
| Cass, Arla | Chester, Jane | Munoz, Maria |
| Cass, Mary | Crowe, Amir | Reid, Jesse |
| Davis, Latoyah | Gottlieb, Matt | Taveras, Rosa |
| Gupta, Anita | Marshall, Gary | |
| Latham, Hal | Martinez, Tom | |
| Miller, James | Moleson, Rachel | |
| Navarez, Esteban | Moss, Michael | |
| Nunez, Sunny | Ormond, Nancy | |
| Roebuck, Lila | Reese, Nelson | |
| Rosado, Juan | Roberts, Mike | |
| Sanchez, Jose | | |
| Sandies, Dan | | |
| Thoreau, James | | |

Help & Support : About the Grow Network : Terms of Service : Security & Policy : Contact Us © 2002 The Grow Network. All Rights Reserved.

FIG. 36

| ⊡ MAIN MENU | The Grow Teacher Report™ | LOGOUT ⊠ |
|---|---|---|
| | CHICAGO PUBLIC SCHOOLS | |

Update Flexible Groupings — 3702

In order to move a student to a new category, check the circle under the appropriate column for each student. Then click "Submit" at the bottom of the page. To start over with the previous values, click "Reset."

☐ = Original Position
F = Help With Fundamentals
P = Additional Instruction and Practice
A = Advanced Work
— 3704

Source of Information [Ongoing Assessment]   🔒 printer-friendly version of score sheet

| | F | P | A |
|---|---|---|---|
| Allen, John | ⊡ | ○ | ○ |
| Allsopp, Victoria | ○ | ⊡ | ○ |
| Barda, Willy | ⊡ | ○ | ○ |
| Bochamps, Martin | ○ | ⊡ | ○ |
| Cass, Arla | ⊡ | ○ | ○ |
| Cass, Mary | ⊡ | ○ | ○ |
| Cavanaugh, Kate | ○ | ○ | ⊡ |
| Chester, Jane | ○ | ⊡ | ○ |
| Collier, Edward | ○ | ○ | ⊡ |
| Crowe, Amir | ○ | ⊡ | ○ |
| Davis, Latoyah | ⊡ | ○ | ○ |
| Gottlieb, Matt | ○ | ⊡ | ○ |
| Gupta, Anita | ⊡ | ○ | ○ |
| Latham, Hal | ⊡ | ○ | ○ |
| Marshall, Gary | ○ | ⊡ | ○ |
| Martinez, Tom | ○ | ⊡ | ○ |
| Miller, James | ⊡ | ○ | ○ |
| Moleson, Rachel | ○ | ⊡ | ○ |
| Moss, Michael | ○ | ⊡ | ○ |
| Munoz, Maria | ○ | ○ | ⊡ |
| Navarez, Esteban | ⊡ | ○ | ○ |
| Nunez, Sunny | ⊡ | ○ | ○ |
| Ormond, Nancy | ○ | ⊡ | ○ |
| Reese, Nelson | ○ | ⊡ | ○ |
| Reid, Jesse | ○ | ○ | ⊡ |
| Roberts, Mike | ○ | ⊡ | ○ |
| Roebuck, Lila | ⊡ | ○ | ○ |
| Rosado, Juan | ⊡ | ○ | ○ |
| Sanchez, Jose | ⊡ | ○ | ○ |
| Sandies, Dan | ⊡ | ○ | ○ |
| Taveras, Rosa | ○ | ○ | ⊡ |
| Thoreau, James | ⊡ | ○ | ○ |

[Submit]  [Reset]

Help & Support : About the Grow Network : Terms of Service : Security & Policy : Contact Us
© 2002 The Grow Network. All Rights Reserved.

FIG. 37

(Press the back button on your browser to return to where you were.)

Chicago Public Schools - Grade 4 Reading

Character

The Grow Network • Ongoing Assessment

Read the following passage. Then answer the questions below.

Michelle wanted to be the best shot on her basketball team. Every morning she went to school early and spent an hour practicing in the gym by herself. In the evening, she would practice all alone at the playground near her house. She loved the swish sound of a perfect shot, and she was improving every day. But she still wasn't as good as her best friend Lisa, the team's star forward. Sometimes Lisa teased her for trying so hard, but Michelle would just smile and keep practicing.

1. Which word best describes Michelle?

a) jealous
   b) dedicated
   c) lonely
   d) frustrated

2. At the end of the passage, why does Michelle smile?

a) Lisa has just told Michelle a joke.
   b) Michelle likes being alone.
   c) Michelle is about to make a successful shot.
   d) Michelle is confident that she's doing the right thing.

3. Michelle and Lisa are both characters in this passage. List three (3) things the passage tells us about Lisa.

4. In your own words, describe what problem Michelle faces. What does she do to overcome it?

SCORING GUIDE

1. The correct answer is (b), dedicated.

0 Points = incorrect or no answer
   1 Point = correct answer

2. The correct answer is (d), Michelle is confident that she's doing the right thing.

0 Points = incorrect or no answer
   1 Point = correct answer

3. For sample responses, see Teacher Reference Guide below.

0 Points = all incorrect or no answer
   1 Point = one or two things about Lisa
   2 Points = three things about Lisa 4. For sample responses, see Teacher Reference Guide below 0 Points = no answer or both parts of question incorrect
   1 Point = one part of question correct
   2 Points = both parts of question correct

TOTAL SCORE

Here is a suggested way to update the Flexible Groupings in your Grow Report Online, based on a student's total score or the Ongoing Assessment:

0-1 points Fundamentals column
2-4 points Practice column
5-6 points Advanced Work column

FIG. 38

| ⊞ MAIN MENU | The Grow Teacher Report™ | LOGOUT ⊠ |
|---|---|---|
| | CHICAGO PUBLIC SCHOOLS | |

Focus on a Student:
Anita Gupta
Room 410 - Reading

-Choose another student- ▽ GO

This student scored in the Academic Warning level in Reading. For additional resources to identify Anita's difficulties, visit "Primary Assessment Tools."

| | Average % Correct | | Click on a topic below to see your class's breakdown in that topic. |
|---|---|---|---|
| | This Student | CPS Students | Based on this information, Anita Gupta is likely to need... |
| Tools and Techniques | | | Help with Fundamentals |
| Stated Information | 91 | 83 | Main Idea and Theme |
| Words and Phrases | 89 | 84 | Character |
| Genre and Literary Terms | 91 | 87 | Fact and Opinion |
| Bringing Texts to Life | | | Author's Purpose |
| Sequence | 67 | 62 | Setting |
| Setting | 81 | 75 | Cause and Effect |
| Character | 45 | 54 | Predicting Outcomes |
| Evaluating Evidence | | | Additional Instruction and Practice |
| Fact and Opinion | 60 | 60 | |
| Cause and Effect | 73 | 75 | Sequence |
| Overall Meaning | | | Stated Information |
| Main Idea and Theme | 40 | 50 | Advanced Work |
| Author's Purpose | 47 | 49 | Genre and Literacy Terms |
| Predicting Outcomes | 53 | 63 | Words and Phrases |

Help & Support : About the Grow Network : Terms of Service : Security & Policy : Contact Us © 2002 The Grow Network. All Rights Reserved.

FIG. 39

SYSTEM AND METHOD FOR PROCESSING TEST REPORTS

CROSS-REFERENCE TO RELATED APPLICATIONS

This application is a continuation of U.S. application Ser. No. 11/231,975, filed Sep. 22, 2005, which is a continuation of U.S. application Ser. No. 10/072,820, filed Feb. 8, 2002, which claims the benefit of U.S. Provisional Application Ser. No. 60/267,840, filed Feb. 9, 2001, which is hereby incorporated by reference.

COPYRIGHT AND TRADEMARK NOTICE

A portion of the disclosure of this patent document contains material that is subject to copyright and trademark protection. The copyright owner has no objection to the facsimile reproduction by anyone of the patent document or the patent disclosure, as it appears in the Patent and Trademark Office patent files or records, but otherwise reserves all copyright and trademark rights whatsoever.

FIELD OF THE INVENTION

This invention relates to systems and methods for analyzing and interpreting test results and for displaying test results together with diagnostic information and instructional materials.

BACKGROUND OF THE INVENTION

A standardized test consists of questions or tasks that are given to students for completion under similar testing conditions, thus enabling comparisons among the students' performance. The term "standardized test" is used here expansively to denote assessments of various sorts.

Standardized tests are employed in a wide variety of ways in our society. For example, standardized test results play an important role in certain employers' decisions concerning hiring and promotion decisions, certain government agencies' determinations of whether to license professionals, and certain educational institutions' admissions decisions.

In addition, standardized tests are increasingly used within K-12 education as a means of assessing students' progress in various disciplines such as math, reading, social studies, and language arts. At least 48 states now assess students' reading and mathematics skills at the elementary, middle, and high school levels. Increasingly, the results of end-of-year tests are seen as an important way to measure educational progress at the state and local level, and the consequences of these tests are growing; for example, in some places, students may be held back from advancing to the next grade based on their standardized test results.

A particular standardized test (a "Test") is designed to measure the performance of a test-taker in a given field or domain (a "Subject"). Subjects could include an academic discipline (e.g., college mathematics); (b) a professional field (e.g., tax accounting); or (c) a practical endeavor (e.g., driving). Individual test-takers are known as "Students", and aggregations of Students are known as "Groups". Groups can exist at different levels of hierarchy, such as the class or school level, or can be based on non-hierarchical relationships such as shared ethnicity, etc.

A Test is designed to measure Students' abilities to carry out certain tasks in that Subject and/or Students' knowledge about that Subject ("Skills", sometimes known in the literature as "Attributes" or "Rules"). A Test is designed for test-takers within a given ability range or at a certain point within a course of study, meaning that the Test has a certain "Level" associated with it.

All of the information that can be said about a Student or Group, based on its performance on a Test, is known as the "Test Results". Test Results is a broad concept, which can encompass both numerical and evaluation statements, either about Students' overall performance or performance in a specific Skill. Some examples of Test Results are as follows: a list of Student's total scores on a monthly diagnostic test; a chart tracking the average performance of girls in a school from one year to the next on the yearly math exam; or statements of "Needs Improvement", "Good Work", or "Review Vectors" associated with Students' performance in the various Skills assessed on a science exam.

Users are the individuals that use the Test Results for a given purpose. Some typical Users include Educators, Parents, and Students. For example, Educators (as defined below) may use Test results to guide instruction of Students, or to evaluate the overall progress of a class or school. Likewise, Parents may use Test Results by following up with their child's teacher to make sure the child receives additional instruction in a Skill.

Here, Educator is an extremely general term and can refer to any individual associated with the training or instructing of Students. For example, in the K-12 context, an Educator can include without limitation teachers, tutors, reading specialists, remediation specialists, or administrators of various kinds (such as a school principal, superintendent, or state education official). In other contexts, an Educator could be a job trainer, flight trainer, or professor, for example.

An organization that wants to process and display the results of a Test to a certain group of Users is known as the "Client". For example, a Client may be a local school district that wishes to process and display the students' results on a statewide standardized exam. In other cases, the Client could be the test publishing organization, which wants a way to effectively process and display the Test Results. Here, more generally, the term Client is used to refer to the organization or organizations that may provide inputs into the system, such as lists of Students and lists of Students' responses to tasks on the Test.

It is important to note that standardized tests have different reference methods. For example, some standardized tests are "Norm-referenced", meaning that an individual student's performance is implicitly compared against the performance of other students. Other standardized tests are "Criterion-referenced", meaning that students' performance is implicitly compared against performance standards in that Subject as established by pedagogical experts in that Subject. Criterion-referencing is common in a number of contexts, including licensure and certification exams within the professions, K-12 accountability measures, college entrance exams, and elsewhere. According to Gandal in The State of States: A Progress Report (1999), increasing numbers of states are moving away from norm-referenced tests that compare students to national averages and toward criterion-referenced exams that measure students' ability to master standards-based material.

Standardized tests may be given only at the end of a course of study (such as at the end of a grade in school), or they may be given at various times throughout the year to measure students' progress. Their purposes may be evaluative or diagnostic or some combination of both.

Also, standardized tests may be structured in various ways. For example, a standardized test consists of one or more questions (known here as "Items"). Items may be of one or more types; for example, two common types of Items are multiple choice Items (which require a student to choose the best response among various possible answers) and constructed response Items (which require a student to compose the student's own answer). Other types of Items could include tasks of other natures, in other forms, delivered by other media.

Finally, standardized tests may be administered and scored in diverse ways. For example, they can be administered in various media, such as in paper and through a networked computer. Scoring of Items can be performed manually, electronically, or in some combination thereof. Items are scored with respect to a "Scoring Guide" for that Test, which may include an answer key for scoring multiple choice questions and/or rubric guides for scoring essays and other types of open-ended questions.

Innovations in standardized testing continue to reshape the field, particularly within the field of psychometrics, the science of interpreting test results by means of statistical and cognitive models. Now some types of standardized tests involve a testing process in which different Students are given different Items and complex scoring methodologies are used to generate aggregate (and in some cases, Skill-specific) Scores that are comparable across Students.

Regardless of their subject, level, reference method, design, structure, administration, or scoring method, all standardized tests share a common feature: Test Results are received by individuals who want to utilize the results in certain ways. In some cases, the Users are only interested in aggregate information that specifies how well students performed overall on a test. For example, a school administrator may want to review the school's mean student performance on a test in a given subject from year to year, as one method of evaluating the school's progress in that subject over time.

Often, however, Users want significant diagnostic information that goes beyond students' overall test performance. For example, an Educator may want to know how well a given student performed on a particular Skill examined on a given Test. The Educator also may be interested in how well certain groups of students performed on particular Skills. Furthermore, the Educator may want to understand what instructional strategy is most appropriate for individuals and groups, based on results from that test. Other recipients of Test Results (such as Students or Parents) often desire similar information.

In order for Test Results to be useful to Users, Test Result information should be processed and displayed in a manner that permits Users to understand the results, navigate between different displays of the results, and take action based on the results. Current methods of processing and displaying Test Result information have various flaws: For example, the Skill categories in which the results are displayed are not useful, and the methods used to generate Skill-Item associations are crude. Likewise, the conclusions that are reached about individual Students and Groups, based on the Results, are often difficult for Users to understand and are based on sub optimal methods of generating statistical conclusions. Finally, the display of the Test Results itself leaves much to be desired, as current methods (such as U.S. Pat. Nos. 5,934,909 and 6,270,351) fail to enable Users to see Test Results and related instructional materials in a way that facilitates action.

These problems with the existing methods of processing and displaying Test Results are endemic across all forms of standardized testing, including such diverse fields as corporate training and higher education. Indeed, in the K-12 context, various experts have sharply critiqued current systems and methods for processing and displaying Test Result information. For example, the National Educational Goals Panel (1998) has concluded that printed reports given to Parents about the Test Results in K-12 "are not very clear". As a result, the nonprofit organization Public Agenda has concluded in its Reality Check (1998) that Parents "appear to lack a solid grasp of their schools' academic goals," as well as the "information essential to properly evaluate how well their children and schools are doing."

Similarly, even though many Educators in grades K-12 are told to use data to inform their instructional practice, they are not positioned to do so because current systems and methods do not render the information meaningful or comprehensible. As researchers at the UCLA Center for Research on Evaluation, Standards, and Student Testing have concluded, "The practice of applying large-scale data to classroom practice is virtually nonexistent" (2001).

The system and method described in this invention address deficiencies in the current methods for the processing and displaying of Test Results, with application to all forms of standardized testing.

OBJECTS AND SUMMARY OF THE INVENTION

The objects of the invention are several, primarily related to the importance of ensuring that Test Results are processed and displayed in such a way that Users can respond practically and effectively to the demonstrated educational needs of Students and Groups:

1. One object of the invention is to enable the processing and displaying of Test Results based on information and specifications provided by a Client requiring such services, and performed according to strict routines and operating processes. The information and specifications to be provided by the Client includes the Test itself, performance information such as the Student Scores on the Test Items, the identity of the Students and Groups who took the Test, specifications approved by the Client with respect to the displays to be shown Users, and educational content related to the Subject of the Test.
2. Another object is to produce Skill-by-Skill analyses of Test Results in a wide array of circumstances, for example even when the Client is itself unable to identify which particular Skills are actually being examined by a particular Test.
3. Another object is to ensure that the Skill categories deployed in performing the test analysis are both pedagogically useful and statistically sound. Reporting Test Results in Skill categories that are overbroad, too specific, inconsistent with the educational goals and practices of Users, or statistically ungrounded can render the results useless as a basis for instructional action by Users. Accordingly, a reliable process is needed that will establish useful, statistically sound Skill categories.
4. Another object is to introduce enhanced instructional insight into certain psychometric techniques for establishing correspondences between Items and Skills. These techniques take as their input a "coding matrix" that is typically binary in form; the results of the techniques could be improved if the coding matrix reflected more nuanced pedagogical insight about the extent to which an Item assesses a particular Skill.
5. Another object is to generate evaluation statements and recommendation statements about Students based on their performance. Users of Test Results do not simply want to see numerical Scores for each Student. Instead, they want meaningful verbal statements about how Students performed, both on the Test as a whole and in particular Skills, as well as concrete recommendations about steps for improvement. Therefore it is useful to establish practical procedures for assigning such statements based on Student Skill performance.

6. Another object is to produce Criterion-referenced conclusions about Students' performance on individual Skills. Many Tests are Criterion-referenced as a whole, meaning that Students' overall performance on the Test is compared against performance standards in that Subject that have been established by pedagogical experts. Users rely on these standards to know where their Students stand in mastery of a Subject. An object of this invention, therefore, is an efficient method for leveraging existing Criterion-referencing of Students' overall scores in order to generate approximate Criterion-referenced statements about Students' performance on the Skills assessed by the Test.

7. Another object is to use Test Results to identify the Skills in which Students and Groups have the greatest potential for growth. Users often want to understand how Students and Groups can most efficiently achieve mastery of various Skills. A method for identifying Skills where rapid progress might be expected, especially a method that is understandable to Users and computationally efficient, would be valuable to Users.

8. Another object is to generate diagnostic statements, including Skill-specific recommendations, for Groups of Students. Users will find Group-level recommendations particularly useful to the extent that the recommendations are aligned with the recommendations given for individual Students and take into account the effects of different Group-level instructional actions on individual Students.

9. Another object is to generate meaningful statements summarizing the performance of Groups. It is important that these statements resist regression towards the mean, as Students are conceptually aggregated into larger and larger Groups such as schools, school districts, and states.

10. Another object is to establish a system and method for obtaining a list of desired statistical analyses from an external source (here called the "Client"); performing calculations according to these specifications; and extracting the resulting information into electronic document structures that can be used to facilitate print and electronic displays of data. These statistical specifications could range widely and could include, for example, performance data that is to be calculated across time or by racial group.

11. Another object is to produce reports about Test Results and instructional information both in print and electronically, using the same electronic document structures and data source to ensure consistency between the two displays, and to encourage Users to see electronic displays through the Internet by means of access information included in the printed documents.

12. Another object is to provide Users with instructional materials that are organized in the same Skills assessed on the Test; that offer Users instructional responses in each Skill that are appropriate for Students with varying levels of mastery; and that are organized within each Skill in the same categories, or mastery levels, that are used to describe Students' performance in the Skills tested. This is highly effective in encouraging Users to act on the Test Results to address their Students' particular needs.

13. Another object is to enable Users to navigate directly among key electronic displays of Test Result information and instructional materials. It is critical, for example, to enable Users to go directly from seeing an overall Skill-by-Skill analysis of a Student or Group to additional information on that Skill, such as the breakdown of the Group into different mastery levels within that Skill alone.

14. Another object is to permit Users, such as teachers, to track Students' progress in Skills over time using diagnostic measures that are simple and efficient to implement. Test Results, though one useful measure of Student performance, should be supplemented by ongoing assessments in the classroom in order to be trustworthy. In order for this supplementation to be effective, the ongoing assessments should be practical to access, distribute, grade, and record. They also should be calibrated to generate evaluation statements that are tightly aligned with the evaluation statements given to Students and Groups based on the Test Results themselves.

The system of the invention involves several Operators that operate and coordinate multiple components and subcomponents, as detailed in later sections. Physically, the system may be constructed from a network of interoperating servers and desktop computers, which form a Local Area Network (LAN), connected to the Internet through a switch and secure firewall.

The method of the invention consists of several steps:

First, the system receives information about the Test itself, performance information such as the Student Scores on the Test Items, the identity of the Students and Groups who took the Test, specifications approved by the Client with respect to the displays to be shown Users, and educational content related to the Subject of the Test.

Second, the system executes analysis procedures to identify the Skills examined on the Test and determine Scores, i.e. numerical measures of Student and Group performance by Skill (assuming these are not originally provided to the system as an input). In doing so, the system implements routines to ensure that the Skill categories themselves are pedagogically useful and statistically sound.

Third, based on these numerical scores and on Client specifications about the information to be displayed, the system generates and stores various quantitative and qualitative indicators and recommendation statements by Student and Group, both in the aggregate and by Skill.

Fourth, the system organizes educational content based on how the Test scores themselves are reported, including by breaking down the content into the same Skills that are assessed on the Test, and by breaking down the content within a Skill into the same categories, or mastery levels, used in the evaluation statements for Students and Groups.

Fifth, in accordance with the specifications of the Client, the system generates displays of the Test Results and instructional information, and distributes these related displays to Users in print and via the Internet. The print reports may include access information so the Users can access their accounts online.

Sixth, the website operated by the system enables Users to obtain instructional information for each Skill at different mastery levels and provides direct navigational access between critical views of different Test Results. In one embodiment, the system additionally provides Educators with diagnostic assessment tools by Skill for use in the classroom. These assessments are scored by hand using the same evaluation statements as employed in assessing Students' and Groups' Test performance, and therefore they enable Educators to track Student performance by Skill in an ongoing way.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

FIG. 2 is a block diagram illustrating the technical components of the system.

FIGS. 5-1 and 5-2 show a block diagram illustrating the Data Storage Module component of the system.

FIG. 8 is a diagram illustrating Skill Organizations, described in the Skill Set Generator component of the system.

FIGS. 14-1 and 14-2 show a flowchart illustrating the operation process of the Utility Aggregation algorithm, described in the Aggregation Analyzer component of the system.

FIG. 14a is a diagram illustrating the different class breakdowns possible within the First Scenario, described in the Aggregation Analyzer component of the system.

FIG. 14c is a diagram illustrating the different class breakdowns possible within the Third Scenario, described in the Aggregation Analyzer component of the system.

FIG. 18 is a diagram of a portion of an Instructional Response Report, described in the Display Module component of the system.

FIGS. 19-1, 19-2A and 19-2B show a diagram of a sample printed report, described in the Display Module component of the system.

FIG. 23 is a diagram illustrating a "Welcome" display of a Display Website, described in the Display Module component of the system.

FIG. 24 is a diagram illustrating a "Main Menu" display of a Display Website, described in the Display Module component of the system.

FIG. 25 is a diagram illustrating a "Students' Overall Performance" display of a Display Website, described in the Display Module component of the system.

FIG. 26 is a diagram illustrating a "Skill Profile of a Student" display of a Display Website, described in the Display Module component of the system.

FIG. 27 is a diagram illustrating a "Skill Profile of a Group" display of a Display Website, described in the Display Module component of the system.

FIG. 28 is a diagram illustrating a "Performance in a Skill across Students" display of a Display Website, described in the Display Module component of the system.

FIG. 30 is a diagram illustrating an "Instructional Tools" display of a Display Website, described in the Display Module component of the system.

FIG. 35 is a diagram illustrating an "Introduction to Ongoing Assessments" Display for a Display Website with an Ongoing Assessment Component, described in the Display Module component of the system.

FIG. 36 is a diagram illustrating a "Performance in a Skill across Students" Display for a Display Website with an Ongoing Assessment Component, described in the Display Module component of the system.

FIG. 37 is a diagram illustrating an "Update Student Skill Assignments" Display for a Display Website with an Ongoing Assessment Component, described in the Display Module component of the system.

FIG. 38 is a diagram illustrating an "Ongoing Assessment" Display for a Display Website with an Ongoing Assessment Component, described in the Display Module component of the system.

FIG. 39 is a diagram illustrating a "Focus on a Student" Display for a Display Website with an Ongoing Assessment Component, described in the Display Module component of the system.

FULL DESCRIPTION OF THE DRAWINGS

1. System Overview and Requirements

Figure 1:
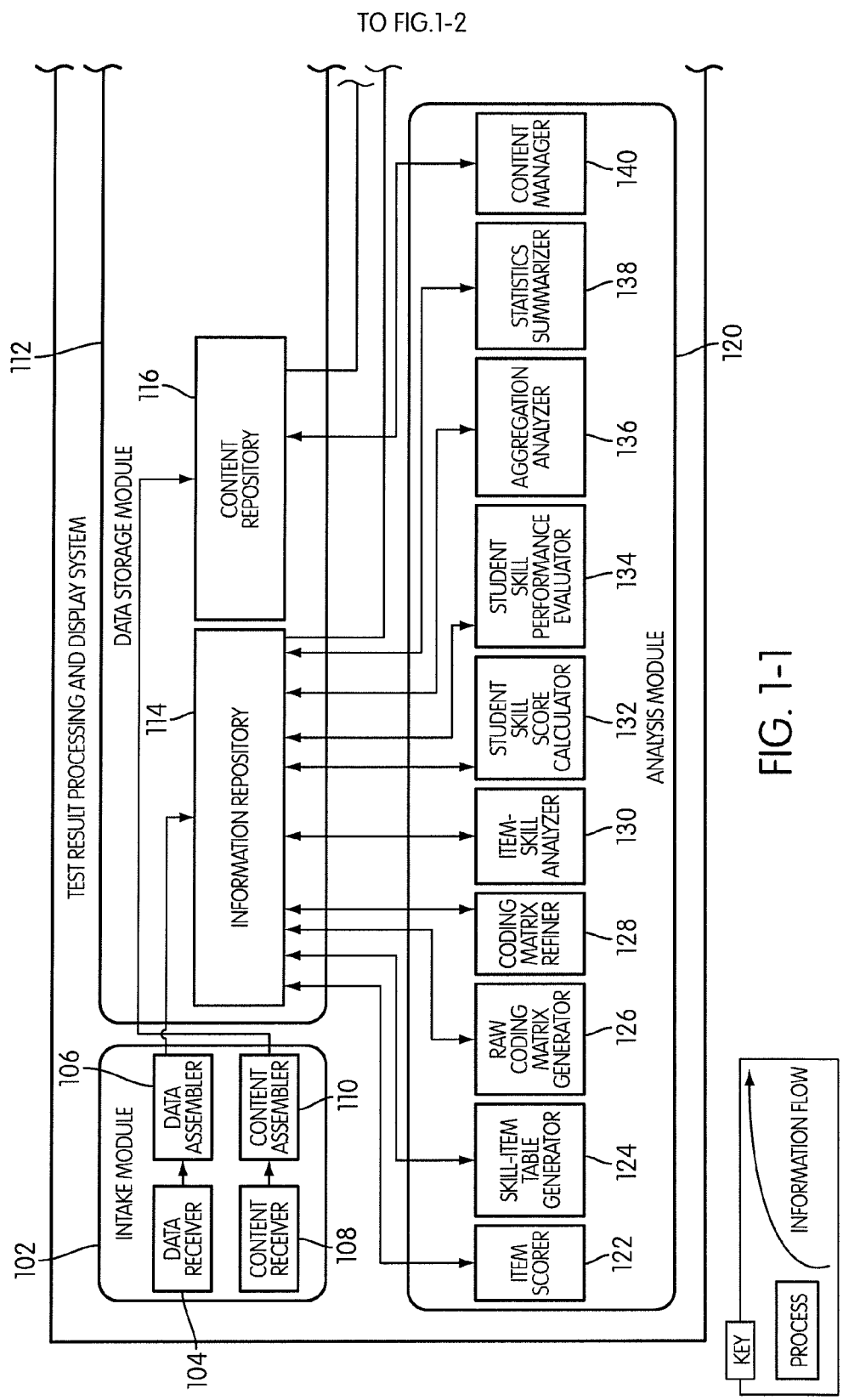
FIGS. 1-1 and 1-2 show a block diagram illustrating the system.
Figures 1, 2:
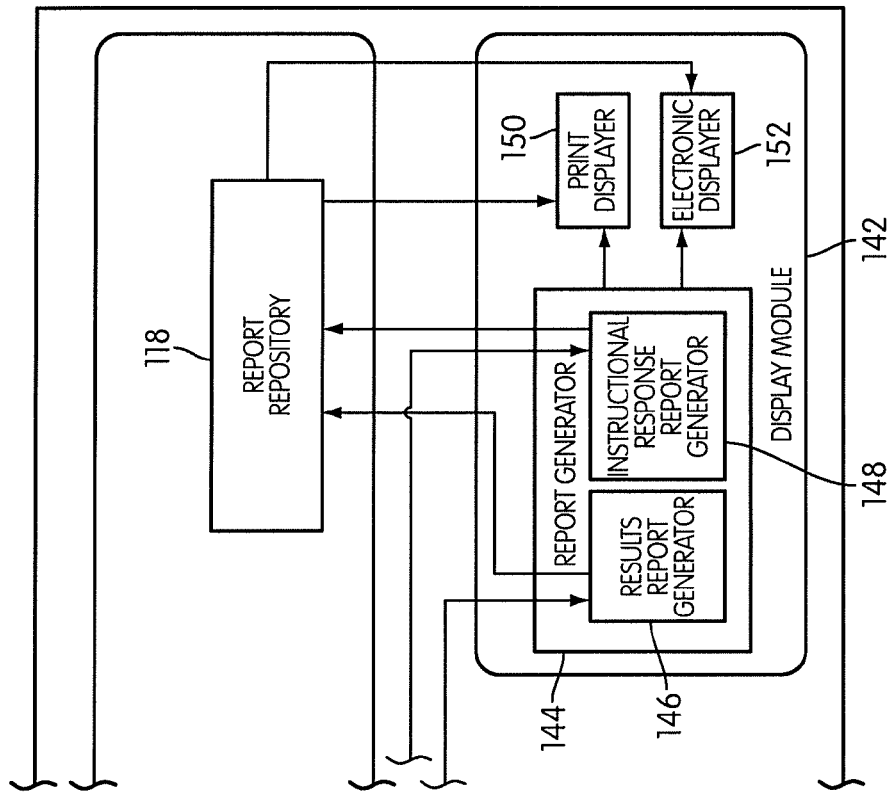
Figure 2:
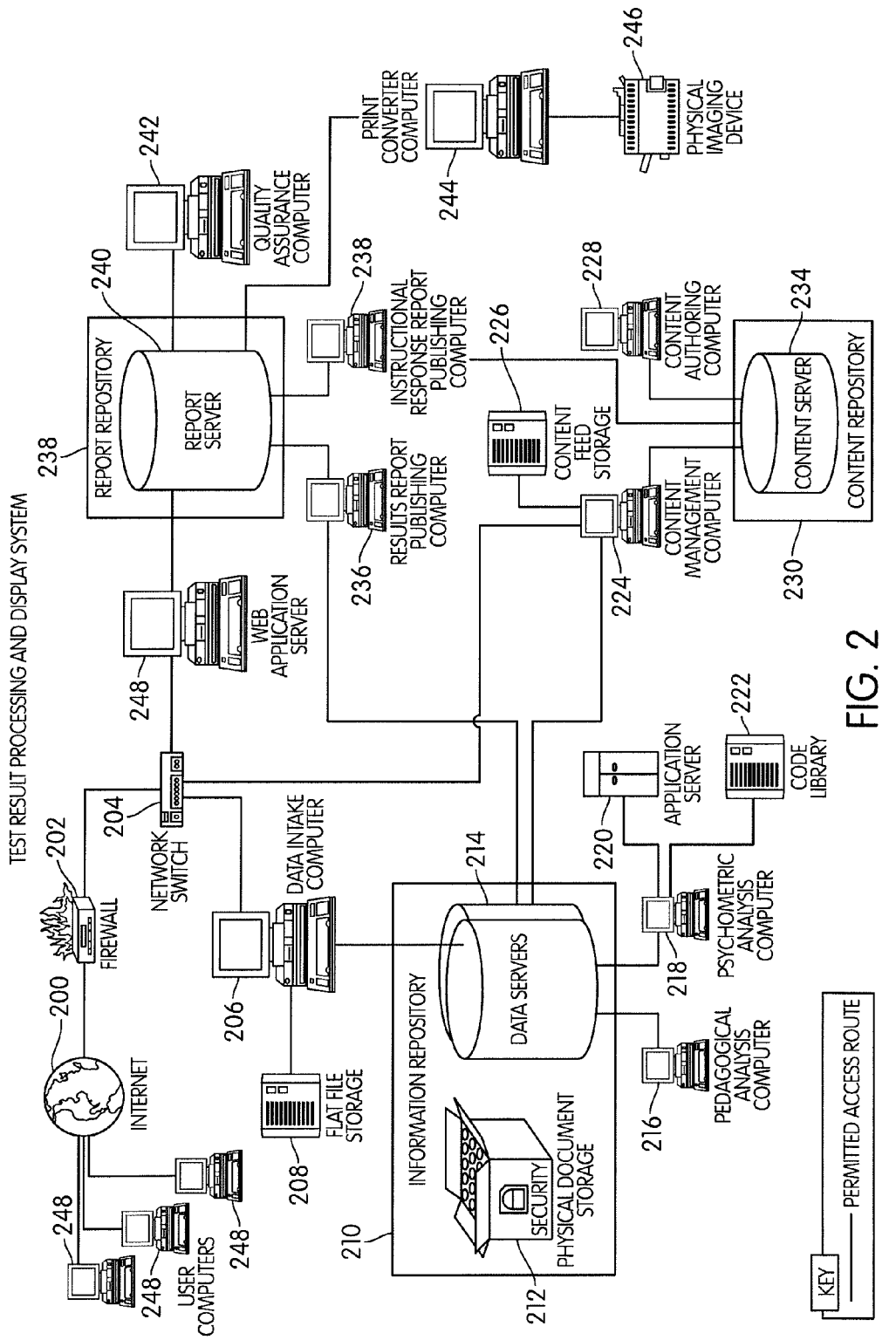

FIGS. 1-1 and 1-2 illustrate the four components of the system, each of which is more fully described in subsequent sections. These components are the Intake Module 102, the Data Storage Module 112, the Analysis Module 120, and the Display Module 142.

Figure 3:
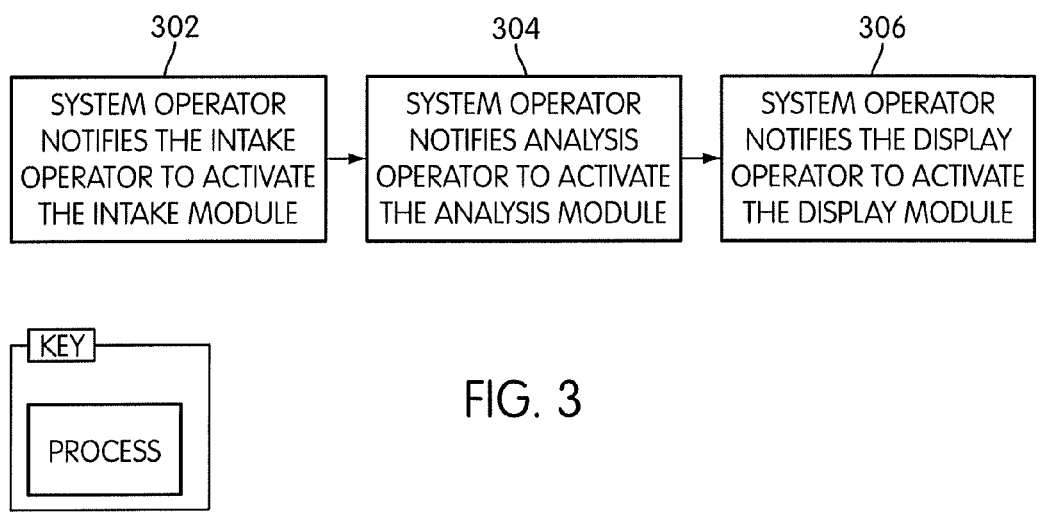
FIG. 3 is a flowchart illustrating the operation process of the entire system.

The system is activated by a System Operator, which may be instantiated as a human or a computer running a script. The System Operator carries out the following steps, as shown in FIG. 3.

Figure 4:
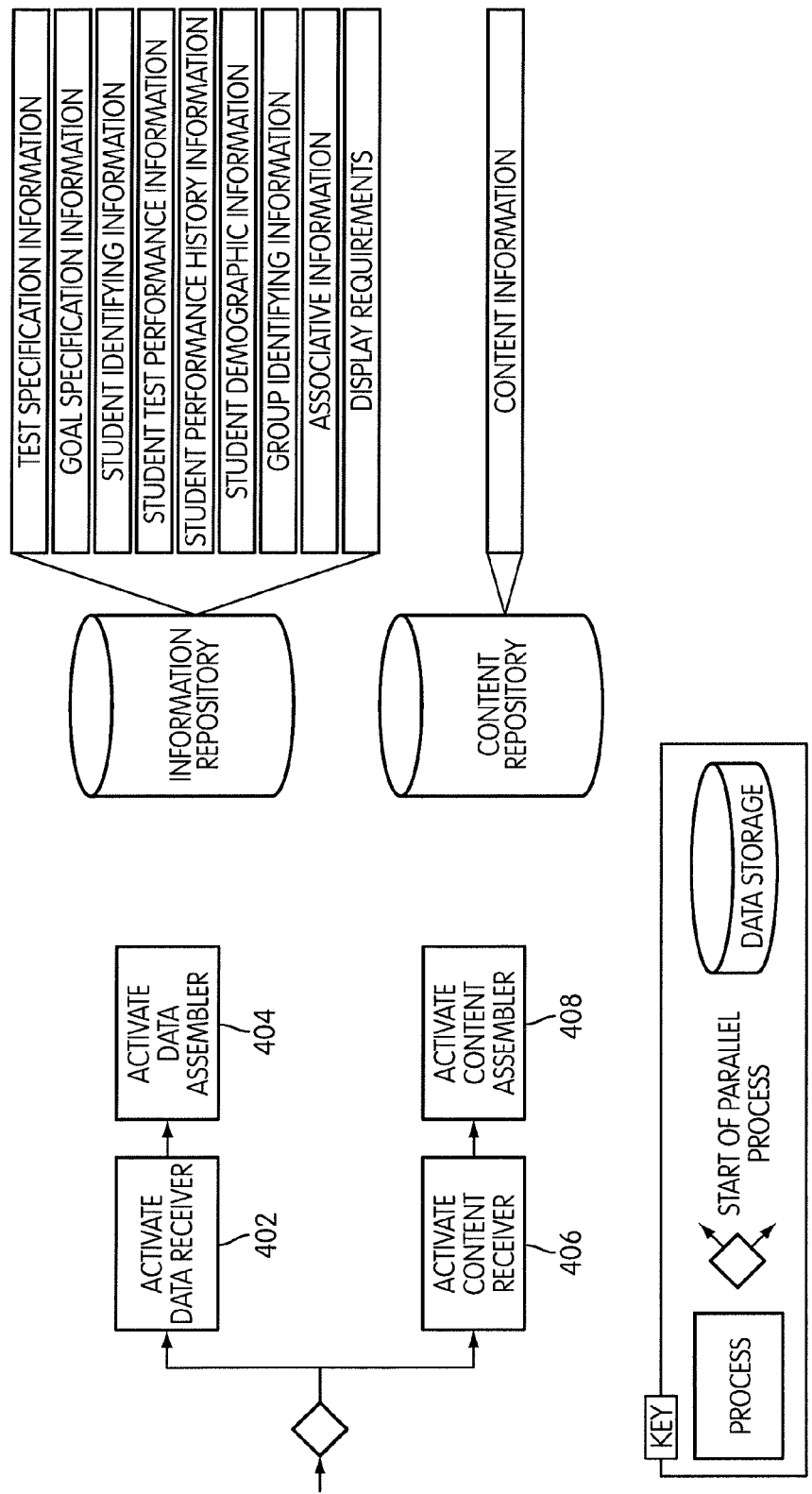
FIG. 4 is a block diagram illustrating the operation components of the Data Intake Module component of the system.

In step 302, the System Operator notifies the Intake Operator to activate the Intake Module 102, following the flowchart in FIG. 4. The Intake Module has two functions: First, the Intake Module populates the Information Repository 114 with inputs from the Client concerning the Test, the Students, the Users, as well as specifications about how the Client wants information to be displayed to Users. Second, the Intake Module populates the Content Repository 116 with instructional information from the Client related to the Subject of the Test.

Figure 6:
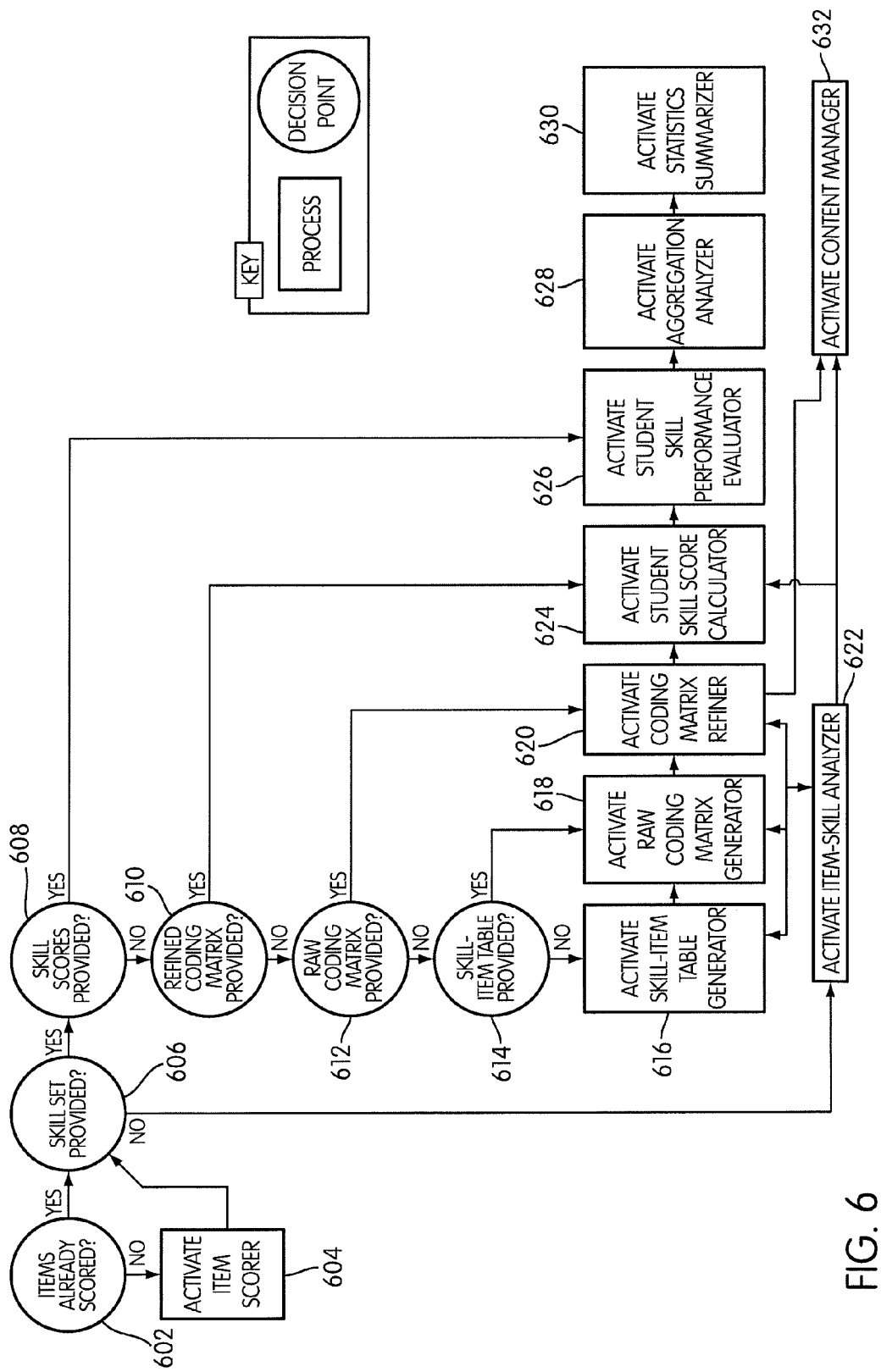
FIG. 6 is a flowchart illustrating the operation process of the Analysis Module component of the system, according to one embodiment of the system.

In step 304, the System Operator signals the Analysis Operator to activate the Analysis Module 120, following the flowchart in FIG. 6. Analogous to the Intake Module 102, the Analysis Module 120 has two functions: First, the Analysis Module 120 uses the information stored in the Information Repository 114 to generate numerical information, qualitative statements, and recommendations based on the performance of Students and Groups on the Test, and the Analysis Module 120 writes that information to the Information Repository 114 upon completion. Second, the Analysis Module 120 organizes the Content in the Content Repository 116 so that instructional information can subsequently be presented to Users in a manner that is tightly integrated with information about the Test Results themselves.

Figure 16:
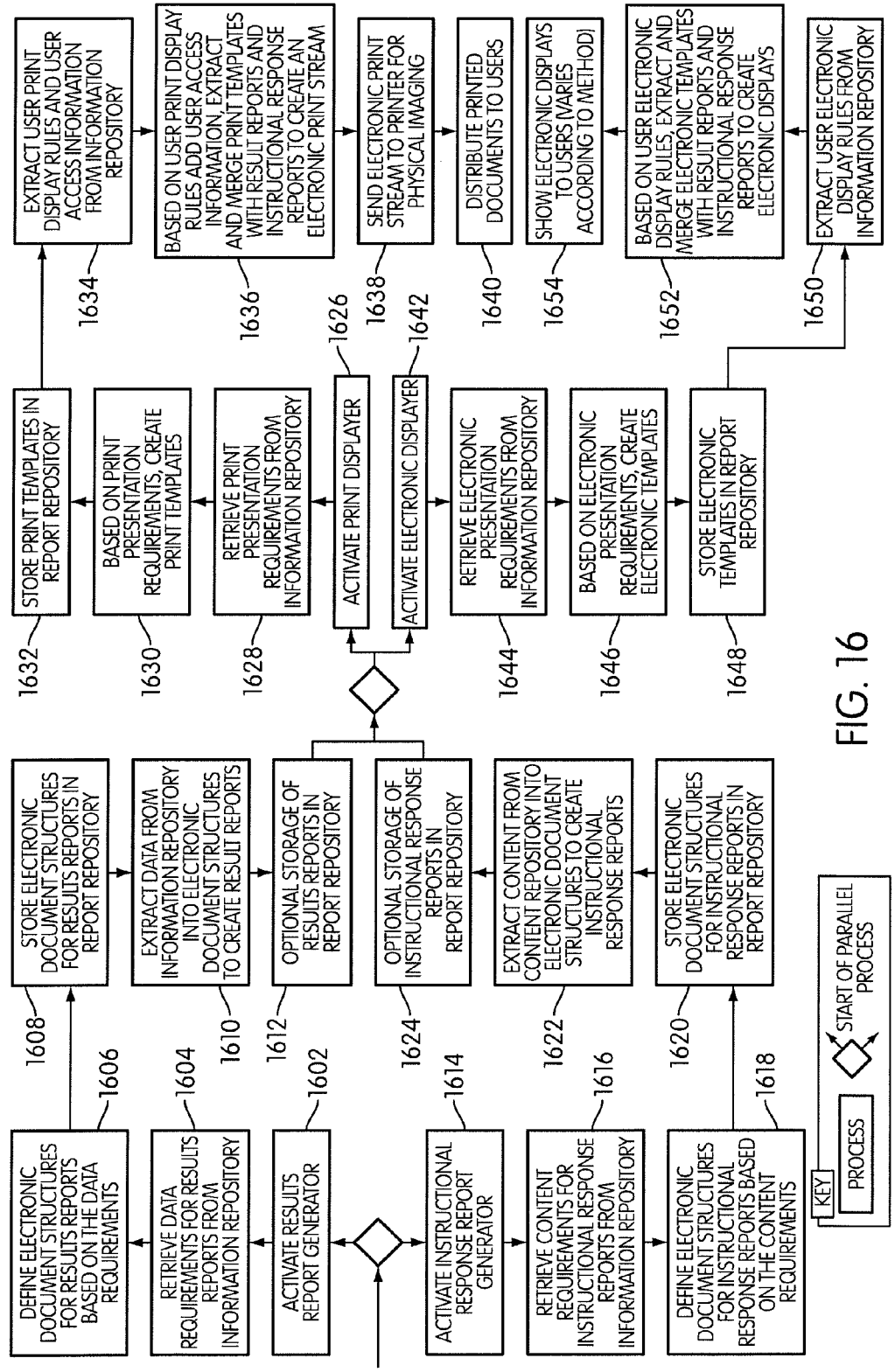
FIG. 16 is a flowchart illustrating the operation process of the Display Module component of the system.

In step 306, the System Operator signals the Display Operator to activate the Display Module 142, following the flowchart in FIG. 16. The Report Generator 144 extracts information from the Information Repository 114 and Content Repository 116 respectively, and assembles that information into electronic reports, called Results Reports and Instructional Information Reports respectively. The Print Displayer 150 and Electronic Displayer 152 then utilize these reports to create displays viewed by Users.

FIG. 2 illustrates potential technical components of such a system, which are the following:

The system may be constructed from a network of interoperating servers and desktop computers, which form a Local Area Network (LAN). This LAN can be built using Fast Ethernet technology over twisted pair cables (such as 100BaseT). Each of the servers and computers may be equipped with a compatible network adapter, and connected to a central Network Switch 204 via appropriate network cables. To segment the network into logical components for security, this Network Switch 204 may ensure Layer 2 through Layer 4 access control over traffic between the computers and servers, using a switch such as the Cisco® Catalyst® 2900 series. The lines between machines in FIG. 2 illustrate the permitted access routes.

There may be an uplink connection between the Firewall 202 and the Network Switch 204. The Firewall 202 may be an enterprise-class firewall appliance similar to as the Cisco® Secure PIX® 500 series. The purpose of this Firewall 202 is to restrict traffic between the LAN and the Internet on every direction and every network port unless specified otherwise in the following paragraphs.

The Data Intake Computer 206 facilitates the transfer of data from external test data sources into the LAN. In one embodiment, this Data Intake Computer 206 should have access to enough storage space either internally or through Flat File Storage 208 space to permanently store every data file transferred into the LAN. In a typical configuration, this Data Intake Computer 206 can be an Intel® Pentium® III-class machine with at least 20 gigabytes of storage space running the Microsoft® Windows® 2000 operating system. The Flat File Storage 208 may be a similar machine but with additional space on its hard drive. The Firewall 202 may be configured to allow Internet communications to and from the Data Intake Computer 206.

An operator may run programs familiar to those skilled in the art on the Data Intake Computer 206 to parse the data file and load it into one or Data Servers 214. The Data Servers 214 may run relational database management systems (RDBMS) that allow for efficient querying and storage of tabular data. These Data Servers 214 may run Oracle8i™ Standard Edition on top of a UNIX operating system (OS) such as Sun™ Solaris™ 7 OS. These Data Servers 214 may be powerful enough to allow for concurrent, multi-user access (both read and write) to the data that is stored within them. Typically, these Data Servers 214 can be enterprise-class servers such as the Sun™ Enterprise™ 420R with one or more 450 MHz CPUs and 100 or more gigabytes internal disk storage. Additional external disk storage can be added as total amount of data on the machine grows by attaching external disk arrays such as Sun™ StorEdge™ A1000 disk arrays to the data servers via a fast network connection or SCSI-style connectors. To ensure security of the data stored within these Data Servers 214, detailed access control may be implemented using mechanisms provided by the DBMS, according to methods familiar to those skilled in the art.

For documents that are delivered by mail or by hand, a secure storage area can be used to store sensitive physical documents such as test booklets. Security policies of permitting access to electronic media may serve as a reference when granting access to this Physical Document Storage 212.

Several computers may access the Data Servers 214 to perform a variety of functions. Both the Pedagogical Analysis Computer 216 and the Psychometric Analysis Computer 218 may be installed with client software that is compatible to the DBMS used on the data server. The operators of the two aforementioned computers are likely to be authorized users as defined by the access control profile stored in the DBMS. They then may have the privileges to extract data from the DBMS over the LAN onto their local computers to perform further data processing. These two computers may be powerful desktop machines that can perform calculation of large data sets efficiently. Intel® Pentium® III class machines with more than 512 MB of RAM would be suitable.

The Psychometric Computer 218 may be configured to run standard statistical packages such as such as SAS®, SPLUS®, Mathematica®, BILOG®, etc. Using those statistical packages as a software platform, additional interactive programming and iterative refinement of the psychometric programming code can be carried out. Throughout the development of the code, the artifacts may be stored in a Code Library 222, which could be a workgroup server-class machine running the Microsoft® Windows® 2000 operating system that houses a configuration management system similar to StarBase's StarTeam™ system. Once source code is finalized, the code can be transferred to the Application Server 220, which may be an enterprise-class server running the UNIX operating system that allows the same code to run faster on the data set. An example of an appropriate Application Server would be a Sun™ Enterprise™ 420R with one or more 450 MHz CPUs and 100 or more gigabytes of internal disk storage. To ensure interoperability of code between the Psychometric Analysis Computer and the Application Server, both machines may run analysis software from the same statistics software vendor.

Similar to the Data Intake Computer 206, a Content Management Computer 224 may be configured to serve as storage for content transfer from outside the LAN. This Content Management Computer 224 may run the Microsoft® Windows® 2000 operating system and contain copies of a collection of content editing software for various types of text, images, or other content resources. Content that is imported from external source may be stored in their native format in a Content Feed Storage 228 device connected to the LAN. This allows selective incorporation of external content into the Content Server 234.

The Content Server 234 may run multimedia content repository software that allows multiple types of content resources to be stored on a single system. Software packages, such as Oracle® Internet File System (iFS), are candidates for such a Content Repository 230. An enterprise-class server running the UNIX operating system, similar to the one used for the Data Servers 114, may be used to power the Content Repository 230.

Content that is generated by internal content authors may be created and edited using one or more Content Authoring Computers 228 running similar software and hardware as the Content Management Computer 224. These machines may have user-friendly interfaces that authors can use to add and modify content that is stored in the content repository. Software packages such as Arbortext™ Epic™ Editor may be suitable as the front-end for these content-editing tasks.

For extracting and merging useful data and content, and generating results reports, a Results Reports Publishing Computer 236 may be configured to access the Data Servers 214 using a database access protocol such as Java Database Connectivity (JDBC). The Result Reports Publishing Computer 236 may be a powerful personal computer running the Microsoft® Windows® 2000 system with one or more Intel® Pentium® III processors. The output of the publishing computer is a self-contained report encoded in a markup language such as XML. These structured documents may then be stored in a Report Server 240 for further processing. Similarly, content from the Content Repository 230 may be selected and extracted by an Instructional Response Report Publishing Computer 238 and placed inside the report repository in a markup language such as XML or HTML. The hardware configuration of the two report-generating machines may be similar: Intel® Pentium® III-class personal computers with one or more CPUs running the Microsoft® Windows® 2000 system.

The Report Server 240 may be an enterprise-class machine similar to those used for the Data Server 214 and Content Server 234. For the storage of the markup documents, for example, in the XML or HTML format, a well-defined directory structure using the native file system of the UNIX operating system may be sufficient. The Report Repository 238 may include more than one Report Server 240 if needed for scalability.

To ensure the quality of the reports in the Report Repository 238, a Quality Assurance Computer 242 may contain a custom program that is configured to extract all or a sample of reports and run programs to ensure the consistency and completeness of both types of reports. The Quality Assurance Computer 242 may be an Intel® Pentium® III-class personal computer with one or more CPUs running the Microsoft® Windows® 2000 system. Any errors discovered during this quality assurance process may prompt rework in all or some of the previous steps.

It may be necessary to convert the markup documents stored in the Report Servers into formats that a Physical Imaging Device 246 can interpret and print. A separate Print Converter Computer 244 can be used for this purpose. A typical output language for the print converter may be the Adobe® PostScript® format. A possible configuration for this Print Converter Computer 244 is a workstation-class machine with one 450 MHz processor running a UNIX operating system such as Sun™ Solaris™ operating system. It is also possible to use a data merge print language that generates the PostScript format. This Print Converter Computer 244 may also be responsible for scheduling and spooling print data to one or more Physical Imaging Device 246. Possible imaging devices may be high-speed laser printer such as the Xerox® DocuTech® series.

To convert and serve the files in a human-friendly HTML format to authorized users via the World Wide Web, a Web Application Server 246 may be placed between the Internet and the Report Server 240. The Firewall 202 may need to be configured to allow Internet access to the Web Application Servers 246 over the Hypertext Transfer Protocol (HTTP). One possible configuration of the Web Application Servers 246 would be a workstation-class UNIX server similar to the one used as the Print Converter Computer 244. One or more Web Application Servers 246 may be installed as a cluster for increased performance and fail-over in case of hardware or software failure. Report-specific code may add visual embellishments and hypertext navigation structure using a web template language such as JavaServer Pages™ (JSP). A JSP-compatible engine such as Apache Tomcat may be used on the Web Application Server 248.

Also, the Web Application Server 248 may manage the User authentication process, ensuring that only authorized Users have access to the various electronic displays. The Web Application Server 248 may accomplish this by making queries to the Data Servers 214 using a protocol such as Lightweight Directory Access Protocol (LDAP) or Structured Query Language (SQL) to retrieve data stored about a User who is attempting to log on. The retrieved information may consist of a unique Log In ID and password for a User, as well as the User Electronic Display Rules that define what a particular User is able to view.

Finally, authorized users on the Internet may use a personal computer that can run web browser software such as Microsoft® Internet Explorer® 6 or Netscape™ Navigator™ 6 to access the reports served up by the Web Application Servers 246.

2. Intake Module

The Intake Module 102 consists of two parallel processes by which a range of information is received from the Client, assembled, and stored. This information relates to such matters as the Test itself, the identity of the Students and Groups who took the Test, and the specifications approved by the Client with respect to the displays to be shown Users. The information also includes educational content sent by the Client to be shown to Users in conjunction with the Test Results.

FIG. 4 illustrates the operation process of the Intake Module. The System Operator activates the Intake Module 102 by notifying the Intake Operator (which could be person or a computer implementing a script), which notifies in parallel the Data Receiver Operator and the Content Receiver Operator, so that the Data Receiver 104 and the Content Receiver 108 are activated in steps 402 and 406 respectively.

2.A. Data Receiver

Once the Data Receiver Operator activates the Data Receiver 104 in step 402, the Data Receiver receives information from the Client about a wide range of matters related to the Test and stores that information temporarily, allowing the Data Assembler 106 to assemble the data in step 404.

Figures 1, 5:
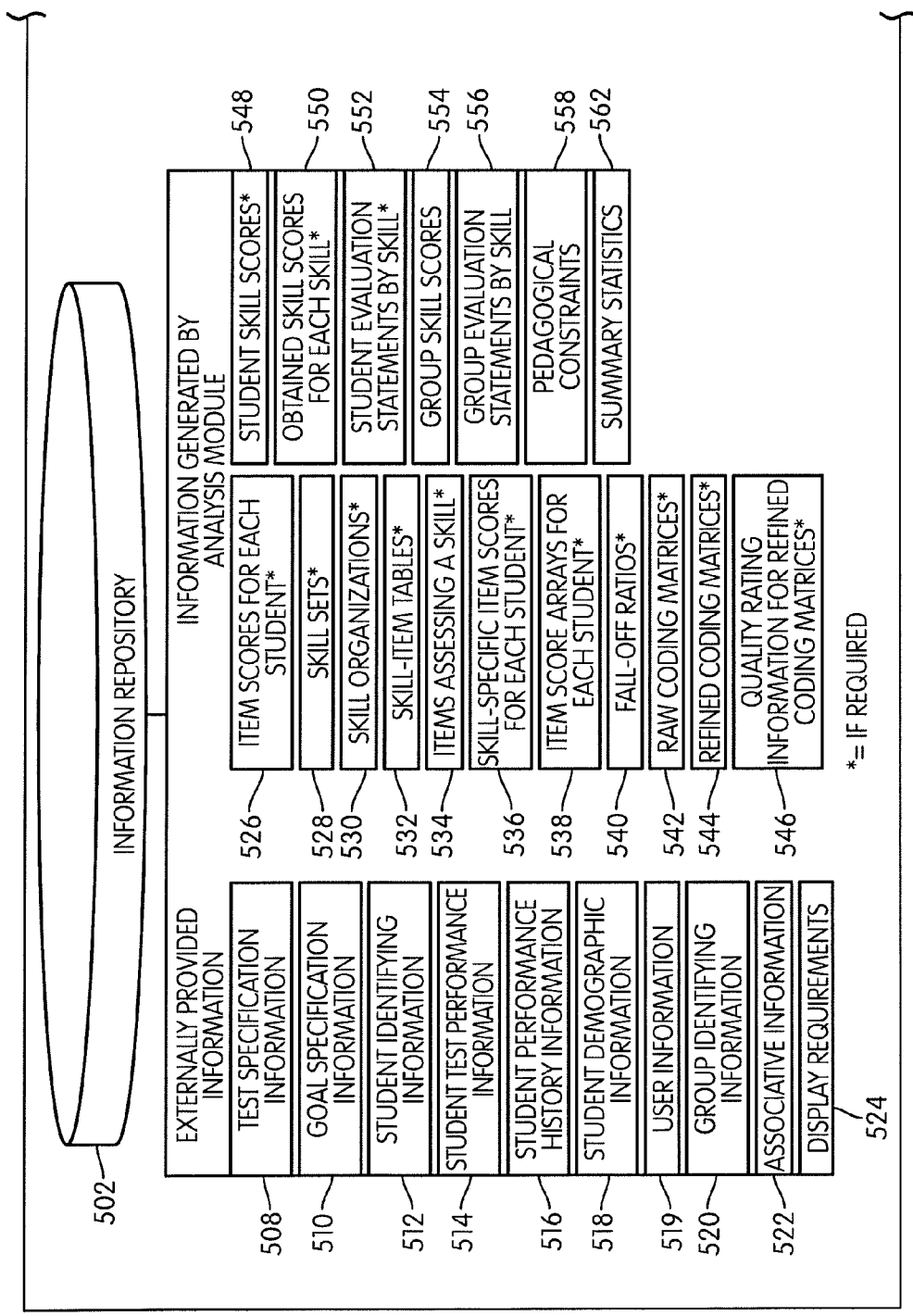
Figures 2, 5:
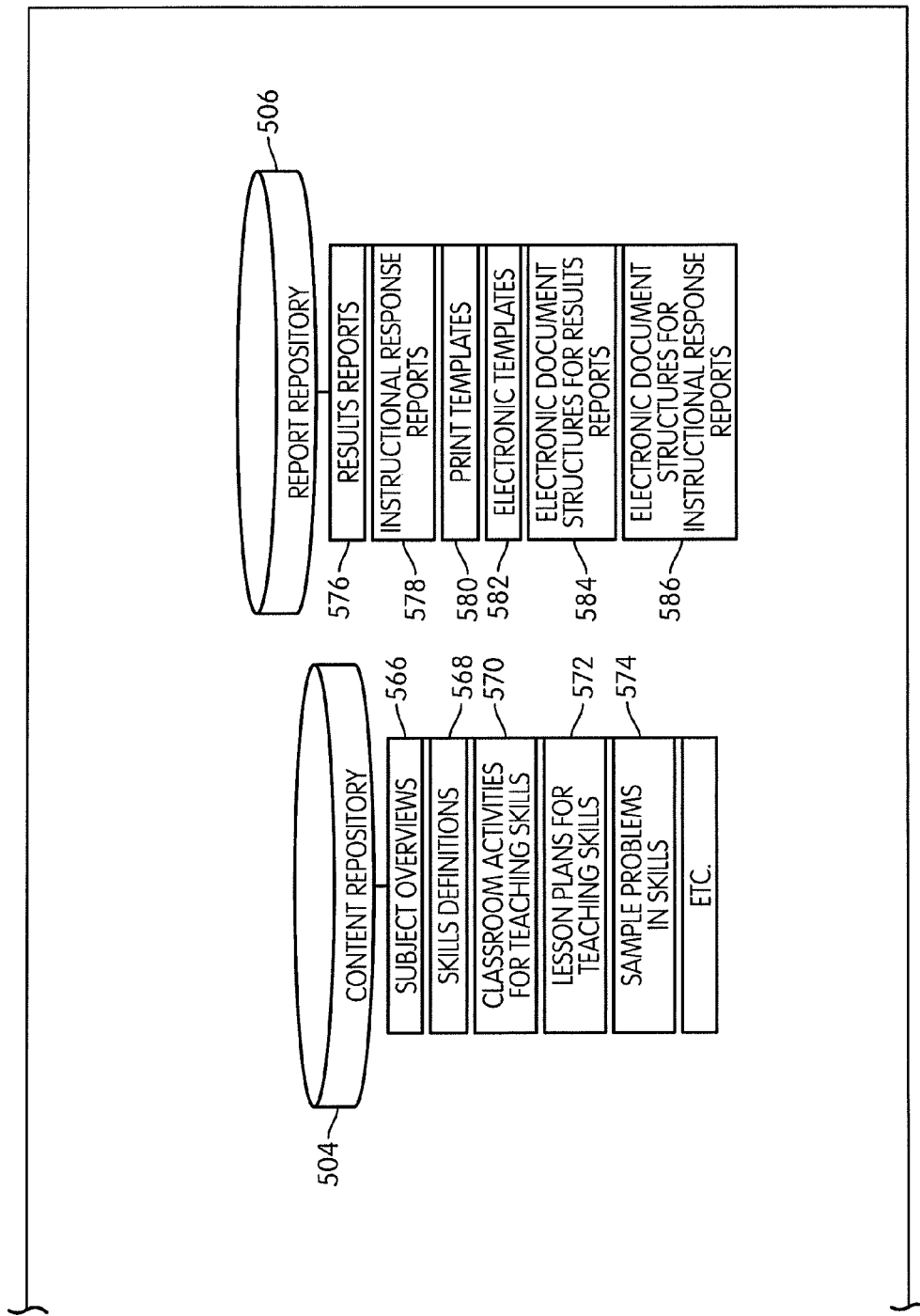

FIGS. 5-1 and 5-2 illustrate the information that is delivered by the Client to the Data Receiver 104 and eventually stored by the Data Assembler in step 404:

1. Test Specification Data

For each Test that is to be analyzed by the Analysis Module 120 and reported upon by the Display Module 142, the Client may provide "Test Specification Information" 508. Depending on the Client's preferences, needs, or abilities, the type of Test Specification Information 508 provided by the Client may vary:

The Client may provide the actual form of the Test, or a facsimile thereof. The Client may choose to provide the Scoring Guide for the Test, but if not provided by the Client, a Scoring Guide can be developed by experts skilled in the tested Subject.

In addition to the actual form of the Test, the Client may choose to provide information about the cognitive demands made by the Test. This information is known as a "Skill Set" and is defined in more detail in the description of the Analysis Module 120. If the Client does not provide the Skill Set, the Skill Set will be generated by the Item-Skill Analyzer 130.

Finally, in addition to the actual form of the Test and the Skill Set, the Client may choose to provide complete information showing the degree of relevance of each Skill in the Skill Set to each Item on the Test. This information is known as a "Coding Matrix" and is defined in more detail in the description of the Analysis Module 120. If the Client provides the Skill Set but not the Coding Matrix, then the Coding Matrix will be generated by the Analysis Module 120.

2. Goal Specification Information

The Client may provide "Goal Specification Information" 510, namely (1) a list and description of the educational goals in the subject examined by the Test Items, appropriate to the Level of the Test, and (2) a list and description of the criteria to be used for determining Students' mastery of such goals.

3. Student Identifying Information

The Client may provide "Student Identifying Information" 512 such as Student names, identification numbers, or other personal information.

4. Student Test Performance Information

The Client may provide "Student Test Performance Information" 514 that enables determination (according to the methods described in the Analysis Module 120) of each Student's performance with respect to the Skills examined on the Test. Depending on the Client's preferences, needs, or abilities, this particular information could be provided in one of three ways: as a listing of each Student's response to each Item on the Test; as a listing of each Student's Score for each Item on the Test; or as a listing of each Student's Score for each Skill examined on the Test.

An Item Response is a particular Student's response to particular Test item. An Item Response may be obtained in the form of a pencil mark on a bubble sheet; an alphanumeric character in an electronic file; a physical document bearing the Student's writing, artwork, computations, or other responses; as a digitized (scanned) electronic version of such a document; as analog or digital recordings; or in any other form.

In addition to this information, the Client also may choose to provide Student Overall Test Performance Information. This information is numerical or qualitative measures of Students' level of accomplishment on the Test as a whole, examples of which are as follows:

- total number of Items answered correctly;
- percent of Items answered correctly;
- total number of points earned, using an internal scoring metric;
- percent of points earned;
- rank measures (such as percentiles or quartiles) based on the above numbers;
- scale scores computed from individual Item performance by means of psychometric models familiar to those skilled in the art of measuring student test performance (scale scores being overall numerical measures that permit comparison of test results from one administration of the exam to another); and
- qualitative evaluations of Students' performance (such as "Meeting the Standards", "Far Below Standards", etc.) based on the above numbers.

5. Student Performance History

To permit the generation of displays showing trends in Student accomplishment, Student educational needs, the effectiveness of educational programs, or similar metrics, the Client may provide "Student Performance History Information". This consists of information concerning the performance of Students on prior Tests, including either Overall Performance information or Skill-Specific Performance information or both.

6. Student Demographic Information

To permit the formation of Groups along dimensions of interest to the Client, the Client may provide Student Demographic Information 518 about each Student. Such information may include information such as the Students' age, race, ethnicity, gender, and/or socioeconomic status.

7. User Information

In order to enable Users to view the displays produced by the Display Module 142, the Client may provide "User Information" 519 that uniquely identifies Users. For example, the Client could provide names, identification codes, titles, and contact information of the Users.

8. Group Identifying Information

To permit the formation of Groups along dimensions of School organization, the Client may provide "Group Identifying Information" 520. This may include listings of any or all of classrooms, schools, districts, ad hoc tutoring groups, training centers, etc.

9. Associative Information

The Client also may provide information that associates the various actors and entities that are referred to during the processing and displaying of Test results. "Associative Information" 522 includes the correspondence between specific Students and their respective Groups, hierarchical associations among Groups and institutions (i.e., which classes are within which school), and personnel associated with a specific Group for a given Subject (i.e., which teacher teaches math to a certain class).

Associative Information may be gathered from many sources, including without limitation class rosters, school enrollment lists, human resource files, payroll lists, district personnel charts, and student course schedules.

10. Display Requirements

For a given Test, the Display Requirements consist of specifications of the displays that may be made available to Users. As will be discussed in more detail with respect to the Display Module 140, Users may receive displays of data or displays of instructional material or, most commonly, displays of both.

As implemented in this system and method, the Client may approve the particular type of displays it wants the Users to receive. There are five aspects to this decision:
(1) What kinds of Test Result information to display in print and electronically?
(2) What kinds of instructional information to display in print and electronically?
(3) In what format to display Test Result and instructional information in print?
(4) In what format to display Test Result and instructional information electronically?
(5) Which Users should see which kinds of information?

(Display Requirements typically will vary from User to User. For example, customarily the Client may want Users who are teachers to see displays of individual information about many Students, but the Client may want Users who are Students to see only information about themselves.)

According to the terminology used here, the five types of Display Requirements 524 are as follows:
(1) Data Requirements for Results Reports
(2) Content Requirements for Instructional Response Reports
(3) Print Presentation Requirements
(4) Electronic Presentation Requirements
(5) User Display Rules Data Requirements for Results Reports Data Requirements for Results Reports are text files that specify what data is needed in order to generate each display that concerns Student Test Results. For example, it may be desirable to display all Students' national percentile rank in a given Subject and Level of a Test. In that case, advantageous data would be the Students' names, the Subject and Level of the Test, and each Student's national percentile rank in that Test, in addition to the explanatory information needed concerning the Student's teacher, class, and school.

In another example, the Client may want to display how a specific Group of Students (as defined by gender, race, or socio-economic status) performed in a specific Skill. In that case, it would be advantageous to obtain numerical and qualitative information about each Student's performance in each Skill, as well as information that will enable the appropriate Group of Students to be identified.

Finally, the Data Requirements for Results Reports may also include specifications of the particular recommendation statements that should be made about Students or Groups. These recommendation statements, of course, can vary by the type of User being addressed: The types of recommendation statements given to Educators, for example, may differ from the recommendation statements given to Students. The Data Requirements for Results Reports also may explain how the Evaluation Statements should be presented to Users, and how those statements relate to evaluation statements that may already be in use by the Users. This relationship serves as an input to the statistical analysis performed in the Student Skill Performance Evaluator 134, as shown in the discussion of "Coarse Graining" therein.

Content Requirements for Instructional Response Reports

The Content Requirements for Instructional Response Reports are text files that specify the type of the instructional information that is to be presented along with the Test Results. These requirements will vary by User. More details about this instructional information is included below in the description of the Content Receiver 108 and the Content Assembler 110.

For example, the Display Requirements identify whether the instructional information to be displayed may consist of some various combinations of the following elements:
  Overview of the Subject at a particular Level
  Definition of a particular Skill within that Subject, at a particular Level
  Analysis of how the Skill aligns with educational goals, such as the relevant state and local standards
  Common difficulties that Students face with respect to the Skill
  Listing of related Skills
  Instructional strategies that Educators might use to help Students improve in the Skill, including strategies organized by difficulty level
  Activities that Educators may use to help Students improve in the Skill, including activities organized by difficulty level
  Activities or games that Students and/or Parents can use to build mastery of a Skill
  Sample problems in the Skill that Educators may provide to Students, including problems organized by difficulty level and problems organized or by subskill within the Skill As suggested in this last item, the Content Requirements specify which types of content need to be organized by difficulty level. The Client may decide that sample problems should be organized by difficulty level so that they can be distributed to Students appropriately according to their needs. On the other hand, the Client may decide that instructional overviews in a Skill should not be specific to a difficulty level, so that teachers can use that information in instructing their class as whole.

It is important to understand that different Users may desire different types of instructional information: For example, teachers may benefit from lesson plans; an administrator may benefit from materials useful for training teachers to better understand Skills; Parents may benefit from materials that recommend books appropriate to a Student's interest and level of performance; and Students may benefit from games that build mastery of Skills.

Also, the Content Requirements approved by the Client may vary by Skill: For example, instructional material that is used to teach Skills in math is typically structured quite differently than the instructional material used to teach Skills in social studies.

Finally, it is important to note that a Client may approve multiple Content Requirements even for a given Skill, in order to allow the Print Displayer 150 and the Electronic Displayer 152 to show Students different views depending on Students' needs. For example, the Content Requirements for one type of Users (i.e., Students) with respect to a given Test could specify two information structures: one for sample problems and for fin activities. In such a scenario, the Content Requirements also will include decision-rule information about which Students should see which type of information.

Print Presentation Requirements

Print Presentation Requirements are electronic text files and prototypes that together specify the printed document or documents that a particular type of User will receive. For example, the Print Presentation Requirements may specify that a Student will receive a 2-page document, one side of which is a form letter to the Student's parent from the principal and the other side of which is a "Skill Profile Table", where the precise data involved in that table is specified in the Data Requirements.

The Print Presentation Requirements include all necessary specifications to transform the raw elements of the Test Results and instructional information into printed documents for the Users. These specifications, for example, will include the colors and styling to be used on the documents, the page length, and the location of the various displays of Test Result and instructional information.

Electronic Presentation Requirements

Analogous to the Electronic Presentation Requirements, the Electronic Presentation Requirements are electronic text files and prototypes that specify all of the types of electronic displays that a particular type of User will see, and under what circumstances the User should see those displays. In the case of a website that a User will access, the Electronic Presentation Requirements may include all the necessary elements (such as color, navigation elements, etc.) that would allow one skilled in the art of web design to create a website that shows all of the information in the manner specified.

User Display Rules

The final aspect of the Display Requirements that may be approved by the Client is the "User Display Rules", which are electronic text files containing descriptions of which types of information is to be seen by which Users. There are User Print Display Rules and User Electronic Display Rules, each for the respective display medium.

User Display Rules simply define what information particular types of Users are permitted to see: For example, the User Print Display Rules could specify that a local job training coordinator should see a printed document that describe the performance of all job training classes at a job training institute, while a regional job training coordinator should see a printed document that describes the performance of a all job training classes in that region.

In the school context, User Display Rules may specify the year of the Test Results to be shown to a teacher. For example, in typical cases, 3rd grade Students typically take exams in the late spring before school ends. A 4th grade teacher in the fall should see Students' results based on the new class organization for that school year.

Also, User Display Rules can specify more detailed criteria. In particular, User Electronic Display Rules may specify a high degree of customization of displays on a website, given the dynamic nature of that medium: For example, one User Electronic Display Rule could be that if the User is a Parent of a Student who performed at or below a certain overall score on a Test, the User should see an electronic display that warns them that their Students may be facing significant academic challenges. Another User Electronic Display Rule could be that a User who is a tutor or teacher should see an electronic display of a complete packet of Instructional Response Materials that would be made available with respect to each Student whose Test Results are displayed on the website.

Physically, step 402 may be accomplished by means of the Data Intake Operator, who could be an individual or a computer operating according to a script. With respect to the receipt of electronic information, the Data Intake Operator may operate the Data Intake Computer 206, which is connected to the Internet 202 via a firewall 204, and can obtain information from the Client in methods that are familiar to those skilled in the art, such as e-mail of tables, File Transfer Protocol, or other means.

After the Data Intake Computer 206 receives the electronic information, it may store this information internally or in the attached Flat File Storage mechanism 208, which may store information using a file system, a relational database, or both.

With respect to physical information, such as actual Test forms and Scoring Guides, the Data Intake Operator may this information by familiar methods, such as regular mail or personal delivery. The Data Intake Operator simply holds this information for use by the Data Assembler 106.

When step 402 is complete, the Data Intake Operator notifies the Intake Operator.

2.B. Data Assembler

Once the Intake Operator is notified that the Data Receiver has completed processing, the Intake Operator notifies the Data Assembler Operator. The Data Assembler 106 takes the information that had been stored temporarily by the Data Receiver 104 and, using methods known to those skilled in the art, assembles and stores the data in the Information Repository 108 so that it can be retrieved efficiently by the various components of the Analysis Module 120 that rely upon that information.

In most cases, the data received by the Data Receiver 104 will be in electronic form, such as Student data files that include Student names and Test Result information. With respect to this information, the Data Assembler 106 uses methods familiar to those skilled in the art to clean the information; remove records that are incomplete, duplicate, or inconsistent; and store the information, either in data tables that reside in a computerized database or in electronic data files that reside in a computer directory structures.

The Data Assembler 106 also stores system-specific identification numbers for potential Users of the system, including randomized passwords that can be utilized by Users to access electronic displays produced by the Electronic Display 152. This information is known as "User Access Information" and is discussed more fully in the discussion of the operation of the Electronic Display 152 below.

In other cases, the data received by the Data Receiver 104 will be in paper form, such as actual physical specimens of the form of the Test. In that case, the Data Assembler 106 may simply store the physical documents within the Information Repository 114, in a way that facilitates secure storage and efficient retrieval of these documents later on.

Physically, step 404 may be accomplished by means of the Data Intake Operator as follows. With respect to the electronic information, the Data Intake Operator operates the Data Intake Computer 206 and employs data cleansing and extraction using commercially available products such as Ascential Software™ DataStage XE and Informatica PowerCenter® to read information from the Flat File Storage mechanism 208; remove incomplete, duplicate, or inconsistent information; and store it in organized files within the Data Server 214, which is part of the Information Repository 210.

The Data Intake Operator can generate the User Access Information by means of software products offered commercially or as shareware, which produce random passwords according to protocols tested for security.

The Data Server 214 typically runs on a UNIX operating system or other commonly used system. The Data Server 214 typically may be built using a SQL-based database management system (DBMS) such as Oracle or other type of DBMS.

With respect to physical documents that may be received by the Data Receiver 402, the Data Assembler Operator organizes and stores such documents in the Physical Document Storage 212 for the purpose of enabling efficient retrieval in the future.

When step 404 is complete, the Data Assembler Operator notifies the Intake Operator.

2.C. Content Receiver

As data is received by the Data Receiver 104 and assembled by the Data Assembler 106 for storage in the Information Repository 114, a concurrent process occurs whereby educational content is received and assembled by the Content Receiver 106 and the Content Assembler 108 respectively.

At the same time that the Intake Operator notifies the Data Receiver Operator to activate the Data Receiver 104 in step 402, the Intake Operator also notifies the Content Receiver Operator to activate the Content Receiver 108 in step 406.

The Content Receiver 108 receives Content Information from the Client applicable to the Subject and Level of the Test and stores this information temporarily for use in Step 408 by the Content Assembler 110.

Content Information is educational information that can help guide instructional responses to Student Test Results, and may be customized according to the User. For example, Content Information for Educators may consist of lesson plans and sample problems that they can use with their Students to address their Students' needs. Similarly, Content Information for Students may consist of activities, reading passages, and self-quizzes that Students may use to improve their understanding of a Subject. FIG. 5-2 shows that among the items held in the Content Repository 504 are Subject overviews 566, Skills definitions 568, classroom activities for teaching Skills 570, lesson plans for teaching Skills 572, and sample problems in Skills 574. This is not an exhaustive list.

Physically, step 406 may be accomplished by means of the Data Intake Operator, who could be an individual or a computer operating according to a script, as follows. The Data Intake Operator operates the Content Management Computer 224, which may be connected to the Internet 202 via a firewall 204, and which may obtain information from the Client in methods that are familiar to those skilled in the art (such as through FTP, e-mail, and other means). After the Content Management Computer 224 receives the Content Information, it may store this information in the attached Content Feed Storage mechanism 226. When step 406 is complete, the System Operator is notified and activates the Content Assembler 106 in step 408.

In certain cases, the Content Information received by the Data Receiver 104 may be in paper form, such as actual physical specimens of lesson plans. In that case, the Data Receiver 104 may convert the paper images into electronic text, using methods familiar to those skilled in the art such as advanced scanning techniques, or, if such techniques are unavailable, using human typists and a word processing program. This electronic text is then stored in the attached Content Feed Storage mechanism 226.

When step 406 is complete, the Content Receiver Operator notifies the Intake Operator.

2.D. Content Assembler

Once the Intake Operator is notified that the Content Receiver has completed processing, the Intake Operator notifies the Content Assembler Operator. The Content Assembler Operator activates the Content Assembler 110 in step 408. The Content Assembler 110 takes the information that had been stored temporarily by the Content Receiver 406 and, using methods known to those skilled in the art, assembles and stores the data in the Content Repository 116 so that the information can be retrieved efficiently by the Content Manager 140 during operation of the Analysis Module 120.

The object of the Content Assembler 110 in step 408 is to organize all of the Content Information received by the Content Receiver 406, and store it electronically in the Content Repository 116. The information held in the Content Repository 116 may be organized by Skill and Level within a given Subject, either according to the judgment of the Intake Operator or by means of electronic tagging of the material by the Client prior to delivery.

Physically, step 408 may be accomplished by means of the Content Assembler Operator in the following way. The Content Assembler Operator operates the Content Management Computer 224 and, employing common data extraction methods and sorting methods as well as organizational judgment, assembles the information from the Content Feed Storage mechanism 226 and store it in files on the Core Content Server 232 within the Content Repository 230.

In order to facilitate the work of the Content Manager 140 of the Analysis Module 120, these materials may be organized in different files to the extent possible by Subject, Level, and Skill. However, the Content Manager 140 will organize this material more systematically on the basis of the Skill definitions arrived at during the processing of the Analysis Module 120.

When the processing of the Content Assembler 110 is completed, the Content Assembler Operator notifies the Intake Operator.

At the point when both the Data Assembler Operator and the Content Assembler have notified the Intake Operator that their respective processes are completed, the Intake Operator notifies the System Operator that the processing of the Intake Module 102 is completed. At this point, the System Operator notifies the Analysis Operator to activate the Analysis Module in step 304.

3. Data Storage Module

The Data Storage Module 112 is an integral module in this system, because it facilitates the information transfer among different system components. The precise steps involved are detailed in the flowcharts of the various components. It is useful, nonetheless, to provide an overview of the three components of the Data Storage Module 112: the Information Repository 114, the Content Repository 116, and the Report Repository 118.

3.A. Information Repository

The first component of the Data Storage Module 112 is the Information Repository 114. As described in step 404, the Data Assembler 404 outputs information to the Information Repository 114.

Also, as will be described more fully below, various components of the Analysis Module 120 read information from, and write information to, the Information Repository 114. In this way, the Analysis Module 120 can store intermediate and final calculations that express Test Results for Students and Groups in ways that are meaningful for the Users.

Finally, as part of the functioning of the Display Module 142, the Results Report Generator 146 accesses information from the Information Repository 114 in order to assemble Instructional Response Reports, which are then stored in the Report Repository 118.

FIGS. 5-1 and 5-2 show that the Information Repository holds many different data types:

The following is data that may be stored in the Information Repository 502 if the Client does not provide full information about which Skills are examined on a given Test: Item Scores for each Student 526, Skill Sets 428, Skill Organizations 530, Skill-Item Tables 532, Items Assessing a Skill 534, Skill-Specific Item Scores for each Student 536, Item Score Arrays for each Student 538, Fall-off Ratios 540, Raw Coding Matrices 542, Refined Coding Matrices 544, Quality Rating Information for Refined Coding Matrices 546, Student Skill Scores 548, and Obtained Skill Scores for each Skill 550. In other cases, the Client will provide some but not all of the above information.

In addition, the following information is calculated and stored in the Information Repository 502 by the Analysis Module 120: Student Evaluation Statements by Skill 552; Group Skill Scores 554; Group Evaluation Statements 556; Pedagogical Constraints 558; and Summary Statistics 562.

3.B. Content Repository

The second component of the Data Storage Module 112 is the Content Repository 116. Initially, the Content Repository 116 holds instructional materials developed prior to activation of the system and received via the Content Receiver 108 in step 406. As described more fully below, the Content Manager 140 then organizes and customizes the materials in the Content Repository 116.

FIG. 5 shows some of the types of instructional materials that may be held in the Content Repository 504: Subject overviews 566, Skills definitions, 568, classroom activities for teaching Skills 570, lesson plans for teaching Skills 572, and sample problems in Skills 574.

As part of the functioning of the Display Module 142, the Instructional Response Report Generator 148 accesses information from the Content Repository 116 in order to assemble Instructional Response Reports, which are then output to the Report Repository 118. This is not an exhaustive list.

3.C. Report Repository

The third component of the Data Storage Module 112 is the Report Repository 118. FIG. 5-2 illustrates the key components held in the Report Repository 506: namely the Results Reports 576, Instructional Response Reports 578, Print Templates 580, Electronic Templates 582, Electronic Document Structures for Results Reports 584, and Electronic Document Structures for Instructional Response Reports 586. These components are each discussed more fully below in the description of the Display Module 142. As will be discussed, the Print Displayer 150 and Electronic Displayer 152 access these reports and templates in order to produce their respective displays for Users.

4. Analysis Module

FIGS. 1-1 and 1-2 show a block diagram showing the relation of the Analysis Module 120 to the rest of the System.

FIG. 6 is a flowchart showing the functioning of the Analysis Module 120

Overview of the Analysis Module

A great deal of analysis must be done in order to turn raw assessment data into useful information for Educators, Parents, and Students. Much of this work is accomplished by the Analysis Module 120.

As described below, the Analysis Module 120 performs a substantial number of calculations, the results of which are stored in the Information Repository 114. The precise type of data outputted by the Analysis Module 120 depends on the extent to which data is not otherwise inputted into the System by the Client.

FIGS. 5-1 and 5-2 represent a block diagram of the Data Storage Module, including the Information Repository 502 and its contents.

If the Client provides no information with respect to the Skills that are examined on the Test, then the Analysis Module 120 must calculate the following information and output it to the Information Repository 114: Item Scores for each Student 526, Skill Sets 428, Skill Organizations 530, Skill-Item Tables 532, Items Assessing a Skill 534, Skill-Specific Item Scores for each Student 536, Item Score Arrays for each Student 538, Fall-off Ratios 540, Raw Coding Matrices 542, Refined Coding Matrices 544, Quality Rating Information for Refined Coding Matrices 546, Student Skill Scores 548, and Obtained Skill Scores for each Skill 550. In other cases, the Client will provide some but not all of the above information.

In addition, the Analysis Module 120 typically calculates the following information and outputs it to the Information Repository 114: Student Evaluation Statements by Skill 552; Group Skill Scores 554; Group Evaluation Statements 556; Pedagogical Constraints 558; F Scores, P Scores, and A Scores by Skill 560; and Summary Statistics 562.

The Analysis Module 120 accomplishes several discrete tasks. First, in those cases where the Client does not provide detailed information about the particular Skills examined on the Test, the Analysis Module 120 analyzes the Test to generate such a list of the Skills examined as well as a detailed chart concerning the degree to which each Item on the Test assesses each Skill. This task is accomplished by an algorithmic process explained below and is based on analysis of the Test itself, as well as Student response data.

Second, the Analysis Module 120 calculates various quantitative and qualitative indicators of performance and recommendations for individual Students and Groups within the Skills that have been tested. After determining these indicators, the Analysis Module 120 stores these indicators in the Information Repository 114 so they can be displayed to Users via the Display Module 142.

Finally, by activating in step 632 the Content Manager 140, the Analysis Module 120 generates appropriate instructional material, organized by skill and difficulty, so that this material can be presented to Educators, Parents, and Students in an integrated manner with the Test Result information. This instructional material will enable them to act effectively in response to the Test Result information.

As detailed in the description of its components and sub-components, the Analysis Module 120 identifies and circumvents many of the deficiencies in the existing methods of processing and displaying Test Results. Later in this document is a detailed description of the system and method of each component of the Analysis Module 120. By way of introduction, however, what follows is an outline of the steps followed by the Analysis Module 120, as well as key features of this system and method:

1. Responding Flexibly to Different Levels of Information from the Client, in Order to Identify how Students Performed on Particular Skills The core of the Analysis Module 120 is a determination of how Students have performed on particular Skills examined on the Test. Importantly, the Client may provide different types of information about Students' Skill performance. This system and method are designed to respond appropriately depending on the level of information provided, with the Analysis Module 120 filling in gaps where required.

The first step of the Analysis Module 120 is simply to determine in step 602 whether the Items of the Test are scored already. If not, the Item Scorer 122 is activated in step 604 to produce Student Scores in all of the Items of the Test.

The next steps of the Analysis Module 120 respond to much more complex scenarios regarding the extent of information provided by the Client. At one extreme, the Client may not provide (and may not even possess) any information on which Skills are being Tested. If in step 606 that is the case, then the Analysis Module 120 activates in step 622 the Item-Skill Analyzer 130, which (as described below) generates, as its final output, a list of the Skills examined on the Test (also known as the "Skill Set") and a numerical matrix that describes the degree to which each Item assesses each Skill (also known as the "Refined Coding Matrix").

At the other extreme, the Client in step 608 may have provided all necessary information: namely, the individual Students' Scores on each particular Skill assessed on the Test. In that case, the Analysis Module 120 activates the Student Skill Performance Evaluator 134 directly in step 626, omitting all the various prior steps.

Between the two extremes are several different potential scenarios, all of which are addressed explicitly by the Analysis Module 120:

In some cases, as governed by steps 606, 608, and 610, the Client may provide only the Skill Set and Refined Coding Matrix. In that case, the Analysis Module 120 activates step 624 the Student Skill Score Calculator 132, which performs the necessary calculations to obtain each Students' Score in each Skill.

In some cases, as governed by steps 606, 608, 610, and 612 the Client may provide only the Skill Set and a Raw Coding Matrix. In that case, the Analysis Module 120 activates in step 620 the Coding Matrix Refiner 128, which takes as its input the Raw Coding Matrix and generates the Refined Coding Matrix (to be used by the Student Skill Score Calculator 132).

In some cases, as governed by steps 606, 608, 610, 612, and 614, the Client may provide only the Skill Set and a Skill-Item Table. In that case, the Analysis Module 120 activates in step 618 the Raw Coding Matrix Generator 126, which takes these as its inputs and generates the Raw Coding Matrix (to be used by the Coding Matrix Refiner 128).

Finally, in some cases, as governed by steps 606, 608, 610, 612, and 614, the Client may provide only the Skill Set. In that case, the Analysis Module 120 activates in step 616 the Skill-Item Table Generator 124, which takes the Skill Set as its input and generates the Skill-Item Table (to be used by the Raw Coding Matrix Generator 126).

As shown above, these components enable the system to respond flexibly and comprehensively, regardless of the extent of the Skill information that is provided by the Client. Each of these various components will be detailed more precisely below.

2. Generating Sound Skill Categories

One important feature of the Item-Skill Analyzer 130 is that it produces a list of the Skills examined on the Test. In particular, the system and method employed in the Item-Skill Analyzer 130 result in a list of Skills that are pedagogically and statistically sound categories in which to report Test Results.

As background, it should be noted that when Test Results are displayed to Users, the results for any Student or Group typically are shown in two ways: aggregated and Skill-specific. For example, a Student's aggregate results might be reported as the Student's percent correct on the Test as a whole, or as a percentile that measures the Student's performance on the Test as a whole against the performance of other Students. A Student's Skill-specific results, by contrast, measure only the Student's performance on those Items on the Test that measure a specific Skill.

Existing Skill categories used in Test reports are not useful for the intended recipients of the results. In many cases, teachers typically do not understand these Skill categories, or find them overbroad. For example, the organization that reports the exam results for the New York state testing program uses the math reporting category "Modeling/Multiple Representation", a term that typical teachers do not understand. Similarly, the organization that reports the exam results for the California state testing program uses the reading reporting category "Functional Reading", a term that typical teachers find overbroad.

Reporting in Skill categories that are not useful may occur because the organization that reports the exam results decides, for simplicity, to base the reporting categories on educational language that already exists, such as broad language that the state has adopted about its educational goals or standards. Unfortunately, using reporting categories based on such language is problematic because the categories are then too broad and non-descriptive, and may or may not faithfully represent the content of the Test.

On the other extreme, certain organizations report exam results using Skill categories that are very narrowly defined around the precise types of questions asked on the exam. Because these categories are built around capturing the specific items on a particular Test itself, these categories are not useful for teachers or others interested in using the Test Results to guide instruction more broadly. Indeed, such narrow categories may even be instructionally misleading, to the extent they do not help instructors understand the range of Skills that their students may be expected to master on future Tests.

Another problem arises when the organization that reports the results uses a purely statistical method, such as a factor analysis, to determine which Items to group together for reporting purposes. Because this approach does not involve systematically the insight of people with instructional expertise, it often leads to reporting categories that are not clearly defined or understood by the recipients of the Test Results.

By contrast, the Item-Skill Analyzer 130 constitutes a reliable process for developing appropriate Skill categories for a given Test. As will be discussed in more detail below, the Item-Skill Analyzer 130 maximizes the pedagogical insight of the reporting categories, subject to statistical constraints, in order to create Skill reporting categories that are both educationally useful and psychometrically sound.

3. Generating Non-binary Raw Coding Matrices Based on Instructional Insight

Another important aspect of the Analysis Module 120 is that the Raw Coding Matrix Generator 126 produces Raw Coding Matrices that are particularly useful because they contain instructionally nuanced information about the extent to which each Item assesses various Skills.

Several well-known approaches in the current art take, as their inputs, pedagogical estimates of the degree to which each Skill is examined on each Item (which estimates are here called the Raw Coding Matrix), in order to output what is known as a Refined Coding Matrix, which is the best estimation of the same, taking into account statistical features of Students' responses to the Test Items.

However, the pedagogical estimates used as inputs by these approaches are typically simple 'yes/no' judgments about whether a Skill is or is not assessed on an Item. In other words, the Raw Coding Matrix typically is in binary form, with each cell containing 1 or 0, corresponding to a simple 'yes/no' decision about whether or not each Skill is assessed by each Item.

These approaches would be substantially enhanced by a reliable process for creating a Raw Coding Matrix that contains nuanced, non-binary pedagogical estimates about the extent to which each Skill is assessed by each Item.

Figure 9:
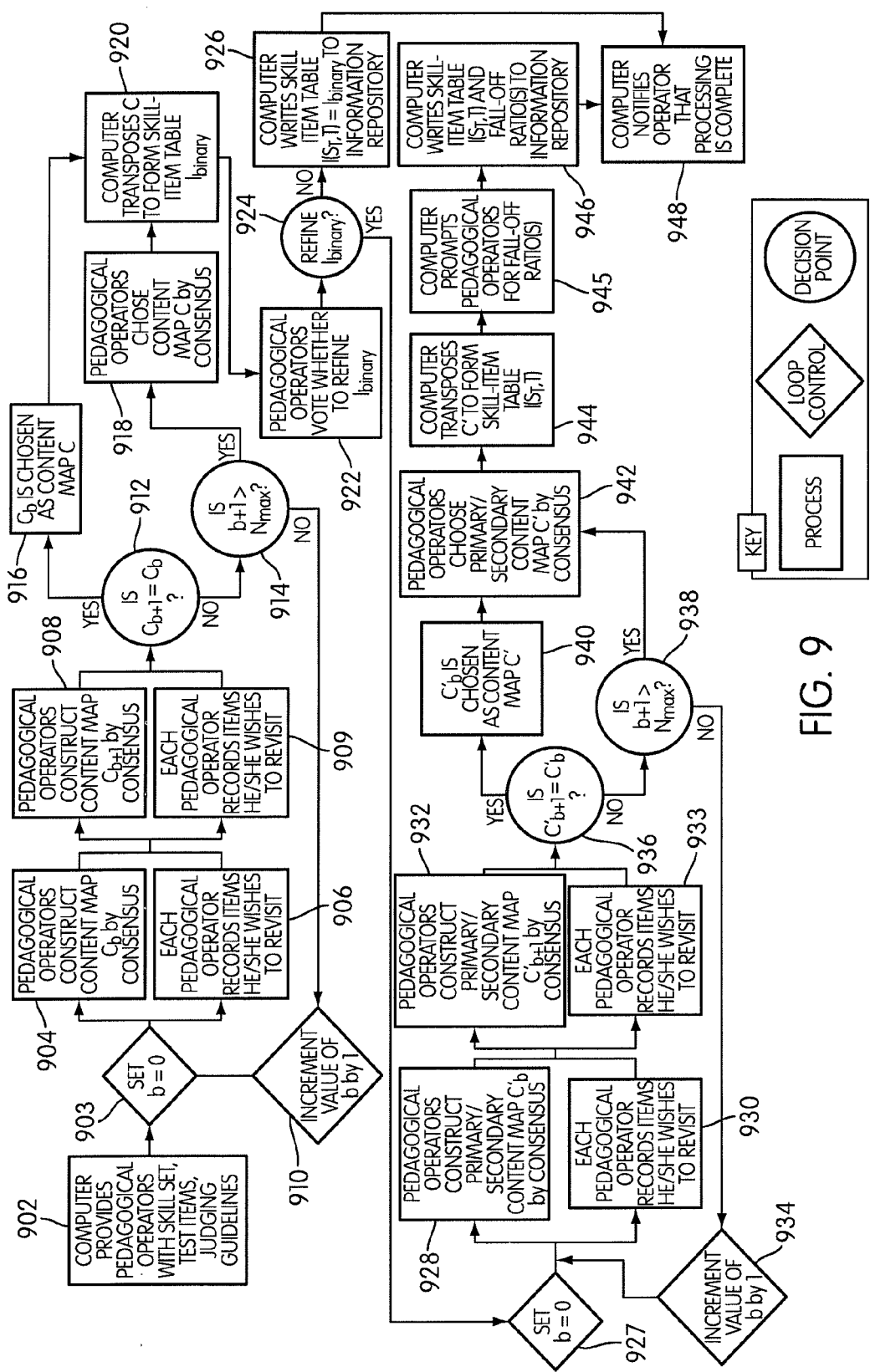
FIG. 9 is a flowchart illustrating the operation process of the Skill Item-Table Generator component of the system.

To address this issue, the Analysis Module 120 activates the Skill-Item Table Generator 124, which instantiates a robust process of deliberation whereby those with instructional experience generate a non-binary, instructionally accurate coding matrix representing qualitatively the degree of relevance of each Skill to each Item, rather than simply a binary, 'yes/no' determination of relevance. FIG. 9 is flowchart showing the functioning of the Skill-Item Table Generator 124 in one embodiment.

4. Calculating Student Skill Scores

After the Item-Skill Analyzer 130 is completed (in the event that the Client did not provide the Skill Set) or after the Coding Matrix Refiner 128 is completed (in the event that the Client did provide the Skill Set but did not provide Student Scores in each Skill), then the Analysis Module 120 activates in step 624 the Student Skill Score Calculator 132.

The Student Skill Score Calculator 132 embodies a system and method for transforming a Refined Coding Matrix and information about Students' Scores on all Test Items into a table that reflects Students' Scores in all Skills. This is accomplished by employing any of several methods from among the body of psychometric methods familiar to those skilled in the art.

5. Generating Evaluation Statements (Including Formative Statements) for Students It is important to realize that Users of Test Results do not simply want to see numerical Scores that describe Students' performance on the Test. Instead, they want verbal statements (known here as "Evaluation Statements") about how Students and Groups performed, both on the Test as a whole and in particular Skills. In particular, Users of Test Results may want to know about recommended instructional strategies for addressing weaknesses and for helping Students and Groups to advance still further in areas of their strength (here known as "Formative Statements").

Accordingly, after the Student Skill Score Calculator 132 is completed, the Analysis Module 120 activates the Student Skill Performance Evaluator 134. The Student Skill Performance Evaluator 134 assigns Evaluation Statements (including Formative Statements) to individual Students based on their performance on the Test. The system and method of the Student Skill Performance Evaluator 134 constitute a repeatable process for assigning Evaluation Statements to Students based on Students' performance in particular Skills.

For example, in one embodiment, the Student Skill Performance Evaluator 134 assigns each Student one of three absolute, Formative Statements for each Skill, such as the following: "Likely to Need Help with Fundamentals", "Likely to Need Additional Instruction and Practice", and "Likely to Be Ready for Advanced Work". These Formative Statements (i.e., statements that recommend one course of action over another) might be applied to specific Students and Skills, resulting (for example) in suggestions that one Student work on the fundamentals of subtraction, while another Student proceed to advanced work in that subject. These Formative Statements can be very useful for Users, such as Educators who can take such recommended courses of actions in the classroom.

It may also be the case that Client may provide additional requirements for the types of Evaluation Statements that it wishes displayed. These requirements, stored in the Information Repository 114 by the Data Assembler 106, can be applied by the Student Skill Performance Evaluator 134 as well. For example, the Client might wish that when a Student receives his or her Test Results, the Student will see that one of a particular group of two Evaluation Statements (for instance, "Try Harder" and "Good Work") that corresponds best to the Student's overall performance and to the Student's particular performance in individual Skills.

6. Leveraging Overall Criterion-referencing to Enhance Diagnosis

One embodiment of the Student Skill Performance Evaluator 134 described below is a system and method for obtaining Criterion-referenced conclusions about Students' performance in particular Skills.

As stated in the Introduction, many Tests are Criterion-referenced, meaning that Students' performance is implicitly compared against performance standards in that Subject that have been established by pedagogical experts. Students who take a Criterion-referenced Test are typically assigned an Evaluation Statement based on their overall Test Results, which statement reflects experts' interpretation of those particular results. For example, Students who perform poorly on a particular Criterion-referenced 4th grade math test may be deemed as "Not Meeting Standards" in 4th grade math, while those who perform well may be deemed as "Exceeding Standards."

However, Criterion-referenced tests typically are not used to generate criterion-based evaluations about a Student's performance in a given Skill. For example, a Student who takes a 4th grade math test typically is not evaluated against particular criteria in the various Skills tested. This occurs because pedagogical experts usually do not establish criteria with respect to Students' performance on particular Skills that are examined on the Test, but rather only with respect to Students' overall scores on the Test.

Indeed, it would be extremely time-consuming for pedagogical experts to perform Criterion-referencing in each Skill on a Test, because that would require the experts to assign evaluative judgments to the range of actual Student scores attained within each Skill. Therefore, in the K-12 environment, Criterion-referencing is usually used only to measure student overall performance on high-stakes, end-of-year tests. This situation is unfortunate, because it would be useful for Users to know a Student's performance on a Skill with respect to expert-established criteria of mastery.

Therefore, the Student Skill Performance Evaluator 134, in one embodiment, instantiates an algorithm to produce Criterion-referenced information about each Student's performance in each Skill. Namely, the Student Skill Performance Evaluator 134 leverages (1) the existing Criterion-referencing of Students' overall scores, and (2) empirical data about the relationship between Students' overall scores and their scores within a Skill, in order to produce an approximate Criterion-referencing for performance within each of the Skills assessed by the Test.

7. Prioritizing Skills within a Diagnostic Report Based on Potential for Growth

Users of Test Results often want to understand how Students (and Groups) can most efficiently improve their mastery of Skills. Unfortunately, there does not exist in the prior art a method of prioritizing Skills within a diagnostic report so that the Users' attention is drawn first to those Skills in which a Student (or Group) performed relatively poorly while most Students who took the Test performed relatively well. Such Skills often present unique opportunities for rapid progress, and therefore this information may be helpful for Users, such as for an Educator who is deciding which Skill to focus on with a Student.

In one embodiment of the Student Skill Performance Evaluator 134 described below, that component instantiates an algorithm that prioritizes the Skills for a Student based on the Student's (or Group's) results on a Test, using potential for growth as a consideration.

That application of the Student Skill Performance Evaluator 134 (described more fully below) is advantageous for two reasons: First, the algorithm employed is relatively straightforward, so that Users may easily understand the method and feel confident about its application. Second, the algorithm is not computationally intensive, so that it can be implemented relatively quickly over large numbers of Tests, each taken by large number of Students. The application of this algorithm does not scale drastically as the number of Students, Items, or Skills increases.

8. Generating Formative Statements for Groups

After the Student Skill Performance Evaluator 134 has completed its processing, the Analysis Module 120 activates the Aggregation Analyzer 136 in step 628. Among other forms of aggregation, the system and method embodied in the Aggregation Analyzer 136 can obtain appropriate recommendations, or "Formative Statements" for Groups of Students.

As might be expected, Educators would like to know how to approach instructing their class based on its performance on a Test. However, there does not exist in the art an adequate method of aggregating individual Students' Formative Statements over a Group in order to generate a single Formative Statement for the Group.

An obvious approach to aggregating Formative Statements might proceed as follows: (1) calculate a single average Score for the Group; (2) imagine that this score represents the score of a single Student; and then (3) assign the Group the same Formative Statement that a Student would receive, had he or she received the Group average Score.

However, an approach based on averaging will not be appropriate for determining the best way to address the needs of a Group collectively. This is because averaging does not take into account the varying degree to which the different actions recommended by different Formative Statements will affect different individual Students.

The Aggregation Analyzer 136 in one embodiment described below offers a superior approach. This embodiment of the Aggregation Analyzer 136 instantiates an algorithm that aggregates individual Formative Statements that have been offered for Students, in order to generate a single Formative Statement for the Group as a whole. In this embodiment, the particular algorithm functions by selecting the Formative Statement for the Group that corresponds to the instructional action that maximizes the educational benefit accruing to all of the Group members.

9. Maintaining Diversity in Aggregation Across Larger and Larger Groups

In some applications, the goal of aggregating the Evaluation Statements of a Group is not to recommend a single action to be pursued with the Group as a whole, but, rather, simply to give a sense of which Evaluation Statement best typifies the Group. Here again, though, averaging is impractical. For example, if the Evaluation Statements range from "Poor" to "Intermediate" to "Good", and if the tested population contains Students with well-distributed variations in their Scores, then in practice, as Students are aggregated into larger and larger Groups, those Groups' Evaluation Statements tend, under an averaging mechanism, to converge rapidly toward "Good". Thus, averaging gives rise to a regression to the mean in which all Groups of large enough size (more than 10 Students or so) receive very similar information, even though their data may be meaningfully different.

In one embodiment described below, the Aggregation Analyzer 136 instantiates an algorithm that measures the central tendency of individual Students' Evaluation Statements in a manner that resists such regression toward the mean.

10. Generating Numerical Data about the Performance of Students and Groups

Users of Test Results obviously want to see a wide of range of data that reflects the performance of Students on the Test. Therefore, after the Aggregation Analyzer 136 is completed, the Analysis Module 120 activates the Statistics Summarizer 138. Thus, the Statistics Summarizer 138 takes as its input the specific types of displays sought by the Client and produces the appropriate tables of data for individual Students and Groups.

For example, based on the types of displays sought by the Client, the Statistics Summarizer 138 might calculate trends in Students' overall percentage correct across past administrations of similar Tests. Similarly, the Statistics Summarizer 138 might calculate the percentage of students of each race (or by other category such as gender, socioeconomic class, etc.) who have been deemed to meet that state's educational standards in the Subject of the Test.

11. Instructional Material that Truly Assist Users

The Content Manager 140 ensures that instructional materials are organized in the same Skills assessed on the Test; offer Users instructional responses in each Skill that are appropriate for Students with varying levels of mastery; and are organized within each Skill in the same categories, or mastery levels, that are used to describe Students' performance in the Skills tested. This is highly effective in encouraging Users to act on the Test Results to address their Students' particular needs.

Preliminary Definitions and Notation

The Analysis Module 120 may process many Tests for any given Client as part of any single Reporting cycle. For purposes of illustration, however, the description of the Analysis Module 120 often focuses on a single Test for the sake of clarity.

The mathematical definitions of many terms are included in the Technical Glossary. As a preliminary matter, however, it is important to note the following terms: The number of Items on this Test is denoted n. A fixed but arbitrary ordering is assigned to these n Items; the $i^{th}$ Item of the Test may then be denoted $\tau_i$. The full set of Items on the Test is denoted $T=\{\tau_1, \tau_2, \ldots, \tau_n\}$. The symbol T denotes the Test itself. As a matter of convention, the index i will always range over the values $1, 2, \ldots, n$. Thus, any quantity with a subscript i refers to a particular Item on Test T. The number of Students taking the Test is denoted p. As a matter of convention, the index j will always range over the values $1, 2, \ldots, p$. Thus, any quantity with a subscript j refers to a particular Student taking Test T.

Certain typographical conventions are also employed here: Italic lower-case letters (as x) represent numbers. Boldface lower-case letters (as v) represent vectors of numbers, or vectors of other entities (such as Skills, Evaluation Statements, etc.). Boldface upper-case letters (as V) represent a set of vectors defined in some particular way.

Depending on the nature of the displays that are produced (different displays carry different statistical demands), the number of Students taking the Test should be relatively large. For most displays, $p \geqq 1000$ or so is required.

Functioning and Physical Instantiation of the Analysis Module

The Analysis Module 120 may consist physically of (a) an Analysis Module Operator (human or computer) that follows the flowchart FIG. 6 to operate the Analysis Module 120 when notified to do so in step 304 by the System Operator; (b) one or more Psychometric Analysis Computers 218 with network access to one or more application servers 220 running commercial analysis software (such as SAS®, SPLUS®, Mathematica®, MULTILOG, etc.), which computers operate various components of the Analysis Module 120 and/or execute algorithms implemented by these components; and (c) a Code Library 222, which is simply an electronic file storage system (such as a hard drive) for storing custom-written code as necessary for implementing different components of the Analysis Module 120.

Each component of the Analysis Module 120 is operated by an Operator as well (human or, in many embodiments, computer). When the Analysis Operator notifies the Operator of a particular component within the Analysis Module 120, that component is activated, performs the processing required, and then notifies its Operator that it has finished. The Operator transmits this information to the Analysis Module Operator, which requires this flow-control information to implement the flowchart FIG. 6.

Each component of the Analysis Module 120 draws inputs from the Information Repository 114 and/or Content Repository 116; applies computer algorithms and/or prompts human expertise to generate new information from the inputs; writes the output information to the Information Repository 114 in electronic form; and notifies its Operator that processing is complete.

More specifically, using the terminology employed here, the Analysis Module 120 uses the information held in the Information Repository 112 to generate:

a Skill Set;
Scores and Evaluation Statements for each Student for each Skill in the Skill Set;
Scores and Evaluation Statements for each Group for each Skill in the Skill Set; and
Statistical Summary Information for Students.

These products, described more fully below, are written to the Information Repository 114 so they can be assembled into Reports by the Display Module 142.

In addition, the Analysis Module 120 uses the information held in the Content Repository 116 to generate content suitable for Educators, Parents, and Students that is broken down by Skill and mastery level, corresponding to the Skills and mastery levels used in reporting the Test Results themselves. This content is written to the Content Repository 118 so it can be assembled by the Display Module 142.

The following individual components can all be activated during the operation of the Analysis Module 120:

Item Scorer 122
Skill-Item Table Generator 124
Raw Coding Matrix Generator 126
Coding Matrix Refiner 128
Item-Skill Analyzer 130
Student Skill Score Calculator 132
Student Skill Performance Evaluator 134
Aggregation Analyzer 136
Content Manager 140

The above components function as follows.

4.A. Item Scorer

As indicated in step 602, the Item Scorer 122 is activated in step 604 in the event that the Client does not provide each Student's numerical Score for each Item. In that case, the Item Scorer 122 uses the Scoring Guide for the Test to assign each Student an Item Score for each Item on the Test.

For each Item, the Item Score for that Item is a number that represents a given Student's level of accomplishment on a particular Test item. The Item Score Range for a Test Item is a number that represents the range of Item Scores that are possible in that Item. For a multiple-choice Item, the Item Score for the Item is typically 0 or 1. For constructed-response Items (such as essay questions, for example), the Item Score typically ranges from 0 to some integer greater than 1. Larger Item Scores represent greater levels of accomplishment on the Item in question.

The Item Scorer 122 assigns each Student a list of Item Scores, one Item Score for each Item on the Test. This list of Item Scores is called the Student's Item Score Vector. The Item Scorer 122 records these Item Score Vectors in the Information Repository 114, where they can be used by the other components of the Analysis Module 120 later in the analysis process.

The system used to generate Item Scores will depend on the nature of the Test Items and of the Scoring Guide.

For example, if all of the Test Items are in multiple choice format, then the Item Scorer 122 can be instantiated in the obvious way as a computer program running on the Psychometric Analysis Computer 218 (which has network access) that (1) reads Student Item Responses from the Information Repository 114 in electronic form, as lists of alphanumeric characters (each Student's list containing one character representing that Student's response to each Item on the Test); (2) reads the Scoring Guide from the Information Repository 114 in electronic form as a list of correct response characters, one correct response character for each Item on the Test; (3) assigns the Item Score 0 or 1 to each Student for each Item, according to whether the Student's Item Response for that Item matches the corresponding response character in the Scoring Guide; and (4) writes these Item Scores to the Information Repository 114 in electronic form, where they constitute the stored Item Score Vectors for the Students.

For Test Items in constructed-response format, the Item Scorer 122 can be instantiated as a rubric-scoring routine, such as is commonly employed in the art, in which humans with skill in evaluating Student work in the Subject of the Test are prompted to input scores for each Item for each Student, by following a Scoring Guide. (The scorers may evaluate Students' actual Responses, or facsimiles or reproductions thereof.) Such routines typically involve, in addition to human scorers, human arbitrators who are prompted to assign final scores whenever human scorers disagree markedly as to the Score merited by a particular Response.

In the constructed-response case, the Item Scorer 122 generates Item Scores for each Student in such a way, and then writes them to the Information Repository 114 in electronic form, where they constitute the stored Item Score Vectors for the Students.

Once the Item Score Vectors for the Students taking the Test have been written to the Information Repository 114, they can serve as inputs to the other components of the Analysis Module 120.

4.B. Skill-Item Table Generator

The Skill-Item Table Generator 124 described here is valuable because in many cases, the Client will provide Students' scores on Test Items, in addition to a list of the Skills that are assessed on the Test, but will not provide any information concerning how those Skills are tested by particular Items. In that case, i.e., when Decisions 606, 608, 610, 612, and 614 are all negative, it will be necessary to activate the Skill-Item Table Generator 124.

FIG. 9 is a flowchart showing the functioning of the Skill-Item Table Generator 124 in one embodiment.

The Skill-Item Table Generator 124 may consist physically of (a) an Operator (human or computer) that follows the flowchart in FIG. 9 to operate the Skill-Item Table Generator 124 when notified to do so in step 616 by the Analysis Operator or in steps 1004, 1010, or 1016 by the Item-Skill Analyzer Operator; and (b) the Psychometric Analysis Computer 218 (or a human moderator) executing a programmed routine whose algorithm reproduces that represented within FIG. 9 and described below. The embodiment below describes a computer-driven version.

The programmed routine of the Skill-Item Table Generator 124 prompts a group of human judges, called Pedagogical Operators, to assess the relevance of a given set of Skills $S_T$ to a given set of Test Items T. The result of this process is a Skill-Item Table $I(S_T, T)$ that reflects the detailed judgment of the Pedagogical Operators as to which Skills are required for the successful completion of which Items, and in what qualitative degree. The number of Pedagogical Operators is flexible.

An important feature of the Skill-Item Table Generator 124 is that it produces nuanced information about the extent to which each Skill is assessed by each Item. Rather than simply a 'yes/no' decision about whether a Skill is assessed by an Item, the Skill-Item Table Generator 124 produces qualitative judgments about the extent to which each Item assesses each Skill.

Given a Skill Set, which is a list of the Skills required for a given Test, a Skill-Item Table is a table in which (a) successive rows of the table correspond to successive Skills in the Skill Set; (b) successive columns in the table correspond to decreasing degrees of relevance that a Skill may have for successfully responding to a Test Item, as judged by the Pedagogical Operators; (c) cells of the table contain various Item designations, reflecting the degree to which it is judged that the designated Item assesses each Skill; and (d) no Item appears more than once in any given row.

For a Test T with five Items and Skill Set $S_T$ with four Skills, a Skill-Item Table might look like the following:

|  | Items PRIMARILY Assessing this Skill | Items SECONDARILY Assessing this Skill |
| --- | --- | --- |
| Skill 1 | $\tau_1, \tau_3$ | $\tau_4$ |
| Skill 2 | $\tau_4, \tau_5$ |  |
| Skill 3 | $\tau_1$ |  |
| Skill 4 | $\tau_3, \tau_4, \tau_5$ | $\tau_2$ |

According to this Skill-Item Table, Item $\tau_4$ primarily assesses Skills 2 and 4, but only secondarily assesses Skill 1. Depending on the protocols for the algorithm, the Skill-Item Table may also contain columns for tertiary relevance, etc.; or, at the other extreme, it may only contain a single column. It is not required that every Item appear somewhere in the Skill-Item Table. This is to allow for the possibility that certain Items on the Test may be deemed unsuitable for use in providing Skills diagnosis.

In general form, the Skill-Item Table Generator 124 functions in the following way (with various embodiments noted):

In step 902, the computer displays to the Pedagogical Operators or provides to them in printed form a Skill Set, the Test Items, the Scoring Guide, a written outline of the algorithm to be followed, and printed guidelines that facilitate careful judging of Skill-Item relevance. The computer also offers the Pedagogical Operators access to the actual responses of the Students that took the test, should they wish to review them during judging.

In step 903, the computer enters a loop that is indexed by the control index b; the initial value of the control index is b=0.

In step 904, the Pedagogical Operators construct a "Content Map" $C_b$ in the following way.
1. The computer cycles through the Items on the Test, prompting the Pedagogical Operators to code them in turn as follows.
   1.a. The Pedagogical Operators are prompted to focus on the first Item in the Test.
   1.b The Pedagogical Operators are prompted to reach consensus as to which Skills are assessed by that Item in any degree whatsoever.
   One embodiment of 1(b) is as follows:
   1.b.i The Pedagogical Operators are prompted to focus on the first Skill in the Skill Set.
   1.b.ii The Pedagogical Operators are prompted to vote "yea" or "nay" on the issue of whether or not the chosen Item assesses the Skill in any degree. Votes are tallied by inputting them on a computer keyboard.
   1.b.iii The computer tallies the votes. If a majority of the Pedagogical Operators has voted "yea," then the chosen Skill is entered next to the chosen Item in the Content Map $C_0$ and displayed as shown in 1(c) below.
   1.b.iv The computer repeats 1.b(i)-1.b(iii) for all Skills in the Skill Set.
   1.b.v At the completion of 1.b(iv), it is possible that no Skill will have been determined to assess the chosen Item. That is, it is possible that each Skill in the Skill Set will have failed to earn a majority of "yea" votes for the chosen Item. In this event, the computer enters those Skills receiving the maximal number of "yea" votes into the Content Map $C_b$ alongside the chosen Item. If no Skill receives any "yea" votes, then the computer leaves the row of the Content Map $C_b$ corresponding to the chosen Item blank.
   1.c. 1(a) and 1(b) are repeated for all Items on the Test. As the routine progresses through the Items, the group's conclusions for each Item are entered into a Content Map, $C_b$, which is a table with the following structure. This Content Map, as well as all Content Maps and Skill-Item Tables constructed during the functioning of the Skill-Item Table Generator, are visually displayed to the Pedagogical Operators throughout the process, for example in separate windows on the computer screen.

| $C_b$ | |
| --- | --- |
| Item | Skills Assessed by the Item |
| $\tau_1$ | |
| $\tau_2$ | |
| $\tau_3$ | |
| $\partial$ | |

Upon completion of 1(c), step 904 has been completed.

Also, as noted in step 906, as the routine progresses through the Items, each Operator is prompted to keep records of any Items he or she may wish to revisit in step 2 below.

The Pedagogical Operators may likely want to revisit the analysis of the Items, as their understanding of the relationship between the Items and the Skills may have evolved during the process of carrying out steps 904 and 906. Thus, in steps 908 and 909, the Pedagogical Operators are given the opportunity to construct a new Content Map, entitled $C_{b+1}$, as follows:

2.a. The group is prompted to focus on the first Item in the Test.

2.b. The group is prompted to reach consensus as to whether the list of Skills assessed by the Item, as represented in Content Map $C_b$, should be revised.

One embodiment of 2(b) is as follows:

2.b.i. The Pedagogical Operators vote "aye" or "nay" on the issue of whether the list of Skills Assessing the Item, as represented in Content Map $C_b$, should be revised. Votes are tallied by inputting them on a computer keyboard.

2.b.ii. The computer tallies the votes. If "aye" votes form the majority, then the computer reports that the consensus is that the list of Skills must be revised.

2.b.iii. If one or more "aye" votes were cast, but did not form a majority, then each of those who voted "aye" is prompted to explain his or her reasoning. Then the vote is repeated as in 2.b(i) and 2.b.(ii). If in this second vote "ayes" form the majority, then the computer reports that the consensus is that the list of Skills must be revised. If "aye" votes do not form the majority, then the computer reports that the consensus is that the list of Skills must not be revised.

2.c. If the consensus is that the list of Skills should be revised, then the experts reach a new consensus as to which Skills are assessed by the Item in any degree whatsoever, as in 1(b) above.

2.d. The computer repeats 2(a)-2(c) for all Items on the Test. As the group progresses through the Items, the computer enters the group's conclusions for each Item into a new Content Map $C_{b+1}$. Also, as noted in step 909, as the routine progresses through the Items, each Operator is prompted to keep records of any Items he or she may wish to revisit in further iterations.

Upon completion of 2(d), step 908 has been completed.

The computer next evaluates Decision 912, by comparing the $(b+1)^{st}$ Content Map, $C_{b+1}$, to the $b^{th}$ Content Map, $C_b$.

If the two content maps are identical, then in step 916 the computer designates $C_b$ as the Content Map, C.

If the two content maps are not identical, then the computer evaluates Decision 912, by comparing the value of b to the value of a 'kickout' number, $N_{max}$, which is hard-coded into the routine in advance.

If $b<N_{max}$, then in step 910 the computer increments the value of the loop control index b by unity and repeats steps 904, 906, 908, 909.

If $b>N_{max}$, then in step 918 the computer prompts the group to select by consensus the best Content Map C from among all of the Content Maps $C_0, \ldots, C_b$. This allows earlier Content Maps to re-enter the discussion in case the group feels it has gone astray in its revisions.

One embodiment of step 918 is as follows:

3.a. Each Content Map is subjected to a vote in turn. The Pedagogical Operators are prompted to vote "aye" or "nay" on the question whether the given Content Map is acceptable. The votes are input via keyboard, and the computer tallies the votes.

In the logically possible (but extremely unlikely) event that no Content Map receives any "aye" votes, the Pedagogical Operators are prompted to vote once again, with the constraint imposed that each Pedagogical Operator must vote for at least one Content Map.

3.b. From among the Content Maps receiving the maximal number of "aye" votes, the computer selects one at random as the consensus choice C.

In step 920, the computer 'transposes' the Content Map C in the obvious way to produce a Skill-Item Table $I_{binary}$ with one column, as illustrated here: the Content Map C

| Item | Skills Assessed by the Item |
|---|---|
| $\tau_1$ | $S_1, S_3$ |
| $\tau_2$ | $S_4$ |
| $\tau_3$ | $S_1, S_4$ |
| $\tau_4$ | $S_1, S_2, S_4$ |
| $\tau_5$ | $S_2, S_4$ | becomes 'transposed' as:

| $I_{binary}$ | |
|---|---|
| Skill | Items Assessing this Skill |
| $S_1$ | $\tau_1, \tau_3, \tau_4$ |
| $S_2$ | $\tau_4, \tau_5$ |
| $S_3$ | $\tau_1$ |
| $S_4$ | $\tau_2, \tau_3, \tau_4, \tau_5$ |

In step 922, the Pedagogical operators are prompted to vote on the question whether they wish to refine the Skill-Item Table $I_{binary}$ by sorting the Items assessing each Skill into Items primarily assessing that Skill and Items secondarily assessing that Skill. The votes are input via keyboard and tallied by the computer, which then displays the majority decision (breaking ties at random or by a hard-coded prejudice to one side or another).

In Decision 924, the computer chooses a course of action depending on the outcome of the vote. If the Pedagogical Operators have voted not to refine the Skill-Item Table $I_{binary}$, then in step 926 the computer writes $I_{binary}$ to the Information Repository 114, bringing the functioning of the Skill-Item Table Generator 124 to completion.

If the Pedagogical Operators have voted to refine the Skill-Item Table $I_{binary}$, then in step 927 the computer enters a refinement loop indexed by the control index b, which is initially set to b=0.

In step 928, the Pedagogical Operators construct a Primary/Secondary Content Map $C_b$ in the following way.

4. The computer prompts the Pedagogical Operators to re-examine the Content Map C, cycling through the Items in turn.

4.a. The group is prompted to focus on Item $\tau_1$.

4.b Among the Skills in the Content Map C appearing next to Item $\tau_1$, the group is prompted to reach consensus as to which Skills are Primarily Assessed by Item $\tau_1$, and which Skills are Secondarily Assessed by Item $\tau_1$.

The group may construe the terms 'Primarily' and 'Secondarily' as they wish, or they may allow themselves to be constrained by guidelines and examples such as those specified below, which clarify the Pedagogical Operators' role and standardize their judgments, thereby contributing to an efficient coding process:

To decide which of two Skills, $S_1$ and $S_2$, is primarily assessed by an Item, and which is secondarily assessed by it, suppose that a Student has answered the Item incorrectly, and ask the following question:

If a Student of this Subject, being tested at this Level, answers this question incorrectly, then, in your judgment, is the reason much more likely to be a lack of competence in $S_1$ or a lack of competence in $S_2$?

If the reason is much more likely to be a lack of competence in $S_1$, then $S_1$ is primarily assessed by the Item and $S_2$ is secondarily assessed by the Item.

If the reason is much more likely to be a lack of competence in $S_2$, then $S_2$ is primarily assessed by the Item and $S_1$ is secondarily assessed by the Item.

If neither reason is much more likely than the other, then the Skills are either (1) both primarily assessed by the Item, or, particularly when other Skills are assessed by the Item, (2) both secondarily assessed by the Item.

Example:

| Item | Skills Primarily Assessed by the Item | Skills Secondarily Assessed by the Item |
|---|---|---|
| John has 9 apples. Mary has 6 more apples than John. Bill has 17 times as many apples as Mary. How many apples does Bill have? | Addition - Problem Solving Multiplication - Problem Solving Multiplication - Computation | Addition - Computation |
| John has 3 apples. Mary has 9 times as many apples as John. Bill has 998 more apples than Mary. How many apples does Bill have? | Addition - Problem Solving Multiplication - Problem Solving Addition - Computation | Multiplication - Computation |

One embodiment of 4(b) is as follows:

4.b.i. The group is prompted to focus on the first Skill appearing next to Item $\tau_1$ in the Content Map C.

4.b.ii. The group is prompted to vote "Primary" or "Secondary" on the issue of whether Item $\tau_1$ primarily assesses that Skill or secondarily assesses that Skill. The votes are input via keyboard, and the computer tallies the votes.

4.b.iii. In accordance with the outcome of the vote (ties being ruled "Primary"), the computer places the chosen Skill in the appropriate column in a new Content Map $C_b$ like the one shown below. (The majority vote was "Primary" in this example.)

| | $C'_0$ (shown in progress) | |
|---|---|---|
| Item | Skills Primarily Assessed by this Item | Skills Secondarily Assessed by this Item |
| $\tau_1$ | $S_1$ | |
| $\tau_2$ | | |
| $\tau_3$ | | |
| $\tau_4$ | | |

4.b.iv. The computer repeats 4.b(i)-4.b(iii) for all Skills appearing next to Item $\tau_1$ in the Content Map C.

4.c. The computer repeats 4(a) and 4(b) for all of the Items in T. As the group progresses through the Items, the computer enters the group's conclusions for each Item into the Content Map $C'_b$ as in the following example:

| | $C'_b$ | |
|---|---|---|
| Item | Skills Primarily Assessed by this Item | Skills Secondarily Assessed by this Item |
| $\tau_1$ | $S_1, S_3$ | |
| $\tau_2$ | | $S_4$ |
| $\tau_3$ | $S_1, S_4$ | |
| $\tau_4$ | $S_2, S_4$ | $S_1$ |
| $\tau_5$ | $S_2, S_4$ | |

Upon completion of 4(c), step 928 has been completed. Also, as noted in step 930, as the routine progresses through the Items, each Operator is prompted to keep records of any Items he or she may wish to revisit in further iterations.

The Pedagogical Operators may likely want to revisit the analysis of the Items, as the group's own understanding of the terms 'Primary' and 'Secondary' may have evolved during the process of carrying out steps 928 and 930. Thus, in steps 932 and 933, the Pedagogical Operators are given the opportunity to construct a new Primary/Secondary Content Map, $C_{b+1}$, by cycling through the Items in turn as follows:

5.a. The group is prompted to focus on Item $\tau_1$.

5.b. The group is prompted to reach consensus as to whether the sorting of Skills Assessed by the Item, as represented in Content Map $C_b$, should be revised.

One embodiment of 5(b) is as follows:

5.b.i. The group is prompted to vote "aye" or "nay" on the issue of whether the sorting of Skills should be revised. The votes are input via keyboard and tallied by the computer.

5.b.ii. If "aye" votes form the majority, then the Pedagogical Operators are informed that the consensus is that the sorting of Skills must be revised.

5.b.iii. If one or more "aye" votes were cast, but did not form a majority, then each of those who voted "aye" is prompted to explain his or her reasoning. Then the vote is repeated. If in this second vote "ayes" form the majority, then the Pedagogical Operators are informed that the consensus is that the sorting of Skills must be revised. If "aye" votes do not form the majority, then the Pedagogical Operators are informed that the consensus is that the sorting of Skills must not be revised.

5.c. If the consensus is that the sorting should be revised, then the experts are prompted to reach a new consensus as to which Skills are Primarily Assessed by the Item and which Skills are Secondarily Assessed by the Item, as in 4(b) above.

5.d. The computer repeats 5(a)-5(c) for all Items on the Test. As the routine progresses through the Items, the computer enters the group's conclusions for each Item into a new Content Map $C'_{b+1}$. Also, as noted in step 933, as the routine progresses through the Items, each Operator is prompted to keep records of any Items he or she may wish to revisit in further iterations.

Upon completion of 5(d), step 932 has been completed.

The computer next evaluates Decision 936, by comparing the $(b+1)^{st}$ Primary/Secondary Content Map, $C'_{b+1}$, to the $b^{th}$ Primary/Secondary Content Map, $C'_b$.

If the two content maps are identical, then in step 940 the computer designates $C'_b$ as the Content Map, C'.

If the two content maps are not identical, then the computer evaluates Decision 938, by comparing the value of b to the value of a 'kickout' number, $M_{max}$, which is hard-coded into the routine in advance.

If $b<M_{max}$, then in step 934 the computer increments the value of the loop control index b by unity and repeats steps 928, 930, 932, 933.

If $b>M_{max}$, then in step 942 the computer prompts the group to select by consensus the best Content Map C' from among all of the Content Maps $C'_0, \ldots, C'_b$, in the same manner as in step 918.

Next, in step 944 the computer 'transposes' the Content Map C' in the obvious way to form the Skill-Item Table $I(S_T, T)$.

The Pedagogical Operators are then prompted in step 945 to identify the Fall-off Ratio(s) that numerically express the differences between the qualitative assignments 'Primary' and 'Secondary'.

For example, take the case of a Skill-Item Table that has columns for "Skills Primarily Assessed by this Item" and "Skills Secondarily Assessed by this Item". If the Operators express the Fall-Off Ratio of Primarily Assessed Skills to Secondarily Assessed Skills as 10:1, then this means that the Operators regard the so-called Secondary Skills as highly secondary. If the Fall-Off Ratio were 2:1, however, then this means that the Pedagogical Operators regard Secondary Skills as relatively important.

Thus, for example, the computer can prompt each Pedagogical Operator with a menu of choices, such as the following:

| In Your Judgment . . . | Reference value of Fall-Off Ratio |
|---|---|
| . . . Are Secondary Skills much less relevant to the Item than the Primary Skills? | 8:1 |
| . . . Are Secondary Skills almost as relevant to the Item as the Primary Skills are? | 1.5:1 |

The Pedagogical Operators can input the value of the Fall-Off Ratio that they feel best captures their judgment, based on the reference values shown in the table. The computer records the values $\gamma_t$ of these input Ratios, and then calculates the consensus Fall-Off Ratio $\gamma$ as the geometric mean of the input values: $\gamma = (\gamma_1 \equiv \gamma_N)^{1/N}$, where N is the number of Pedagogical Operators. (When the numbers being chosen are ratios, the geometric mean is a more sensible measure of central tendency than the arithmetic mean.)

When the Skill-Item Table includes columns for Tertiary relevance, etc., then there will be more than one Fall-Off Ratio, so as to permit comparison between Primary/Secondary Skills, Secondary/Tertiary Skills, etc.: $\gamma_{PS}, \gamma_{ST}, \ldots$.

In step 946, the computer writes the Skill-Item Table $I(S_T, T)$ and the Fall-Off Ratio(s) to the Information Repository 114, and then finally in step 948 the computer notifies the Operator of the Skill-Item Table Generator 124 that processing is complete.

For simplicity, the flowchart FIG. 9 does not represent the logically possible (but extremely unlikely) event in which every Item fails to have any Skills listed next to it in the initial Content Map $C_0$. If this happens, the Client is notified, and a new Skill Set must be provided. (This circumstance cannot arise when the Skill-Item Table Generator 124 is being activated as a subprocess of the Item-Skill Analyzer 130.)

4.C. Raw Coding Matrix Generator

The next component to be described is the Raw Coding Matrix Generator 126. The Raw Coding Matrix Generator 126 uses the qualitative correspondences between Skills and Items as represented in the Skill-Item Table, as well as the Fall-Off Ratio(s) that encapsulate the strength of the pedagogical distinction(s) between Primary/Secondary, Secondary/Tertiary, etc., to produce a numerical matrix that expresses the correspondence between each Item and each Skill.

The Raw Coding Matrix Generator 126 may consist physically of (a) an Operator (human or computer) that activates the Raw Coding Matrix Generator 126 when notified to do so in step 618 by the Analysis Operator or in steps 1006, 1012, or 1018 by the Item-Skill Analyzer Operator; and (b) a computer (or a human moderator) connected to the network executing a programmed routine that retrieves a Skill-Item Table from the Information Repository 114, converts it to a numerical Raw Coding Matrix, and then writes the Raw Coding Matrix to the Information Repository 114. The embodiment below describes one algorithm for accomplishing this, assuming for definiteness that the programmed routine is being carried out by a computer.

Once the Raw Coding Matrix Generator 126 is activated, the computer retrieves a Skill-Item Table from the Information Repository 114. The computer first converts the Skill-Item Table into a larger table, with one row for each Skill and one column for each Item. Such a conversion functions in the natural way as follows:

A.

| | Items PRIMARILY Assessing this Skill | Items SECONDARILY Assessing this Skill |
|---|---|---|
| Skill 1 | $\tau_1, \tau_3$ | $\tau_4$ |
| Skill 2 | $\tau_4, \tau_5$ | |
| Skill 3 | $\tau_1$ | |
| Skill 4 | $\tau_3, \tau_4, \tau_5$ | $\tau_2$ |

B.

| | Item 1 | Item 2 | Item 3 | Item 4 | Item 5 |
|---|---|---|---|---|---|
| Skill 1 | Primarily assessed | Not assessed | Primarily assessed | Secondarily assessed | Not assessed |
| Skill 2 | Not assessed | Not assessed | Not assessed | Primarily assessed | Primarily assessed |
| Skill 3 | Primarily assessed | Not assessed | Not assessed | Not assessed | Not assessed |
| Skill 4 | Not assessed | Secondarily assessed | Primarily assessed | Primarily assessed | Primarily assessed |

Then, the computer transforms this larger table into a numerical matrix, with the same number of rows and the same number of columns as the table, and with a numerical value between 0 and 1 associated with each cell. This value represents numerically the degree to which a given Item assesses a given Skill, and reflects prior pedagogical judgments made about the correspondence between each Item and each Skill, as reflected in their expressed Fall-Off Ratio(s).

Mathematically, the computer effects this transformation in such a way that (a) the sum of the numbers across all the Skills for a particular Item must equal 1; and (b) the previously determined Fall-Off Ratio(s) govern the comparative numerical measures of Skill relevance within a given Item.

For example, take the above table in the case where the Fall-Off Ratio stipulates a primary to secondary ratio of 2:1. In that case, the Raw Coding Matrix would be as shown below. For example, in the case of Item 4, where Skill 1 is secondarily assessed and Skills 2 and 4 are primarily assessed, the numerical assignments of Item 4 to Skills 1, 2, and 4 respectively would be 0.2, 0.4, and 0.4:

|         | Item 1 | Item 2 | Item 3 | Item 4 | Item 5 |
|---------|--------|--------|--------|--------|--------|
| Skill 1 | 0.5    | 0      | 0.5    | 0.2    | 0      |
| Skill 2 | 0      | 0      | 0      | 0.4    | 0.5    |
| Skill 3 | 0.5    | 0      | 0      | 0      | 0      |
| Skill 4 | 0      | 1      | 0.5    | 0.4    | 0.5    |

(In this embodiment, in the event that an Item has only a single Secondary coding, that Item-Skill cell is assigned the number 1. In another embodiment, one could regard an Item with only a "Secondary" coding as reflecting the Operators' judgment there is a Skill required for the Item not represented in the Skill Set, in which case the Item-Skill cell would be assigned 0.33—reflecting the fact that a non-assessed Skill was primarily assessed).

This Raw Coding Matrix is sometimes called a Q-matrix, except that a Q-matrix traditionally contains as matrix elements only 0's and 1's.

Once the computer has transformed the Skill-Item Map into a numerical Raw Coding Matrix by means of a transformation such as the above, it writes the Raw Coding Matrix to the Information Repository 114 and notifies the Operator that processing is complete.

4.D. Coding Matrix Refiner

The Raw Coding Matrix generated by the Raw Coding Matrix Generator 126 represents a set of careful judgments about which Skills in the Skill Set are important for successfully answering each Item on the Test—and, at least qualitatively, in what degree these Skills are required. These judgments are highly valuable in generating meaningful diagnostic information based on the results of a Test.

However, the question of which Items on a Test "belong together" is not entirely a question of expert opinion. If judgment suggests that all of the Items in a particular cluster assess the same Skill, then it should be the case, for example, that Students who get one of those Items wrong tend to get many of them wrong. This is a hypothesis that can be tested empirically by examining the Student response data. If the correlations between the Items in the cluster is not high enough, then the original judgment may need to be modified.

Those skilled in the art of psychometrics recognize complex methods for using correlations found in the Student response data (such as the relationship between a Student's answers on different sets of Items) to refine the entries in a Raw Coding Matrix in this way. The Coding Matrix Refiner 128 serves to implement such a routine, and the matrix resulting from this implementation is called here the Refined Coding Matrix. Thus, in short, the Coding Matrix Refiner 128 transforms the Raw Coding Matrix into a Refined Coding Matrix.

The Coding Matrix Refiner 128 may consist physically of (a) an Operator (human in most embodiments) that activates the Coding Matrix Refiner 128 when notified to do so in step 620 by the Analysis Operator or in step 1008, 1014, or 1020 by the Item-Skill Analyzer Operator; and (b) a computer (or a human moderator) connected to the network executing a programmed routine that retrieves a Raw Coding Matrix from the Information Repository 114, retrieves Student response data from the Information Repository 114 as appropriate to the psychometric routine being employed, uses the Student response data to refine the Raw Coding Matrix, and then writes the resulting Refined Coding Matrix to the Information Repository 114, along with Quality Rating Information as described in more detail below. The embodiment below assumes for definiteness that this programmed routine is being carried out by a computer.

One simple method the computer might implement to transform a Raw Coding Matrix into a Refined Coding Matrix would be to perform commonly employed factor-analytic calculations that identify spurious Skill assignments for particular Items. More complex methods for refining the Raw Coding Matrix include approaches based on multidimensional Item Response Theory and cognitive diagnosis routines such as Tatsuoka's Rule Space methodology (Tatsuoka, K. K., Architecture of knowledge structures and cognitive diagnosis, P. Nichols, S. Chipman & R. Brennan, Eds., Cognitively Diagnostic Assessment. Hillsdale, N.J.: Lawrence Erlbaum Associates, 1995) (incorporated herein by reference) and DiBello and Stout's Unified Cognitive/Psychometric Diagnostic Assessment model (DiBello, L., Stout, W., and Roussos, L. Unified Cognitive/Psychometric Diagnostic Assessment likelihood-Based Blassification Techniques. In P. Nichols, S. Chipman, and R. Brennan, Eds., Cognitiyely Diagnostic Assessment. Hillsdale, N.J.: Lawrence Erlbaum Associates, 1995) (incorporated herein by reference).

All of these methods typically produce one form of quality rating or another that reflects whether and to what extent the connections posited by a Coding Matrix are reflected in the patterns of Student response data.

To take a 'toy model' example of the foregoing, suppose that a Test has two Skills, Addition and Subtraction, and three Items. The Raw Coding Matrix for this Test has been given as

|             | Item 1 | Item 2 | Item 3 |
|-------------|--------|--------|--------|
| Addition    | 1      | 0.5    | 0      |
| Subtraction | 0      | 0.5    | 1      |

Thus, the best pedagogical judgment has determined that Item 2 assesses Addition and Subtraction equally.

Of course, whether or not Item 2 really assesses Addition and Subtraction equally is a question that admits of empirical analysis; that is, the Students' responses to the Test Items can be analyzed with this question in mind. For example, if the correlation $r_{21}$ that holds between a Student's score on Item 2 and the Student's score on Item 1—a pure Addition Item—is higher than the correlation $r_{23}$ that holds between Student's Score on Item 2 and the Student's Score on Item 3—a pure Subtraction Item—then this offers statistical evidence that Item 2 actually assesses ability in Addition more directly than it assesses ability in Subtraction. Thus, a simple refinement of the Raw Coding Matrix above could be given by

|             | Item 1 | Item 2                                              | Item 3 |
|-------------|--------|-----------------------------------------------------|--------|
| Addition    | 1      | $0.5((1 + r_{21})/(1 + r_{21}/2 + r_{23}/2))$      | 0      |
| Subtraction | 0      | $0.5((1 + r_{23})/(1 + r_{21}/2 + r_{23}/2))$      | 1      | provided, at least, that the highly exceptional case $r_{21}=r_{23}=-1$ does not obtain. (For example, the condition $r_{21}=-1$ can only obtain when every Student who answered Item 1 correctly also answered Item 2 incorrectly, and conversely; this occurrence would never arise in practice.)

For example, if $r_{21}$ is as high as 0.7, but $r_{23}$ is only 0.2, then the Raw Coding Matrix

|  | Item 1 | Item 2 | Item 3 |
|---|---|---|---|
| Addition | 1 | 0.5 | 0 |
| Subtraction | 0 | 0.5 | 1 | would become the Refined Coding Matrix

|  | Item 1 | Item 2 | Item 3 |
|---|---|---|---|
| Addition | 1 | 0.586 | 0 |
| Subtraction | 0 | 0.414 | 1 |

Since the correlation $r_{21}$ is greater than the correlation $r_{23}$, the refinement has increased the weight of Item 2 in Addition, at the expense of the weight of Item 2 in Subtraction.

Correlation coefficients can also serve as a simple example of Quality Rating Information for a Refined Coding Matrix. For example, the matrix elements $Q_{ki}$ from the Refined Coding Matrix (where k=1 for Addition, k=2 for Subtraction, i=1 for Item 1, i=2 for Item 2, and i=3 for Item 3) can be compared with correlation coefficients to form a quality rating index such as $$q = 9 - (\frac{1}{2}(1+r_{12}) - Q_{11}Q_{12})^2 - (\frac{1}{2}(1+r_{23}) - Q_{12}Q_{13})^2 - (\frac{1}{2}(1+r_{13}) - Q_{11}Q_{13})^2 - (\frac{1}{2}(1+r_{12}) - Q_{21}Q_{22})^2 - (\frac{1}{2}(1+r_{23}) - Q_{22}Q_{23})^2 - (\frac{1}{2}(1+r_{13}) - Q_{21}Q_{23})^2.$$

Taking the first term in parentheses as an example, one sees that if Item 1 correlates poorly with Item 2 (so that $\frac{1}{2}(1+r_{12})$ is small), and yet Item 1 is grouped with Item 2 in the same Skill (so that $Q_{11}Q_{12}$ is large), then the squared term in parentheses will have to be large, because it is the difference of a small number and a large number. When the squared term is large, it will detract from the quality q in virtue of the minus sign. Thus, one sees that when the Refined Coding Matrix "disagrees with the data," its quality rating will be relatively low. As an illustration of this, the quality rating of the Refined Coding Matrix (with the weights adjusted) is higher than the quality rating of the Raw Coding Matrix (with 0.5/0.5 entries for Item 2) in the above example:

$$q_{refined} - q_{raw} = 0.028 > 0.$$

This shows that, at least according to this simple model, the quality of the Coding Matrix has gone up as a result of Refinement.

In a conceptually similar manner, more sophisticated and theoretically motivated analyses yield Quality Rating Information that allows those skilled in the art to evaluate the quality of a Refined Coding Matrix from the statistical point of view.

However, whatever method is used, it is important to note that the method will rely on accurate instructional judgment to provide it with a Raw Coding Matrix as an input. Typically, the Raw Coding Matrices employed reflect crude 'yes/no' judgments as to Skill-Item relevance; this compromises the effectiveness of the routines in generating instructionally valid Skill-Item assignments. By contrast, the Raw Coding Matrices employed in this invention are more instructionally accurate because they reflect nuanced, non-binary judgments about Skill-Item relevance. As a result, any routine implemented in the Coding Matrix Refiner 128 becomes a more powerful source of diagnostic information.

4.E. Item-Skill Analyzer

Figure 6A:
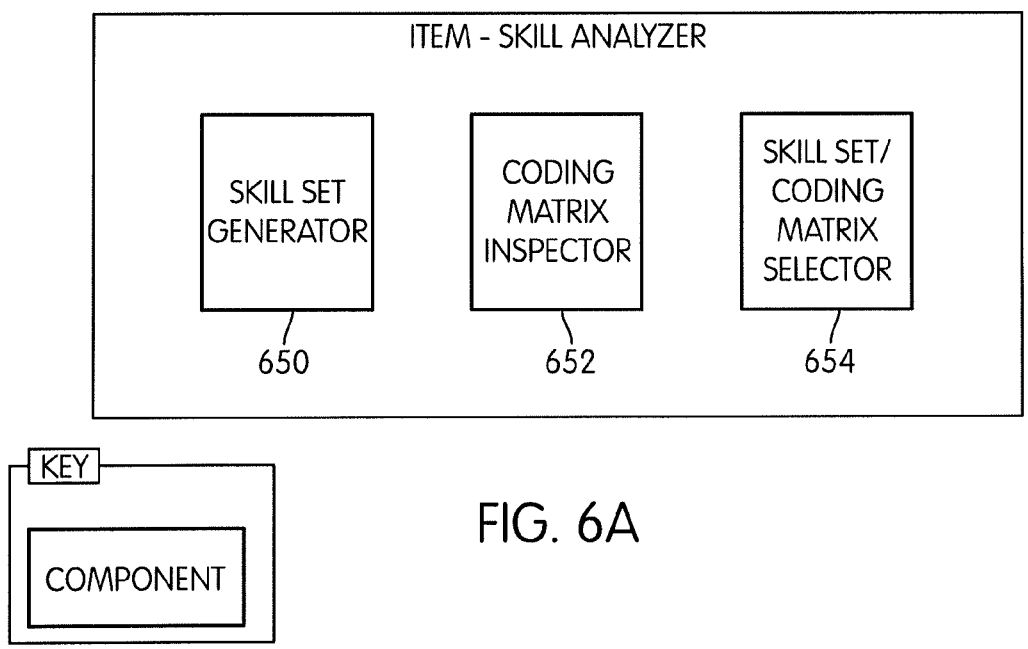
FIG. 6a is a block diagram illustrating the Item-Skill Analyzer component of the system.
Figure 10:
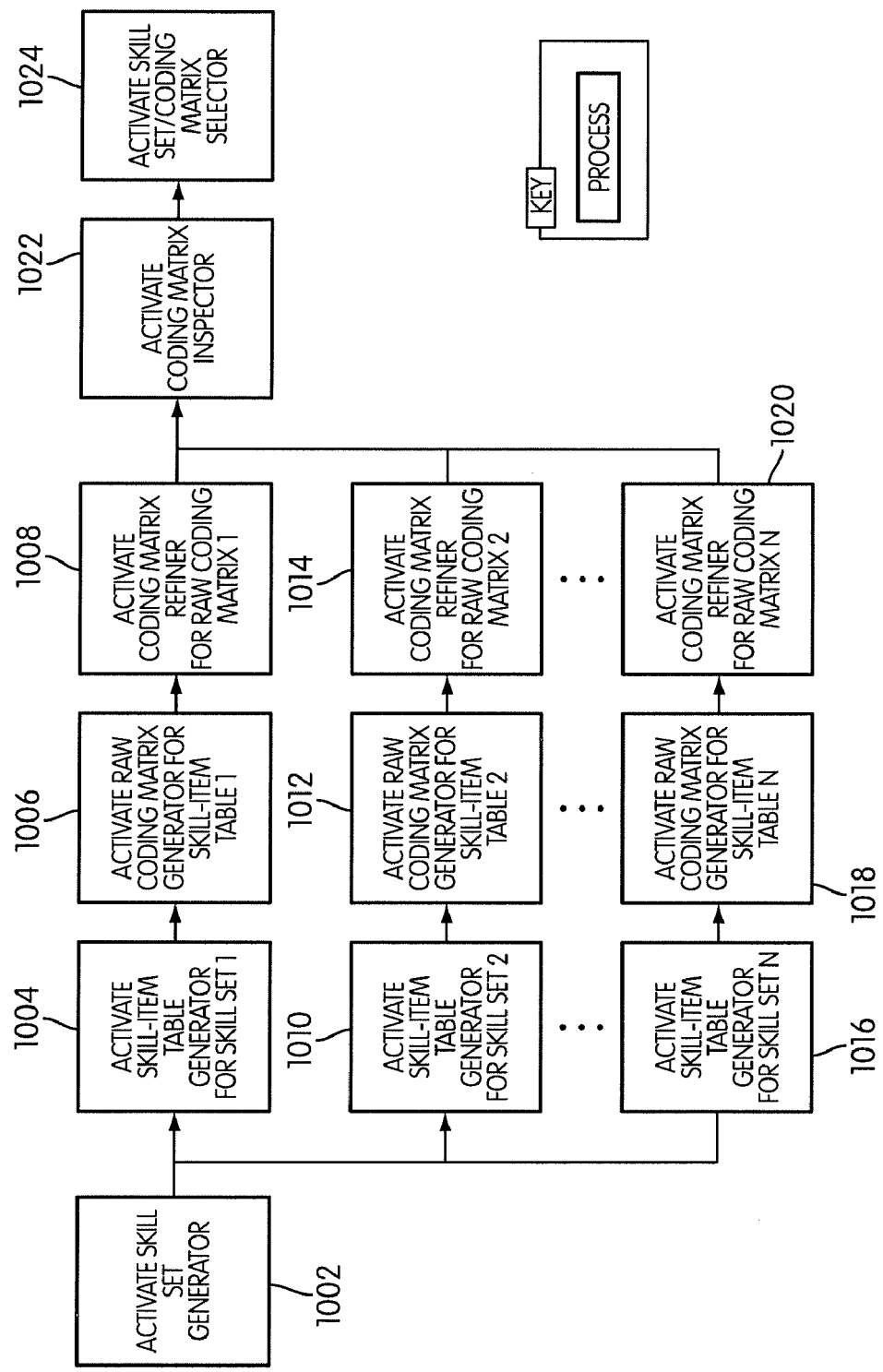
FIG. 10 is a flowchart illustrating the operation process of the Item-Skill Analyzer component of the system.

FIG. 6a is a block diagram of the Item-Skill Analyzer 130 showing its subcomponents: the Skill Set Generator 650, the Coding Matrix Inspector 652, and the Skill Set/Coding Matrix Selector 654. FIG. 10 is a flowchart showing the functioning of the Item-Skill Analyzer 130.

Existing methods typically calculate Test Results in reporting categories that are not useful for the intended recipients of the results. In many cases, teachers typically do not understand these reporting categories, or find them overbroad. For example, the organization that reports the exam results for the New York state testing program uses the math reporting category "Modeling/Multiple Representation", a term which typical teachers do not understand. Similarly, the organization that reports the exam results for the California state testing program uses the reading reporting category "Functional Reading", a term which typical teachers find overbroad.

This may occur because the organization that reports the exam results decides, for simplicity, to base the reporting categories on educational language that already exists, such as broad language that the state has adopted about its educational goals or standards. Unfortunately, using reporting categories based on such language is problematic because the categories are then too broad and non-descriptive.

On the other extreme, certain test preparation organization report exam results using categories that are very narrowly defined around the precise types of questions asked on the exam. Because these categories are built around capturing the specific items on the test itself, these categories are not useful for teachers or others interested in using the Test Results to guide instruction. Indeed, such narrow categories may even be instructionally misleading, to the extent they suggest do not help instructors understand the range of skills that their students may be expected to master.

Another problem arises when the organization that reports the exam results uses a purely statistical method, such as a factor analysis, to determine which Items on the Test to collect together for reporting purposes. Because this approach does not systematically involve the insight of people with instructional expertise, it often leads to reporting categories that are not clearly defined or understood by the recipients of the Test Results.

The Item-Skill Analyzer 130 instantiates a repeatable process by which individuals can develop reporting categories for a given test according to a shared protocol. One embodiment of this process would maximize the pedagogical insight of the reporting categories, subject to statistical constraints, and therefore would be both educationally useful and psychometrically sound.

This is especially useful when Clients (a) regard themselves as working towards an explicit set of educational goals or standards defined by them, but (b) purchase their Tests from external vendors. Under these circumstances, the connection between the Skills required for success on the Test and the educational goals embraced by the Client may not be explicit. Indeed, the Client may never even have examined this connection in detail.

The Item-Skill Analyzer 130 makes it possible to establish such a connection in an efficient, reliable, and robust manner. Given a particular Test, and given the response data from Students taking the Test, the Item-Skill Analyzer 130 generates (a) a Skill Set $S_T$; (b) an "Organization," $\Omega_T$, which is a grouping of the Skills in the Skill Set $S_T$ into pedagogically related families of Skills (Organizations are defined in detail below); and (c) a Refined Coding Matrix $Q(S_T, T)$. These items are written to the Information Repository 114 for use in the remainder of the System's operations.

The Item-Skill Analyzer 130 may consist physically of (a) an Operator (human or computer) that activates the Item-Skill Analyzer 130 when notified to do so by the Analysis Operator; and (b) a computer (or a human moderator) executing a programmed routine that follows the sequence of steps in FIG. 10. The embodiment below assumes for definiteness that this programmed routine is being carried out by a computer.

The process embodied in the Item-Skill Analyzer 130 is as follows: First, the computer activates the Skill-Set Generator 650 in step 1002. As part of its functioning (described below), the Skill-Set Generator 650 outputs a list of Proposed Skill Sets $S_T^1, \ldots, S_T^N$ and their associated Organizations $\Omega_T^1, \ldots, \Omega_T^N$ to the Information Repository 114.

In step 1004, the computer activates the Skill-Item Table Generator 124 with the first Proposed Skill Set $S_T^1$ as the input. As part of its functioning as described above, the Skill-Item Table Generator 124 outputs to the Information Repository 114 a Skill-Item Table $I(S_T^1, T)$ corresponding to $S_T^1$.

With reference to step 904 of the Skill-Item Table Generator 124 flowchart, when the computer activates the Skill-Item Table Generator 124 in step 1004, it enforces the rule that, with reference to part 1.b(ii) of that process, the Proposer of that Proposed Skill Set is required to vote "aye" for an Item whenever the Item is a Justifying Item for him or her in the given Skill. (These terms are defined below.)

In step 1006, the computer activates the Raw Coding Matrix Generator 126 with the first Skill-Item Table $I(S_T^1, T)$ as the input. As part of its functioning as described above, the Raw Coding Matrix Generator 126 outputs to the Information Repository 114 a Raw Coding Matrix $Q^0(S_T^1, T)$ corresponding to $I(S_T^1, T)$.

In step 1008, the computer activates the Coding Matrix Refiner 128 with the first Raw Coding Matrix $Q^0(S_T^1, T)$ as the input. As part of its functioning as described above, the Coding Matrix Refiner 128 outputs a Refined Coding Matrix $Q(S_T^1, T)$ and its associated Quality Rating Information $q_1$ to the Information Repository 114. (This quality information may consist of more than a single number, and may also include qualitative statements useful to those skilled in the art of psychometrics for evaluating Coding Matrices.)

In steps 1010, 1012, and 1014, the computer carries out for the second Proposed Skill Set $S_T^2$ a process strictly analogous to the steps 1004, 1006, and 1008 that were carried out for the first Proposed Skill Set S1. At the termination of step 1014, therefore, the Information Repository 114 will contain a Skill-Item Table $I(S_T^2, T)$, its associated Organization $\Omega_T^2$, a Raw Coding Matrix $Q^0(S_T^2, T)$, a Refined Coding Matrix $Q(S_T^2, T)$, and Quality Rating Information $q_2$ associated with $Q(S_T^2, T)$.

Strictly analogous steps are carried out for successive Proposed Skill Sets in the list $S_T^1, \ldots, S_T^N$ until, in steps 1016, 1018, and 1020, the final Proposed Skill Set $S_T^N$ is processed. The Information Repository 114 now contains, for each Proposed Skill Set, an Organization that groups the Skills in the Skill Set into pedagogically related families; a Skill-Item Table; a Raw Coding Matrix; a Refined Coding Matrix; and Quality Rating Information associated with the Refined Coding Matrix.

At the completion of step 1020, the computer activates in step 1022 the Coding Matrix Inspector 652. As part of its functioning (described below), the Coding Matrix Inspector 652 outputs to the Information Repository 114 a sub-list of the original list of Proposed Skill Sets (containing M Skill Sets, where $M \leq N$).

In step 1024 the computer activates the Skill Set/Coding Matrix Selector 654. As part of its functioning (described below), the Skill Set/Coding Matrix Selector 654 writes to the Information Repository 114 a single Skill Set $S_T$, its associated Organization $\Omega_T$, and its associated Refined Coding Matrix $Q(S_T, T)$.

Subcomponents Activated by the Item-Skill Analyzer

In broad outline, the Item-Skill Analyzer 130 is a system for prompting two groups of human judges (called Pedagogical Operators and Psychometric Operators, respectively) to interact with one another to examine a set of Test Items and a set of Student response data for those Test Items. The two groups are prompted, in an efficient and repeatable way, to use the skills of their respective arts to generate, from those Items and those data, a Skill Set $S_T$, an Organization $\Omega_T$, and a Refined Coding Matrix $Q(S_T, T)$ that together express the structure of the Test in a pedagogically and statistically sound manner.

The dynamics of the Item-Skill Analyzer 130 and its subcomponents are structured in recognition of the fact that Pedagogical Operators and Psychometric Operators tend to exhibit opposing tendencies. Pedagogical Operators seek to define Skill Sets aligned with their pedagogical outlook, potentially at the expense of statistical reliability. Psychometric Operators, on the other hand, seek to define Skill Sets that lead to results that are statistically reliable (as understood by people trained in the art), potentially at the expense of making diagnostic recommendations that are understandable for Educators, Parents, or Students.

When one of these groups works in isolation, or when its interaction with the other group is insufficiently structured, the resulting Skill Set has the weaknesses characteristic of the group that produced it. By contrast, the flow of the Item-Skill Analyzer 130 achieves an optimization between the two groups' tendencies that produces results that are simultaneously useful and reliable.

The dynamics of the Item-Skill Analyzer 130 and its subcomponents, one embodiment of which is described in detail below, have the following fundamental characteristics.

First, the algorithm is iterative in nature, consisting of a series of proposals and counterproposals between the two groups. The basic dynamics of these proposals and counterproposals must be determined in advance. Schematically, if one group is Group A and the other group is Group B, then the process may be chosen to take any one of the following forms: AB, BA, ABA, BAB, etc.

The Group acting first in the process proposes a number of potential Skill Sets, and in each successive phase of the process, the number of potential Skill Sets is diminished, until only a single Skill Set survives.

Subject to the chosen structure of proposals and counterproposals, the process by which each Group generates or selects Skill Sets and Coding Matrices may be decided by the Group itself or may be governed by pre-existing decision-making criteria, including (1) required approval by a fixed percentage of a Group with respect to Proposed Skill Sets and Coding Matrices; (2) culling from a summation of individual or subgroup determinations of Proposed Skill Sets' and Skill-Item Matrices' fitness according to a pre-determined rubric (these determinations could be in the form of quality ratings, rank orderings, gradated determinations of fitness, etc.).

Now that the operation of the Item-Skill Analyzer 130 as a whole has been described, it is useful to describe one embodiment of its first subcomponent, the Skill Set Generator 650.

4.E.1. Skill Set Generator 650

Figure 7:
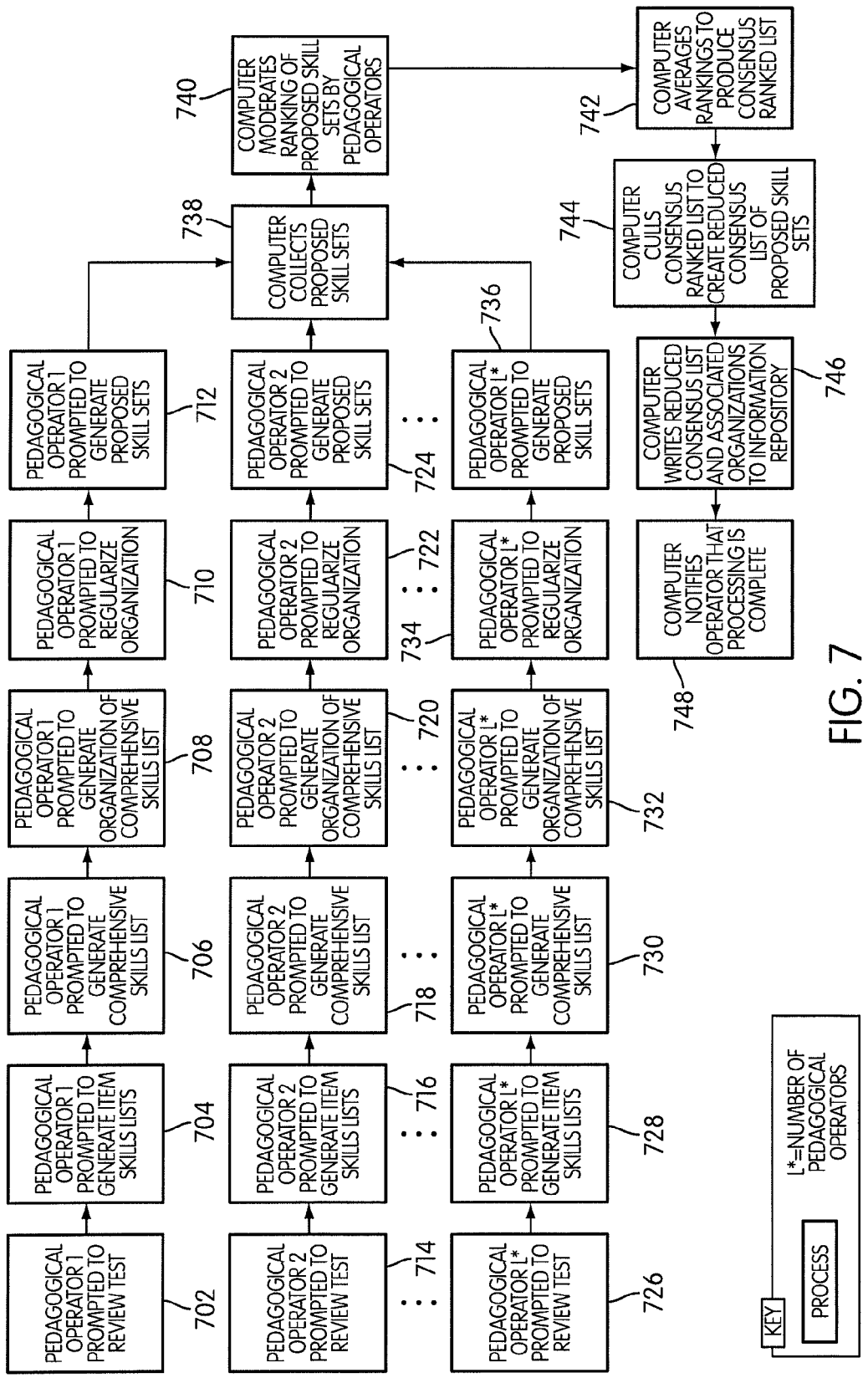
FIG. 7 is a flowchart illustrating the operation process of the Skill Set Generator component of the system.

The Skill Set Generator 650 may consist physically of (a) an Operator (human or computer) that activates the Skill Set Generator 650 when notified to do so by the Item-Skill Analyzer Operator; and (b) a computer (or a human moderator) connected to the network executing a programmed routine that follows the sequence of steps in FIG. 7. The embodiment below assumes for definiteness that this programmed routine is being carried out by a computer.

The programmed routine of the Skill Set Generator 650 prompts each member of a group of human judges, called Pedagogical Operators, to generate lists of Skills, each of which, in that person's judgment, captures the array of cognitive, artistic, or other demands made on Students by a given set of Test Items T. The number of Pedagogical Operators is flexible.

Importantly, the Skill Set Generator 650 ensures that every list of Skills proposed by a Pedagogical Operator arises from a comprehensive and, in the Pedagogical Operator's judgment, coherent breakdown of the Subject of the Test (called an Organization). Deriving the proposed lists of Skills from an Organization ensures that, even though the Test itself may only assess a limited portion of the Subject being assessed, nevertheless each proposed list of Skills will present a coherent picture of the Subject, with no gaps or overlaps. This feature of the Skill Set Generator 650 is highly valuable to Users, who seek to use the Skill Set in a Display as a way of thinking about the Subject they are trying to teach or learn.

FIG. 7 is a flowchart showing the functioning of the Skill Set Generator 650.

To understand the operation of the Skill Set Generator 650, one can consider the following brief example of a Test, which is a set of six constructed-response Items that might be administered to third-grade mathematics students.

1. What is 13+7?
2. What is 7×9?
3. Is 16×19879 odd or even?
4. What is the name of the following shape?

5. What fraction is represented by this diagram?

6. Which decimal is larger? 0.6 or 0.06

In step 702, the first Pedagogical Operator is prompted to review the Test.

In step 704, the first Pedagogical Operator is prompted to generate a list of the discrete Skills from the Subject that are required in order to answer all Items on the Test correctly. These lists will be called "Item Skills Lists."

For the example Test above, the Item Skills Lists of the first Pedagogical Operator might be as follows:

| | Item Skills Lists for the first Pedagogical Operator | | | | | |
|---|---|---|---|---|---|---|
| | Item 1 | Item 2 | Item 3 | Item 4 | Item 5 | Item 6 |
| Skills Required | Basic Operations on Whole Numbers | Basic Operations on Whole Numbers | Basic Operations on Whole Numbers Properties of Whole Numbers | Naming Shapes | Recognizing Fractions | Ordering Decimals |

In step 706, the first Pedagogical Operator is prompted to list all of the Skills that appear in at least one Item Skills List. This will be called the "Comprehensive Skills List".

| Comprehensive Skills List for one Pedagogical Expert |
|---|
| Basic Operations on Whole Numbers |
| Properties of Whole Numbers |
| Naming Shapes |
| Recognizing Fractions |
| Ordering Decimals |

In step 708, the first Pedagogical Operator is prompted to generate a tree that arranges the Skills in the Comprehensive Skills List into families based on pedagogical relatedness.

To do this, the first Pedagogical Operator is prompted to judge which Skills from the Comprehensive Skills List are most closely related to one another, and to group these Skills together. These groups are called Skill Families, and the Pedagogical Operator is prompted to give them names.

For example, the first Pedagogical Operator may judge that a Skill called "adding fractions with like denominators" and a Skill called "adding fractions with unlike denominators" both belong to a Skill Family called "adding fractions."

The first Pedagogical Operator is next prompted to judge which Skill Families are most closely related to one another, and to group these into Skill Families of Second Order, and to give these names.

For example, the first Pedagogical Operator may judge that a Skill Family called "adding fractions" and a Skill Family called "multiplying fractions" both belong to a Skill Family of Second Order called "basic operations with fractions."

Next, the first Pedagogical Operator is prompted to judge which Skill Families of Second Order are most closely related to one another, and to group these into Skill Families of Third Order, and to give these names.

This process continues until at some order the first Pedagogical Operator has obtained a single over-arching Skill Family. (This single Skill Family may be considered the Operator's view as to the Level and Subject of the Test itself.)

This is called the "Organization" for the first Pedagogical Operator. An example of an Organization 802 is shown in FIG. 8.

In step 710, the first Pedagogical Operator is prompted to "Regularize" his/her Organization. Regularizing an Organization means collapsing all single-track paths in the corresponding tree as far as possible from the bottom up, combining Skill Family names in the process. More precisely, regularization is an iterative process that proceeds as follows: If any leaf in the tree is an "only child," then the name of the leaf is appended to the name of the parent, and the leaf is deleted. This process is repeated on the resulting tree, and iterated until the tree remains fixed. A regularized tree, known as the "Regularized Operation" is either a single node, or else a tree in which each leaf has a parent with degree greater than one. An example of a Regularized Organization 804 is shown in FIG. 8.

Note that Regularizing an Organization is a process that can be easily performed by a computer; hence, in some embodiments, the task of Regularization can be lifted from the Pedagogical Operator. This is especially worthwhile when the number of nodes in the Organization is large.

Next, the first Pedagogical Operator is prompted to use his/her Organization to generate a series of Proposed Skill Sets. A Proposed Skill Set is a list of Skills and/or Skill Families (henceforth called, simply, Skills) with the property that a direct path from the root of the tree to any leaf in the tree encounters exactly one Skill or Skill Family in the list. The Regularized Organization in FIG. 8 generates four Proposed Skill Sets:

| Proposed Skill Set $S_T^1$ | Proposed Skill Set $S_T^2$ | Proposed Skill Set $S_T^3$ | Proposed Skill Set $S_T^4$ |
| --- | --- | --- | --- |
| Basic Operations on Whole Numbers | Basic Operations on Whole Numbers | Whole Numbers | Whole Numbers |
| Whole Number Properties | Whole Number Properties | Geometry: Naming Shapes | Geometry: Naming Shapes |
| Geometry: Naming Shapes | Geometry: Naming Shapes | Fractions: Recognizing Fractions | Fractions and Decimals |
| Fractions: Recognizing Fractions Decimals: Ordering Decimals | Fractions and Decimals | Decimals: Ordering Decimals | |

Note that each Skill in a Proposed Skill Set corresponds to a node in the Organization that generated it. This node has a set of ultimate descendants within the Organization, which are Skills that form leaves in the Organization. These Skills must earlier have appeared as entries in the Item Skills List of some Item (or Items). Thus, for any Skill in any Proposed Skill Set generated by an Organization, there is a nonempty set of Items on the Test whose Skill requirements, in that Pedagogical Operator's opinion, would not properly be represented in the Proposed Skill Set if that Skill were deleted from the Skill Set. These will be called the Justifying Items for this Skill for that Pedagogical Operator.

Note that the process of enumerating all of the Proposed Skill Sets that can be generated by a given Organization is a process that can be easily performed by a computer; hence, in some embodiments, the task of generating Proposed Skill Sets can be lifted from the Pedagogical Operator. This is especially worthwhile when the number of nodes in the Organization is large.

In steps 714, 716, 718, 720, 722, and 724, the precisely analogous process is carried out for the second Pedagogical Operator as was carried out in steps 702, 704, 706, 708, 710, and 712 for the first Pedagogical Operator.

This process continues until, in steps 726, 728, 730, 732, 734, and 736, the precisely analogous process is carried out for the last Pedagogical Operator as was carried out in steps 702, 704, 706, 708, 710, and 712 for the first Pedagogical Operator.

The Pedagogical Operators may be prompted simultaneously (in parallel), provided each Pedagogical Operator has access to his/her own terminal. (In the case in which a human moderator executes the programmed routine, using paper questionnaires, etc., to prompt the Pedagogical Operators, parallel processing is trivial to implement.)

In step 738, the computer collects together all of the distinct Proposed Skill Sets that are generated by the Organizations of all the Pedagogical Operators.

In step 740, the computer prompts each Pedagogical Operator to rank the assembled Proposed Skill Sets. A Proposed Skill Set earns a high rank if, in the Pedagogical Operator's opinion, it offers (1) a usefully precise set of diagnostic categories for Teachers working in the Subject and Level of the Test; and (2) a breakdown of the Subject and Level consonant with the instructional approaches of most Teachers in the audience of the Report.

In step 742, the computer averages the rankings of the Pedagogical Operators to produce a "Consensus Ranked List" of Proposed Skill Sets. For the sake of economy, the analysis can be continued with only a certain number or proportion of Proposed Skill Sets, chosen from the top of the Consensus Ranked List. This number or proportion can be hard-coded into the programmed routine. The resulting collection of Proposed Skill Sets is called the Reduced Consensus List of Skill Sets.

In step 746, the computer writes each Skill Set $S_T^b$ in the Reduced Consensus List $S_T^1, \ldots, S_T^N$ to the Information Repository 114, along with the Organization $\Omega_T^b$ that generated it. (Note that the $\Omega_T^b$ will not in general be distinct, although this fact is not significant for the functioning of the Item-Skill Analyzer 130.)

Finally, in step 748, the computer notifies the Operator of the Skill Set Generator 650 that processing is complete.

4.E.2. Coding Matrix Inspector 652

After the Skill Set Generator 650 has completed its processing, the Information Repository 114 contains a Reduced Consensus List of Skill Sets $S_T^1, \ldots, S_T^N$; an Organization $\Omega_T^b$ for each Skill Set $S_T^b$ in the Reduced Consensus List that groups the Skills in the Skill Set $S_T^b$ into pedagogically related families; a Skill-Item Table $I(S_T^b, T)$ for each Skill Set $S_T^b$ in the Reduced Consensus List; a Raw Coding Matrix $Q^0(S_T^b, T)$ for each Skill Set $S_T^b$ in the Reduced Consensus List; a Refined Coding Matrix $Q(S_T^b, T)$ for each Skill Set $S_T^b$ in the Reduced Consensus List; and Quality Rating Information $q_b$ associated with the Refined Coding Matrix $Q(S_T^b, T)$.

The Coding Matrix Inspector 652 may consist physically of (a) an Operator (human or computer) that activates the Coding Matrix Inspector 652 when notified to do so by the Item-Skill Analyzer Operator; and (b) a computer (or a human moderator) executing a programmed routine that follows the sequence of steps outlined below. The embodiment below assumes for definiteness that this programmed routine is being carried out by a computer.

The programmed routine of the Coding Matrix Inspector 652 prompts each member of a group of human judges, called Psychometric Operators, to shorten the Reduced Consensus List of Skill Sets $S_T^1, \ldots, S_T^N$ based on the Quality Rating Information of the associated Refined Coding Matrices. The number of Pedagogical Operators is flexible.

The programmed routine operates according to the following algorithm:

First, the computer reads from the Information Repository 114 the list of Refined Coding Matrices $Q(S_T^1, T), \ldots, Q(S_T^N, T)$. Then, each Psychometric Operator is prompted to view each Refined Coding Matrix $Q(S_T^b, T)$ and familiarize himself/herself with its Quality Rating Information $q_b$. The Psychometric Operators are prompted to record notes on each Refined Coding Matrix for use later in the routine.

The Psychometric Operators can signal the completion of their review of a given Refined Coding Matrix by touching a key on the computer keyboard or entering a computer command.

After each Psychometric Operator has been prompted to review each Refined Coding Matrix, the computer prompts the Psychometric Operators to discuss each Refined Coding Matrix in turn. The Psychometric Operators signal the computer when the discussion of a given Refined Coding Matrix has completed.

Following this discussion, the computer prompts each Psychometric Expert to rate the suitability of each Refined Coding Matrix in binary fashion (suitable/unsuitable). The ratings are inputted via the computer keyboard, and the computer tallies the votes.

If a Refined Coding Matrix is judged unsuitable by a certain percentage of the Psychometric Operators (which percentage can be hard-coded into the programmed routine), then the computer designates the Refined Coding Matrix as unsuitable.

If all of the Skill-Item Matrices are deemed unsuitable by the group, then the Psychometric Experts are each prompted to cast a vote for the single Refined Coding Matrix they would reinstate. After the votes are input into the computer and the computer counts them, a Refined Coding Matrix is chosen randomly from among those receiving the maximal number of votes, and this Refined Coding Matrix is reinstated as suitable.

The computer writes to the Information Repository 114 the suitable Refined Coding Matrices $Q(S_T^b, T)$, numbering $M \geq 1$ in all, along with their corresponding Skill Sets $S_T^b$, Organizations $\Omega_T^b$, and Skill-Item Tables $I(S_T^b, T)$. The remaining list of Skill Sets $S_T, S_T^M$ is now called the Culled List of Skill Sets.

Finally, the computer notifies the Operator of the Coding Matrix Inspector 652 that processing is complete.

4.E.3. Skill Set/Coding Matrix Selector 654

After the Coding Matrix Inspector 652 has completed its processing, the Information Repository 114 contains a Culled List of Skill Sets $S_T^1, \ldots, S_T^M$; an Organization $\Omega_T^b$ for each Skill Set $S_T^b$ in the Culled List, which groups the Skills in Skill Set $S_T^b$ into pedagogically related families; a Skill-Item Table $I(S_T^b, T)$ for each Skill Set $S_T^b$ in the Culled List; a Raw Coding Matrix $Q^0(S_T^b, T)$ for each Skill Set $S_T^b$ in the Culled List; a Refined Coding Matrix $Q(S_T^b, T)$ for each Skill Set $S_T^b$ in the Culled List; and Quality Rating Information $q_b$ associated with each Refined Coding Matrix $Q(S_T^b, T)$.

The Skill Set/Coding Matrix Selector 654 may consist physically of (a) an Operator (human or computer) that activates the Skill Set/Coding Matrix Selector 654 when notified to do so by the Item-Skill Analyzer Operator; and (b) a computer (or a human moderator) executing a programmed routine that follows the sequence of steps outlined below. The embodiment below assumes for definiteness that this programmed routine is being carried out by a computer.

The programmed routine of the Skill Set/Coding Matrix Selector 654 prompts a group of human judges, called Pedagogical Operators, to select a single Skill Set $S_T$ from among the Skill Sets in the Culled List of Skill Sets $S_T^1, \ldots, S_T^M$ based on pedagogical considerations. The number of Pedagogical Operators is flexible.

The programmed routine operates according to the following algorithm:

First, the computer reads from the Information Repository 114 the Culled List of Skill Sets $S_T, \ldots, S_T$, along with the Organizations $\Omega_T^b$ and Refined Coding Matrices $Q(S_T^b, T)$ corresponding to each Skill Set $S_T^b$ in the Culled List. Each collection $$(S_T^b, \Omega_T^b, Q(S_T^b, T))$$

that is read by the computer from the Information Repository 114 is called a "Proposal."

Next, the computer provides each Pedagogical Operator with access to the Test Items for his/her reference.

Then, each Pedagogical Operator is prompted to view each Proposal and consider it from a pedagogical point of view, using the same criteria applied during step 740 of the functioning of the Skill Set Generator 650, together with two additional criteria:

Pedagogical Operators may also take into account the coherence, completeness, scope, and sensibility of the Organization $\Omega_T^b$ in a Proposal, as it serves to communicate the structure and organization of the Subject to Users.

Pedagogical Operators may also take into account the extent to which the Skill-Item connections represented in the Refined Coding Matrix reflect their own assessment of the relevance of each Skill to each Item.

The Pedagogical Operators can signal the completion of their review of a given Proposal by touching a key on the computer keyboard or entering a computer command.

After each Pedagogical Operator has been prompted to review each Proposal, the computer prompts the Pedagogical Operators to discuss each Proposal in turn as a group. The Pedagogical Operators signal the computer when the discussion of a given Proposal has completed.

Following this discussion, the computer prompts each Pedagogical Operator to rank the Proposals. The ranking of each Pedagogical Operator is inputted via the computer keyboard.

After the rankings are all input into the computer and aggregated by the computer using a point system (e.g., 0 points for the top ranking, −1 points for the bottom ranking, etc.), a Proposal $(S_T, \Omega_T, Q(S_T, T))$ is chosen randomly from among those receiving the maximal number of points.

The computer then writes to the Information Repository 114 the final Skill Set $S_T$, Organization $\Omega_T$, and Refined Coding Matrix Matrices $Q(S_T, T)$.

Finally, the computer notifies the Operator of the Skill Set/Coding Matrix Selector 654 that processing is complete.

4.F. Student Skill Score Calculator

The purpose of the Student Skill Score Calculator 132 is to represent each student's performance in each Skill by a single number. This number is called the Student's Skill Score for the Skill in question.

It is important to understand that the Skill Score may have many different interpretations. First, the Skill Score may represent a normative level of performance; for example, the percent of those Items requiring the Skill that were answered correctly by the Student. Second, the Skill Score may represent an estimate of the Student's ability in the Skill, as commonly discussed in Multidimensional Item Response Theory. Third, the Skill Score may represent an estimate of the Student's probability of mastery of the Skill, as commonly discussed in the theory of cognitive diagnosis. Fourth, the Skill Score may represent the Student's percentile rank, based on normative criteria such as these. Finally, the Skill Score need not be interpreted as normative data at all, instead representing simply a label that uniquely identifies the Student's set of responses to the Items requiring the Skill in question. Different Displays in a given Report may show different varieties of Skill Score, and any given Display may show several different varieties of Skill Score simultaneously.

The Student Skill Score Calculator 132 may consist physically of (a) a human Operator who activates the Student Skill Score Calculator 132 according to the flowchart in FIG. 10a when notified in step 624 to do so by the Analysis Module Operator; and (b) a computer connected to the network that executes appropriate code as described in more detail below.

Processing Performed by the Computer Code

The Student Skill Score Calculator 132 takes from the Information Repository 114 the following inputs:
   Data Requirements for Results Reports;
   the Refined Coding Matrix; and
   each Student's Item Score Vector.

The Student Skill Score Calculator 132 writes to the Information Repository 114 the following outputs:
   Each Student's Skill Score Vector (or Vectors, in the case of multiple types of Skill Scores as suggested above).

The transformation of these inputs into these outputs is accomplished by computer code. According to the technical terminology specified in the Glossary, the computer code executed during the operation of the Student Skill Score Calculator 132 effectively applies one or more "Skill Score Mappings" to each Student's "Item Score Array", in order to create one or more "Skill Score Vectors" for each Student. This statement can be made clearer by describing several explicit embodiments of Skill Score Mappings.

As specified in the Glossary, an Item Score Array is a two-dimensional array of numbers containing a Student's Item Scores, sorted by Skill. Each row of the array corresponds to a different Skill. The numbers in a given row are the Student's Item Scores for the Items requiring that Skill, where, in the context of the Student Skill Score Calculator 132, a given Item i is said to require a given Skill k when its column i in the Refined Coding Matrix has a non-zero entry in row k (i.e. when the matrix element $Q_{ki} \neq 0$).

A simple example of an Item Score Array can be given as follows.

Item Score Array Example

Suppose the Skill Set is given by $S_T$={"Skill 1", "Skill 2", "Skill 3", "Skill 4"}, and the Refined Coding Matrix is given by

|  | Item 1 | Item 2 | Item 3 | Item 4 | Item 5 |
|---|---|---|---|---|---|
| Skill 1 | 0.5 | 0 | 0.788 | 0.2 | 0 |
| Skill 2 | 0 | 0 | 0 | 0.4 | 0.5 |
| Skill 3 | 0.5 | 0 | 0 | 0 | 0 |
| Skill 4 | 0 | 1 | 0.212 | 0.4 | 0.5 |

Then, for example, the Items requiring Skill 1 are Item 1, Item 3, and Item 4.

Suppose next that a hypothetical Student has incorrectly answered Items 1 and 5, but has correctly answered Items 2, 3, and 4. So the Student's Item Score Vector is given by $y=(0,1,1,1,0)$.

By sorting these Scores in rows corresponding to Skills, the Student's two-dimensional Item Score Array is found as $$\psi = \begin{pmatrix} (0, 1, 1) \\ (1, 0) \\ (0) \\ (1, 1, 1, 0) \end{pmatrix}.$$

For example, the first row of the array contains the Item Scores for just those Items requiring Skill 1 (Items 1, 3, and 4). The Student's Score of 0 for Item 1 appears as the first number in the first row of the array; the Student's Score of 1 for Item 3 appears as the second number in the first row of the array; and the Student's Score of 1 for Item 4 appears as the third number in the first row of the array. The other rows are completed similarly.

In this example, there is only one Item requiring Skill 3, namely Item 1. So the third row of the Item Score Array contains only one number, namely, the Item Score 0 that was received by the Student on Item 1.

Explicit Embodiments of Skill Score Mappings

A Skill Score Mapping is any mathematical function that transforms a Student's Item Score Array $\psi$ into a Skill Score Vector, denoted $s=(s_1, \ldots, s_m)$. Here, $s_1$ denotes the Student's Skill Score for Skill 1, and so on. Some embodiments of Skill Score Mappings are as follows.

1. A given Display may include information how many Items requiring each Skill were answered correctly by the Student. This list of numbers is an example of a Skill Score Vector for the Student. To calculate this Skill Score Vector, the computer code would simply add the entries in each row of the Student's Item Score array:

$$\psi = \begin{pmatrix} (0, 1, 1) \\ (1, 0) \\ (0) \\ (1, 1, 1, 0) \end{pmatrix} \text{ transforms to: } \begin{pmatrix} 2 \\ 1 \\ 0 \\ 3 \end{pmatrix} = s_{rawscores}$$

This transformation is a Skill Score Mapping.

2. Another Display may include information on the Student's probability of mastery of each Skill. This would call for a more complex Skill Score Mapping, $$\psi = \begin{pmatrix} (0, 1, 1) \\ (1, 0) \\ (0) \\ (1, 1, 1, 0) \end{pmatrix} \text{ transforms to: } \begin{pmatrix} \pi_1 \\ \pi_2 \\ \pi_3 \\ \pi_4 \end{pmatrix} = s_{probabilities. \, of \, mastery}$$

Here the probabilities of mastery $\pi_k$ emerge from the Student's Item Scores in a much more complicated way than simple addition, through the implementation of a cognitive diagnosis routine.

3. Generalized Percent Correct.

In one embodiment of the Student Skill Score Calculator, a Skill Score Mapping is implemented which generates Generalized Percent Correct values in each Skill. Here the term "Generalized Percent Correct" reflects the fact that Refined Coding Matrices may split Items among different Skills. Therefore, a Student's performance on a given Skill must take into account not only which of the Items requiring that Skill the Student answered correctly, but also the varying extent to which those Items require the Skill.

The following constitutes a method for generating Students' Generalized Percent Correct for a given Skill. First, given the Refined Coding Matrix for the Test, the Total Weight for each Skill is calculated and stored in the Information Repository 114. The Total Weight in a Skill is found by multiplying [the $n^{th}$ value in the row of the Refined Coding Matrix corresponding to the Skill in question] by [the Item Weight of the $n^{th}$ Item], and adding these products across the row. In other words, the Total Weight in a Skill can be thought of as the maximum Score possible in a Skill, taking into account the various maximum Scores of every Item and the varying degree to which any Item assesses any Skill.

The Student's point total in the Skill is then found by multiplying [the $n^{th}$ value in the row of the Refined Coding Matrix corresponding to the Skill in question] by [the Student's Item Score for the $n^{th}$ Item], and adding these products across the row Dividing this point total by the Total Weight in a Skill yields the Student's Generalized Percent Correct in the Skill. For example, in the special case in which all Items are multiple-choice Items with possible Item Scores of 0 or 1 (so that the Item Weight of every Item is 1), and in which no single Item assesses more than one Skill, the Generalized Percent Correct is equal to [the number of Items requiring the Skill that were answered correctly by the Student] divided by [the total number of Items requiring the Skill].

4. Labeling Item Score Arrays.

As a final example of a Skill Score Mapping, a Display may involve specifying, for a given Skill, precisely which Items among the Items requiring the Skill were answered correctly by the Student. For this to be possible, the Student Skill Score Calculator 132 must write the Student's Skill Score Vector to the Information Repository 114 in the form of a vector of "labels" that allow the Student's Item Score Array $\psi$ to be reconstructed. This can be accomplished by means of the following Skill Score Mapping, which regards each row in the Item Score Array as an integer in base-2 representation, and simply expands the integer in base-10:

$$\psi = \begin{pmatrix} (0,1,1) \\ (1,0) \\ (0) \\ (1,1,1,0) \end{pmatrix} \rightarrow \begin{pmatrix} 0 \cdot 2^0 + 1 \cdot 2^1 + 1 \cdot 2^2 \\ 1 \cdot 2^0 + 0 \cdot 2^1 \\ 0 \cdot 2^0 \\ 1 \cdot 2^0 + 1 \cdot 2^1 + 1 \cdot 2^2 + 0 \cdot 2^3 \end{pmatrix} = \begin{pmatrix} 3 \\ 1 \\ 0 \\ 7 \end{pmatrix} = s_{labels}$$

(Note that the number of Items requiring each Skill is necessary in order to recover the original Item Score Array from the vector of labels s=(3,1,0,7); this information exists in the Information Repository 114 within the Refined Coding Matrix.)

In the embodiments 1, 3, and 4 above, it is easy to see that the Skill Score Mapping treats each Skill independently when it calculates the Skill Scores; that is, the mapping proceeds row by row, and there is no interaction between one Skill and another Skill in calculating the Skill Scores. Such a Skill Score Mapping is called a Factorizable Skill Score Mapping. Skill Scores leading to probabilities of mastery may or may not arise from Factorizable Skill Score mappings.

Thus, Non-Factorizable Skill Score Mappings form another embodiment of the Student Skill Score Calculator 132. Non-Factorizable Skill Score Mappings do not treat a Student's performance on each Skill as independent from the Student's performance on other Skills. As an example of a Non-Factorizable Skill Score Mapping, those skilled in the art can estimate the probability that a Student has mastered a particular Skill taking into account the Student's performance on a particular Test; for example, by using Cognitive Diagnosis theories such as Tatsuoka's Rule Space Methodology or diBello and Stout's Unified Model, both cited above.

A given Cognitive Diagnosis routine may or may not require (or permit) the introduction of explicit curricular intelligence into the calculation of this estimated probability of mastery. However, one might easily imagine that, among those skilled in the pedagogy of the Subject of the Test, it is almost universally agreed that a Student can never master Skill $k_1$ without first mastering Skill $k_2$. This knowledge makes it possible (and necessary) to introduce an 'override' into the estimate of the probability of mastery for Skill $k_1$. For example, if a Student has very low mastery of skill $k_2$, then it is extremely unlikely that the Student can have mastered skill $k_1$. This curricular 'override' produces an explicit dependence of one Skill Score on another.

Skill Score Mappings are implemented by the Student Skill Score Calculator 132 as follows.

Figure 10A:
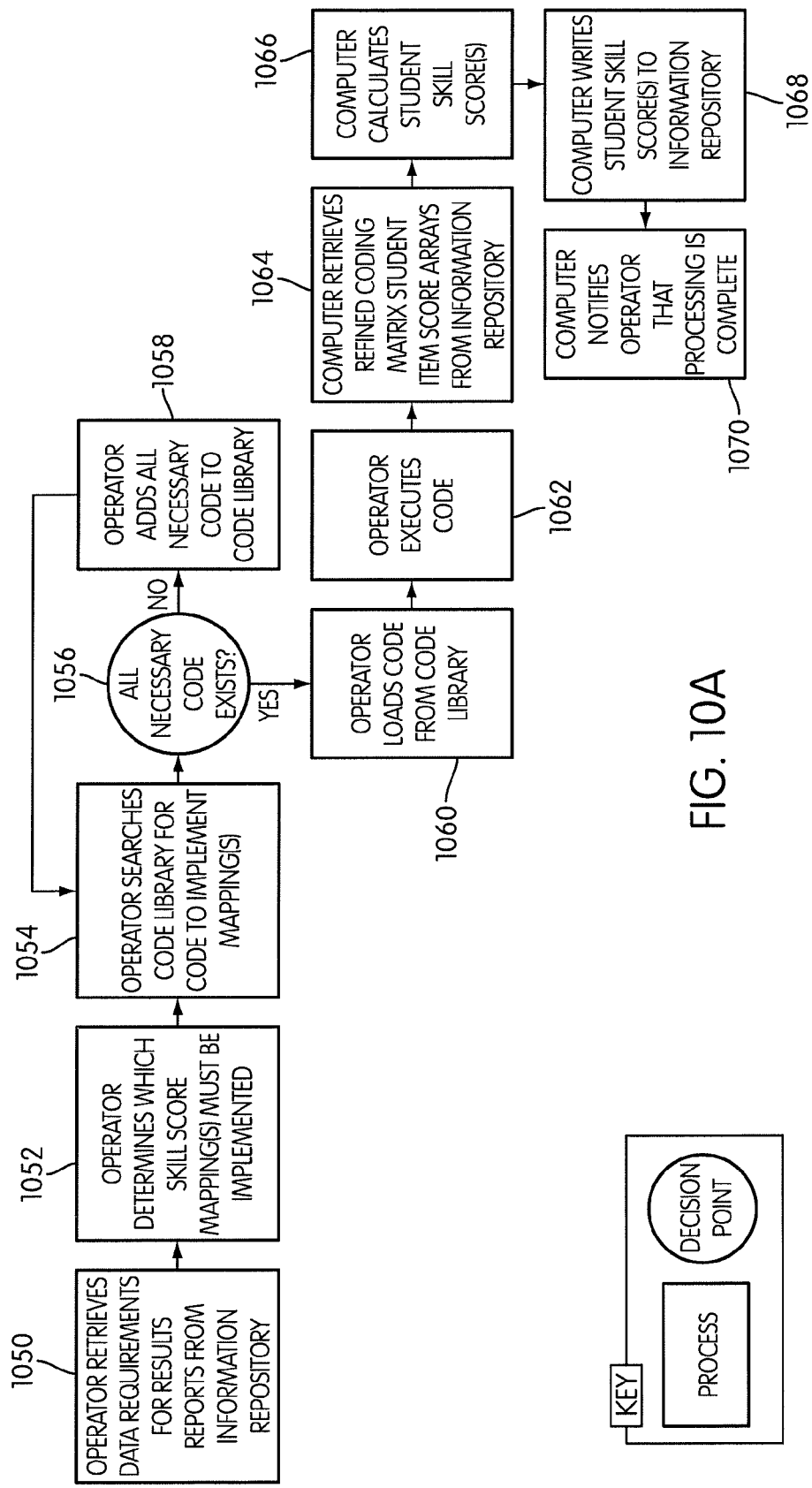
FIG. 10a is a flowchart illustrating the operation process of the Student Skill Score Calculator component of the system.

FIG. 10a is a flowchart showing the functioning of the Student Skill Score Calculator 132.

In step 1050, the Operator of the Student Skill Score Calculator 132 retrieves the Data Requirements for Results Reports from the Information Repository 114.

In step 1052, the Operator reviews the Data Requirements for Results Reports to determine which Skill Score Mappings must be implemented (probabilities of mastery, percent correct values, etc.) in order to meet the requirements.

In step 1054, the Operator searches the Code Library to determine whether code exists in the Code Library to implement all of the required Skill Score Mappings. In Decision 1056, if all of the necessary code does not exist in the Code Library, the Operator uses the skills of his/her art in Step 1058 to write the necessary code and add it to the Code Library. Upon searching the Code Library again in Step 1054, he/she is guaranteed to find all of the necessary code in Decision 1056.

Having found the necessary code in Decision 1056, the Operator loads the code from the Code Library into the Psychometric Analysis Computer in step 1060 and executes it in step 1062. This sets the computer in motion.

In step 1064, the computer retrieves from the Information Repository 114 the Refined Coding Matrix, as well as each Student's Item Score Array.

In step 1066, the computer then effects a transformation of each Student's Item Score Array into that Student's Skill Score Vector(s), according to the particular Skill Score Mapping(s) being implemented.

In step 1068, the computer writes the Student Skill Score(s) to the Information Repository 114, and then, in step 1070, notifies the Operator that the processing of the Student Skill Score Calculator 132 is complete.

4.F. Student Skill Performance Evaluator

The purpose of the Student Skill Performance Evaluator 134 is to evaluate each Student's performance in each Skill in a verbal (non-numerical) fashion. It is important to realize that Users of Test Results do not simply want to see numerical Scores that describe Students' performance on the Test.

Instead, they want verbal statements (known here as "Evaluation Statements") about how Students and Groups performed, both on the Test as a whole and in particular Skills. In particular, Users of Test Results may want to know about recommended instructional strategies for addressing weaknesses and for helping Students and Groups to advance still further in areas of their strength. Evaluation Statements that recommend actions of one kind or another are here known as "Formative Statements."

Accordingly, the Student Skill Performance Evaluator 134 assigns Evaluation Statements (including Formative Statements) to individual Students based on their performance on the Test. The system and method of the Student Skill Performance Evaluator 134 constitute a repeatable process for assigning Evaluation Statements to Students based on Students' performance in particular Skills.

For example, in one embodiment, the Student Skill Performance Evaluator 134 assigns each Student one of three absolute, Formative Statements for each Skill, such as the following: "Likely to Need Help with Fundamentals", "Likely to Need Additional Instruction and Practice", and "Likely to Be Ready for Advanced Work". These Formative Statements (i.e., statements that recommend one course of action over another) might be applied to specific Students and Skills, resulting (for example) in suggestions that one Student work on the fundamentals of subtraction, while another Student proceed to advanced work in that subject. These Formative Statements can be very useful for Users, such as Educators who can take such recommended courses of actions in the classroom.

It may also be the case that Client may provide additional requirements for the types of Evaluation Statements that it wishes displayed. These requirements, stored in the Information Repository 114 by the Data Assembler 106, can be applied by the Student Skill Performance Evaluator 134 as well. For example, the Client might wish that when a Student receives his or her Test Results, the Student will see that particular one of a group of two given Evaluation Statements (for instance, "Try Harder" and "Good Work") that corresponds best to the Student's overall performance and to the Student's particular performance in individual Skills.

The Student Skill Performance Evaluator 134 thus draws its Evaluation Statements from a certain range. Formally, a "Range of Evaluation Statements" is here defined to be a set of jointly exhaustive, mutually exclusive Evaluation Statements. To say that a Range of Evaluation Statements is jointly exhaustive means that any Obtained Skill Score can be comprehended under the scope of at least one of the Evaluation Statements in the Range. To say that a Range of Evaluation Statements is mutually exclusive means that there is no Obtained Skill Score that can be comprehended under the scope of more than one Evaluation Statement in the Range.

Some examples of Ranges of Evaluation Statements could include:

$$R=\{\text{'Rapid Growth Potential', 'Low Growth Potential'}\}$$

(growth-based Evaluation Statements are discussed in an embodiment below);

$$R=\{\text{'Likely to Need Help With Fundamentals', 'Likely to Require Additional Instruction and Practice', 'Likely to Be Ready for Advanced Work'}\};$$

(these particular Evaluation Statements can be assigned to Students based on a "Coarse-Grained Criterion Mapping," as described in an embodiment below, or can be assigned by other means, including comparisons of relative performance of Students); and $$R=\{\text{'Top Quartile', 'Second Quartile', 'Third Quartile', 'Bottom Quartile'}\}$$

(which are necessarily assigned on the basis of relative comparisons).

Several Ranges of Evaluation Statements may be involved in the various Displays of a particular Report. For example, the Displays in a given Report may involve the following four Ranges of Evaluation Statements:

$$R_1=\{\text{'Likely to Need Help With Fundamentals', 'Likely to Require Additional Instruction and Practice', 'Likely to Be Ready for Advanced Work'}\},$$

$$R_2=\{\text{'Room to Grow', 'Where You Shine', 'Neither'}\},$$

$$R_3=\{\text{'Recommended Starting Point', 'Not a Recommended Starting Point'}\},$$

$$R_4=\{\text{'Low Probability of Mastery', 'High Probability of Mastery', 'Impossible to Estimate Probability of Mastery'}\}.$$

Not every Evaluation Statement in each Range need be overtly displayed in an actual display shown to Users. For example, in the case of $R_3$ above, the display would likely highlight the single Skill that maps to the Evaluation Statement 'Recommended Starting Point'—the other Skills' status as 'Not a Recommended Starting Point' being reasonably indicated merely by omission or implication.

Using the Evaluation Statements in a given Range, the Student Skill Performance Evaluator 134 "evaluates" numerical scores and generates "conclusions" from them. Informally, it is as if the Student Skill Performance Evaluator 134 accomplishes the task of saying, "Given all these Skill Scores, what would one best conclude?" Obviously, the mathematical details of the code operating within the Student Skill Performance Evaluator 134 must depend intimately on the semantic universe represented by the Range of Evaluation Statements. The Client constrains this process through the Data Reporting Requirements, as described in more detail below.

When Evaluation Statements are displayed by the Display Module 142, they allow Users to view and organize information not only according to numerical measures such as percent correct or scale score, but also according to qualitative criteria, which criteria may include summative evaluations ("Mastery", "Area of Difficulty", etc.) as well as formative statements, which are recommendations for action of one kind or another ("Ready for Advanced Work", etc.).

Physical Instantiation

The Student Skill Performance Evaluator 134 may consist physically of (a) a human Operator who activates the Student Skill Performance Evaluator 134 according to the flowchart in FIG. 11 when notified in step 624 to do so by the Analysis Module Operator; and (b) a computer connected to the network that executes appropriate code as described in more detail below.

Processing Performed by the Computer Code

The Student Skill Performance Evaluator 134 takes from the Information Repository 114 the following inputs:

Data Requirements for Results Reports;

each Student's Skill Score Vector(s);

other Student Performance Information such as may be required to generate Evaluation Statements in a particular embodiment, such as those described in detail below.

The Student Skill Score Calculator 132 writes to the Information Repository 114 the following outputs:

Each Student's Vector(s) of Evaluation Statements (or Vectors, in the case of multiple correspondences between Skill Scores and Ranges of Evaluation Statements as suggested above).

The transformation of these inputs into these outputs is accomplished by computer code. Using the technical terms defined in the Glossary, the computer code executed during the operation of the Student Skill Performance Evaluator 134 effectively applies one or more "Score-Statement Mappings" to one or more of each Student's Skill Score Vectors, in order to produce one or more "Vectors of Evaluation Statements" for the Student.

As a very brief example of an explicit embodiment of such a Score-Statement Mapping, consider a mapping that transforms any Skill Score above 90 into the Evaluation Statement "Good Job!"; transforms any Skill Score between 80 and 90 into the Evaluation Statement "Practice Makes Perfect!"; and transforms any Skill Score of 80 or below into the Evaluation Statement "Keep Trying!" This transformation rule is a Score-Statement Mapping.

More sophisticated embodiments of Score-Statement Mappings will be described below. However, since these explicit embodiments have lengthy descriptions, it is helpful to describe first the overall functioning of the Student Skill Performance Evaluator 134 itself, which is the component of the Analysis Module 120 that implements Score-Statement Mappings.

Score-Statement Mappings are implemented by the Student Skill Performance Evaluator 134 as follows.

Figure 11:
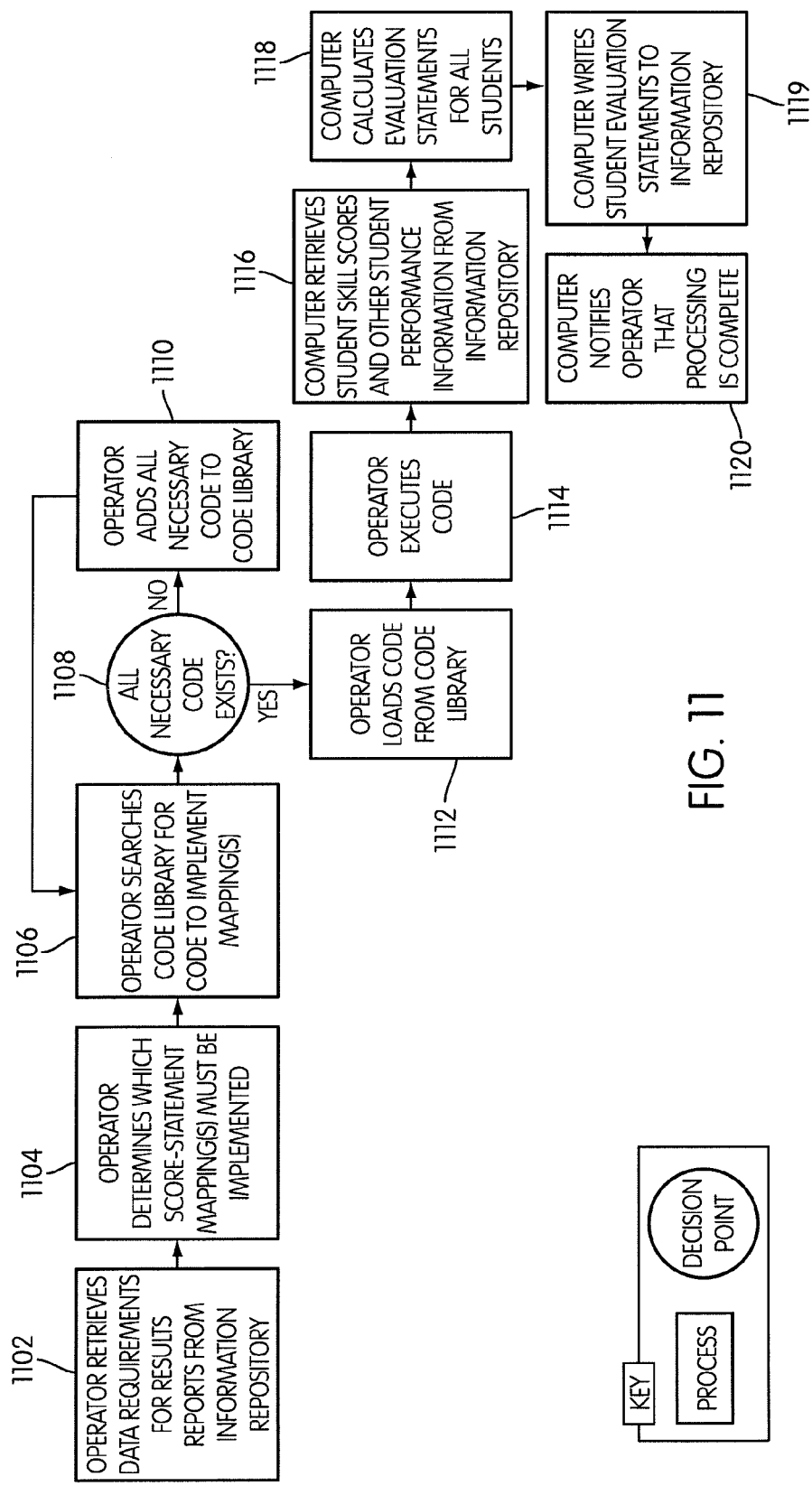
FIG. 11 is a flowchart illustrating the operation process of the Student Skill Performance Evaluator component of the system.

FIG. 11 is a flowchart showing the functioning of the Student Skill Performance Evaluator 134.

In step 1102, the Student Skill Performance Evaluator Operator retrieves from the Information Repository 114 the Data Requirements for Reporting. These stipulate the Ranges of Evaluation Statements to be used in the Displays, and they also stipulate constraints on the mapping of Skills Scores to these Evaluation Statements, as happens for example in Coarse Graining, discussed below.

By reviewing the Data Requirements for Reporting, the Operator determines in step 1104 which Score-Statement Mapping(s) must be implemented in order to provide data for the Displays.

In step 1106 the Operator searches the Code Library for the code necessary to implement these mappings via a computer program.

If in Decision 1108 the necessary code does not exist, then the Operator uses the skills of his/her art to write the necessary code, adding it to the Code Library in step 1110. When the Operator next searches the Code Library in step 1106, the necessary code will be found.

In Decision 1108 the Operator then finds the necessary code in the Code Library, and in step 1112 loads it into the computer, executing it in step 1114.

The computer in step 1116 retrieves Student Skill Scores, as well as other Student Performance Information as required by the algorithm(s) being implemented; see below for embodiments. In step 1118 the computer carries out the algorithm(s) to assign each Student one or several Vectors of Evaluation Statements, as for example in the embodiments below. Then in step 1119 the Students' Vectors of Evaluation Statements are written to the Information Repository 114, and the computer in step 1120 notifies the Operator that its processing is complete.

Explicit Embodiments of Score-Statement Mappings

Intuitively, a Score-Statement Mapping converts the numerical data in a Skill Score Vector into the Skill-by-Skill list of verbal statements or recommendations in a Vector of Evaluation Statements. As defined in the Glossary, a Skill Score Mapping $\mu_R$ is any mathematical function that transforms a Student's Skill Score Vector $s=(s_1, \ldots, s_m)$ into a Vector of Evaluation Statements $e=(e_1, \ldots, e_m)$. Here, $s_1$ denotes the Student's Skill Score for Skill 1 and $e_1$ denotes the Student's Evaluation Statement for Skill 1, drawn from the Range of Evaluation Statements R. Usually the Range of Evaluation Statements under discussion is understood, so $\mu_R$ is simply written $\mu$.

It is also useful to consider the nature of "Factorizable" Score-Statement Mappings, $\mu=(\mu_1, \ldots, \mu_m)$ As defined in the Glossary, the finite set consisting of all distinct Skill Scores in a particular Skill k that have been obtained by at least one Student is denoted $O_k$ and called the set of "Obtained Skill Scores" for Skill k. Thus, given any Student's Skill Score Vector s, its k component $s_k$ must be drawn from the set $O_k$. The set of all Skill Score Vectors that may be assembled by drawing $k^{th}$ components from $O_k$ is therefore called the "Logical Space of Skill Score Vectors," defined in the Glossary and denoted U. With these terms fixed, a Score-Statement Mapping $\mu: S \rightarrow E(R)$ is said to be Factorizable when it "treats Skills independently," i.e., when there exist m Skill-specific mappings $$\mu_k: O_k \rightarrow R$$

such that the action $\mu(s)=e$ decomposes as $$\mu((s_1, s_2, \ldots s_m)) = (\mu_1(s_1), \mu_2(s_2), \ldots, \mu_m(s_m))$$

for every $s \in U$. Intuitively, a Factorizable Score-Statement Mapping is one that considers each Skill independently; whereas a non-Factorizable Score-Statement Mapping is one that "takes the entire Skill Score Vector into account."

When the mappings $\mu_k$ exist, it will be said that "$\mu$ Factorizes." An economical notation for a Factorizable Score-Statement Mapping is $\mu=(\mu_1, \ldots, \mu_m)$.

Some embodiments of Skill Score Mappings are as follows.

Embodiments

Automated Skill-Specific Criterion Referencing

Many Tests are Criterion-referenced, meaning that Students' performance is implicitly compared against performance standards in that Subject as established by pedagogical experts in that Subject. Students who take a Criterion-referenced Test are typically assigned an Evaluation Statement based on their Test Results, which statement reflects experts' interpretation of those particular results. For example, Students who perform poorly on a particular Criterion-referenced 4th grade math test may be deemed as "Not Meeting Standards", while those who perform well may be deemed as "Exceeding Standards." These standards are typically absolute standards, although they could also be based on a relative comparison to a standard group, e.g. "All Students nation-wide taking this Test."

However, Criterion-referenced tests typically are not designed to generate criterion-based evaluations about a Student's performance in a given Skill. For example, a Student who takes a 4th grade math test generally is not evaluated against particular criteria in the various Skills tested. This occurs because test developers usually do not ask pedagogical experts to establish criteria with respect to particular Student response vectors on the Items related to a given Skill. Instead, such experts usually establish criteria only with respect to Students' overall scores on the Test. (For example, in the K-12 environment, criterion-referencing is usually used only to measure student overall performance on high-stakes, end-of-year tests.)

This situation is unfortunate for several reasons. First of all, Users often want to understand a Student's performance on a Skill with respect to the same criteria of mastery that is applied to Students' overall scores on the Test. More fundamentally, although a given Student may perform poorly overall on a Test, that Student may still have high ability in one or more Skills. One of the most important goals of diagnostic Test reporting is to uncover these hidden strengths. As long as Criterion Referencing only applies to the Student's overall Score, this is impossible.

It is conceivable, of course, that pedagogical experts could perform Skill-specific Criterion-referencing in each Skill on a Test. However, this process is extremely time-consuming and is rarely carried out.

What is needed, therefore, is an efficient computer algorithm that leverages (1) the existing criterion-referencing of Students' overall scores, and (2) empirical data about the relationship between Students' overall scores and their scores within a Skill, in order to produce an approximate criterion-referencing for performance within each of the Skills assessed by the Test.

One helpful way to approach this problem is through the notion of probability. Probabilities are a useful way to deal with situations in which we have limited information. In the present situation, we are trying to determine, roughly speaking, whether or not a Student has high ability in a given Skill. We don't have much information to work with; just the Student's Score in the Skill, which often arises from the Student's responses to just a few Test Items. In a situation of uncertainty like this, it is helpful to use probability to make a good decision. What is the probability that the Student has high ability in the Skill? Can we use what knowledge we have about the Student's Score in order to estimate this probability and make the most accurate determination possible under the circumstances?

A particular algorithm based on this approach is defined in this embodiment. The algorithm consists of an explicit Score-Statement Mapping (Factorizable in this embodiment), in which the Evaluation Statements that evaluate Students' performance by Skill inherit their meaning from the expert Criterion-referencing that had been used to evaluate students' overall performance. This example of Automated Skill-Specific Criterion Referencing is called the Criterion Mapping.

Construction of the Criterion Mapping $\mu^*$

The following description specifies precisely how to construct mathematically the sought-after Criterion Mapping $\mu^*$. To be useful in large-scale applications, this specification should be implemented on a computer by one skilled in the art of programming mathematical algorithms.

It is a feature of this Embodiment that the Criterion Mapping $\mu^*$ is Factorizable. One may therefore select a fixed but arbitrary Skill—denoted Skill K—and construct explicitly a mapping $\mu^*_K: O_K \to R$. The Criterion Mapping will then be completely specified in terms of its Skill-by-Skill components as $\mu^* = (\mu^*_1, \ldots, \mu^*_m)$.

For the sake of brevity, $\mu^* K$ is referred to as a Criterion Mapping, although, strictly speaking, it is a component of the Criterion Mapping $\mu^*$.

Figure 12:
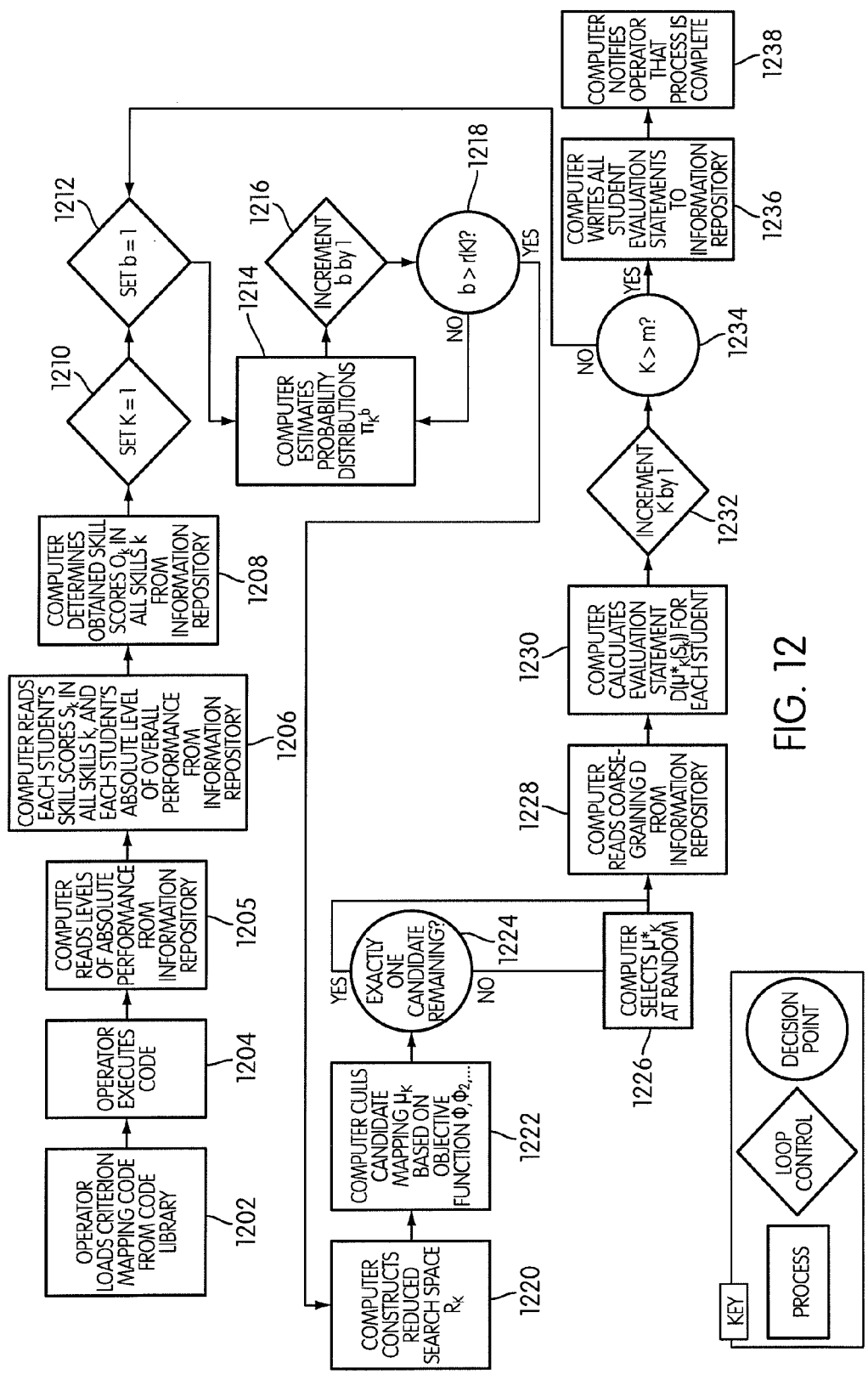
FIG. 12 is a flowchart illustrating the Criterion Mapping execution, described in the Student Skill Performance Evaluator component of the system.

FIG. 12 is a flowchart illustrating the major steps in one possible Criterion Mapping routine.

In step 1202, the Student Skill Performance Evaluator Operator loads code for implementing the Criterion Mapping from the Code Library, and in step 1204 he/she executes this code. The computer then performs the following steps.

In step 1205, the computer reads from the Information Repository 114 the list of Absolute Levels of Overall Performance; these are part of the Data Requirements for Results Reports. The meaning of these Absolute Levels of Overall Performance is as follows.

As discussed above, the Test under consideration in this embodiment has been Criterion-referenced. That is to say, certain ranges of overall scores have been defined by human experts, which ranges are regarded by persons under the umbrella of the testing system as indicating ascending absolute levels of overall performance. As an example, such a Criterion-referencing can be compactly expressed as follows:

| Scale Score Range | Absolute Level of Overall Performance |
|---|---|
| 350-500 | Far Below Standards |
| 501-600 | Below Standards |
| 601-720 | Meeting Standards |
| 721-800 | Far Above Standards |

As per this table, each Student has had assigned to him or her an Absolute Level of Overall Performance, based on his or her overall score. In this example, there are four Absolute Levels of Overall Performance, $\Lambda_1, \ldots, \Lambda_4$:

$\Lambda_1$ Far Below Standards $\Lambda_2$ Below Standards $\Lambda_3$ Meeting Standards $\Lambda_4$ Far Above Standards.

In general, there will be M Absolute Levels of Overall Performance, $\Lambda_1, \ldots, \Lambda^M$, which can be taken without loss of generality to be arranged in ascending order of performance. For brevity, a Student with Absolute Level of Overall Performance $\Lambda_a$ is referred to as a "Level-a Student."

The Range R for the sought-after Criterion Map $\mu_K^*$: $O_K \to R$ is that same collection of verbal statements provided by the criterion referencing of the Test as a whole. Abbreviating these verbal statements as $\Lambda_1, \Lambda_2, \ldots, \Lambda_M$, the Range R for the Criterion Map $\mu_K^*$ is thus $R = \{\Lambda_1, \Lambda_2, \ldots, \Lambda_M\}$. The absolute levels of performance $\Lambda_1, \Lambda_2, \ldots, \Lambda_M$ in R are called Skill-Specific Absolute Levels of Performance.

In sum, the Criterion Map $\mu_K^*$ ascribes an absolute level of performance to a Student's numerical performance in a Skill, extending, by statistical inference, the same vocabulary that expresses absolute levels of performance for the Test as a whole: namely, the criterion-referenced Absolute Levels of Overall Performance, $\Lambda_1, \Lambda_2, \ldots, \Lambda_M$.

In step 1206, the computer reads from the Information Repository 114 each Student's Skill Score $s_k$ in each Skill k, as well as each Student's Absolute Level of Overall Performance.

In step 1208 the computer determines from the data read in step 1206 those Skill Scores $o_k^b$ in each Skill k that were obtained by Students taking the Test. In this way, the computer constructs the sets of Obtained Skill Scores $O_k = \{o_k^1, o_k^{r(k)}\}$. Here, r(k) is the number of distinct Skill Scores obtained by Students in Skill k.

As an example that will be considered for the sake of concreteness from time to time throughout the embodiment, consider a hypothetical multiple-choice test in elementary-school mathematics, with seven Skills in the Skill Set $S_T = \{S_1, \ldots, S_7\}$. Suppose that five of the Items on this Test Assess Skill $S_7$, which happens to be the Skill of "Addition." Suppose, further, that none of these five Items are 'split' (meaning that none of the five Items Assess any other Skill besides Addition.) Then, if the Skill Scores in question represent Generalized Percent Correct values, $O_7$ will be given by $O_7 = \{0.00, 0.20, 0.40, 0.60, 0.80, 1.00\}$, provided (as is usually the case for a typical Test and a for large enough group of Students) that there is at least one Student among the Test-takers who got one out of the five Addition Items correct, at least one Student among the Test-takers who got two out of the five Addition Items correct, and so on.

Returning to the computer's execution, in step 1210 the computer enters a loop controlled by the index K, initializing the value of K at 1. The index K is a Skill index, ranging from 1 to m. The computer has thus begun looping through the Skills in order.

In step 1212 the computer enters a loop controlled by the index b, initializing the value of b at 1. The index b is an obtained-score index, ranging from 1 to r(K). The computer has thus begun looping through the Obtained Skill Scores $O_K$, $o_K^b$, in Skill K.

At this point, the algorithm can bring the methods of probability to bear. Specifically, we would like next to answer the following question: What is the probability that a given Student has a certain level of ability in a given Skill?

Of course, all we know about the Student is his or her Skill Score in the Skill. Thus, the algorithm will focus on the question in this form: What are the chances that a given Student has a certain level of ability in a given Skill, given that he or she attained a certain Score in the Skill? Very high Scores will cause us to raise our estimate of the chances that the Student has high ability in the Skill. Very low Scores will cause us to lower our estimate of the chances that the Student has high ability in the Skill. The algorithm provides a rational method for making this intuition precise.

In step 1214 the computer estimates a certain probability distribution, denoted $\pi_K^b$. This calculation proceeds as follows:

1. For each value of $a = 1, \ldots, M$, count the number $p_a$ of Level-a Students.
2. For each value of $a = 1, \ldots, M$ and each value of $b = 1, \ldots, r(k)$, count the number $g_{Kab}$ of Level-a Students with Skill Score $s_K = o_K^b$.
3. For each value of $a = 1, \ldots, M$ and each value of $b = 1, \ldots, r(k)$, calculate the fraction $f_{Kab} = g_{Kab} / p_a$ of Level-a Students with Skill Score $s_K = o_K^b$.

4. For each value of $b = 1, \ldots, r(k)$, use the M fractions $f_{K1b}, f_{K2b}, \ldots, f_{KMb}$ to estimate the probability distribution $\Pi_K^b = \{\pi_K(1|b), \pi_K(2|b), \ldots, \pi_K(M|b)\}$ over the space of Absolute Levels of Overall Performance $\{\Lambda_1, \ldots, \Lambda_M\}$.

Here, $\pi_K(a|b)$ represents the probability that the Absolute Level of Overall Performance $\Lambda_a$, among all the $\Lambda_M$, best describes a Student's true level of mastery of Skill K, given that the Student has earned a Skill Score $o_K^b$ in the Skill. As discussed above, the Student's Score in the Skill has a strong effect on our assessment of the probability that the Student has this or that level of ability. This is why the probability $\pi_K(a|b)$ depends on the index b: it is this index that specifies the Student's Skill Score, $o_K^b$. Of course, the probability $\pi_K(a|b)$ also depends on the index a: it is this index that specifies the particular level of mastery $\pi_a$ we are considering attributing to the Student.

Returning to the hypothetical five-Item Test to illustrate $\pi_K(a|b)$ by example, suppose that the overall criterion referencing for this Test recognizes four Absolute Levels of Overall Performance:

$\Lambda_1$ Far Below Standards
$\Lambda_2$ Below Standards
$\Lambda_3$ Meeting Standards
$\Lambda_4$ Far Above Standards.

In this case, recalling that there are six Obtained Skill Scores in the Skill $S_7 =$ "Addition," namely the Generalized Percent Correct Values $O_7 = \{0.00, 0.20, 0.40, 0.60, 0.80, 1.00\}$, the quantity $\pi_7(1|6)$ represents the probability that the statement "Far Below Standards" best describes a Student's absolute level of performance in Addition, given that the Student has earned a Skill Score of 1.00 in Addition. (This probability is reasonably expected to be low.)

The discrete probability distribution $\Pi_K^b = \{\pi_K(1|b), \ldots, \pi_K(2|b), \ldots, \pi_K(M|b)\}$ can be estimated from the M fractions $f_{K1b}, f_{K2b}, \ldots, f_{KMb}$ in many different ways, according as the Operator applies the skills of his art in writing the code that effects the Criterion Mapping. However, in any event, the transformation used should have the following properties:

i. $\pi_K(a|b)$ is an increasing function Of $f_{Kab}$; and
ii. $\pi_K(a|b)$ is a decreasing function of $f_{Kxb}$ for $x \neq a$.

The reason for constraint (i) can be better understood by returning to the hypothetical example. All other things being equal, if 75% of those Students who are "Below Standards" overall earned a Skill Score of 0.40 in Addition, then one is more convinced that earning a score of 0.40 in Addition is a performance deserving of the label "Below Standards" than if it were the case that only 20% of those Students who are "Below Standards" earned a Skill Score in Addition of 0.40.

On the other hand, even if 75% of those Students who are "Below Standards" overall did earn a Skill Score of 0.40 in Addition, one can also say that if 95% of those Students who are "Far Below Standards" earned a Skill Score of 0.40 in Addition, then one is more convinced that earning a score of 0.40 in Addition is a performance deserving of the label "Far Below Standards"—and hence less convinced that earning a score of 0.40 in Addition is a performance deserving of the label "Below Standards"—than if it were the case that only 60% of those Students who are "Far Below Standards" earned a Skill Score in Addition of 0.40. This is the motivation for constraint (ii).

If desired, one can adopt a very simple rule for generating the probabilities $\square_K$ from the fractions f:

$\pi_K^0(a|b) = f_{Kab} / (f_{K1b} + f_{K2b} + \propto + f_{KMb})$, where the superscript 0 indicates that this is an estimate. It is easy to see that this rule satisfies constraints (i) and (ii). (To economize on notation, the superscript 0 will henceforth be suppressed.)

Once the probability distribution $\Pi_K^b$ has been estimated, the computer in step 1216 increments the loop index b by unity and checks in Decision 1218 whether the new value of b is greater than r(K), which would signal the completion of the Obtained Skill Score loop.

If the new value of b is less than or equal to r(K), then the computer returns to step 1214 to begin the probability distribution $\Pi_K^b$ estimation cycle once again.

Once the computer has cycled through all the possible values of b, the computer will have determined, for each Skill Score, the probability that a Student with that Skill Score has an ability in that Skill best described by a certain Level. Thus, if the Student has a Skill Score in Addition of 0.20, we may assess the chances as follows:

| Addition Score: 0.20 | "Far Below Standards" | "Below Standards" | "Meeting Standards" | "Far Above Standards" |
|---|---|---|---|---|
| Chances that the Student's level of mastery in Addition are best described by the statement . . . | 70% | 20% | 8% | 2% |

In this example, if the Student earns a Score of only 0.20, then the chances are low (2%) that the Student's level of mastery in Addition is best described as "Far Above Standards."

But the situation may look very different for a Student who earns a score of 0.80 in Addition:

| Addition Score: 0.80 | "Far Below Standards" | "Below Standards" | "Meeting Standards" | "Far Above Standards" |
|---|---|---|---|---|
| Chances that the Student's level of mastery in Addition are best described by the statement . . . | 10% | 25% | 25% | 40% |

Suppose, then, that in this example we are faced with a Student who has earned an Addition Score of 0.80. What Skill-Specific Absolute Level of Performance should we assign to this Student?

The table above shows that the chances are greatest that the Student's level of mastery is best described by the statement "Far Above Standards."

Thus, once the relevant probability distributions have been calculated, one option for assigning the Skill-Specific Absolute Levels of Performance is to (a) focus on a particular Student; (b) look at the Student's Score in the Skill in question; (c) look at the probabilities for the different Level options, given the Student's Score; and (d) choose the Level with the highest probability, i.e. the greatest likelihood.

This embodiment of the Criterion Mapping is a useful option.

Another option is also useful, particularly when the Student Score data in question are extremely "noisy," as may happen for any number of reasons: few Students taking the Test, very few Items requiring a given Skill, a great deal of "Item splitting," and so on. In the case of noisy data, it can be very hard to obtain good estimates of the above probabilities. And when the accuracy of the probability estimates is compromised, it may not be appropriate to base Students' Level assignments on a simple examination of these probabilities.

Even in such a situation, however, the algorithm can proceed, as described in the remaining steps laid out in FIG. 12. In this embodiment, one first narrows the field of possibilities by imposing reasonableness constraints, and only then does one return to the use of probability to make the best possible choice.

If the new value of b is greater than r(K), then in step 1220 the computer constructs the Reduced Search Space, K. This is accomplished as follows.

1. To begin with, the Universal Search Space, $_K$, consists of all possible mappings $\mu K$ from the set $O_K = \{o_K^1, \ldots, o_K^{r(K)}\}$ to the set $R = \{\Lambda_1, \Lambda_2, \ldots, \Lambda_M\}$. The mappings $\mu_K$ in $_K$ are called "Candidate Mappings." The Criterion Mapping $\mu_K^*$ is necessarily contained in the Universal Search Space $_K$.

2. The Criterion Mapping $\mu_K^*$ will be selected by defining one or several objective functions that assign "ratings" to Candidate Mappings. The Criterion Mapping will be selected by examining these ratings for a wide array of Candidate Mappings.

3. Note, however, that the number of mappings in $_K$ is given by $M^{r(K)}$, which is on the order of $\log_{10} M^{r(K)} \sim 5$-$12$ in practice. Values on the larger end of this range make exhaustive searching impracticable in most applications. Where possible, exhaustive searching of $_K$ can of course be employed, in the same manner used below to search the Reduced Search Space $_K$. Where this is not possible, those skilled in the art of combinatorial optimization can apply many techniques in order to find efficiently a Candidate Mapping $\mu_K^+ \in _K$ with a high rating. The Candidate Mapping $\mu_K^+$ can then be designated as the sought-after Criterion Mapping $\mu_K^*$. Alternatively, as mentioned above, the Universal Search Space can be reduced, as described next.

4. The following reasonableness constraints for Candidate Mappings drastically reduce the region of Universal Search Space $_K$ that must be examined.
   i. If $o_K^x > o_K^y$, then $\mu_K(o_K^x)$ represents a higher level of performance than $\mu_K(o_K^y)$.
   That is, if $o_K^x > o_K^y$, then we must have $\mu_K(o_K^x) = \Lambda_r$ and $\mu_K(o_K^y) = \Lambda_s$ with $r > s$. In other words, $\mu_K$ must be order-preserving.
   ii. $\mu_K(\min(O_K)) = \Lambda_1$ and $\mu_K(\max(O_K)) = \Lambda_M$.
   That is, $\mu_K$ maps endpoints to endpoints.

It may be advantageous that a Criterion Mapping should obey these constraints. After all, condition (i) simply says that higher Skill Scores should never lead to lower estimates of ability. And condition (ii) is almost tautological: the first condition says that when a Student's Skill is Score is the lowest Score possible, then the best estimate of the Student's ability in the Skill, based only on that Score, is given by the lowest ability rating available.

And the second condition says that when a Student's Skill is Score is the highest Score possible, then the best estimate of the Student's ability in the Skill, based only on that Score, is given by the highest ability rating available.

This is not to say that the constraints are without effect. Apart from reducing the size of the Search Space, these constraints will also sometimes result in a Student receiving a Level assignment that is not the most probable assignment. Thus, as discussed above, imposing these constraints is the most appropriate option when the probability estimates themselves are highly uncertain.

On the other hand, the probabilities obviously cannot be ignored. Having opted first of all to require that the Level assignments satisfy the conditions (i) and (ii), the remaining steps of the algorithm fold the probabilities back into the calculation, so that the final Level assignments can be chosen in a way that minimizes the expected number of inaccurate assignments made during the process.

5. The Reduced Search Space $_K \subset _K$ consists of all mappings $\mu_K$ satisfying the constraints above. The number of Candidate Mappings $\mu_K$ in $_K$ is (r(K)+M−3)!/((M−1)!(r(K)−2)!)

a number typically on the order of $\log_{10}(|_K|) \sim 2$ or 3 in applications, which means that global optimization by the method of exhaustive searching is practical. Here the exclamation point represents the factorial function, $N! \equiv N(N-1)(N-2) \propto (3)(2)(1)$.

6. One skilled in the art of programming can cause the computer to construct the space $_K$ by simply generating a list of all many-to-one correspondences between $O_K$ and R satisfying constraints (i) and (ii).

In step 1222, the computer culls the list of Candidate Mappings in $_K$ by means of a series of one or more Objective Functions. In the present embodiment this is accomplished as follows.

1. Note that arbitrary mapping $\mu_K$ chosen at random from $_K$ will ascribe Skill-Specific Absolute Levels of Performance to the Skill Scores $o_K^b \in O_K$ without any regard for the actual probability $\pi_K(a|b)$ that a Student who scored $s_K = o_K^b$ in Skill k actually has level of mastery in the Skill that is best described, among all the Evaluation Statements in R, by $\mu_K(o_K^b)$. In short, most Candidate Mappings $\pi_K$ will commit many errors.

2. Thus, given a Candidate Mapping $\mu_K$, an "Error of Type (a, x)" is an erroneous assignment committed by the mapping in which a Student, whose level of mastery in the Skill is actually best described by the Evaluation Statement $\Lambda_a$, is nevertheless assigned the Evaluation Statement $\Lambda_{x \neq a}$ by the Candidate Mapping $\mu_K$ based on his or her Skill Score.

3. Note that any given Candidate Mapping $\mu_K$ will commit a certain number of Errors of Type (a, x). The expected number of such errors is denoted $E(\mu_K; a, x)$, and can be calculated by the computer based on the probability distributions $\Pi_K^1, \ldots, \Pi_K^{r(K)}$ as follows:

3.A. First calculate the total number of Students $p_K^b$ obtaining Skill Score $o_K^b$ in Skill K. (Note that $p_K^b = g_{Kab} + \propto + g_{KMb}$.)

3.B. Then, in terms of quantities already defined, $E(\mu_K; a, x)$ is given by $E(\mu_K;a,x) = \Sigma[\delta(\mu_K(o_K^b), \Lambda_x) p_K^b \pi_K(a|b) : b = 1, \ldots, r(K)]$.

Here, $\delta$ is the discrete delta function, i.e. $\delta(p, q) \equiv 1$ if p=q, and $\delta(p, q) \equiv 0$ if p≠q.

4. To construct the Objective Function $\phi$, the Operator must have specified the kinds of errors he/she would most like to avoid. For instance, in the hypothetical example $\Lambda_1$ Far Below Standards
$\Lambda_2$ Below Standards
$\Lambda_3$ Meeting Standards
$\Lambda_4$ Far Above Standards the intended meaning attached to the Absolute Levels of Overall Performance is bifurcated, so that, broadly speaking, Levels 1 and 2 represent failure, whereas Levels 3 and 4 represent success. In such a case, one might wish, in assigning the Skill-Specific Absolute Levels of Performance, to minimize the number of errors in which a Student who should have been assigned either $\Lambda_1$ or $\Lambda_2$ is actually assigned either $\Lambda_3$ or $\Lambda_4$; or conversely. One might call errors of these kinds Crossing Errors, because in these cases, a Student's erroneous Skill-Specific Absolute Level of Performance causes him or her to cross the boundary between passing and failing, or conversely. Preferences such as this can also be part of the Data Requirements for Results Reports as well.

Alternatively, the Operator might choose (or the Data Requirements for Results Reports might stipulate) to minimize the total number of erroneous assignments without regard for the detailed type; or the number of erroneous assignments of the type (a, x) where x differs from a by two or three, etc. All of these choices can be implemented in the series of Objective Functions as described below.

5. Define an objective function $\phi: _K \rightarrow V$ to be −1 times the expected number of errors, of the kind specified in (4) as being most important, that are committed by a Candidate Mapping $\mu_K$ in $_K$. Thus, for example, if in (4) Crossing Errors are identified as most important, one would put $\varphi = -(E(1, 3) + E(1, 4) + E(2, 3) +$ $E(2, 4) + E(3, 1) + E(3, 2) + E(4, 1) + E(4, 2))$.

Or, as another example, if in (4) the total number of errors, without prejudice as to the Type, are identified as most important, then one would put $\varphi = -(E(1, 2) + E(1, 3) + E(1, 4) + E(2, 1) + E(2, 3) + E(2, 4) +$ $E(3, 1) + E(3, 2) + E(3, 4) + E(4, 1) + E(4, 2) + E(4, 3))$.

In this embodiment, the Operator may also hard-code into the computer program a tunable parameter $\alpha_1$ defined below that allows the global optimization to relaxed, if desired, so that additional criteria (different kinds of errors, or considerations in addition to error) can play a role.

6. The computer calculates $\phi(\mu_K)$ for each $\mu_K \in _K$.

7. The computer discards all $\mu_K \in _K$ except those that are within $\alpha_1$ standard deviations of $\phi_{max} \equiv \max\{\phi(\mu_K): \mu_K \in _K\}$.

Here, $\alpha_1 > 0$ is a pre-specified parameter; some experimentation on the part of the Operator who writes the code for the Criterion Mapping is helpful in determining values of $\alpha_1$ that yield $\mu_K$ with acceptable error rates while presenting following steps of the construction with a fair diversity of options. (Suitable values of $\log_{10}\alpha_1$ usually fall in the range $\sim -1$ to $\sim -0$, although one can of course set $\alpha_1 = 0$ to allow the objective $\phi$ to completely determine the solution. One skilled in the art can also implement a subroutine to calculate a value of $\alpha_1$ that satisfies various statistical criteria.)

8. The set of $\mu K$ remaining after (7) is the Second Reduced Search Space $_K^2$. If desired, a secondary objective function $\phi_2: _K^2 \rightarrow V$, based on criteria other than the expected number of errors, can now be defined. A beneficial such function is the entropy, $\phi_2 = -\Sigma[z_a \ln(z_a) : a=1, \ldots, M]$ where $z_a \equiv |\mu_K^{-1}(\Lambda_a)|p$ is the percentage of Students Tested who are assigned $\Lambda_a$ by the Candidate Mapping $\mu_K$.

The purpose of using the entropy $\phi_2$ as a secondary objective function is to introduce a bias in favor of Candidate Mappings that 'spread out' the Students to a greater extent. As a hypothetical example, suppose that two Candidate Mappings $\mu_K'$ and $\mu_K''$ in $_K^2$ have very similar error rates, and are given as in the following table:

| Obtained Skill Score $o_K^b$ | Skill-Specific Absolute Level of Performance $\mu_K'(o_K^b)$ | Skill-Specific Absolute Level of Performance $\mu_K''(o_K^b)$ | Number of Students $p_K^b$ |
|---|---|---|---|
| 0.00 | $\Lambda_1$ | $\Lambda_1$ | 1000 |
| 0.20 | $\Lambda_1$ | $\Lambda_2$ | 2000 |
| 0.40 | $\Lambda_2$ | $\Lambda_2$ | 5000 |
| 0.60 | $\Lambda_3$ | $\Lambda_3$ | 10000 |
| 0.80 | $\Lambda_4$ | $\Lambda_3$ | 5000 |
| 1.00 | $\Lambda_4$ | $\Lambda_4$ | 200 |

Then the profile of the Student population within Skill K is as follows:

| | $\mu_K'$ | $\mu_K''$ |
|---|---|---|
| Number of Students assigned $\Lambda_1$ | 3000 | 1000 |
| Number of Students assigned $\Lambda_2$ | 5000 | 7000 |
| Number of Students assigned $\Lambda_3$ | 10000 | 15000 |
| Number of Students assigned $\Lambda_4$ | 5200 | 200 |
| | $\phi_2(\mu_K') \approx 1.29$ | $\phi_2(\mu_K'') \approx 0.82$ |

In this situation $\mu_K'$ may be chosen over $\mu_K''$, because without compromising accuracy, it offers Users a richer diagnosis (i.e., there is less 'clumping' of Students in the middle Levels $\Lambda_2$ and $\Lambda_3$). This is reflected in the entropy values, $\phi_2(\mu_K') > \phi_2(\mu_K'')$.

9. The computer repeats (6)-(8), this time with the Second Reduced Search Space $_K^2$ and the second objective function $\phi_2$.

The process may be continued as many times as desired, with successive objective functions $\phi_3, \phi_4, \ldots$ and successively Reduced Search Spaces $_K^3, _K^4, \ldots$, until either (i) only one candidate mapping is left; or (ii) all of the objective functions have been applied.

Once all the objective functions have been applied, the computer checks in Decision 1224 whether there is exactly one Candidate Mapping remaining, in which case this is the sought-after Criterion Mapping, or whether there are many Candidate Mappings remaining. If there are many Candidate Mappings remaining after the objective functions have been applied, then these Candidate Mappings are all equally suitable by definition, so in step 1226 the computer selects one of them at random.

In step 1226 the computer reads from the Information Repository 114 a "Coarse Graining." This Coarse Graining is part of the Data Requirements for Results Reports, and specifies (a) the number and wording of the Skill-Specific Evaluation Statements that will ultimately be shown in Displays, which may differ from the number M and the wording of the Skill-Specific Absolute Levels of Performance $\Lambda_1, \ldots, \Lambda_M$; and (b) the rule for translating the Skill-Specific Absolute Levels of Performance $\Lambda_1, \ldots, \Lambda_M$ generated in the previous steps of the algorithm.

The translation rule allows the computer to 'bin' the Students into a smaller number of levels than the $\Lambda_1, \ldots, \Lambda_M$ levels resulting from the previous steps of the algorithm. This is often advantageous, especially when M is greater than three, because a smaller number of final Evaluation Statements allows for both improved accuracy (because the diagnostic ranges are wider) and also improved usability (because it is pointless to offer practitioners more options for action than they can realistically resolve in their practice).

The computer reads the protocol for Coarse Graining from the Data Requirements for Results Reports in the form of an order-preserving mapping D: R→R' onto a Range of Evaluation Statements R' with strictly fewer Evaluation Statements than R (i.e., |R'|<|R|). For example, if there are more than three Absolute Levels of Overall Performance, such as, $\Lambda_1$ Far Below Standards
$\Lambda_2$ Below Standards
$\Lambda_3$ Meeting Standards
$\Lambda_4$ Far Above Standards, then the Criterion Mapping found in the previous steps of the algorithm, $\mu_K^*: O_K \rightarrow \{$'Far Below Standards', ..., 'Far Above Standards'$\}$, can be Coarse-Grained with a Coarse Graining D given by D('Far Below Standards')='Likely to Need Help with Fundamentals'

D('Below Standards')='Likely to Require Additional Instruction and Practice'

D('Meeting Standards')='Likely to Require Additional Instruction and Practice'

D('Far Above Standards')='Likely to Be Ready for Advanced Work'.

Now the Coarse-Grained Criterion Mapping $D \cdot \mu_K^*$ assigns each Student one of three Skill-Specific Absolute Levels of Performance in Skill K:

$\mu_K^*: O_K \rightarrow \{$'Likely to Need Help with Fundamentals', 'Likely to Require Additional Instruction and Practice', 'Likely to Be Ready for Advanced Work'$\}$.

Using this rule, the computer in step 1230 calculates an Evaluation Statement $D(\mu_K^*(s_K))$ for each Student in Skill K, based on his or her score $s_K$ in that Skill.

In step 1232 the loop control index K is incremented by unity, and in Decision 1234 the computer checks to see whether the new value of K is greater than the overall number of Skills, m. If not, then the computer returns to step 1212 to resume the algorithm with another Skill.

If in Decision 1234 the value of K is greater than m, then the computer in step 1236 writes all Students' Evaluation Statements in all Skills to the Information Repository 114 and notifies the Operator in step 1238 that processing is complete.

Some Important Features of μ* in this Embodiment

1. A given Student's Skill-Specific Absolute Levels of Performance, as generated by the Criterion Mapping μ*, derive their meaning via statistical inference from the same Absolute Levels of Overall Performance that are assigned to the body of Students as a whole. Thus, the Criterion Mapping μ* allows Users to understand a Student's performance on a Skill with respect to the same criteria of mastery that are applied to Students' overall scores on the Test.

2. Evaluating μ* for a given student is an efficient computational process. Even when the Criterion Mapping μ* is constructed by means of a computer program written in a relatively slow, high-level programming language, such as Mathematica; and even when this code is executed on a modest computer (IBM Thinkpad 600X, a laptop with a 500 MHz Pentium III processor); and even when the data set to be analyzed is quite large (p~100,000 Students, m~15 Skills, and r(k)~10 Obtained Skill Scores, on average, across Skills); the construction of the map still takes only a matter of minutes. Furthermore, the mapping $\mu_K$ itself need only be constructed once, at the outset of processing—and, once constructed, it can be cast as a simple lookup table with ~15 entries, as in the examples $\mu_K'$ and $\mu_K''$ above. Assigning Evaluation Statements to the Students via the Criterion Mapping then merely amounts to doing a lookup for each Student; hence, the processing time per student is negligible.

3. The combination of the primary objective function $\phi$ defined in terms of error rates, and the secondary objective function $\phi_2$ defined in terms of entropy, allows the Criterion Mapping to provide diagnostic richness without appreciably affecting accuracy.

4. Coarse Graining allows the Criterion Mapping to be at once more accurate and more usable.

Embodiment

Prioritizing Skills Based on Growth Opportunities

Users of Test Results often want to understand how a Student (or Group) can improve its mastery of Skills. Unfortunately, there does not exist in the prior art a method of prioritizing Skills within a diagnostic report so that the Users' attention is drawn first to those Skills in which rapid growth may be possible. The present invention remedies this problem.

On the other hand, recommending that Users focus on one Skill over another is a sensitive undertaking, because Users must be confident that they are not being asked to pass over important Skills without good cause. Users may be much more receptive to Skill prioritization, and may therefore be more likely to act on the recommendations in the Test Report, when the method used to prioritize the Skills is relatively straightforward, so that Users may easily understand the method and feel confident about its application. The routine specified below allows this requirement to be satisfied.

Of course, as a practical matter, it is also important that any such prioritization method be not computationally intensive, so that it can be implemented relatively quickly over large numbers of Tests, each taken by large number of Students. For example, the time for implementing such a method should not scale exponentially with the number of Items on the Test. The routine specified below allows this requirement to be satisfied also.

The routine specified below is one method for specifying priorities for individual Students based on opportunities for growth, called the "Room to Grow™ Method." The analogous process for identifying priorities for Groups based on the Room to Grow™ Method is described during the discussion of the Aggregation Analyzer 136.

Construction of the Room to Grow™ Mapping $\mu_{RTG}$

The Room to Grow™ Mapping $\mu_{RTG}$ is a understandable way to identify effectively those Skills in which a particular Student performed relatively poorly, but in which most Students who took the Test performed relatively well. Such "surprising" Skills often present unique opportunities for rapid progress, and therefore this information may be helpful for Users, such as for an Educator who is deciding which Skill to focus on with a Student.

The description below will specify one way in which to construct (mathematically) the Room to Grow™ Mapping $\mu_{RTG}$ To be useful in large-scale applications, this specification could be implemented on a computer by one skilled in the art of programming mathematical algorithms.

The Room to Grow™ Mapping $\mu_{RTG}$ as constructed here will be a Score-Statement Mapping, that is, it will convert vectors of Skill Score values into vectors of Evaluation Statements. The Skill Scores may represent Generalized Percent Correct values, estimated probabilities of mastery, etc. Meanwhile, the Evaluation Statements in question are R={'Room to Grow™ Skill', 'Not a Room to Grow™ Skill'} or statements with essentially equivalent meaning, which have been read by the Student Skill Performance Evaluator 134 in step 1102. When Results are Displayed, those Skills that are deemed "Room to Grow™ Skills" are highlighted, e.g. with graphical elements or by collecting them together in a separate list.

Figure 12A:
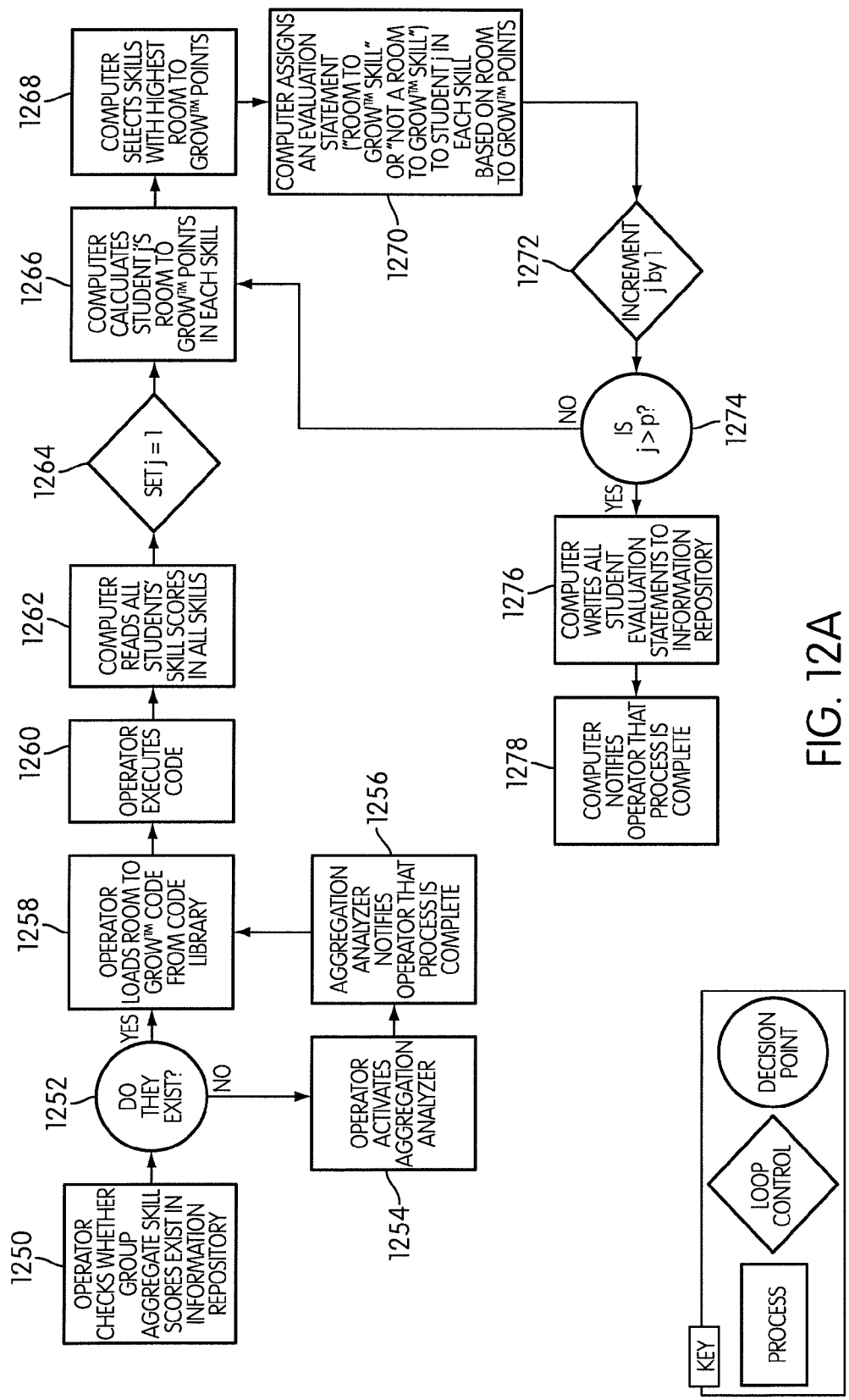
FIG. 12a is a flowchart illustrating the Room to Grow™ prioritization, described in the Student Skill Performance Evaluator component of the system.

FIG. 12a is a flowchart illustrating the major steps in one possible Room to Grow™ prioritization routine.

In step 1250, the Student Skill Performance Evaluator Operator checks the Information Repository 114 to determine whether or not it contains the aggregate Skill Scores for Groups required to run the particular Room to Grow™ prioritization being implemented. If in Decision 1252 aggregate Skill Scores for Groups do not exist in the Information Repository 114, then in step 1254 the Student Skill Performance Evaluator Operator activates the Aggregation Analyzer 136, either by serving as its Operator or by notifying its Operator. In steps 1302, 1304, 1306, 1308, 1310, 1312, 1314, 1315, 1316, 1317, and 1318, the Aggregation Analyzer 136 generates the required Group aggregate Skill Scores, writes them to the Information Repository 114, and notifies the Operator that processing is complete. In step 1258, the Student Skill Performance Evaluator Operator then proceeds to load the Room to Grow™ code from the Code Library (which, if necessary, had been written by the Student Skill Performance Evaluator 134 in step 1110).

In step 1260 the Student Skill Performance Evaluator Operator executes the code. The computer then performs the following routine.

In step 1264 the computer enters a loop controlled by the index j, initializing the value of j at 1. The index b is a Student index, ranging from 1 to the number of Students p. The computer has thus begun looping through the Students.

In step 1266 the computer calculates the current Student's "Room to Grow™ points" in each Skill, using a "Room to Grow™ function." This function estimates the growth potential for a given Skill. The Room to Grow™ function can be constructed in numerous ways, one of which is decided upon by the Operator in step 1104.

A. In the first family of methods, the Room to Grow™ function estimates growth potential by taking into account (1) how well the Student scored in the Skill; and (2) how well a comparison group scored in the Skill. Intuitively speaking, Skills in which the Student scored poorly, but in which the comparison group scored well, represent "gaps" that the Student can be expected to address easily.

To be precise, the Room to Grow™ function $\rho(x,y)$ in this case is a function that takes two real arguments, both in the continuous range [0,1]. The first argument is interpreted as the Student's Skill Score, normalized if necessary so that it ranges from 0 to 1. The second argument is interpreted as a 'benchmark' Skill Score in the Skill, also normalized to the range [0,1]. Examples of possible benchmark Skill Score values might include the average Skill Score in this Skill of all Students taking the Test, or the average Skill Score in this Skill of all Students taking the Test who earned overall Scores in a certain range, etc. Benchmark Skill Scores are calculated in step 1254 during the functioning of the Aggregation Analyzer 136.

Under this framework, the Room to Grow™ function can be chosen heuristically so long as it satisfies the following properties:

i. $\rho(x,y) > 0$ for all x and y in [0,1].
ii. $\rho(1,y) = 0$ for all $y \in [0,1]$
iii. $\rho(x,0) = 0$ for all $x \in [0,1]$
iv. For all $y \in [0,1]$, $x' > x'' \Rightarrow \rho(x',y) < \rho(x'',y)$
v. For all $x \in [0,1]$, $y' > y'' \Rightarrow \rho(x,y') > \rho(x,y'')$.

For example, a satisfactory functional form is $\rho(x,y) = y(1-x)$. If this form is chosen, then the Room to Grow™ function $\rho$ measures the growth potential in a Skill, for a Student with Skill Score $s_k$ in the Skill, as $$\rho(s_k, b_k) = b_k(1 - s_k).$$

Here, $b_k$ represents the benchmark Percent Correct in Skill k. This has an understandable motivation as follows:

Insofar as the term $s_k$ is the level of performance of the Student in Skill k, and insofar as the maximum possible level of performance in the Skill k is 1, the term $1-s_k$ represents a "resource" that is still available to the Student provided his or her ability in the skill increases.

Insofar as the term $b_k$ is a fraction between 0 and 1 that represents a realistic level of performance for some standard comparison group, the term $b_k$ measures the "efficiency" with which the group can be expected to "convert" the resource.

The product of "resource" times "efficiency" gives the "yield"—in this case, the improvement in the level of performance in the given Skill.

B. In the second family of methods, the Room to Grow™ function estimates growth potential by taking into account not only (1) how well the Student scored in the Skill; and (2) how well a comparison group scored in the Skill; but also (3) how strongly emphasized the Skill was on the Test. Intuitively speaking, progress will be more rapid with the Student focuses on Skills that carry a great deal of weight on the Test.

To be precise, the Room to Grow™ function $\rho(x,y,z)$ in this case is a function that takes three real arguments. The first two arguments are interpreted as in (a). The third argument is interpreted as the Total Weight in a Skill, $w_k$. Total Weights of Skills are calculated by the Student Skill Score Calculator 132 in step 1066, during the calculation of Generalized Percent Correct results.

Under this framework, the Room to Grow™ function can be chosen heuristically so long as it satisfies the following properties:

i. $\rho(x,y,z) > 0$ for all x and y in [0,1] and all $z > 0$.
ii. $\rho(1,y,z) = 0$ for all $y \in [0,1]$ and all $z > 0$.
iii. $\rho(x,0,z) = 0$ for all $x \in [0,1]$ and all $z > 0$.
iv. $\rho(x,y,z) \to 0$ as $z \to 0$, for all x and y in [0,1]
v. For all $y \in [0,1]$ and all $z > 0$, $x' > x'' \Rightarrow \rho(x',y,z) < \rho(x'',y,z)$
vi. For all $x \in [0,1]$ and all $z > 0$, $y' > y'' \Rightarrow \rho(x,y',z) > \rho(x,y'',z)$
vii. For all x and y in [0,1], $z' > z'' \Rightarrow \rho(x,y,z') > \rho(x,y,z'')$ This method is advisable only when the distribution of maximum point totals among the Skills (a) reflects explicit educational choices on the part of the Client; and (b) is approximately stable from one administration of the test to another.

C. In the last family of methods, which may improve accuracy, but at the expense of understandability, the Room to Grow™ function estimates growth potential by positing a probabilistic model of teaching and learning, and using the model to predict where the greatest growth can occur.

To be precise, in this approach one adopts:

i. A multicomponent-ability Item Response Theory model, and
ii. A probabilistic model of instruction and ability, taking place within the multicomponent ability model, that allows one to assess the expected magnitude of group improvement in the given Skill, following additional instructional focus. This expected magnitude serves then as the Room to Grow™ function $\rho$.

The multicomponent-ability Item Response Theory model in (i) is a framework within which one asserts that each Student in the testing population has an independent ability in each Skill Category. The higher the Student's ability in a given Skill, the better able the Student is to answer Items in that Skill correctly. The probabilistic model in (ii) amounts to a series of probability distributions, one for each Skill. The $k^{th}$ probability distribution $P_k(s_2|s_1)$ gives the probability density that a Student who achieved a Skill Score $s_1$ in Skill k will, after additional instruction in Skill k, achieve the Skill Score $s_2$ in Skill k.

It is to be expected that in any simple and reasonable model of instruction and learning, the expected improvement for any given Student upon additional instruction, $$\langle s_2 - s_1 \rangle = \int s_2 P_k(s_2|s_1) ds_2 - s_1,$$

will be positive. This expected increase in Skill Score is then the Room to Grow™ function:

$$\rho_k = \int s_2 P_k(s_2|s_1) ds_2 - s_1.$$

As a very simple model of $P_k(s_2|s_1)$ that serves to illustrate the ideas, it can be supposed that given a particular Student, it is known only that (a) the Student's score will increase upon additional instruction; and (b) all other Students will perform the same. Then $P_k(s_2|s_1)$ might be taken proportional to $\theta(s)n_k(s)$, where $$\theta(s) \equiv 0 \text{ for } s \leq s_1 \text{ and } \theta(s) \equiv 1 \text{ for } s > s_1$$

and $n_k(s)$ is "the curve" in Skill k, that is, $n_k(s)$ is the probability density for Students to perform at each Skill Score for the Skill in question. (A model this crude will in general have unsatisfactory properties, but it is described here for illustrative purposes.)

In step 1268, the computer selects those Skills which, for Student j, have the highest number of Room to Grow™ points. The selection can be governed by any number of rules. For example, one may wish to ensure a uniform User experience by always choosing the three Skills (for example) with the highest Room to Grow™ point totals, breaking ties, for example, in favor of Skills with higher benchmark Skill Score values.

One may also wish to detect the "strongest signal" in the Room to Grow™ point total information. Thus, the computer may (a) calculate the standard deviation $\sigma$ of the m Room to Grow™ point values; (b) eliminate those Skills lying more than $0.2\sigma$ (for example) from the maximum; and (c) of these, choose up to three (for example).

In step 1270, the computer assigns an appropriate Evaluation Statement (such as 'Room to Grow™ Skill') to the Student for those Skills selected in step 1268, and assigns an appropriate Evaluation Statement (such as 'Not a Room to Grow™ Skill') to the Student for those Skills not selected in step 1268.

In step 1272, the computer increments the value of the Student index j by unity, and checks in Decision 1274 whether j is greater than the overall number of Students p. If not, then the computer returns to step 1266 to process the next Student.

If in Decision 1274 the Student index j exceeds the total number of Students p, then in step 1276 the computer writes all Students' Evaluation Statements in all Skills to the Information Repository 114 and in step 1278 notifies the Student Skill Performance Evaluator Operator that processing is complete.

4.G. Aggregation Analyzer

Aggregation simply means combining information about each Student in a Group in order to produce information about the Group as a whole. Aggregation is extremely important in providing Educators with an overall picture of their Students, since it is often impractical for Students to receive one-on-one attention.

Some forms of aggregation are extremely simple, such as averaging together Student scores to produce a score for the Group. Other forms of aggregation are much more complex, such as determining a Group's overall Evaluation Statement on the basis of the Evaluation Statements and/or numerical Scores of the Group Members. The different aggregations required for different Displays are specified in the Data Requirements for Results Reports. Broadly speaking, there are four kinds of aggregation that the Aggregation Analyzer 136 can implement in different embodiments to provide data for different Displays:

Score-to-Score Aggregation is any process whereby individual Students' Skill Scores are used to determine a Skill Score for the Group. For example, a simple averaging of each Student's Generalized Percent Correct to obtain an Average Percent Correct for the Group constitutes Score-to-Score Aggregation.

Statement-to-Statement Aggregation is any process whereby individual Students' Evaluation Statements are used to determine an overall Evaluation Statement for the Group. For example, determining a Group's "Room to Grow" Skills, based purely on which Skills are "Room to Grow" Skills for the individual Students in the Group, constitutes Statement-to-Statement Aggregation.

Score-to-Statement Aggregation is any process whereby individual Students' Skill Scores are used to determine an overall Evaluation Statement for the Group. For example, determining a Group's "Room to Grow" Skills, based purely on the numerical Scores of Students in the Group, constitutes Score-to-Statement Aggregation.

Full-Information Statement Aggregation is any process whereby individual Students' Skill Scores and individual Students' Evaluation Statements are used to determine an overall Evaluation Statement for the Group. For example, determining a Group's "Room to Grow" Skills, based on both the numerical Scores of Students in the Group as well as a knowledge of which Skills are "Room to Grow" Skills for the individual Students in the Group, constitutes Score-to-Statement Aggregation.

The Displays in a given Report produced under this system may include instances of all these forms of aggregation.

Physical Instantiation

The Aggregation Analyzer 136 may consist physically of (a) a human Operator who activates the Aggregation Analyzer 136 according to the flowchart in FIG. 13 when notified to do so in step 628 by the Analysis Module Operator or in step 1254 by the Student Skill Performance Evaluator Operator; and (b) a computer connected to the network that executes appropriate code as described in more detail below.

Processing Performed by the Computer Code

The Aggregation Analyzer 136 takes from the Information Repository 114 the following inputs:
 Data Requirements for Results Reports;
 Skill Scores for all members of all Groups to be aggregated over; and
 Evaluation Statements for all members of all Groups to be aggregated over.

The Aggregation Analyzer 136 writes to the Information Repository 114 the following outputs:
 Each Student's Vector of Evaluation Statements (or Vectors, in the case of multiple types of aggregation as suggested above).

The transformation of these inputs into these outputs is accomplished by computer code, the processing ranging in complexity from simple averaging to more complex forms of aggregation as in the embodiments below.

Figure 13:
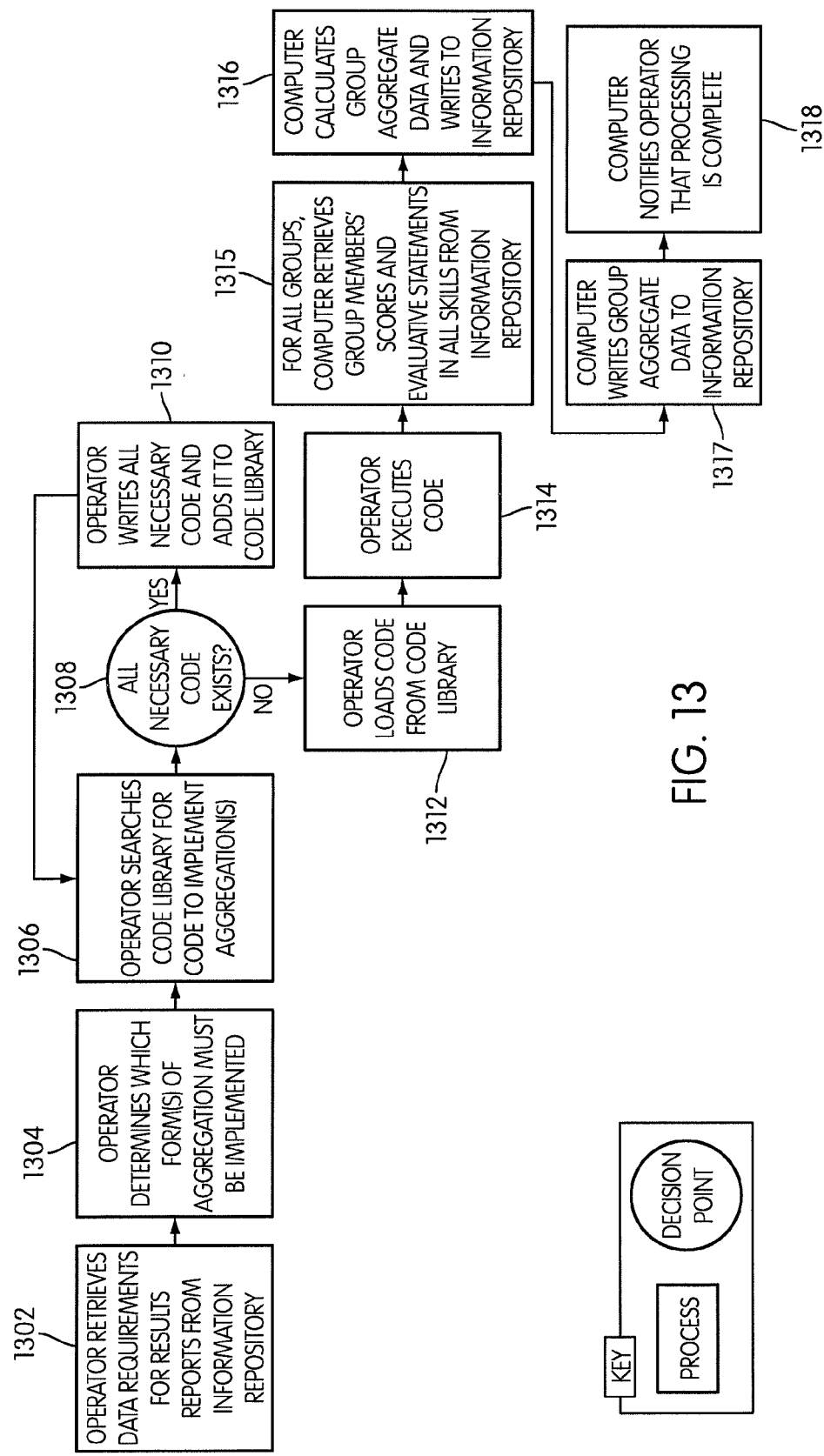
FIG. 13 is a flowchart illustrating the operation process of the Aggregation Analyzer component of the system.

FIG. 13 is a flowchart showing the process of operation of the Aggregation Analyzer 136.

In step 1302, the Aggregation Analyzer Operator retrieves the Data Requirements for Results Reports from the Information Repository 114. Based on the Data Requirements, the Operator determines in step 1304 which form(s) of aggregation must be implemented in order to create the Displays in the Report. For example, it may happen that three different kinds of aggregation are required to produce all of the required Displays:

1. For each Group, and for each Skill, the Generalized Percent Correct values of each Group member in that Skill must be averaged in order to produce the Group's Average Percent Correct.
2. For each Group, the Group's Average Percent Correct values for each Skill must be used to determine the Group's "Room to Grow" Skills.
3. For each Group, and for each Skill, the Evaluation Statements of each Group member in that Skill must be combined with the Generalized Percent Correct values of each Group member in that Skill, to produce the Group's overall Evaluation Statement.

Each of these aggregations is to be accomplished by running a computer program that (a) reads data from the Information Repository 114; (b) carries out the particular form of aggregation required (for example, one of those described in the embodiments below); and (c) writes the results to the Information Repository 114.

Having determined in step 1304 the forms of aggregation required, the Aggregation Analyzer Operator consults the Code Library in step 1306, to see whether the Code Library contains code for implementing the required form(s) of aggregation.

Code may exist in the Code Library for performing some of the desired aggregations, but not for performing others. If in Decision 1308 all of the necessary code does not exist (as naturally arises, for example, in the case of Displays that have not been provided previously to any Client), the Operator in step 1310 uses the skills of his/her art to write the necessary code, depositing it in the Code Library so it will be available for use in reporting to future Clients. (In this way, the Analysis Code Library becomes richer over time.)

The necessary code now exists in the Code Library, so when in Decision 1308 this code is found to exist, the Operator in step 1312 loads it into the computer, executing it in step 1314.

In step 1315 the computer accesses the Information Repository 114 and, for all Groups to be analyzed, retrieves the Group members' Scores and Evaluation Statements in all Skills. In step 1316 computer then calculates aggregate data for the Group as instructed in the computer code (for example by following an algorithm such as one of those specified in the embodiments below). Having done so, the computer in step 1317 writes the Group aggregate data to the Information Repository 114 and in step 1318 notifies the Operator that processing is complete.

Embodiment

Aggregation of Formative Evaluation Statements

Despite the benefits of differentiated instruction (a term that refers to separating Students into work groups based on their levels of mastery, and pursuing different strategies with each work group), teachers are often faced with the need to adopt a single strategy for an entire class. For example, this happens during curriculum planning at the start of an academic term or at the start of a content-specific unit. It also happens during direct instruction, when the teacher explains concepts to the class as a whole.

Many methods exist in the prior art for determining diagnostic information about individual Students based on their Test performance. In some instances, this diagnostic information may include "Formative Statements" about each student—statements, that is, which recommend a particular course of action that should likely be taken by the Student's Educator(s) and/or Parent(s), or even by the Student himself or herself.

For example, Formative Statements about Student Test Results might include suggestions that one Student work on the fundamentals of subtraction, while another Student proceed to advanced work in that subject. These Formative Statements can be very useful for Users, such as Educators can take such recommended courses of actions during direct instruction.

But Educators often have to address Groups of Students collectively. Therefore, Educators can benefit from generalizing the Formative Statements they receive for each Student to obtain and 'overall picture' of the Group as a whole. Unfortunately, however, this need has not been addressed in the prior art, with the result that Educators have not until now been able to obtain formative evaluation statements for Groups of Students. The present invention remedies this problem.

An obvious approach to aggregating Formative Statements might proceed as follows: (1) calculate a single average score for the Group; (2) imagine that this score represents the score of a single Student; and then (3) assign the Group the same Formative Statement that a Student would receive, had he or she received the Group average Score.

However, an approach based on averaging will not be appropriate for determining the best way to address the needs of a Group collectively. This is because averaging does not take into account the varying degree to which the different actions recommended by different formative statements will affect different individual Students.

The Aggregation Analyzer 136 in various embodiments offer a superior approach. Once the Student Skill Performance Evaluator 134 is completed, this embodiment of the Aggregation Analyzer 136 instantiates an algorithm that aggregates individual Formative Statements that have been offered for Students, in order to generate a single formative statement for the Group as a whole. In this embodiment, the particular algorithm functions by selecting the Formative Statement for the Group that corresponds to the instructional action that maximizes the educational benefit accruing to all of the Group members.

Specific Embodiment: Utility Aggregation of Formative Statements

In the example of Utility Aggregation described here, the Range of Formative Evaluation Statements being aggregated consists of three Formative Statements, denoted R={f, p, a}. These take these statements to be arranged in order, that is, beginning with an action more appropriate to a Student with low mastery (f), progressing to an action more appropriate to a Student with an intermediate level of mastery (p), and ending with an action more appropriate to a Student with high mastery (a).

For example, we might have:
f='Work on Fundamentals';
p='[Provide] Additional Instruction and Practice'; and
a='[Pursue] Advanced Work'.

Or, for example, if Users are using the information in Reports to inform their curriculum planning decisions at the start of an academic term, we might have:
f="Set modest goals during curriculum planning";
p="Set intermediate goals during curriculum planning"; and
a="Set high goals during curriculum planning".

Utility Aggregation works on a Skill-by-Skill basis. In its simplest form, it is a Statement-to-Statement Aggregation process. That is, given:
a Group of Students;
each Student's assigned formative statement in the Skill (f, p, or a); and
pedagogical constraint parameters as discussed below;

the Utility Aggregation process returns a single formative statement (f, p, or a) appropriate for the Group as a whole.

Background: Utility Models and Pedagogical Constraints

As specified more precisely below, Utility Aggregation is based on a 3-by-3 payoff matrix, $Z^o$, of the form $$\tilde{Z} = \begin{pmatrix} Z_{ff} & Z_{fp} & Z_{fa} \\ Z_{pf} & Z_{pp} & Z_{pa} \\ Z_{af} & Z_{ap} & Z_{aa} \end{pmatrix}.$$

In a typical matrix element of $Z^o$, of the form $\tilde{Z}_{xy}$, the first subscript index refers to an action taken by the Group, and the second index refers to an action appropriate to the individual. Here, looking at the first row of $\tilde{Z}$, the number $Z_{ff}$ represents the educational benefit that accrues to an individual Student in a Group, when the Student merits the recommendation f, and when the Student's Instructor chooses to follow the recommendation f with the Group as a whole. The number $Z_{fp}$ represents the (presumably smaller) educational benefit that accrues to an individual Student in a Group, when the Student merits the recommendation f, and when the Student's Instructor chooses to follow the recommendation p with the Group as a whole. And finally, the number $Z_{fa}$ represents the (presumably still smaller) educational benefit that accrues to an individual Student in a Group, when the Student merits the recommendation f, and when the Student's Instructor chooses to follow the recommendation a with the Group as a whole. The elements in the p and a rows have similar interpretations.

As stated above, in the matrix element $\tilde{Z}_{xy}$, the first index refers to action taken by the Group, and the second index refers to the action appropriate to the individual. To make more intuitive the notation that follows, we will begin capitalizing the first index, to emphasize that this component refers to a Group. Thus, the matrix elements of $\tilde{Z}$ will appear as $Z_{Ff}$, etc. However, bear in mind that 'F' and 'f', both refer to the same Evaluation Statement, namely f.

It is necessary that these matrix elements obey the following reasonableness constraints:

$$Z_{ff} > Z_{fp} > Z_{fa}$$

$$Z_{pp} > Z_{pf}$$

$$X_{pp} > Z_{pa}$$

$$Z_{aa} > Z_{ap} > Z_{af}$$

$$Z_{ff} > Z_{pf} > Z_{af}$$

$$Z_{pp} > Z_{fp}$$

$$Z_{pp} > Z_{ap}$$

$$Z_{aa} > Z_{pa} > Z_{fa}.$$

Essentially, these constraints require that the matrix elements become smaller as one moves away from the diagonals in any direction (horizontally or vertically). The first set of inequalities mean that any given Student receives maximal benefit when the Group adopts the approach that is most appropriate to him or her, and receives less and less benefit, the more disparate the Group approach becomes from his or her preferred approach. The second set of inequalities mean that the Educational institution as a whole receives maximal benefit (in terms of meeting its goal of reaching every Student) when it provides the approach that matches the Student's needs, and receives less and less benefit, the more disparate the approach it provides is from the Student's needs.

Decision-making models based on a payoff matrix are commonly used in economic theory and in the study of ethics. However, this invention represents the first time they have been applied to the problem of making sound recommendations to instructors.

Decision-making models based on a payoff matrix can be difficult to implement in practice, because it is often difficult to choose values for the matrix elements. The Aggregation Analyzer 136 solves this problem by prompting one or more persons to use pedagogical expertise in setting constraints on the possible elements of the payoff matrix. (This prompting need be carried out at most once per Client.)

For example, suppose that a person with pedagogical expertise, when faced with a class of at least one-third of the students meriting the f recommendation and the remainder meriting the p recommendation, would always adopt the f approach with the class. If the decision-making rule imposed by the payoff matrix is to respect this mandate, then the matrix elements themselves will have to satisfy a mathematical constraint arising from the special role of the number ⅓ in the mandate. Such a constraint is called a Pedagogical Constraint.

Given a set of Pedagogical Constraints, the aggregation routine below calculates a payoff matrix $Z^0$ that satisfies these constraints.

This payoff matrix, by itself, leads to a simple and reasonable aggregation rule, based only on the diversity of Students' recommended actions (f, p, or a) within the Group. (This is a Statement-to-Statement Aggregation process.) This rule can be implemented whenever simplicity is a goal of the aggregation process (for example, when the methods used in the Analysis Module 120 will be explained to Users).

Specific Utility Aggregation Algorithm

Figures 2, 14:
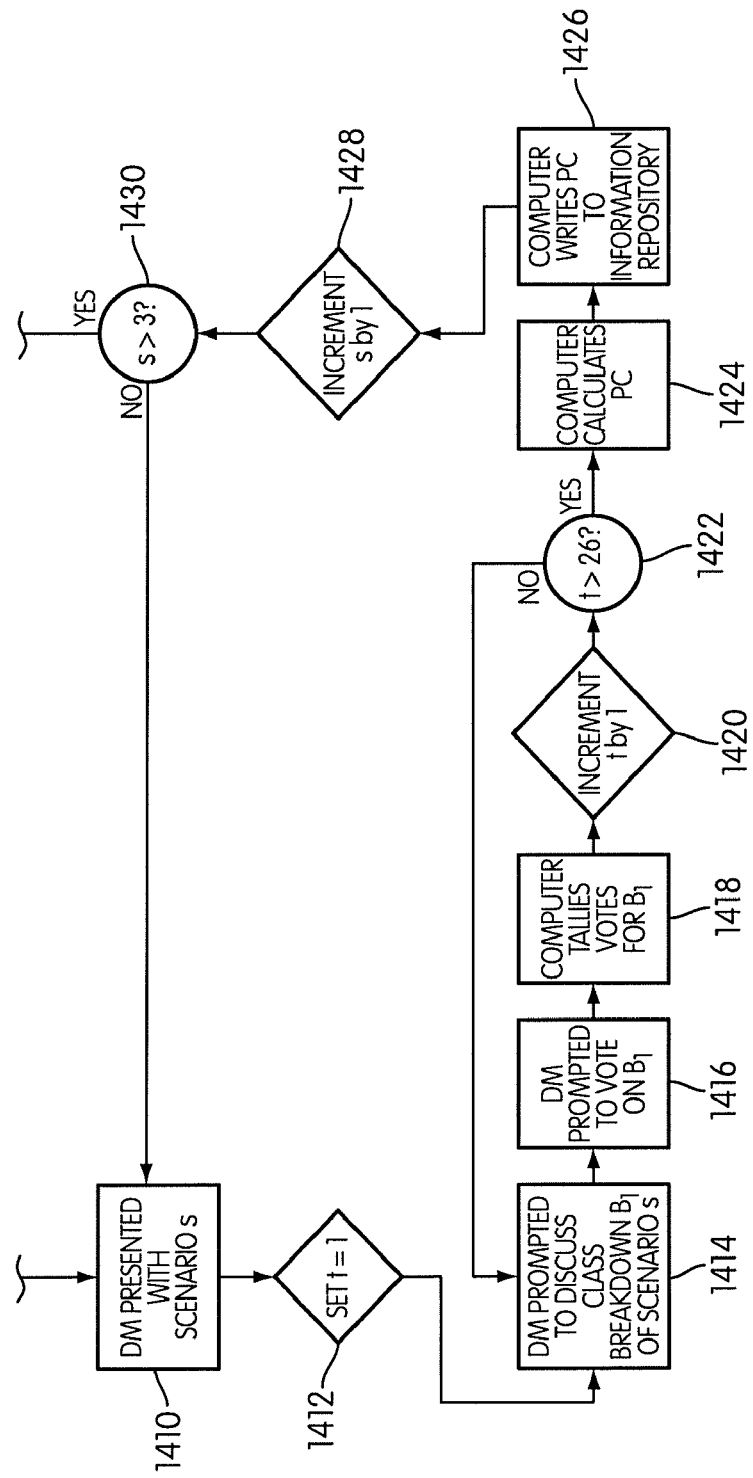

FIGS. 14-1 and 14-2 show a flowchart showing the sequence of steps that can be carried out in order to implement Utility Aggregation.

In step 1402, the Operator of the Aggregation Analyzer 136 accesses the Information Repository 114 to determine whether or not it contains Pedagogical Constraints for the current Client.

If in Decision 1404 Pedagogical Constraints do not exist, then the Operator must convene a group of one or more human Decision Makers in step 1406 and initiate a sub-process consisting of steps 1408, 1410, 1412, 1414, 1416, 1418, 1420, 1422, 1424, 1426, 1428, and 1430. In this sub-process, prompts are given to the Decision Maker(s) in order to elicit their decisions; the Pedagogical Constraints corresponding to these decisions are calculated; and the values of these Pedagogical Constraints are then written to the Information Repository 114. This sub-process can be executed by a human moderator or a computer; for definiteness, this embodiment is written as though the steps are performed by a computer.

Note that steps need be carried out only once per Client; thus, in the typical case, the Operator will proceed from Decision 1404 directly to step 1432. However, in those cases in which steps 1406, 1408, 1410, 1412, 1414, 1416, 1418, 1420, 1422, 1424, 1426, 1428, and 1430 must be carried out, they are as follows.

In step 1408 the computer enters a loop controlled by the index s and initiates the value of s to unity. The index s is a "Scenario" index, and the loop will cycle through three different Scenarios. Each Scenario involves a hypothetical class of 25 Students who, it is imagined, are about to receive direct instruction in a Skill.

Figure 14A:
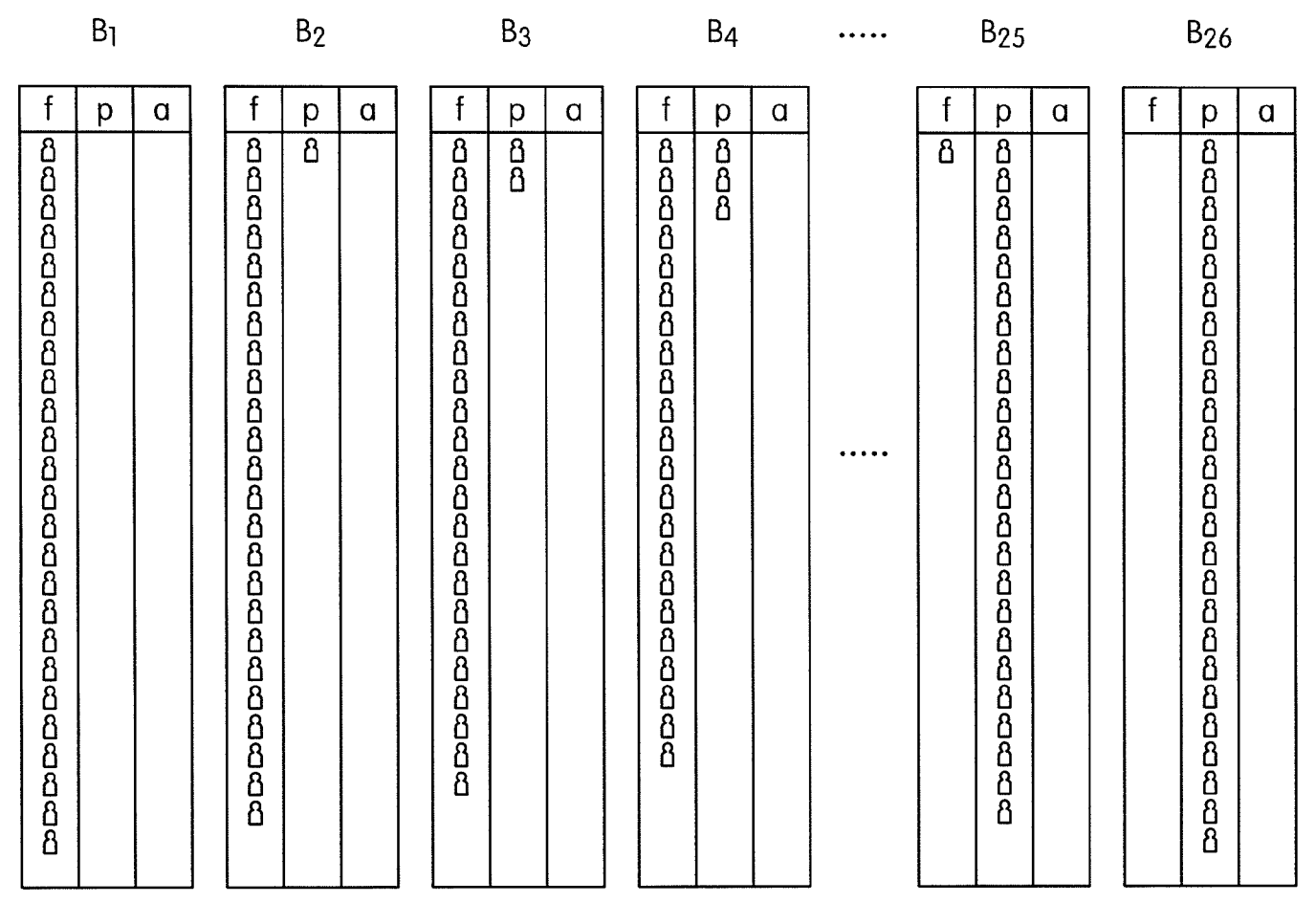

In the first Scenario (s=1), the class has no Students who merit the highest recommendation a. FIG. 14a is a drawing that illustrates figuratively the 26 different possible Class Breakdowns consistent with this Scenario:
  all 25 Students in the f column;
  24 Students in the f column and one Student in the p column;
  23 Students in the f column and two Students in the p column; and so on, ending with all 25 Students in the p column.

Figure 14B:
FIG. 14b is a diagram illustrating the different class breakdowns possible within the Second Scenario, described in the Aggregation Analyzer component of the system.
Figure 14C:
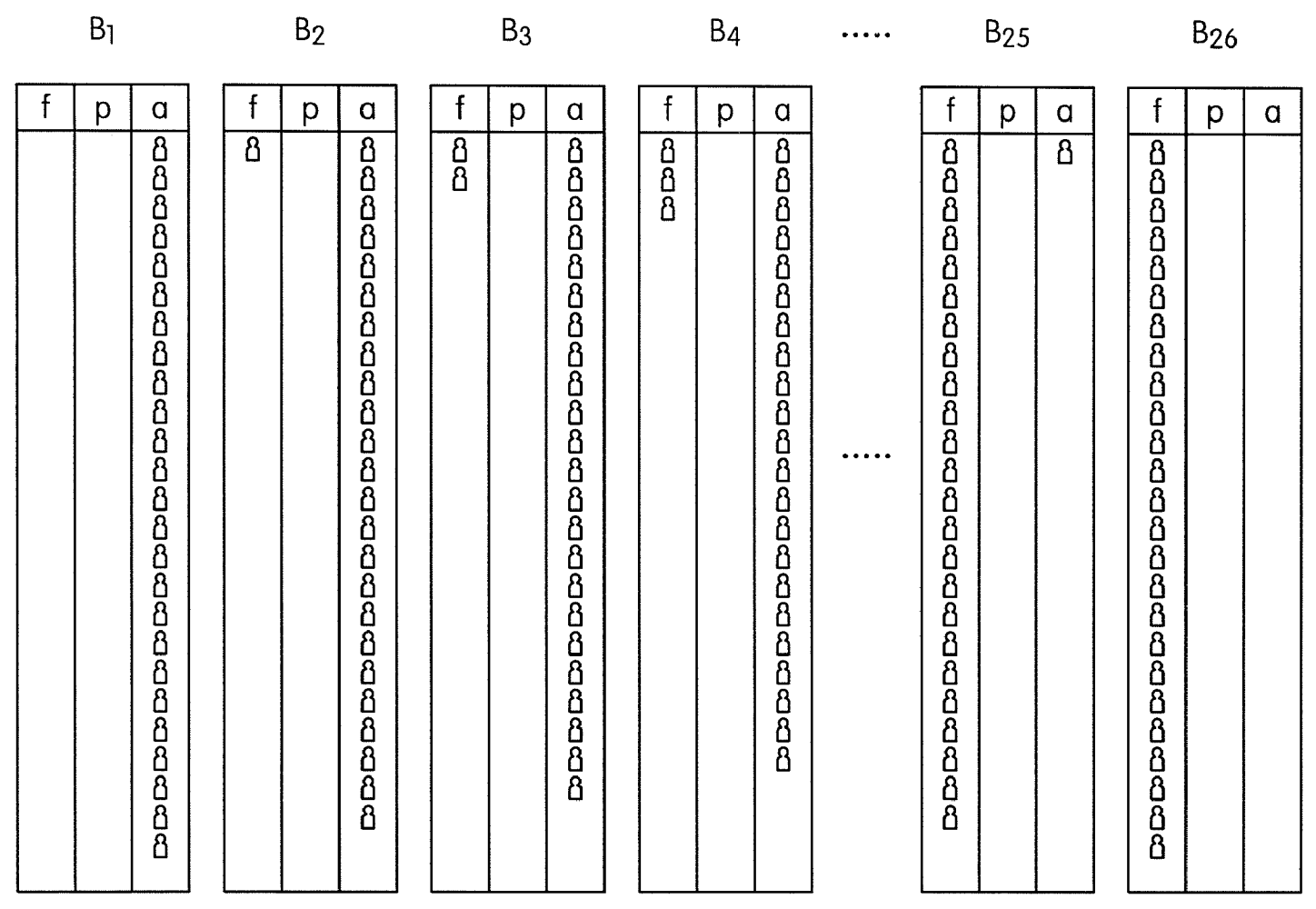
Figure 14D:
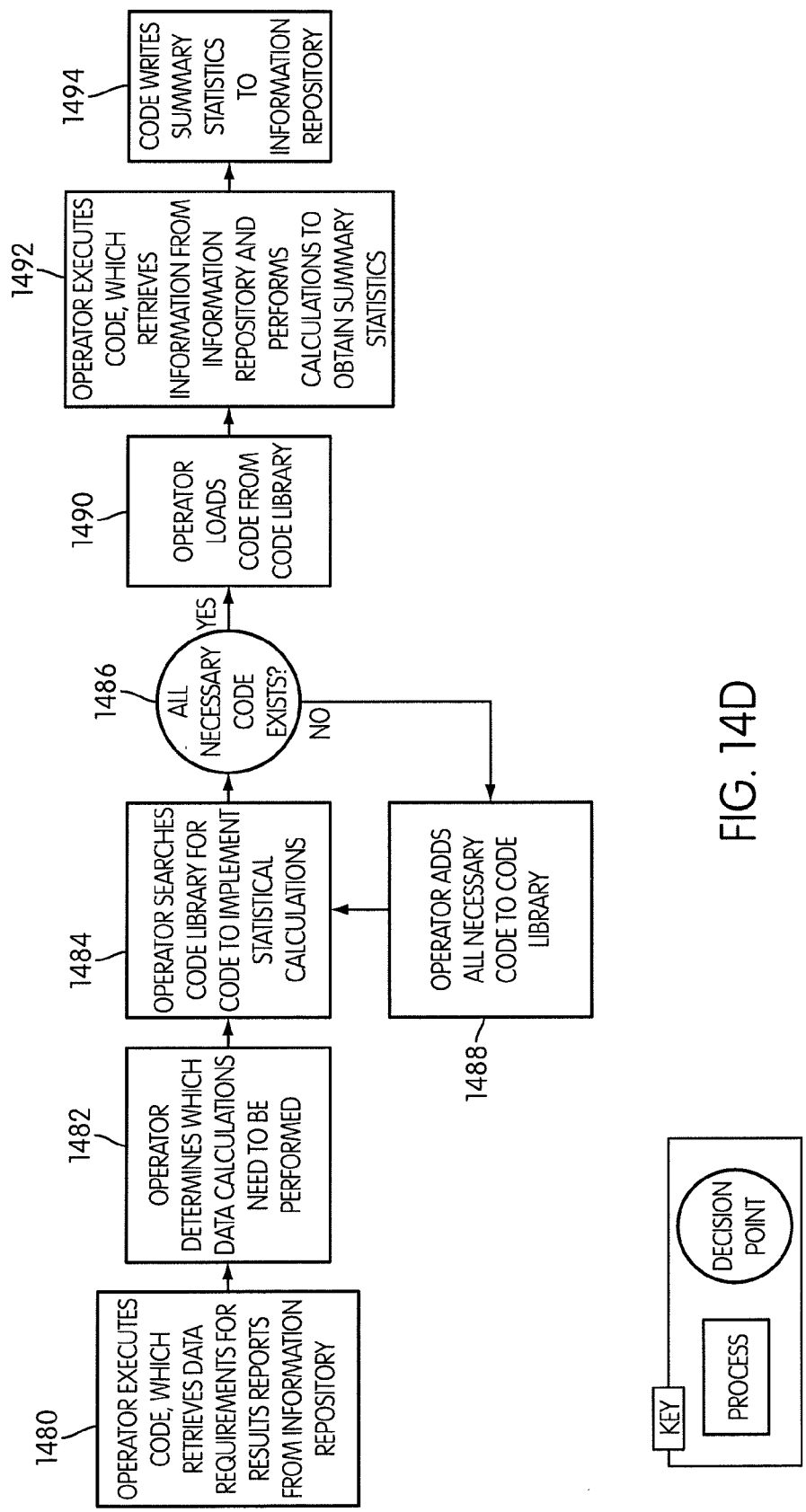
FIG. 14d is a flowchart illustrating the operation process of the Statistics Summarizer component of the system.

In the second Scenario (s=3), the class has no Students who merit the lowest recommendation f. FIG. 14b is a drawing that illustrates figuratively the 26 different possible Class Breakdowns consistent with this Scenario:
  all 25 Students in the p column;
  24 Students in the p column and one Student in the a column;
  23 Students in the p column and two Students in the p column; and so on, ending with all 25 Students in the a column.

In the third Scenario (s=3), the class has no Students who merit the intermediate recommendation p. FIG. 14c is a drawing that illustrates figuratively the 26 different possible Class Breakdowns consistent with this Scenario:
  all 25 Students in the a column;
  24 Students in the a column and one Student in the f column;
  23 Students in the a column and two Students in the f column; and so on, ending with all 25 Students in the f column.

For the sake of clarity, steps 1410, 1412, 1414, 1416, 1418, 1420, 1422, 1424, 1428, and 1430 will be described for each value (1, 2, or 3) of the Scenario index s.

Scenario 1

In step 1410 (with s=1), Scenario 1 is described to the Decision Makers. At this point the computer enters a loop in step 1412 controlled by the loop index t and initializes the value of t to unity. The index t is a Class Breakdown index; as described below, in cycling through the loop the computer will present the Decision Makers with a succession of the 26 different Class Breakdowns $B_1, \ldots, B_{26}$ belonging to the Scenario 1 (which Class Breakdowns are shown in FIG. 14*a*).

In step 1414 the Decision Makers are shown Class Breakdown $B_t$, and the computer pauses while the Decision Makers discuss which approach they would take with the class as a whole (the possible choices being stipulated as f or p in Scenario 1), given the distribution of Student needs represented by that Breakdown. The Decision Makers can signal the completion of the discussion by striking a key on the computer keyboard.

After the Decision Makers have finished discussing Class Breakdown $B_t$, the computer in step 1416 prompts each Decision Maker to vote for the approach (f or p) he or she would take with the class as a whole. Given a Breakdown $B_t$, each Decision-Maker votes "f" or "p". The votes are cast by typing them on the computer keyboard.

In step 1418 the computer tallies the votes, storing the percentage of the Decision Makers voting "f" (this quantity is denoted $F_t$) as well as the percentage of the Decision Makers voting "p" (this quantity is denoted $P_t$). Note that $P_t = 1 - F_t$.

In step 1420 the computer increments the value of the Class Breakdown index t by unity, and in Decision 1422 checks whether the value of t exceeds 26, the number of Class Breakdowns. If in Decision 1422 the value of t is less than or equal to 26, the computer repeats steps 1414, 1416, 1418, and 1420 for the Class Breakdown $B_t$ corresponding to the incremented value of t.

After the Decision Makers have voted on all 26 Class Breakdowns, the computer in step 1420 will increment the value of t to 27, and the Decision in 1422 will cause the computer to proceed to step 1424, the calculation of a Pedagogical Constraint based on the Decision Makers' votes for the Class Breakdowns in Scenario 1. This Pedagogical Constraint is denoted a and calculated as $$a = t_0/25$$

where $t_0$ is the smallest value of t in the interval 2, ..., 25 for which the "Dissent Quantity" $(F_{t-1}+F_t+F_{t+1})(P_{t-1}+P_t+P_{t+1})$ takes on its maximal value. This condition identifies the point in the voting at which the group of Decision Makers reached their maximal level of dissent (or, in the case of one Decision Maker, the Class Breakdown $B_{t_0}$ for which the Decision Maker first changed his or her initial vote).

As an example of such a calculation, suppose that there are five Decision Makers, and that the voting for the Class Breakdowns in Scenario 1 plays out in the following typical fashion:

| Value of t | Class Breakdown | "f" votes | "p" votes | "f" Pct. $F_t$ | "p" Pct. $P_t$ | Dissent Quantity $(F_{t-1} + F_t + F_{t+1}) \times (P_{t-1} + P_t + P_{t+1})$ |
|---|---|---|---|---|---|---|
| 1 | $B_1$ | 7 | 0 | 1.00 | 0.00 | |
| 2 | $B_2$ | 7 | 0 | 1.00 | 0.00 | 0.00 |
| 3 | $B_3$ | 7 | 0 | 1.00 | 0.00 | 0.00 |
| 4 | $B_4$ | 7 | 0 | 1.00 | 0.00 | 0.00 |
| 5 | $B_5$ | 7 | 0 | 1.00 | 0.00 | 0.00 |
| 6 | $B_6$ | 7 | 0 | 1.00 | 0.00 | 0.00 |
| 7 | $B_7$ | 7 | 0 | 1.00 | 0.00 | 0.00 |
| 8 | $B_8$ | 7 | 0 | 1.00 | 0.00 | 0.400 |
| 9 | $B_9$ | 6 | 1 | 0.86 | 0.14 | 0.762 |
| 10 | $B_{10}$ | 6 | 1 | 0.86 | 0.14 | 1.385 |
| 11 | $B_{11}$ | 5 | 2 | 0.71 | 0.29 | 1.385 |
| 12 | $B_{12}$ | 6 | 1 | 0.86 | 0.14 | 1.642 |
| 13 | $B_{13}$ | 5 | 2 | 0.71 | 0.29 | 1.840 |
| 14 | $B_{14}$ | 4 | 3 | 0.57 | 0.43 | 2.010 |
| 15 | $B_{15}$ | 5 | 2 | 0.71 | 0.29 | 2.128 |
| 16 | $B_{16}$ | 4 | 3 | 0.57 | 0.43 | 2.245 |
| 17 | $B_{17}$ | 2 | 5 | 0.29 | 0.71 | 2.128 |
| 18 | $B_{18}$ | 2 | 5 | 0.29 | 0.71 | 1.853 |
| 19 | $B_{19}$ | 2 | 5 | 0.29 | 0.71 | 1.642 |
| 20 | $B_{20}$ | 1 | 6 | 0.14 | 0.86 | 1.105 |
| 21 | $B_{21}$ | 0 | 7 | 0.00 | 1.00 | 0.400 |
| 22 | $B_{22}$ | 0 | 7 | 0.00 | 1.00 | 0.00 |
| 23 | $B_{23}$ | 0 | 7 | 0.00 | 1.00 | 0.00 |
| 24 | $B_{24}$ | 0 | 7 | 0.00 | 1.00 | 0.00 |
| 25 | $B_{25}$ | 0 | 7 | 0.00 | 1.00 | 0.00 |
| 26 | $B_{26}$ | 0 | 7 | 0.00 | 0.00 | |

The value of $t_0$ in this example is $t_0=16$, because the Dissent Quantity first takes on its maximal value (2.245) there; and it is easily seen from the voting pattern that this is where the dissent of the group is most pronounced. In step 1424, this example would therefore lead to the Pedagogical Constraint $a=16/25=0.64$.

In step 1426 the computer writes to the Information Repository 114 the value of the Pedagogical Constraint calculated in step 1424 and increments the Scenario index by unity.

Scenario 2

In step 1410 (with s=2), Scenario 2 is described to the Decision Makers. At this point the computer enters a loop in step 1412 controlled by the loop index t and initializes the value of t to unity. The index t is a Class Breakdown index; as described below, in cycling through the loop the computer will present the Decision Makers with a succession of the 26 different Class Breakdowns $B_1, \ldots, B_{26}$ belonging to the Scenario 2 (which Class Breakdowns are shown in FIG. 14*b*).

In step 1414 the Decision Makers are shown Class Breakdown $B_t$, and the computer pauses while the Decision Makers discuss which approach they would take with the class as a whole (the possible choices being stipulated as p or a in Scenario 2), given the distribution of Student needs represented by that Breakdown. The Decision Makers can signal the completion of the discussion by striking a key on the computer keyboard.

After the Decision Makers have finished discussing Class Breakdown $B_t$, the computer in step 1416 prompts each Decision Maker to vote for the approach (p or a) he or she would take with the class as a whole. Given a Breakdown $B_t$, each Decision-Maker votes "p" or "a". The votes are cast by typing them on the computer keyboard.

In step 1418 the computer tallies the votes, storing the percentage of the Decision Makers voting "p" (this quantity is denoted $P_t$) as well as the percentage of the Decision Makers voting "a" (this quantity is denoted $A_t$). Note that $A_t = 1 - F_t$.

In step 1420 the computer increments the value of the Class Breakdown index t by unity, and in Decision 1422 checks whether the value of t exceeds 26, the number of Class Breakdowns. If in Decision 1422 the value of t is less than or equal to 26, the computer repeats steps 1414, 1416, 1418, and 1420 for the Class Breakdown $B_t$ corresponding to the incremented value of t.

After the Decision Makers have voted on all 26 Class Breakdowns, the computer in step 1420 will increment the value of t to 27, and the Decision in 1422 will cause the computer to proceed to step 1424, the calculation of a Pedagogical Constraint based on the Decision Makers' votes for the Class Breakdowns in Scenario 2. This Pedagogical Constraint is denoted c and calculated as $$c \equiv (1-t_0)/25$$

where $t_0$ is the smallest value of t in the interval 2, ..., 25 for which the "Dissent Quantity" $(P_{t-1}+P_t+P_{t+1})(A_{t-1}+A_t+A_{t+1})$ takes on its maximal value. This condition again identifies the point in the voting at which the group of Decision Makers reached their maximal level of dissent (or, in the case of one Decision Maker, the Class Breakdown $B_{t_0}$ for which the Decision Maker first changed his or her initial vote).

In step 1426 the computer writes to the Information Repository 114 the value of the Pedagogical Constraint calculated in step 1424 and increments the Scenario index by unity.

Scenario 3

In step 1410 (with s=3), Scenario 3 is described to the Decision Makers. At this point the computer enters a loop in step 1412 controlled by the loop index t and initializes the value of t to unity. The index t is a Class Breakdown index; as described below, in cycling through the loop the computer will present the Decision Makers with a succession of the 26 different Class Breakdowns $B_1, \ldots, B_{26}$ belonging to the Scenario 3 (which Class Breakdowns are shown in FIG. 14c).

In step 1414 the Decision Makers are shown Class Breakdown $B_t$, and the computer pauses while the Decision Makers discuss which approach they would take with the class as a whole (the possible choices being stipulated as f, p, or a in Scenario 3), given the distribution of Student needs represented by that Breakdown. The Decision Makers can signal the completion of the discussion by striking a key on the computer keyboard.

After the Decision Makers have finished discussing Class Breakdown $B_t$, the computer in step 1416 prompts each Decision Maker to vote for the approach (f, p, or a) he or she would take with the class as a whole. Given a Breakdown $B_t$, each Decision-Maker votes "f", "p" or "a". In Scenario 3, the voting is constrained by the following two rules: (1) each Decision-Maker must vote "f" for $B_1$, and (2) each Decision-Maker must vote "a" for $B_{26}$. The votes are cast by typing them on the computer keyboard.

In step 1418 the computer tallies the votes.

In step 1420 the computer increments the value of the Class Breakdown index t by unity, and in Decision 1422 checks whether the value of t exceeds 26, the number of Class Breakdowns. If in Decision 1422 the value of t is less than or equal to 26, the computer repeats steps 1414, 1416, 1418, and 1420 for the Class Breakdown $B_t$ corresponding to the incremented value of t.

After the Decision Makers have voted on all 26 Class Breakdowns, the computer in step 1420 will increment the value of t to 27, and the Decision in 1422 will cause the computer to proceed to step 1424, the calculation of two Pedagogical Constraints based on the Decision Makers' votes for the Class Breakdowns in Scenario 3. These Pedagogical Constraints are denoted b and d, and are calculated as follows:

1. The computer determines the following two numbers for each Decision Maker n: $t_{1n}$, the largest value of t for which the Decision-Maker voted "f" on the corresponding Breakdown $B_t$, and $t_{2n}$, the smallest value of t for which the Decision-Maker voted "f" on the corresponding breakdown.

2. The computer calculates the average values of $t_{1n}$ and $t_{2n}$ over the group (averaging over n), calling the results $t_1$ and $t_2$, respectively.

3. If $t_1 \geq t_2$, then the computer calculates the numbers b and d via the formulas $$b = \max(a, 1-((t_1+t_2)/2-1)/25)$$

$$d = \min(c, 1-((t_1+t_2)/2-1)/25);$$

whereas if $t_1 < t_2$, then the computer calculates the numbers b and d via the formulas $$b = \max\{a, 1-(t_1-1)/25\}$$

$$d = \min\{c, 1-(t_2-1)/25\}.$$

Examination of the voting process will show that the min and max expressions here, which ensure (i) that the value of b must be at least as large as the value of a, and (ii) that the value of d must be no larger than the value of c, are necessary to ensure that the voting respects the following two reasonableness conditions:

i. "p" students should not be more influential in driving the class towards more advanced teaching than "a" students are (this requires $a \leq b$); and ii. "p" students should not be more influential in driving the class towards less advanced teaching than "f" students are (this requires $c \leq d$).

In step 1426 the computer writes to the Information Repository 114 the values of the Pedagogical Constraints calculated in step 1424 and increments the Scenario index by unity.

In Decision 1428 the computer now determines that the Scenario index is greater than 3, and proceeds to step 1432 where it checks the Information Repository 114 for the presence of the payoff matrix $Z_0$. If in Decision 1434 the computer does not find the payoff matrix, it loads the Pedagogical Constraints a, b, c, and d from the Information Repository 114 in step 1436, and in step 1438 calculates the payoff matrix $Z_0$ by means of the following formula, $$Z^0 = \begin{pmatrix} \sim & -1 & -1-(b/(1-b))((1-a)/a) \\ -(1-a)/a & \sim & -1 \\ -(1-a)/a-(1-d)/d & -(1-c)/c & \sim \end{pmatrix}$$

writing $Z^0$ to the Information Repository 114 in step 1440.

This brings the computer to step 1442, which, in a typical implementation of the Aggregation Analyzer 136, would actually be reached after a short series of steps and decisions as follows: 1402, 1404, 1432, 1434, 1442. In step 1442 the computer reads the payoff matrix $Z^0$ from the Information Repository 114.

In step 1444 the computer enters a loop controlled by the index k, initializing the value of k at 1. The index k is a Skill index, ranging from 1 to m. The computer has thus begun looping through the Skills in order.

In step 1446 the computer loads Student Evaluation Statements in Skill k for all Students in the first Group to be analyzed.

Using the Student Evaluation Statements in Skill k, the computer calculates in step 1448 the Group's "Population Vector" $v=(v_f, v_p, v_a)$. Here, the number $v_f$ is between 0 and 1, and represents the percentage of Students in the Group who have Evaluation Statement f in Skill k. Likewise, the number $v_p$ is between 0 and 1, and represents the percentage of Students in the Group who have Evaluation Statement p in Skill k; and the number $v_a$ is between 0 and 1, and represents the percentage of Students in the Group who have Evaluation Statement a in Skill k. (The components of the Population Vector v satisfy the relationship $v_f + v_p + v_a = 1$.)

In step 1450, the computer calculates the per-person utility or benefit associated with the three Group-level actions f, p, or a, by multiplying the population vector v by the payoff matrix $Z^0$ to yield the Utility Vector $u \equiv Z^0 v$:

$$u = \begin{pmatrix} Z_{ff} & Z_{fp} & Z_{fa} \\ Z_{pf} & Z_{pp} & Z_{pa} \\ Z_{af} & Z_{ap} & Z_{aa} \end{pmatrix} \begin{pmatrix} v_f \\ v_p \\ v_a \end{pmatrix} = \begin{pmatrix} Z_{ff}v_f + Z_{fp}v_p + Z_{fa}v_a \\ Z_{pf}v_f + Z_{pp}v_p + Z_{pa}v_a \\ Z_{af}v_f + Z_{ap}v_p + Z_{aa}v_a \end{pmatrix} \equiv \begin{pmatrix} u_F \\ u_P \\ u_A \end{pmatrix}$$

where the nine matrix elements $Z_{ff}, Z_{fp}, \ldots, Z_{ap}, Z_{aa}$ are given in terms of the Pedagogical Constraints a, b, c, and d as above.

In the Utility Vector $u = (u_F, u_P, u_A)$, the first number $u_F$ represents the per-person utility for the Group that is associated with the Group-level action f; the second number up represents the per-person utility for the Group that is associated with the Group-level action p; and the third number $u_A$ represents the per-person utility for the Group that is associated with the Group-level action a.

In step 1452 the computer determines the maximal utility component $u_F$, $u_P$, or $u_A$. If there is a single largest component, then the computer selects that component as the maximal utility component. In the rare event of ties, the computer must follow a tie-breaking rule such as the following:

i. If u has two maximal components, then:
  When they are $u_F$ and $u_P$, the maximal utility component is $u_P$.
  When they are $u_F$ and $u_A$, the maximal utility component is $u_A$.
  When they are $u_P$ and $u_A$, the maximal utility component is $u_A$.
ii. If all three components of u are equal, then the maximal utility component is $u_P$.

In step 1454 the computer selects in the obvious way the Group Evaluation Statement corresponding to the maximal utility component determined in step 1452, selecting f when the maximal utility component is $u_F$, selecting p when the maximal utility component is $u_P$, and selecting a when the maximal utility component is $u_A$.

In step 1456 the computer writes the Evaluation Statement for the Group to the Information Repository 114.

In step 1458 the computer increments the value of the Skill index k by unity and in Decision 1460 checks whether the value k is greater than the number of Skills m. If k is not greater than m, then the computer returns to step 1448 to begin the process of assigning the Group and Evaluation Statement in the next Skill (steps 1448, 1450, 1452, 1454, 1456, and 1458).

When the computer finds in Decision 1460 that the value of k is greater than the number of Skills m, then the computer proceeds in step 1462 to check the Information Repository 114 for the presence of unprocessed Groups. If in Decision 1464 the computer finds that there are additional Groups to be processed, then it returns to the Skill loop in step 1444. When the computer finds in Decision 1464 that there are no Groups remaining, it proceeds to step 1466 and notifies the Operator that the aggregation process is complete.

The Utility Aggregation process as described in the above embodiment aggregates formative statements for any Group of Students in such a way as to deliver maximal educational benefit to the Students in the Group, as that notion is given meaning by pedagogical expertise. Interestingly, whether or not the Decision Makers implicitly or explicitly considered utilitarian principles in making their judgments, there is nevertheless a linear utility model that reproduces their insight for the Breakdowns considered by them.

The process is efficient because the Pedagogical Constraints can be calculated once for each Client (and need not be calculated for each Test analyzed on behalf of that Client), and the same is true for the payoff matrix $Z^0$.

Embodiment

High-dispersion Group Aggregation

The Utility Aggregation method described in the above embodiment seeks to maximize the utility of a chosen action when a uniform choice must be made for a Group. In some applications, however, the goal of aggregating the Evaluation Statements of a Group is not to recommend a single action to be pursued with the Group as a whole, but, rather, simply to give a sense of which Evaluation Statement best typifies the Group. Here again, though, averaging is impractical.

In the second embodiment, the Aggregation Analyzer 136 instantiates an algorithm that measures the central tendency of individual Students' ordered evaluation statements in a manner that resists such regression toward the mean. A significant advantage of the method is that is extremely simple to explain to Users: the method simply selects that Evaluation Statement which appears most commonly in the Group. The deceptive simplicity of this method renders surprising its effectiveness at maintaining high-dispersion recommendations. The effectiveness of this "Plurality Method" arises from the following two circumstances:

1. The set of all Population Vectors $v = (v_{poor}, v_{intermediate}, v_{good})$ satisfying $v_{poor} + v_{intermediate} + v_{good} = 1$ forms an equilateral triangle in the three-dimensional space of all vectors (x, y, z); and
2. The Plurality Method divides this set symmetrically into three regions $A_{poor}$, $A_{intermediate}$, and $A_{good}$, all having the same area:
  $A_{poor} = \{(x, y, z) : x > y \text{ and } x > z\}$
  $A_{intermediate} = \{(x, y, z) : y > x \text{ and } y > z\}$
  $A_{good} = \{(x, y, z) : z > x \text{ and } z > y\}$.

Population Vectors drawn from the region $A_{poor}$ are assigned the Group Evaluation Statement "Poor" by the Plurality Method; Population Vectors drawn from the region $A_{intermediate}$ are assigned the Group Evaluation Statement "Intermediate" by the Plurality Method; and Population Vectors drawn from the region $A_{Good}$ are assigned the Group Evaluation Statement "Good" by the Plurality Method. With no one region having greater area than any other, the assignments have "equal representation"—at least, absent any knowledge of the actual distribution of Evaluation Statements within typical Groups—and therefore enjoy high dispersion.

Embodiment

Growth-based Recommendations for Groups

Just as there does not exist in the prior art a method of prioritizing Skills within a diagnostic Student report so that the Users' attention is drawn first to those Skills in which rapid growth may be possible, there also does not exist in the prior art a method of making growth-based recommendations for Groups of Students. In this embodiment, an easily understood method for making such recommendations within the Aggregation Analyzer 136 is described.

Given the Skill Score Vectors $s=(s_1^j, s_2^j, \ldots, s_m^j)$ for each Student j in a Group, the code executed within the Aggregation Analyzer 136 can simply calculate the average Skill Score of the Group in each Skill k:

$$s_k^{avg} = g^1(s_k^1 + s_k^2 + \ldots s_k^g)$$

where $s_k^j$ is the Skill Score in Skill k for the $j^{th}$ Student in the Group, and the Group contains g Students. The code can then calculate the Group's Room to Grow™ points in each Skill, using whichever Room to Grow™ function ρ has been implemented in the Student Skill Performance Evaluator (see step 1266 as well as the description thereof given during the description of the Room to Grow™ Mapping $\mu_{RTG}$), selecting the Group's Evaluation Statement in each Skill ('Room to Grow™ Skill' or 'Not a Room to Grow™ Skill') based on Room to Grow™ points, again by whichever method has been implemented in the Student Skill Performance Evaluator (see steps 1268 and 1270).

4.H. Statistics Summarizer

Users typically want to see a wide of range of data about the performance of Students and Groups on Tests. Therefore, it is important that a system and method for processing and displaying test results perform all the necessary calculations to produce the displays of Test Results approved by the Client.

The Client specifications, called "Data Requirements for Results Reports", are stored in the Information Repository 114. The Statistics Summarizer 138 uses these requirements to determine the types of data calculations needed to be performed, performs these calculations on data stored in the Information Repository 114, and then stores the final data in the Information Repository, so that the Report Generator 144 can retrieve the final data and generate the appropriate types of displays.

The Statistics Summarizer 138 is activated in step 630 as follows: After the Aggregation Analyzer 136 is completed, the Operator of the Aggregation Analyzer 136 notifies the Operator of the Analysis Module 120. The Operator of the Analysis Module 120 then notifies the Operator of the Statistics Summarizer 138 who activates the Statistics Summarizer 138.

FIG. 14*a* illustrates the method of operation of the Statistics Summarizer 138:

In step 1480, the Operator of the Statistics Summarizer 138 executes code, which retrieves from the Information Repository 114 the Data Requirements for Results Reports. The Data Requirements for Result Reports are text files that specify what data is needed in order to generate each display that concerns Student Test Results. For example, a Client may want to display how a specific Group of Students (as defined by gender, race, or socioeconomic status) performed in a specific Skill. The required data here would include numerical and qualitative information about each Student's performance in each Skill, as well as information that will enable the appropriate Group of Students to be identified.

Based on the information retrieved in step 1480, the Operator in step 1482 determines which data calculations need to be performed. For example, if the Data Requirements for Results Reports include a requirement that a group's overall math performance be shown as the percentage of girls who passed versus the percentage of boys who passed, then the data calculations would be simply to (a) divide [the number of girls who passed] into [the total number of girls] to obtain a percentage, and (b) divide [the number of boys who passed] into [the total number of boys].

In step 1484, the Operator searches the Code Library 222 for code to implement the statistical calculations. In the above example, the code sought would be quite simple: merely the ability to divide one number into another and calculate a percentage.

Obviously, more complex calculations will be needed depending on the Data Requirements for Results Reports. For example, it might be necessary to calculate trends in Students' overall percentage correct across past administrations of similar Tests. Similarly, the Statistics Summarizer 138 might calculate "disaggregated data" that breaks down by Group of Students, such as the percentage of students of each race (or by other category such as gender, socioeconomic class, etc.) who have been deemed to meet that state's educational standards in the Subject of the Test. Indeed, one skilled in the art will recognize that many possible data calculations will involve much more sophisticated processes, such as obtaining standard deviations, stanine scores, and linear regressions, and therefore more sophisticated code.

In step 1486, the Operator determines whether all necessary code exists. If not, then the Operator adds the necessary code to the code library in step 1488. The Operator can do this by programming code or by obtaining the code from elsewhere, including by purchase.

In step 1490, having determined that the necessary code exists, the Operator loads the code from the Code Library 222, and in 1492 the Operator executes the code. When executed, the code retrieves Test information from the Information Repository 114 and performs the necessary calculations, according to the specifications provided in the Data Requirements for Results Reports. Finally, in step 1494, the code writes this information to the Information Repository.

Physically, the Statistics Summarizer 138 may consist of: (a) a human Operator who follows the flowchart FIG. 14*a* to operate the Statistics Summarizer 138 when notified to do so by the Analysis Operator; (b) one or more desktop computers 218 with network access to the Data Servers 214 and to one or more application servers 220 running commercial analysis software (such as SAS®, SPLUS®, Mathematica®, BILOG®, etc.); and (c) a Code Library 222, which is simply an electronic file storage system (such as a hard drive) for storing custom-written code as necessary for implementing different components of the Statistics Summarizer.

4.I. Content Manager

The Content Manager 140 ensures that the Content Repository 116 contains all of the content that will be required for creating Instructional Response Reports in step 1622.

Figure 15:
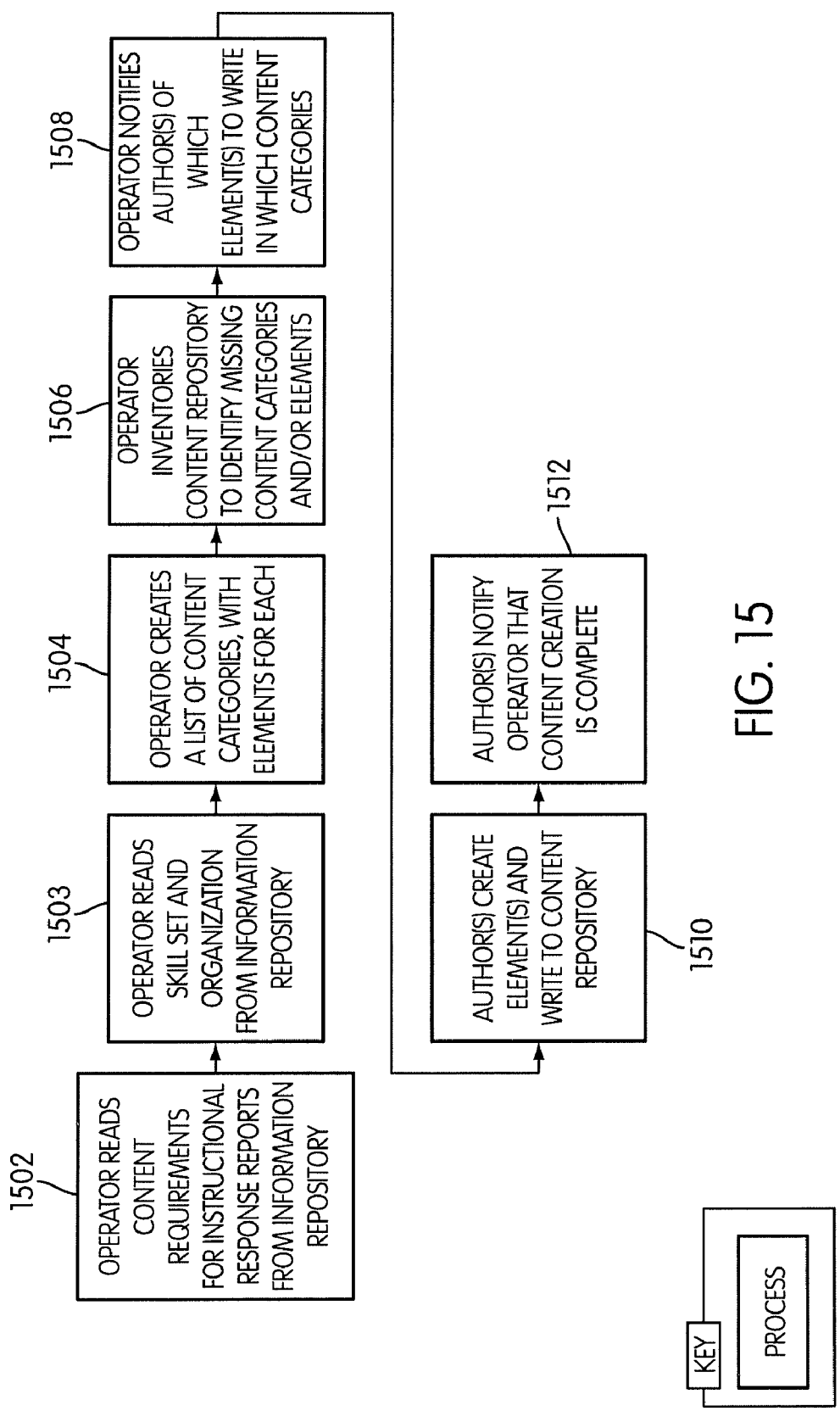
FIG. 15 is a flowchart illustrating the operation process of the Content Manager component of the system.

FIG. 15 is a flowchart illustrating the process of operation of the Content Manager 140.

The Content Manager 140 may consists physically of (a) a human Operator who performs the steps indicated in the flowchart FIG. 15 when notified in step 632 to do so by the Analysis Module Operator; (b) a Content Management Computer 224, with network access to the Content Server 234, which is used by the Content Manager Operator; (c) one or more Authors, who create new content when notified in step 1508 to do so by the Content Manager Operator; and (d) one or more Content Authoring Computers 228, with network access to the Content Server 234, used by the Author(s).

In step 1502 the Content Manager Operator reads from the Information Repository 114 the Content Requirements for Instructional Response. The Content Requirements for Instructional Response will specify, among other things, whether the Instructional Response should include content for each Skill in the Skill Set and for each Skill Family in the Organization; whether the Instructional Response should include content for Skills other than those in the Skill Set; whether the Instructional Response should include content for Skill Families or other larger groupings of Skills in the Organization and/or outside of the Organization; whether the Instructional response should include content other than that associated with subject areas, such as content intended to help Users integrate the Reports into their workflow, whether that workflow consists of teaching, training teachers, supervising teachers, tutoring Students, or Studying; and so on.

In the most common case, the Content Requirements for Instructional Response will mandate, among other things, an Instructional Response that includes content for each Skill in the Skill Set and for at least some Skill Families in the Organization. Thus in step 1503 the Content Manager Operator reads the Skill Set and Organization from the Information Repository 114.

Using the Content Requirements for Instructional Response and the Skill Set and Organization, the Content Manager Operator creates in step 1504 a list of required "Content Categories," along with specified "Elements" for each. These terms are explained next.

A Content Category is a subject-matter heading for content that will be delivered to Users in the form of Instructional Responses. Thus, a partial list of Content Categories for fourth-grade mathematics might look like the following:

1. Addition and Subtraction
2. Addition and Subtraction-Computation
3. Addition and Subtraction-Problem Solving
4. Problem Solving in Mathematics
5. Holding grade-wide conferences with Teachers
6. Doing math with your child
7. Differentiated instruction An Element is a potential component of an Instructional Response associated with a given Content Category. Different Content Categories naturally have different Elements that are germane to them, as in this partial example (Elements are listed here in no particular order):

| Content Category | Element | Element | Element | Element | Element | ... |
|---|---|---|---|---|---|---|
| Addition and Subtraction | Explanation of category | Common student difficulty | Diagnostic Problem | Activity for Students Likely to Be Ready for Advanced Work | Activity for Students Likely to Need Help With Fundamentals | |
| Addition and Subtraction-Computation | Explanation of category | Lesson Plan | Common student difficulty | Practice problem | Diagnostic problem | ... |
| Addition and Subtraction-Problem Solving | Explanation of category | Lesson Plan | Common student difficulty | Practice problem | Diagnostic problem | ... |
| Problem Solving in Mathematics | Explanation of category | Lesson plan | Common student difficulty | Practice problem | Diagnostic problem | ... |
| Holding grade-wide conferences with Teachers | Motivation for a gradewide conference | Planning a gradewide conference | Questions to ask teachers in a gradewide conference | ... | | |
| Doing math with your child | Motivation for doing math with your child | Practice problem | Book list | ... | | |
| Differentiated Instruction | Theory of differentiated instruction | Using differentiated instruction in your classroom | Help teachers in your school use differentiated instruction | | | |

The breakdown of instructional content into Content Categories, with various Elements native to each, allows different Users to receive arrays of content that are not only targeted to their particular role within the educational system, but that also are tightly tied to the Skills being tested, and that, in addition, allow a given Content Category to be presented to Students at range of different levels—in fact, at the same range of levels reported to users in the Test Results as levels of mastery.

Some Elements may be understood within the Content Manager 140 as having sub-Elements as well; for example, a "Practice Problem" Element may necessarily connote a collection of sub-Elements consisting of a Problem Statement, one or more Solution Methods, and one or more Answers.

With the list of required Content Categories and Elements as a reference, the Content Manager Operator in step 1506 inventories the Content Repository 116 to identify which required Elements of which required Content Categories cannot be found there. Depending on the physical instantiation of the Content Repository 116, this inventory may be carried out in different ways, for example by clicking through a directory structure or querying an XML database.

Based on the results of this inventory, the Content Manager Operator in step 1508 notifies one or more Authors of the Elements that must be authored. In step 1510 the Author(s) use the skills of their art to create these Elements and write them to the Content Repository 116. Finally, in step 1512 the Author(s) notify the Content Manager Operator that content creation is complete.

Glossary of Technical Terms

The definitions and notation presented in this Glossary are intended to clarify and standardize the descriptions of the Analysis Module's components.

>Item Score

For each Item, the Item Score is a number that represents a given Student's level of accomplishment on a particular Test item. For a multiple-choice Item, the Item Score is typically 0 or 1. For constructed-response Items, the Item Score typically ranges from 0 to some integer greater than 1.

>Item Score Range, $H(\tau_i)$

The Item Score Range $H(\tau_i)$ is a set of real numbers giving the range of possible Item Scores for Item $\tau_i$, as stipulated by the Scoring Guide. For example, we might have $H(\tau_1)=\{0,1\}$ for a multiple-choice item $\tau_1$, and $H(\tau_2)=[0,3]$ for a 'three-point question' $\tau_2$.

>Weight of an Item

The top score of the Item Score Range is known as the weight of Item $\tau_i \in T$, and is denoted $W_i > 0$. The weight of each Item may be stipulated by the designer of the Test, or by the agency giving the Test, or by another external entity. Among common motivations for the weighting are (a) correspondence to the perceived difficulty of the different Items, or (b) correspondence to the expected time required for the different Items. For example, the Test may have been created such that each multiple choice Item has a weight 2 and each constructed response (e.g., short answer or essay) Item has a weight of 5.

>Item Score Vector, $y=(y_1, \ldots, y_n)$

An Item Score Vector is an ordered n-tuple of numbers $y=(y_1, \ldots, y_n)$, where the $i^{th}$ number $y_i$ represents a Student's Item Score for the $i^{th}$ Item on the Test. Note that $y_i \in H(\tau_i)$ for each i, and that y is therefore an element of the n-fold Cartesian product $$H(\tau_1) \times H(\tau_2) \times \ldots \times H(\tau_n).$$

>Logical Space of Item Score Vectors, H

Any logically-possible Student Item Score Vector y must be an element of the n-fold Cartesian product $$H = H(\tau_1) \times H(\tau_2) \times \ldots \times H(\tau_n).$$

The space H is therefore called the Logical Space of Item Score Vectors.

>Actual Space of Item Score Vectors, Y

The Actual Space of Item Score Vectors $Y \subseteq H$ is defined as $$Y = \cup \{y_j\} : j=1, \ldots, p$$

where $y_j \in H$ is the Item Score Vector of the $j^{th}$ Student taking the Test. To put it another way, a vector $y \in H$ is a member of the Actual Space of Item Score Vectors Y iff there exists at least one Student who obtained y as his or her Item Score Vector. Not every Item Score Vector in H will be found among the p Item Score Vectors of Students taking the Test. For example, in a very difficult test, it may happen that no Student attains the Item Score Vector $y^{perfect}=(y_1^{max}, \ldots, y_n^{max})$ where $y_i^{max}=\max(H_i)$. For purposes of algorithmic efficiency, it is often beneficial to ignore many of the logically possible Item Score Vectors, and to work with the relatively small set of Item Score Vectors actually obtained by Students taking the Test. On the other hand, it is usually easier to define algorithms and mappings in terms of the larger space, restricting attention to the smaller space during implementation.

>Skill Set, $S_T$

A Skill Set $S_T$ is a set of Skills, posited as being necessary and sufficient for successfully responding to the Items on Test T. The number of Skills in a Skill Set $S_T$ will always be denoted m. As a matter of convention, the index k will always range over the values 1, 2, . . . , m. Thus, any quantity with a subscript k refers to a particular Skill in the Skill Set $S_T$.

>Coding Matrix, $Q(S_T, T)$

A Coding Matrix $Q(S_T, T)$ is an m-by-n matrix of non-negative numbers $Q_{ki}$ in which rows correspond to Skills in a Skill Set $S_T$, and columns correspond to Items on the Test T. Typically, the matrix element $Q_{ki}$ lies in the interval [0,1] and is posited as representing numerically the degree to which the $i^{th}$ Item in Test T assesses the $k^{th}$ Skill in $S_T$. For example, in the special case in which each Item assesses a single Skill, the Coding Matrix will consist only of 0's and 1's, with a single 1 appearing in each column. A Coding Matrix is sometimes called a Q-matrix, except that a Q-matrix traditionally contains as matrix elements only 0's and 1's. A Raw Coding Matrix is a Coding Matrix that reflects purely pedagogical judgment. A Refined Coding Matrix is a Coding Matrix that takes into account both pedagogical judgment and statistical features of Students' responses to Items on the Test.

>Skill-Specific Item Score

If the symbol $\tau_k^i$ denotes the $i^{th}$ Test Item requiring Skill k—where an Item i is said to "require" a Skill k whenever the relevant matrix element $Q_{ki}$ of the Refined Coding Matrix is Nonzero—then a Student's Score on Test Item $\tau_k^i$ is correspondingly denoted $y_k^i$ and called a Skill-Specific Item Score. Note that each $y_k^i$ is one of the Item Scores $y_i$ in the Student's Item Score Vector y.

>Skill-Specific Item Score Vector, $y_k=(y_k^1, y_k^2, \ldots, y_k^{l(k)})$

If (k) denotes the number of Items on a Test requiring Skill k, then the ordered (k)-tuple of Skill-Specific Item Scores $y_k^i$ for a fixed Skill k is called the Skill-Specific Item Score Vector and denoted $y_k$. Intuitively, the Skill-Specific Item Score Vector $y_k$ is just that part of the Student's Item Score Vector y that pertains to the particular Items requiring Skill k.

>Logical Space of Skill-Specific Item Score Vectors, $H_k$

Any logically-possible Skill-Specific Item Score Vector $y_k$ must be an element of the (k)-fold Cartesian product $$H_k = H(\tau_k^1) \times H(\tau_k^2) \times \ldots \times H(\tau_k^{(k)}).$$

The space $H_k$ is therefore called the Logical Space of Skill-Specific Item Score Vectors. $H_k$ is the analogue of the Logical Space of Item Score Vectors H, except this time for a specific Skill $S_k \in S_T$.

>Actual Space of Skill-Specific Item Score Vectors, $Y_k$

For a given Skill $S_k \in S_T$, the Actual Space of Skill-Specific Item Score Vectors $Y_k \subseteq H_k$ is defined as $$Y_k = \cup \{y_{kj}\} : j=1, \ldots, p,$$

where $y_{kj} \in H_k$ is the Skill-Specific Item Score Vector for Skill $S_k$ of the $j^{th}$ Student taking the Test. To put this another way, a vector $y_k \in H_k$ is a member of the Actual Space of Skill-Specific Item Score Vectors $Y_k$ for Skill $S_k$ iff there exists at least one student who obtained $y_k$ as his or her Skill-Specific Item Score Vector for that Skill. Not every Skill-Specific Item Score Vector in $H_k$ will be found among the p Skill-Specific Item Score Vectors of Students taking the Test. For example, in a very difficult test, it may happen that no Student attains the Skill-Specific Item Score Vector $Y_k^{perfect}=(y_{k\,max}^1, \ldots, y_{k\,max}^{(k)})$ where $y_{k\,max}^i \equiv \max(H(\tau_k^i))$.

> Item Score Array, $\psi$

When all m of a Student's Skill-Specific Item Score Vectors $y_k$ are collected together, the resulting collection of numbers is called an Item Score Array, and denoted $$\psi = \begin{pmatrix} y_1 \\ y_2 \\ \partial \\ y_m \end{pmatrix}.$$

Item Score Arrays are two-dimensional arrays, but they are not rectangular, because each Skill may have a different number (k) of Items Assessing it.

> Logical Space of Item Score Arrays, H

Any logically-possible Item Score Array $\psi$ can be regarded as an element of the m-fold Cartesian product $$H \equiv H_k \times H_k \times \ldots \times H_k.$$

The space H is therefore called the Logical Space of Item Score Arrays.

> Actual Space of Item Skill Arrays, $\Psi$. The Actual Space of Item Skill Arrays $\Psi \subseteq H$ is defined as $$\Psi = \cup \{\psi_j\} : j=1, \ldots, p$$

where $\psi_j \in H$ is the Item Score Array of the $j^{th}$ Student taking the Test. To put it another way, an Item Skill Array $\psi \in H$ is a member of the Actual Space of Item Skill Arrays $\Psi$ iff there exists at least one student who obtained $\psi$ as his or her Item Skill Array.

> Skill Score, $s_k$

A Skill Score $s_k$ is any number reflecting a Student's performance in a particular Skill $S_k \in S_T$.

> Obtained Skill Score in a Skill

A number x is called an Obtained Skill Score in a Skill if there is at least one Student who has obtained a Skill Score $s_k = x$ for the Skill in question.

> Set of Obtained Skill Scores in a Skill, $O_k$

For each Skill $S_k \in S_T$, there are finitely many Obtained Skill Scores. We denote these numbers by $o_k^1, o_k^2, \ldots, o_k^{r(k)}$. Here, r(k) represents the number of Obtained Skill Scores in Skill k. The superscript indices are understood to be assigned in such a way that $o_k^1 \leq o_k^2 \leq \ldots \leq o_k^{r(k)}$ for each k. The set $$O_k = \{o_k^1, o_k^2, \ldots, o_k^{r(k)}\}$$

is called the Set of Obtained Skill Scores in Skill k.

> Skill Score Vector, s

A Skill Score Vector $s=(s_1, \ldots, s_m)$ is an ordered m-tuple of numbers, where the $k^{th}$ number represents the Skill Score $s_k$ for the $k^{th}$ Skill in the Skill Set $S_T$. Note that each component $s_k$ of s is an element of the relevant set of Obtained Skill Scores $O_k$.

> Logical Space of Skill Score Vectors, U

Any logically-possible Skill Score Vector s must be an element of the m-fold Cartesian product $$U = O_1 \times O_2 \times \ldots \times O_m.$$

The space U is therefore called the Logical Space of Skill Score Vectors. U is the analogue of the Logical Space of Item Score Vectors H, but this time the scores in question are Skill Scores, not Item Scores.

> Actual Space of Skill Score Vectors, S

The Actual Space of Skill Score Vectors $S \subseteq U$ is defined as $S = \cup \{s_j\} : j=1, \ldots, p$, where $s_j \in U$ is the Skill Score Vector of the $j^{th}$ Student taking the Test. To put it another way, a vector $s \in U$ is a member of the Actual Space of Skill Score Vectors S iff there exists at least one student who obtained s as his or her Skill Score Vector for that Skill.

> Skill Score Mapping, $\sigma$

A Skill Score Mapping is any mapping $\sigma: \Psi \to \nabla^m$. Symbolically, the action of $\sigma$ is given by $\sigma(\psi)=s$. In words, a Skill Score Mapping converts an Item Score Array $\psi \in \Psi$ into a Skill Score Vector $s \in S$. Note that the Actual Space of Skill Score Vectors S is the image of the Actual Space of Item Score Arrays $\Psi$ under the mapping $\sigma$: $S = \sigma(\Psi)$.

> Factorizable Skill Score Mapping, $\sigma = (\sigma_1, \ldots, \sigma_m)$

A Skill Score Mapping a: $\Psi \to \nabla^m$ is said to be Factorizable if there exist mappings $\square_k: H_k \to \nabla$ so that $$\sigma((y_1, y_2, \ldots, y_m)) = (\sigma_1(y_1), \sigma_2(y_2), \ldots, \sigma_m(y_m))$$

for each $\psi = (y_1, y_2, \ldots, y_m)$ in H. When the action of a does not decompose in this way, we say that $\sigma$ is non-Factorizable. A convenient notation for a Factorizable Skill Score Mapping is $\sigma = (\sigma_1, \ldots, \sigma_m)$ > Total Weight in a Skill, $w_k$ Given a Coding Matrix $Q(S_T, T)$ with matrix elements $Q_{ki}$, the Total Weight in Skill k is $$w_k = \Sigma [Q_{ki} : i=1, \ldots, n].$$

For example, in the special case in which all Items are multiple-choice Items with Item Score Ranges $\{0,1\}$, and in which no single Item assesses more than one Skill, the Total Weight in a Skill $w_k$ is simply equal to the total number of Items assessing Skill k.

> Generalized Percent Correct in a Skill, $C_k$

Given a Coding Matrix $Q(S_T, T)$ with matrix elements $Q_{ki}$, along with a particular Student's Item Score Vector y, that Student's Generalized Percent Correct in Skill k is $$c_k = w_k^{-1} \Sigma [Q_{ki} y_i : i=1, \ldots, n].$$

For example, in the special case in which all Items are multiple-choice Items with Item Score Ranges $\{0,1\}$, and in which no single Item assesses more than one Skill, the Generalized Percent Correct Ck is equal to the number of Items Assessing Skill k answered correctly by the Student, divided by the total number of Items Assessing Skill k.

> Score-Statement Mapping, $\mu$

A Skill Score Mapping $\mu_R$ is any mathematical function $\mu$: $S \to E(R)$ that transforms a Student's Skill Score Vector $s = (s_1, \ldots, s_m)$ into a Vector of Evaluation Statements $e = (e_1, \ldots, e_m)$. Here, $s_1$ denotes the Student's Skill Score for Skill 1 and $e_1$ denotes the Student's Evaluation Statement for Skill 1, drawn from the Range of Evaluation Statements R. Usually the Range of Evaluation Statements under discussion is understood, so $\mu_R$ is simply written $\mu$.

> Factorizable Score-Statement Mappings, $\mu = (\mu_1, \ldots, \mu_m)$

A Score-Statement Mapping $\mu: S \to E(R)$ is said to be Factorizable when it "treats Skills independently," i.e., when there exist m Skill-specific mappings $$\mu_k : O_k \to R$$

such that the action μ(s)=e decomposes as $$\mu((s_1, s_2, \ldots, s_m)) = (\mu_1(s_1), \mu_2(s_2), \ldots, \mu_m(s_m))$$

for every s∈U. Intuitively, a Factorizable Score-Statement Mapping is one that considers each Skill independently; whereas a Non-Factorizable Score-Statement Mapping is one that "takes the entire Skill Score Vector into account." When the mappings $\mu_k$ exist, it will be said that "μ Factorizes." An economical notation for a Factorizable Score-Statement Mapping is $\mu = (\mu_1, \ldots, \mu_m)$.

5. Display Module

The system and method of the Display Module 142 are designed to address very specific problems in the current systems and methods of displaying Student Test Results and associated instructional information. Namely, existing display processes do not present Users with the data and information that they need in order to respond to Students' needs. Some of these problems are as follows:

First, current display methods do not utilize simultaneous print and Internet delivery of information. In particular, current methods fail to invite Users online via printed reports that include passwords for accessing an account on the Internet to see additional information presented electronically.

Second, current display methods do not provide critical instructional information to Users together with the Test Results. Therefore, they fail to render the Test Results meaningful for Users who seek to take action in response to students' instructional needs as revealed by the Test.

Third, current display methods do not permit Users to navigate between critical information easily. For example, in current methods of electronic display, an Educator cannot click on a Skill name to see her class's Student-by-Student breakdown in that Skill.

Fourth, current display methods do not permit Users to track Students' progress in Skills over time using diagnostic measures that are simple and efficient to implement.

The Display Module 142 addresses each of these issues using systems and methods not previously employed in the current art.

It is important to understand that the application of the Display Module 142 need not be integrated with the application of the Analysis Module: Although the Display Module 142 obviously can display the Test Results produced by the Analysis Module 140, the Display Module 142 alternatively could take as its input any type of Test Results that are stored and organized within the Information Repository 114.

For example, some methods of computerized testing (such as methods known as "adaptive testing") assess different Students with different Items, and complex scoring methodologies are used to generate Scores that are comparable across Students. Provided that Aggregate and Skill-Specific Scores are stored in the Information Repository 114 together with the other requisite information such as Student Identifying Information and Associative Information, the Display Module 142 can display such Scores in the same way that it displays the Scores generated from a Test in which all Students take the same Items.

The Display Module 142 consists of three components: the Report Generator 144, the Print Displayer 150, and the Electronic Displayer 152. The system and method of each of these components is described in detail below.

5.A. Report Generator

After the Analysis Module 120 is completed in step 304, the System Operator is notified and notifies the Display Operator to activate the Display Module 142 in Step 306. The Display Operator then notifies the Report Generator Operator, which initiates the Report Generator process by activating the Results Report Generator in step 1602, as shown in FIG. 16. The Display Operator may be an individual or a computer operating according to a script. The Report Generator Operator is typically one or more individuals.

The Report Generator 144 consists of two subcomponents: the Results Report Generator 146 and the Instructional Response Report Generator 148. It is not necessary for both of these report generators to run, although it may be advantageous if Users see Test Result information together with information about how Users can respond instructionally to students' needs.

These subcomponents of the Report Generator 144 extract information from the Information Repository 114 and Content Repository 116 respectively, and they assemble that information into electronic reports called respectively Results Reports and Instructional Information Reports. (FIG. 5-2 illustrates the key components held in the Report Repository 506: namely the Results Reports 576, Instructional Response Reports 578, Print Templates 580, and Electronic Templates 582. These components are each discussed more fully below.) The Print Displayer 150 and Electronic Displayer 152 then utilize these reports to create displays viewed by Users.

One important benefit of the method described here, of course, is that a single electronic report can be used to generate a particular display in print and a display on the Internet. Because the electronic report functions as a single source for both types of displays, this helps eliminate the possibility of data being inconsistent between a print and electronic display of the same report. In addition, this method takes advantage of efficiencies in parallel processing, as the Results Reports and Instructional Reports can be produced concurrently, rather than sequentially.

Even more important, the system and method described here enable flexible processing and display of Test Results and instructional materials so that the displays can be generated in multiple formats and media for various Users, according to the demands of the Client.

5.A.1. Results Report Generator

The Results Report Generator 146 extracts information from the Information Repository 114 in order to create electronic reports that describe Student Test Results in a particular manner. These so-called "Results Reports" can take various forms. For example, a Result Report could be generated on each class in a school, showing the national percentile ranking of each Student in that class based on the Students' performance on a Test. There are many other potential illustrations of data performance, however, which may be accommodated in order to satisfy the demands of the Users of Test Results.

The method employed by the Results Report Generator 146 comprises several steps, as detailed in flowchart form in FIG. 16:

After the Results Report Generator 146 is activated by the Report Generator Operator in step 1602, the Results Report Generator 146 retrieves the Data Requirements for Results Reports from the Information Repository 114 in step 1604.

As explained in the description of the Intake Module 102, the Data Requirements for Results Reports are electronic specifications that detail the data needed to generate each display concerning Student Test Results that the Client wants shown to Users.

For example, a Client may wish for teachers to see their students' national percentile rank in a given Subject and Level of a Test. In that case, the required data would be the Student's names, the Subject and Level of the Test, and each Student's national percentile rank in that Test, in addition to the associative information needed to link the particular Students with a class, teacher, and school.

In a more involved case, the Client may want to display how a specific Group of Students (as defined by gender, race, or socio-economic status) performed in a specific Skill, plus recommendation statements about how a teacher should proceed in teaching each Student about that Skill. The required data here would include numerical and qualitative information about each Student's performance in each Skill, as well as information that will enable the appropriate Group of Students to be identified.

For purposes of clarity, here is a list of the Data Requirements of certain displays that may be offered to the Client for inclusion in the Data Requirements for Results Reports.

Displays of "Overall Performance of Students" are visual depictions of the following information fields at a minimum:
  Student Identifying Information for each Student
  Student Associative Information for each Student
  Student Overall Performance Information for each Student
  These displays also could depict other information fields, such as:
  Student Demographic Information for each Student
  Student Performance History for each Student Displays of "Overall Performance of Groups" are visual depictions of the following information fields at a minimum:
  Group Identifying Information for each Group
  Group Associative Information for each Group
  Group Overall Performance Information for each Group
  These displays also could depict other information fields, such as:
  Group Demographic Information for each Group
  Group Performance History for each Group Displays of "Skill Profile of a Student" are visual depictions of the following information fields at a minimum:
  Student Identifying Information for each Student
  Student Associative Information for each Student
  Scores by Skill for each Student and/or Verbal Evaluation Statement by Skill for each Student
  These displays also could depict other fields of information, such as:
  Student Demographic Information for each Student
  Student Performance History for each Student
  Student Overall Performance Information for each Student Displays of "Skill Profile of a Group" are visual depictions of the following information fields at a minimum:
  Group Identifying Information for each Group
  Group Associative Information for each Group
  Scores by Skill for each Group and/or Verbal Evaluation Statement by Skill for each Group
  These displays also could include other fields of information, such as:
  Group Demographic Information for each Group
  Group Performance History for each Student
  Group Overall Performance Information for each Group Displays of "Performance in a Skill across Students" are visual depictions of the following information fields at a minimum:
  Student Identifying Information for each Student
  Associative Information for each Student
  Scores in one or more Skills for each Student and/or Verbal Evaluation Statements in one or more Skill for each Student
  These displays also could depict other fields of information, such as:
  Student Demographic Information for each Student
  Student Performance History for each Student
  Overall Performance Information for each Student Displays of "Performance in a Skill across Groups" are visual depictions of the following information fields at a minimum:
  Group Identifying Information for each Group
  Associative Information for each Group
  Scores in one or more Skills for each Group and/or Verbal Evaluation Statements in one or more Skill for each Group
  These displays also could include other fields of information, such as:
  Group Demographic Information for each Group
  Group Performance History for each Group
  Overall Performance Information for each Group These displays are discussed at greater length in the description of the Electronic Displayer 152 below.

The next step 1606 is for the Results Report Generator 146 to define an electronic document structure for Results Reports based on the Data Requirements.

In order to understand this step more fully, consider the case of a Client that wants the principal of a school to see many tables of the same type, namely tables which show Performance in a Skill across Students, for multiple classes and multiple Skills. Those skilled in the art will recognize that the electronic document structure to be defined in step 1606 advantageously permits incorporation, at a minimum, of the following information:
  Test Event Name
  Group Identifying Information for that Group, including the teacher name and class identification
  Skill Name
  Student names in that Group, associated with the appropriate Verbal Evaluation Statement for each Student in each Skill FIG. 17 uses this example to show how the Report Generator Operator creates an electronic document structure based on particular Data Display Requirements. In that example, Data Display Requirement 1736 specifies various fields, including teacher name 1702, school 1704, subject and level 1706, class 1708, date of test 1710, name of a skill examined 1712, and lists of students assigned each of three Evaluation statements based on their performance in that skill 1714, 1716, 1718.

The Results Report Generator Operator, by means of the judgment of one skilled in the art, transforms the Data Display Requirement into an electronic document structure 1738. Many of the elements of the electronic document structure are simply transpositions from the Data Display Requirements: namely, elements 1720, 1722, 1724, 1726, 1728, and 1729. In the case of student names, however, each of the requirements 1714, 1716, and 1718 is transformed into a structural element to be filled by a string of names 1730, 1732, and 1734.

Figure 17:
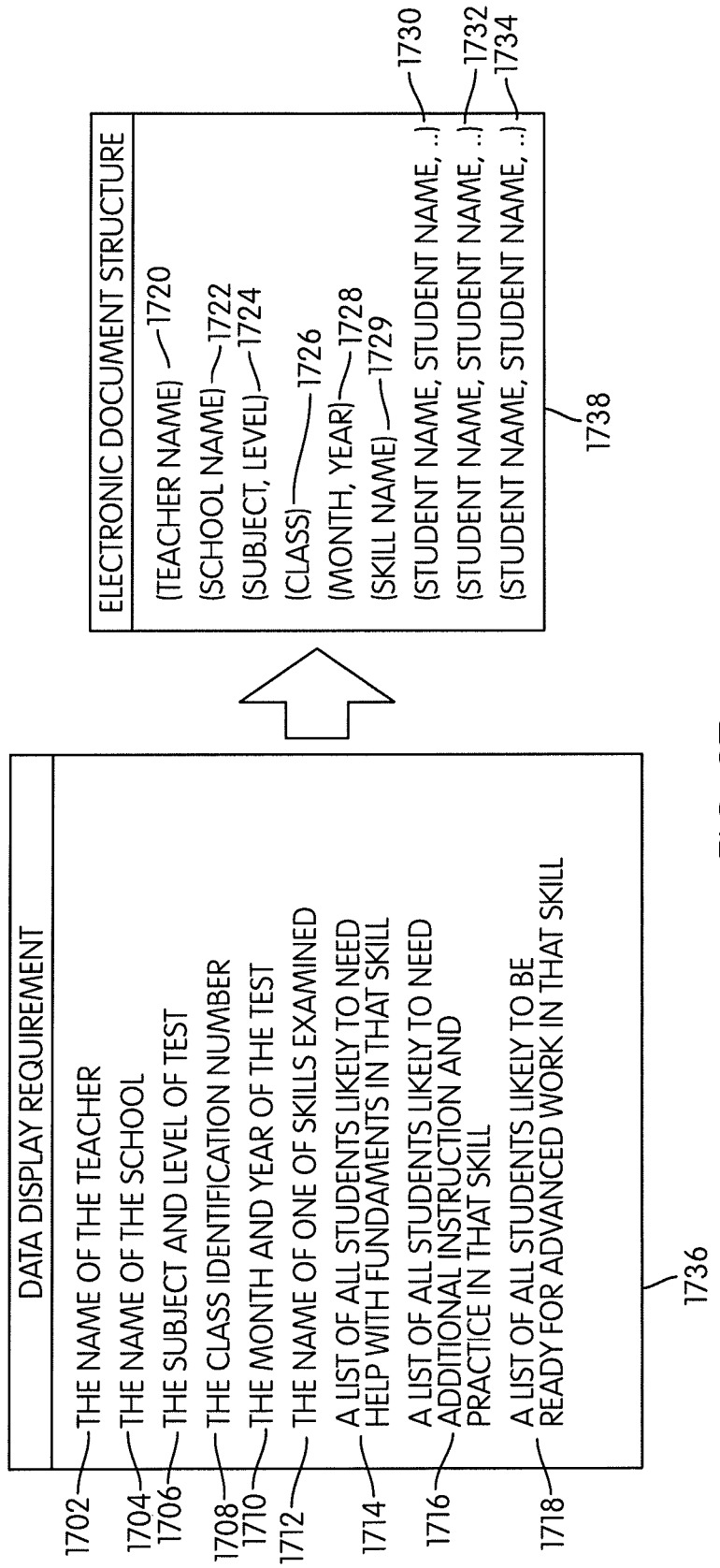
FIG. 17 is a diagram of a Data Display Requirement and a diagram of a corresponding Electronic Document Structure, described in the Display Module component of the system.
Figure 20:
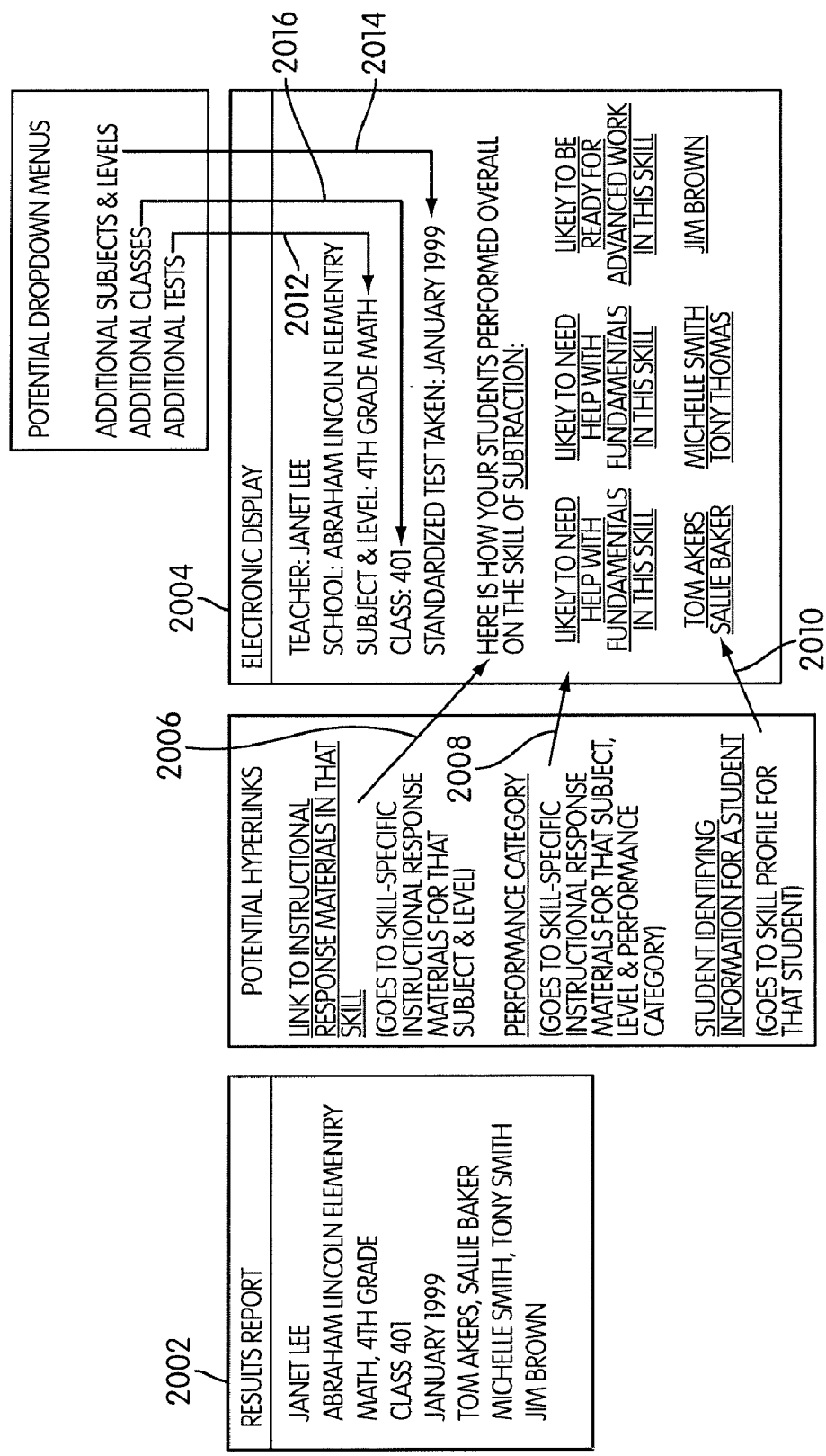
FIG. 20 is a diagram of a Results Report and a diagram of a corresponding Electronic Display, described in the Display Module component of the system.

(Discussed in more detail below, FIG. 20 extends the example shown in FIG. 17, as the particular Data Display Requirement and electronic document structure in FIG. 17 form the basis of the Results Report and ultimately the Electronic Display in FIG. 20.)

The next step 1608 in the operation of the Results Report Generator 146 is to store these electronic document structures in the Report Repository 118. Next, in step 1610, the Results Report Generator 146 extracts Test Result data from the Information Repository 114 (such as the names of Students and their performance on the Test as a whole and individual Skills) and loads that data into electronic document structures to create "Results Reports." These Results Reports will serve as the basis for the displays generated by the Print Displayer 150 and the Electronic Displayer 152.

An optional step 1612 in the operation of the Results Report Generator 146 is to store the Results Reports in the Report Repository 118. This would enable the Results Reports to be accessed at a later date by the Print Displayer 150 and Electronic Displayer 152.

Once the process of the Results Report Generator 146 terminates, the Report Generator Operator notifies the Display Operator.

Physically, the Results Report Generator 146 may function, in one embodiment, as follows:

The Results Report Publishing Computer 236 first obtains the Data Requirements for Results Reports from the Data Servers 214. The Data Servers 214 runs on a UNIX operating system or other commonly used system. The Data Servers 214 typically may be built using a SQL-based database management system (DBMS) such as Oracle® or other type of DBMS. The Results Report Publishing Computer 236 uses database access technologies such as Java Database Connectivity (JDBC) to obtain this information over the internal network.

The Report Generator Operator then uses an editing tool (such as an XML DTD editing tool) to create electronic document structures that reflect the Data Requirements. XML, or eXtensible Mark-up Language, is a widely known, flexible, and platform-independent software language used to create electronic structure documents. DTDs, or Document Type Definitions, are the corresponding language that describes the explicit structure of such documents.

The Results Report Publishing Computer 236 then stores these electronic document structures as DTD files on the Report Server 240. The Report Server 240 operates on a UNIX operating system and stores the DTD in its file system.

Finally, the Results Report Publishing Computer 236 creates individual Results Reports based on a DTD. Java technology is used to extract the Test Result information from the Data Servers 214, and Java and XML technology are used to transform the data based on the rules defined by the DTD and create Results Reports in the form of XML documents.

The Results Report Publishing Computer 236 typically stores these Results Reports in a hierarchical structure (for example organized by teacher/low-level administrator, high-level administrator) on the Report Server 240. These Results Reports could be stored using a file system or a XML-based database management product.

5.A.2. Instructional Response Report Generator

The Instructional Response Report Generator 148 is analogous to the Results Report Generator 146. Just as the Results Report Generator 146 creates Results Reports that are used to display information concerning the Test Results, so the Instructional Response Generator 148 creates electronic Instructional Response Reports that are then used to display suggested Instructional Response Materials based on Student and Group performance.

This function responds to a critical problem in the existing methods of displaying Test Results: Existing methods do not provide Educators with relevant instructional information to address the needs of their Students revealed by their Students'-Test Results. This is unfortunate, because the moment in which Test Results are reported is an ideal time at which to communicate with Educators about recommended instructional courses of action.

The deficiency in existing methods is evident. For example, in U.S. Pat. No. 5,934,909, Ho et al. describe a method in which the results of individually-tailored tests are used to create a list of additional questions in areas of Students' weakness. This information, however, does not provide Educators with guidance about how to instruct their Students in these areas.

Likewise, in U.S. Pat. No. 6,270,351, Roper describes an individual education program tracking system. This system involves the generation of reports describing a Student's educational priorities among various disciplines. However, these reports are not based on an analysis of a student's standardized test scores, and so the reports do not address Students' actual strengths and weaknesses within a given subject. Furthermore, the reports do not include any instructional recommendations that an Educator can use in teaching the Students.

Furthermore, organizations that display basic Test Result information for Students and Groups do not display Instructional Response Material based upon Students' actual results. For example, one existing organization offers a test reporting application on CD-ROM, but this application does not provide instructional recommendations in the various Skills that take into account the different performance levels of Students in those Skills.

What is needed, therefore, is a system for (1) taking instructional content concerning the Subject of the Test and the particular Skills examined and (2) displaying instructional information for Educators with regard to Students and Groups in a manner that is integrated with the presentation of the Test Results themselves.

The operation of the Instructional Response Report Generator comprises several steps:

After activation in step 1614, the Instructional Response Report Generator 148 retrieves the Content Requirements from the Information Repository 114 in step 1616.

As described in the discussion of the Intake Module 102, the Content Requirements are text files that specify the type of the instructional information that is to be presented along with the Test Results. These requirements may vary by User. For example, the Content Requirements might specify that Users who are Educators receive Instructional Response Materials consisting of lesson plans organized by Skill, while Users who are Students receive Instructional Response Materials consisting of sample problems organized by Skill.

The next step 1618 is for the Instructional Response Report Generator 148 to define an electronic document structure for Instructional Response Reports based on the Content Requirements. This process is analogous to Step 1606 in which the Results Report Generator defines an electronic document structure for Results Reports based on the Data Requirements.

For example, take the case of a Client who wants to provide Users who are Students with sample Test problems that they can work on. In that case, the Content Requirements approved by the Client would state that the material for a Skill contains three sample problems, with two-sentences of explanation about the correct answer to the problem. In that case, the electronic document structure is simply an electronic template that is structured to receive three separate problems with two-sentence explanations.

The Content Requirements approved by the Client may typically vary by Skill: For example, instructional material that is used to teach Skills in math is typically structured quite differently than the instructional material used to teach Skills in social studies.

It is important to note that a Client may approve multiple Content Requirements even for a given Skill, in order to allow the Print Displayer 150 and the Electronic Displayer 152 to show Students different views depending on the Client's determination of students' needs. For example, the Content Requirements for one type of User (i.e., Students) with respect to a given Test could specify two information structures: one presenting the information in English, and another presenting the information in Spanish. In such a scenario, the Content Requirements also may include decision-rule information about which Students may see which type of information. In a similarly way, the Print Displayer 150 can query the database and, based on any manner of information stored there, determine for each Student whether to create a display of sample problems or fun activities.

Next, in step 1620, the Instructional Response Report Generator 148 stores the electronic document structures for the Instructional Response Reports, as defined by the Content Requirements, in the Report Repository 148.

Next, in step 1622, the Instructional Response Report Generator 148 extracts instructional content (such as the sample problems and explanations) from the Content Repository 116 and inserts it into the electronic document structures to create Instructional Response Reports.

An optional step 1624 in the operation of the Instructional Response Report Generator 148 is to store the Instructional Response Reports in the Report Repository 118. This would enable the Instructional Response Reports to be accessed at a later date by the Print Displayer 150 and Electronic Displayer 152.

Once the process of the Instructional Response Report Generator 146 terminates, the Report Generator Operator notifies the Display Operator.

Physically, the Instructional Response Reports Generator may function, in one embodiment, as follows:

The Instructional Response Report Publishing Computer 246 first obtains the Content Requirements for the Instructional Response Reports from the Data Servers 214. The Data Servers 214 runs on a UNIX operating system or other commonly used system. The Data Servers 214 typically may be built using a SQL-based database management system (DBMS) such as Oracle® or other type of DBMS. The Instructional Response Report Publishing Computer 236 uses database access technologies such as Java Database Connectivity (JDBC) to obtain this information over the internal network.

The Operator then uses an editing tool, such as an XML DTD editing tool, to create electronic document structures that reflect the Content Requirements. XML, or eXtensible Mark-up Language, is a widely known, flexible, and platform-independent software language used to create electronic structure documents. DTDs, or Document Type Definitions, are the corresponding language that describes the explicit structure of such documents.

The Instructional Response Report Publishing Computer 236 then stores these electronic document structures as DTD files on the Report Server 240. The Report Server 240 operates on a UNIX operating system and stores the DTD in its file system.

Finally, the Instructional Response Report Publishing Computer 236 creates Instructional Response Reports based on the DTDs. Java technology is used to extract the instructional content materials from the Content Server 214, and Java and XML technology are used to transform the data based on the rules defined by the DTD and create Instructional Response Reports in XML format.

FIG. 18 shows a portion of an actual Instructional Response Report in XML format 1802. This portion of the report concerns strategies for teaching multiplication and division problem-solving Skills. The strategies are divided according to Student mastery level: strategies for those Students needing help with "Fundamentals" in the Skill 1804; strategies for those Students requiring additional instruction and "Practice" in the Skill 1806; and strategies for those Students ready for "Advanced" work in the Skill 1808. (As presented here for illustration purposes, only the "Practice"-level strategies can be seen in detail; the "Fundamentals"- and "Advanced"-level strategies have not been expanded for full view.)

The Instructional Response Report Publishing Computer 236 stores these Instructional Response Reports in a hierarchical structure (for example organizing the reports in terms of User type, from the Student to Parent to teacher to principal to superintendent) on the Report Server 240. These are typically stored using the file system, but also could be stored using a XML-based database management product.

5.B. Print Displayer

Once the processing of the Results Report Generator and the Instructional Response Report Generator has terminated, the Report Generator Operator notifies the Display Operator. As shown in FIG. 16, the Display Operator then simultaneously activates the Print Displayer 150 in step 1626 and the Electronic Displayer 152 in step 1642. These components use the Results Reports to generate displays for the Users.

In step 1626, the Print Displayer retrieves Print Presentation Requirements from the Information Repository.

Print Presentation Requirements are electronic text files and prototypes that together specify the printed document or documents that a particular type of User may receive. For example, the Print Presentation Requirements may specify that a Student may receive a 2-page document, one side of which is a form letter to the Student's parent from the principal and the other side of which is a "Skill Profile Table", where the particular types of data in that table are specified in the Data Requirements.

The Print Presentation Requirements include all specifications necessary for transforming the raw elements of the Test Results and Instructional Response Materials into printed documents for the Users. These specifications, for example, include the colors and styling to be used on the documents, the page length, and the location of the various displays of Test Results and Instructional Response Materials.

The range of possible formats is familiar to those skilled in the art of data presentation, and includes such means as tables, pie charts, bar charts, scatter plots, and other types of charts, icons, or graphs. In presenting the information, the displays may sort the information by an ordering rule as applied to one or more of the displayed fields.

Based on these specific Print Presentation Requirements, the Print Displayer 150 generates corresponding Print Templates in step 1630 and stores them in the Report Repository 118 in step 1632. Print Templates are electronic documents written in a templating language known to those skilled in the art; their generation can be carried out by the Operator of the Print Displayer 150, or in some cases by a computer that receives as its input specific, electronic Print Presentation Requirements.

Next, in step 1634, the Print Displayer 150 extracts User Print Display Rules from the Information Repository 114. In step 1636, the Print Displayer 150 extracts the Print Templates, Results Reports, and Instructional Response Reports from the Report Repository 118, and, using the User Print Display Rules, the Print Displayer merges the templates with the reports to create an electronic print stream.

This print stream is then sent to a printer for electronic imaging in step 1638, and once that imaging is complete the printed documents may be distributed to Users in step 1640.

FIGS. 19-1, 19-2A and 19-2B show an example of a printed report 1902 produced by this method. This particular printed report 1902 does not include any Instructional Response Materials, only Test Results combined with static explanatory text. The Test Results shown are displays of Students' Overall Performance 1904, the Group's Performance by Skill 1906, and Verbal Evaluation Statements corresponding to the Group's Performance by Skill 1908. (The names in this report 1902 are not the names of actual people.)

This example also shows how the printed documents produced by the Print Displayer can provide the User with access information, so that the User can log on to a computer network and can see the displays produced by the Electronic Displayer. The access information box 1910 shows the User the appropriate website address for viewing the displays produced by the Electronic Displayer, together with a personalized Login ID and Password to enable the User to log onto the website.

In one embodiment, printed documents produced by the Print Displayer (as well as the electronic displays produced by the Electronic Displayer) show Skill families that are produced by the Skill Set Generator 650 (a component of the Item-Skill Analyzer 130). In the example shown above, these Skill families 1912 are grouped appropriately in the numerical chart of the Group's Score in each Skill, as well as in an explanatory section relating each Skill to local educational standards 1914. So for example the Skill family of "Geometry and Measurement" is composed of the individual Skills "Time and Units of Measure" and "Geometric Terms and Shapes".

Those skilled in the art will recognize that displays of Test Results in print (as well as in electronic form) may be quite complex, and they will be able to implement these displays using commercially available software, such as graphing software. The complexity of the displays of Test Results may depend upon the precise Data Requirements for Results Reports as well as the precise Presentation Requirements.

Figures 1, 19:
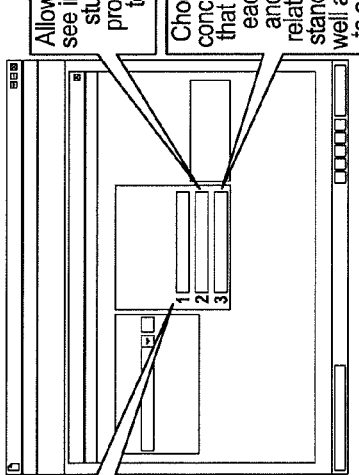
Figure 19A:
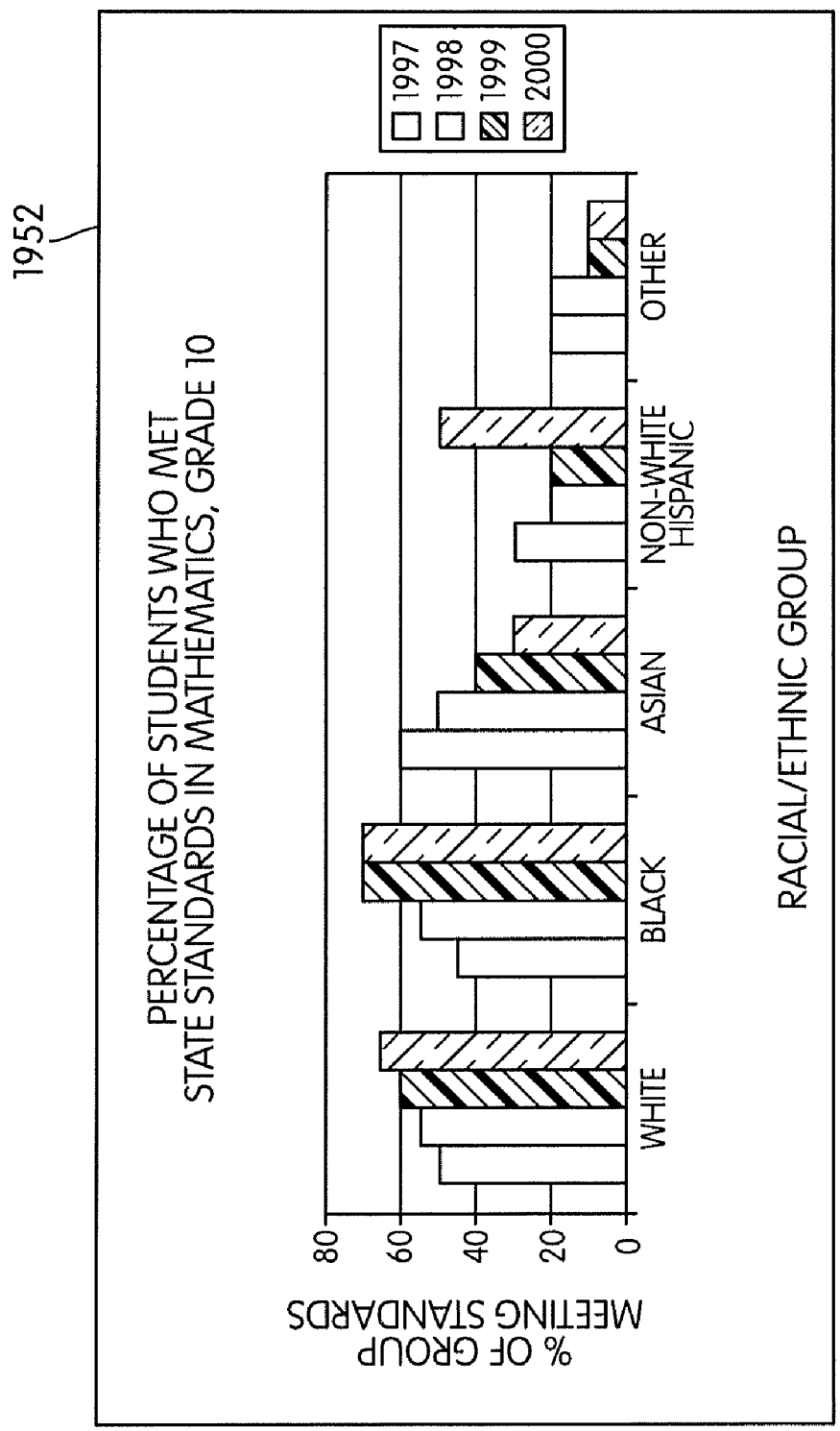
FIG. 19a is a diagram of a complex data display in print, described in the Display Module component of the system.

FIG. 19a is an example of a particular print display. The chart in 1952 is a print display that portrays the percentage of Students in each racial/ethnic group who met grade 10 math standards in each of four years. This chart reflects the Data Requirements for Results Reports (which specify the required percentages for each Group in each year), as well as the Print Presentation Requirements (which specify the chart format and layout.)

The chart in 1952 also illustrates that the Summary Statistics that may be prepared by the Statistics Summarizer 138 often include both "disaggregated" data and "trend data". Disaggregated data is data that reflects breakdowns of Student results according to Groups, while trend data is data that is tracked across time. One skilled in the art will recognize other forms of Summary Statistics that might be demanded as well.

Once the processing of the Print Displayer 150 is terminated, the Display Operator is notified.

Physically, the Print Displayer may function in one embodiment as follows:

The Print Converter Computer 244 retrieves the Print Presentation Requirements from the Information Repository 114 using standard file transfer methods, such as opening a visual display program (e.g., Microsoft Visio®) or a word processing document (e.g., Microsoft Word). These requirements could consist of visual prototypes and text descriptions of what the print documents may look like for each type of User. Based on these Requirements, the Print Display Operator uses a templating language familiar to those skilled in the art such as XSL (extensible Style Language) or other language to create Print Templates, which then are stored as files on the Report Server.

Then Print Converter Computer 244 uses common database methods and file-system operations to retrieve User Print Display Rules from the Information Repository 1634, as well as Print Templates, Results Reports, and Instructional Response Reports from the Report Repository 118.

Then, based on the User Print Display Rules, the Print Converter Computer 244 uses a standard XSL transformation engine, which interprets the XSL and outputs the print stream consisting of Test Results and Instructional Response Information. The print stream can be a complete description of the documents to be printed, such as an Adobe PDF® file could give. A typical output language for the print converter may be the Adobe® PostScript® format. It is also possible to use a data merge print language that generates the PostScript format; IBM's Advanced Function Presentation (AFP) and Xerox's Variable data Intelligent PostScript Printware (VIPP) are two examples of such a language, in which the database master file creates the rules for the printer to interpret, and the data file contains all of the variable data for a particular print job.

The printing itself could be performed using on a variety of types of Physical Imaging Device 246. Depending on the Print Presentation Requirements of the User, the most appropriate machine or machines to be used may vary by such factors as the size of the overall print job and the type of printing (e.g., color or black-and-white) desired. Possible imaging devices are high-speed laser printers such as the Xerox® DocuTech® series.

5.C. Electronic Displayer

Current methods of test reporting involve the production of print reports that contain certain information about Students' Test Results. In some instances, companies that report on tests provide teachers with basic information on CD-ROM. However, current methods do not permit teachers, parents, and others to use the Internet to view electronic displays of rich test result information (including detailed Student and Group performance on specific Skills) and information about suggested instructional responses for responding to Student needs.

What is needed, therefore, is a production system for the print and Internet display of information about Test Results and suggested instructional responses. In order to eliminate the potential for consistency errors across the two media, this production system advantageously may extract data files from a common data storage system. In addition, because the printed documents that display information are often the single method which a school system or test reporting company uses to communicate directly with the Users, it may be advantageous that the printed documents contain the password information that enable the Users to access the website securely As described here, the Electronic Displayer 152 generates electronic displays that are incorporated into a website, enabling Internet access in the manner described above. However, as also discussed, the electronic displays that are produced may also be transmitted to Users using other electronic means.

To reiterate the process flow, once the Results Report Generator 146 and the Instructional Response Report Generator 148 have completed processing, the Display Operator is notified by the Report Generator Operator and then activates the Print Displayer 150 in step 1626 and the Electronic Displayer 152 in step 1642.

In step 1642, the Electronic Displayer retrieves the Electronic Presentation Requirements from the Information Repository.

Electronic Presentation Requirements are electronic text files and prototypes that together specify the types of electronic displays that a particular type of User may receive. For example, the Electronic Presentation Requirements may specify that an Educator will see electronic displays as part of a website in which specific views are shown, with particular navigation elements to allow the Educator to go from one view to the next.

The Electronic Presentation Requirements include all necessary specifications to present Test Results and Instructional Response Materials by means of electronic displays for Users. These specifications, for example, may include the colors and styling to be used on the electronic displays, the types of data presentation methods (such as tables, pie charts, bar charts, or scatter plots) employed, and the display interface used to show instructional materials.

Based on these Electronic Presentation Requirements, the Electronic Displayer 152 generates the corresponding Electronic Templates in step 1646 and stores them in the Report Repository 118 in step 1648. The generation of electronic templates can be carried out by the Operator of the Electronic Displayer 150 using a templating language familiar to those skilled in the art, or in some cases by a computer that receives as its input specific Electronic Presentation Requirements.

Next, in step 1650, the Electronic Displayer 152 extracts User Electronic Display Rules from the Information Repository 114. In step 1652, the Electronic Displayer 152 extracts the Electronic Templates, Results Reports, and Instructional Response Reports from the Report Repository 118, and, using the User Electronic Display Rules, merges the templates with the reports to create electronic displays.

A complete example elucidates this process of creating electronic displays:

Assume that the Data Requirements for Results Reports specify that one report to be shown to Users (in this case Educators) is a display of "Performance in a Skill across Students" that visually depicts the performance of every Student in several 4th grade classes with respect to the specific Skill of subtraction, and that certain additional information (such as teacher name) also may be provided to Users in these displays.

Further assume that the Student Skill Performance Evaluator 134 has stored the appropriate Evaluation assignments in the Information Repository 114, so that each Student has a Verbal Evaluation Statement in the Skill of subtraction based on the Student's Score in that Skill. In this case, the potential Verbal Evaluation Statements for that Skill are "Likely to Need Help with Fundamentals", "Likely to Need Additional Instruction and Practice", or "Likely to Need Advanced Work".

Further assume that the Electronic Presentation Requirements specify that the format for this display is a single table with three columns that correspond to, and are labeled by, each of the three Verbal Evaluation Statements, and that each Student in the class should be listed alphabetically within the column labeled by the Verbal Evaluation Statement corresponding to that Student's performance in that Skill. Finally assume that the Electronic Presentation Requirements also specify the style and the explanatory text to be included within that particular display.

In this example, the figures demonstrate the simple progression from (1) a Data Requirement for Results Reports 1734, to (2) the corresponding Electronic Document Structure 1736, to (3) the corresponding Results Report 1802, and to (4) the corresponding electronic display of that report 2004.

This example also illustrates two important issues concerning display formats: First, effective displays need not include numerical information, because simple verbal evaluation statements often are compelling and descriptive, particularly for the majority of Users who are unfamiliar with the interpretation of numerical data. Second, a single display typically relies on multiple field-sorting principles. In this example, the Verbal Evaluation Statements are arranged from left to right in a specific order, and the Students are ordered from top to bottom, in ascending alphabetical order by last name.

Next, in step 1654, the Electronic Displayer shows electronic displays to Users. This can be done by means of a variety of methods. In one embodiment, the displays could be sent to users via e-mail attachments, or they could be saved onto CD-ROMs and distributed.

According to one embodiment, the electronic displays to be shown to any particular User may be accessible as part of a single application, allowing the User to navigate among different views.

Potential methods for doing so would involve an application on CD-ROM using standard CD-ROM authoring tools, or an application that can run on an internal network. The method described here, however, is to create a web-based application that enables Users to access the application by logging onto the User Computer 248 from anywhere with an Internet connection.

Figure 21:
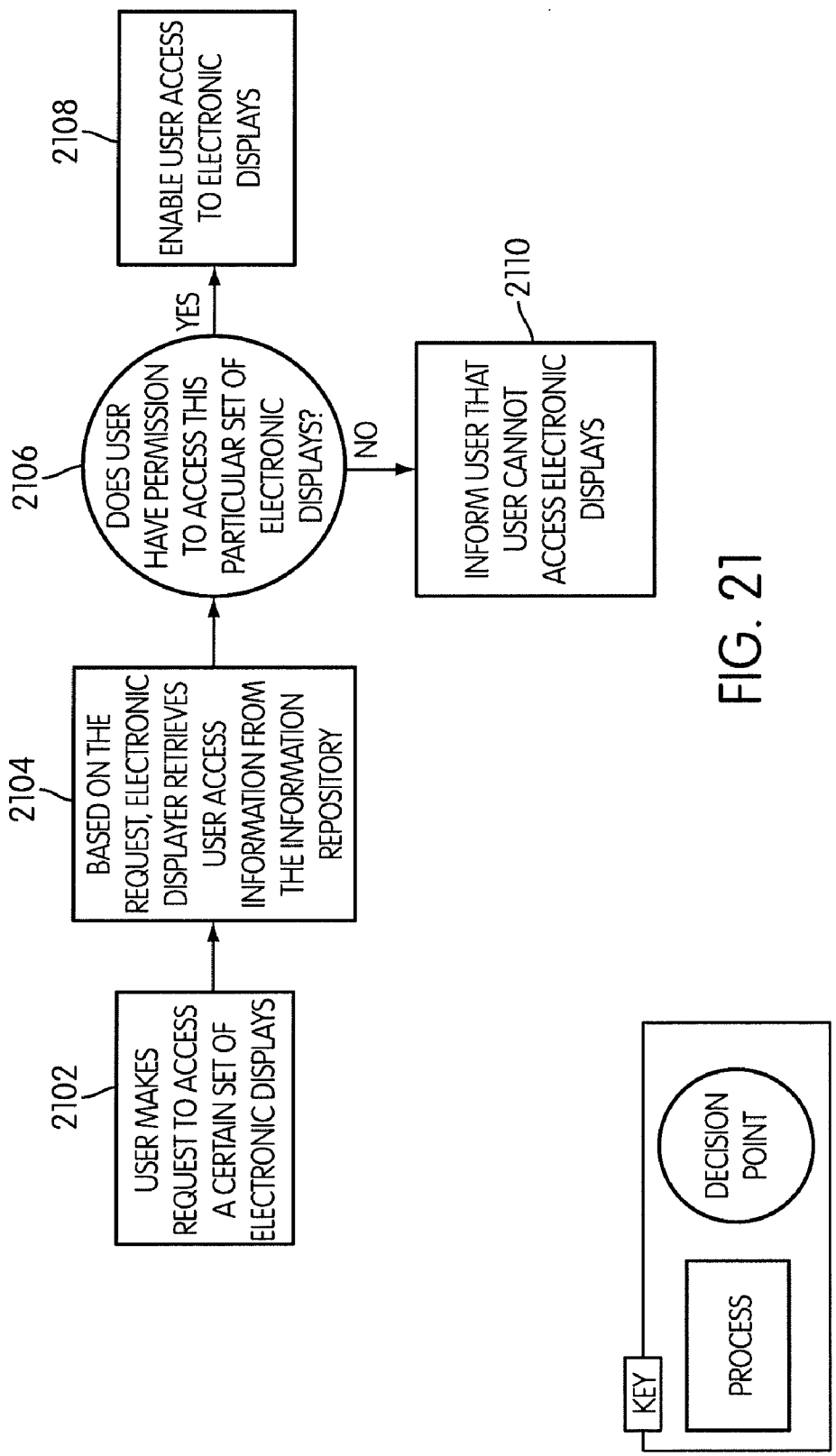
FIG. 21 is a flowchart of the operation process of the user authentication process, described in the Display Module component of the system.

In one embodiment, the User may then enter appropriate log-in information, such as a personalized Login ID and Password. This involves an authentication process, as shown in FIG. 21. In step 2102, the User makes the request to access a certain set of electronic displays. This request may take the form, for example, of an attempted log-in on a website. Next in step 2104, the Electronic Displayer retrieves User permission information from the Information Repository 114, and in step 2106 the Electronic Displayer evaluates whether the User has permission to access this particular set of electronic displays. If so, then the Electronic Displayer enables the User to access the electronic displays 2108, but if not, then the Electronic Displayer informs the User that the User cannot access the electronic displays.

Embodiment

Figure 22:
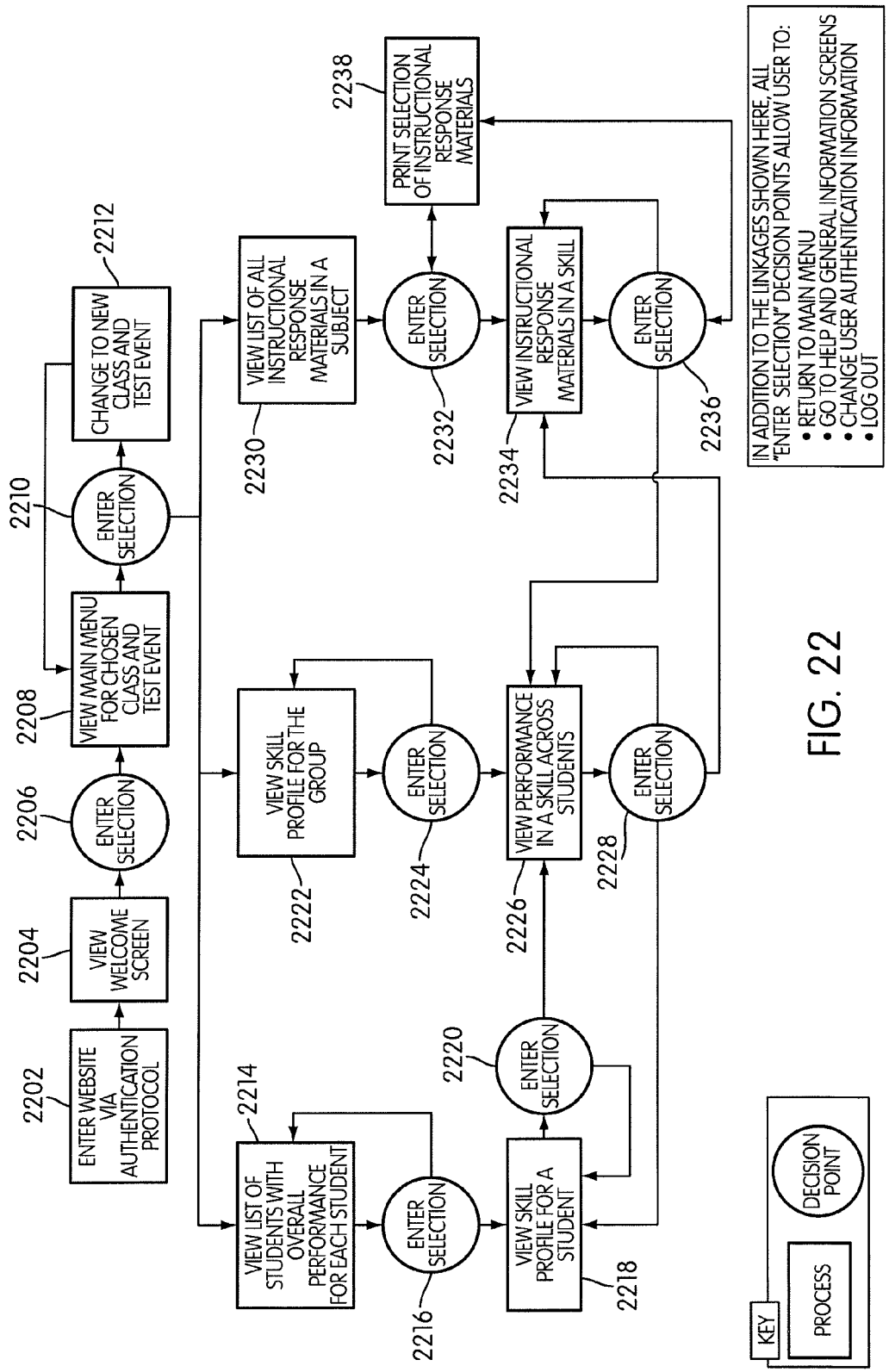
FIG. 22 is a flowchart illustrating the operation process of a Display Website, described in the Display Module component of the system.

In one potential embodiment of the website, the web application that may be approved by the Client would function as follows:

FIG. 22 illustrates the flowchart of a website used to present electronic displays to the Users. First, the User enters the website via an authentication protocol in step 2202 (discussed more fully in FIG. 21), and sees a Welcome Screen in step 2204. In step 2206, the Welcome Screen prompts the User to select a particular class (say a 4th grade class called class 401) and a particular test event (say, 3rd grade math exam). An example of this display 2302 is shown in FIG. 23

After making a selection, the User is shown the Main Menu page for that class and test event in step 2208, from which point the User in step 2210 can select one of three types of electronic displays. (An example of this display 2402 is shown in FIG. 24.)

One display that can be accessed from the Main Menu page is a list of Students showing Students' overall performance in step 2214. (An example of this display 2502 is shown in FIG. 25.)

From this display, the User can opt in step 2216 to see another list of Students (for another class of the same teacher-User, for instance), or can click on a hyperlinked Student name to access a Skill Profile for that Student in step 2218.

(An example of this display is shown in FIG. 25. From this display, the User can opt to see another list of Students by using the dropdown menu 2504, or can click on a hyperlinked Student name such as shown by 2506 to access a Skill Profile for that Student.)

From the view of a Skill Profile for a Student in Step 2218, the User is prompted for next actions in step 2220. From these prompts, the User can opt to see a Skill Profile for another Student, or the User can click on a Skill name and be taken to a view of Performance in that Skill across Students 2226. (An example of this display 2602 is shown in FIG. 26. From this display, the User can opt to see a Skill Profile for another Student by using the dropdown menu 2604, or the User can click on a hyperlinked Skill name such as shown by 2606 to view the Performance in that Skill across Students.)

A second display that can be accessed from the Main Menu page 2208 is a display of a Skill Profile of the Group as a whole in step 2222. This display could contain the Skill-by-Skill scores for the class as a whole, as well as recommendation statements by Skill, for how the teacher should proceed instructionally with the class.

From this view, the User is prompted for next actions in step 2224. The User can opt to see the Skill Profile of another Group, or the User can click on a Skill name and be taken to a view of Performance in that Skill across Students 2226. (An example of this display 2702 is shown in FIG. 27. From this display, the User can opt to see a Skill Profile for another Group by using the dropdown menu 2704, or the User can click on a hyperlinked Skill name such as shown by 2706 to view the Performance in that Skill across Students.)

The display of Performance in a Skill across Students in step 2226 shows the User a breakdown of all the Students in that Skill. From there, the User can choose in step 2228 to see the same display with respect to another Skill in step 2226, to see the Skill Profile 2218 for a Student listed in the breakdown, or to see Instructional Response Materials in a Skill at a particular level in step 2234. (An example of this display 2802, called here the "Flexible Groupings" page, is shown in FIG. 28. From this display, the User can opt to see the same display with respect to another Skill by using the dropdown menu 2808, or the User can click on a hyperlinked Student name 2810 to see the Skill Profile for that Student, or the User can click on an explicit instruction to see instructional materials in that Skill 2806.)

Figure 29:
FIG. 29 is a diagram illustrating a "Listing of Instructional Tools" display of a Display Website, described in the Display Module component of the system.

Finally, a third display that can be accessed from the Main Menu 2208 is a listing of all Instructional Response Materials available in a particular subject 2230. From there, the User can choose 2232 to view Instructional Response Materials in a particular Skill at a particular Level 2234. (An example of a display listing the various Instructional Response Materials 2902 is shown in FIG. 29.)

The Instructional Response Materials in a particular Skill at a particular Level 2234 can contain a variety of different kinds of instructional information, organized in various ways as described above in the Instructional Reports Generator. From the Instructional Response Materials in a particular Skill 2234, the User can choose 2236 to print those materials 2238, see materials for another Skill 2234, or see the display of Performance in that Skill across Students 2226. (An example of this display 3002 is shown in FIG. 30.)

According to this embodiment, the Instructional Response Materials in a particular Skill at a particular Level 2234 may advantageously be organized within the same Evaluation categories that are used to describe Student's mastery of a given Skill elsewhere on the website, such as in the display of Performance in a Skill across Students 2226. (In FIG. 30, the "Activities" portion of the materials are divided 3002 according to the categories of Fundamentals, Practice, Advanced shown in the column headings 2804 of FIG. 28.)

At all times 2206, 2210, 2216, 2224, 2232, 2220, 2228, and 2236 when prompted, the User can return to the Main Menu 2208, can see help and information screens, can change user authentication information, and can log out. These functions are typically available on many commercially available websites.

The foregoing description of one embodiment of the system illustrates several important features:

The first important feature of the website described here is that Users can navigate directly between different displays of Tests Results, and directly between displays of Test Results and Instructional Response Materials. In FIG. 22, these direct navigational paths were as follows:

1. From the display of the List of Students with Overall Performance for each Student 2214, the User can choose a Student name in step 2216 and see the display of the Skill Profile for that Student in step 2218.
2. From the display of the Performance in a Skill across Students, the User can choose a Student name in step 2228 and see the display of the Skill Profile for that Student in step 2218.
3. From the display of the Skill Profile of the Group in step 2222 the User can choose a Skill name and see the display of the Performance in that Skill across Students in step 2226.
4. Similarly, from the display of the Skill Profile of a Student in step 2224 the User can choose a Skill name and see the display of the Performance in that Skill across Students in step 2226.
5. The User can navigate directly between the displays of the Performance in a Skill across Students in step 2226 and the display of Instructional Response Materials in that Skill in step 2234.

In one embodiment, the direct navigation occurs through the links of "hyperlinked" text. For instance, when a User sees the Skill Profile of a Group as shown in FIG. 27, 2702, the User can click on a Skill name 2704 to be taken directly to a display of the Skill Performance in that Skill across Students, as shown in FIG. 28, 2802. However, those skilled in the art will understand that this type of navigation can also be operationalized by means other than hyperlinked text.

The second important feature of the website is that when Users are viewing any particular display, they can directly access the same type of display loaded with different content. For example, consider a User who teaches more than one class (or teaches one class in more than one subject). If that User is viewing the Skill Profile of a Group 2702 as shown in FIG. 27, then the User can simply choose to see another the Skill Profile of another Group by clicking on the dropdown menu 2706 and selecting a class and subject. Similarly, when viewing the display of the Instructional Response Materials for a Skill 3002 as shown in FIG. 30, the User may use the dropdown menu 3004 to access Instructional Response Materials in other Skills.

Dropdown menus are one way to enable direct navigation to the same type of display loaded with different content, and can function with respect to both data and instructional displays. However, those skilled in the art can also implement this feature by other technical means.

Figure 31:
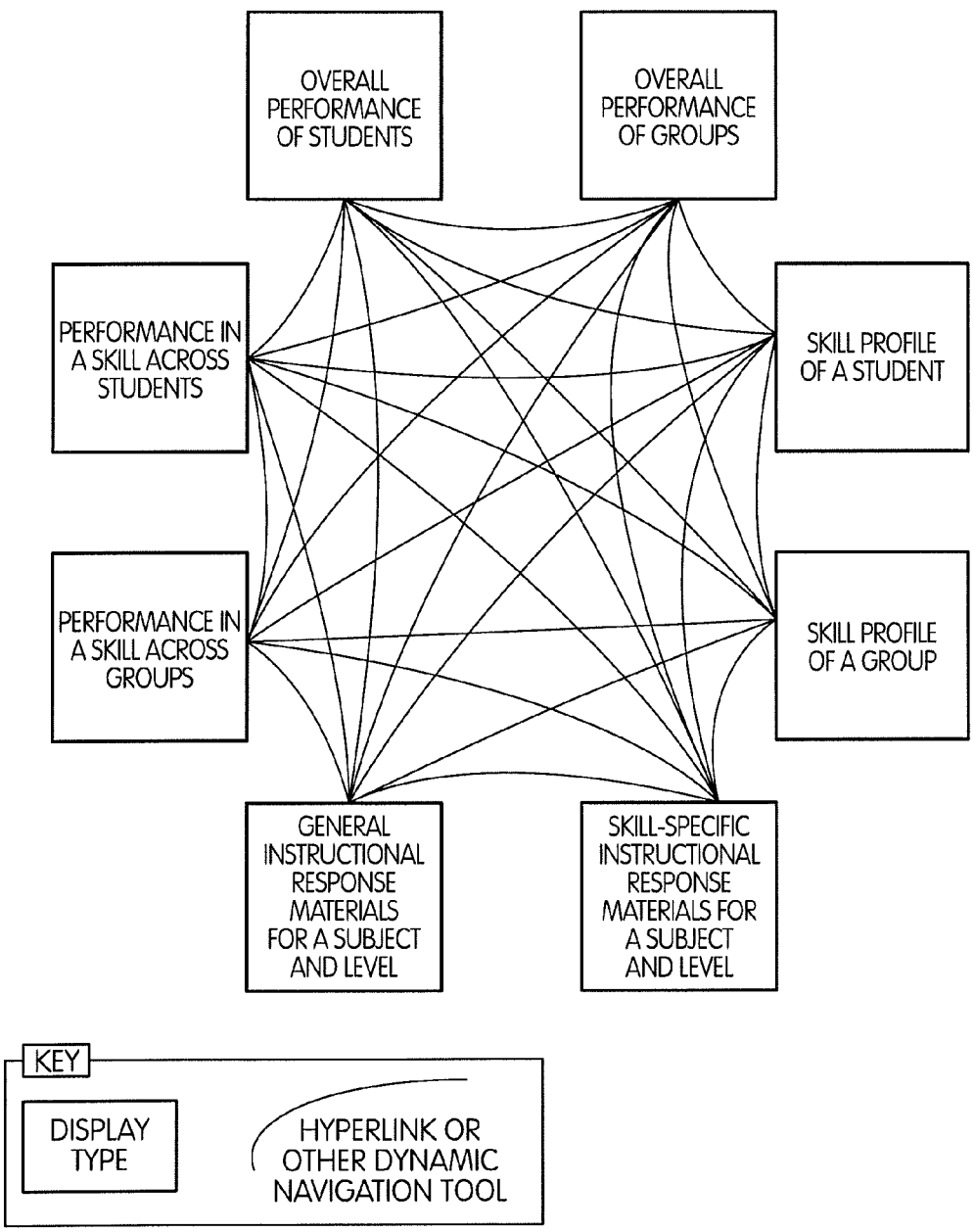
FIG. 31 is a diagram illustrating potential hyperlinks in a Display Website, described in the Display Module component of the system.

These two features of this embodiment of the website are shown in one particular way in the embodiment illustrated in FIG. 22. However, it may be noted that this approach has broader application. As shown in FIG. 31, a website with several types of displays can permit a wide variety of direct connections between different displays. (FIG. 20 shows how a few potential hyperlinks (2006, 2008, 2010) and dropdown menus (2012, 2014, 2016) can be implemented on any single screen.) Regardless of the precise navigational elements of any screen, the critical feature is that the User not have to return to a central menu between viewing different displays of Tests Results or Instructional Materials.

Figure 32:
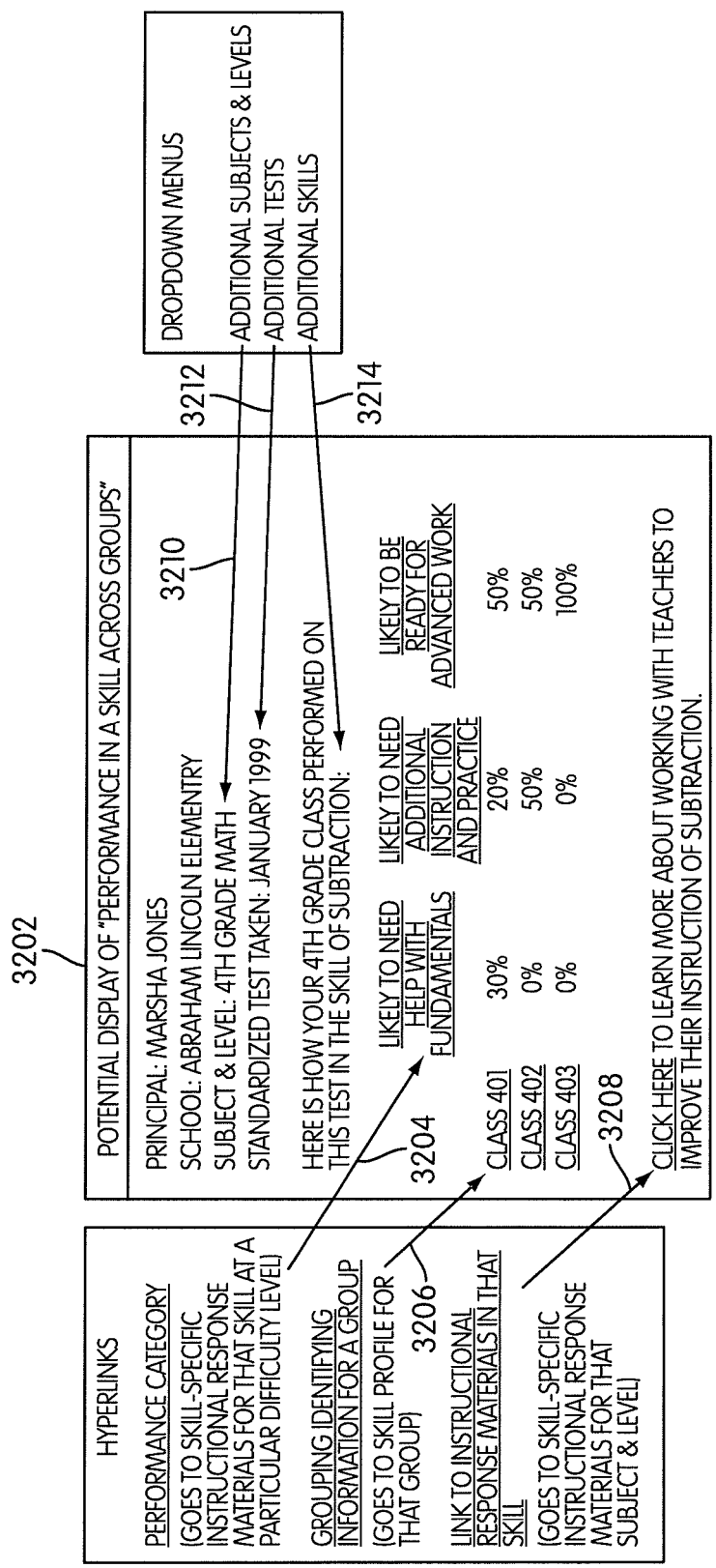
FIG. 32 is a diagram illustrating a potential electronic display of "Performance in a Skill across Groups", described in the Display Module component of the system.

Importantly, these navigational tools may be used with respect to the presentation of Group information as shown in FIG. 32, which is a diagram of a potential display of Performance in a Skill across Groups 3202. This display enables a principal to see how different classes in a given grade performed in a given skill and contains several key navigational features:

1. The column-headings of Evaluation Statements are hyperlinked 3204 to Skill-Specific Instructional Response Materials at an identically-named, corresponding difficulty level, so that the principal could learn how the teachers in the school could best approach the teaching of that Skill with Students of different proficiency levels.
2. The class numbers are hyperlinked 3206 to the respective displays of the Skill Profiles for that class.
3. A link at the bottom of the page 3208 takes the principal to Skill-Specific Instructional Response Materials in that Skill.
4. Dropdown menus enable the principal to see the same display of "Performance in a Skill across Groups" for additional Subjects and Levels 3210, Tests 3212, and Skills 3214.

A third important feature of this embodiment of the website is that the Instructional Response Materials are integrated with the Test Results themselves. As described above, Users directly navigate between Skill names and Instructional Response Materials. More important, the same terminology used to present Test Result information by Skill corresponds to the categories used to present instructional strategies by Skill.

Take, for example, the display of Performance in a Skill across Students shown in FIG. 28, 2802. This display associates three particular Evaluation Statements 2804 with each Student for the Skill of "Multiplication/Division—Problem Solving". The three Evaluation Statements utilized are "Likely to Need Help with Fundamentals", "Likely to Need Additional Instruction and Practice", and "Likely to Be Ready for Advanced Work".

If the User clicks on the hyperlink text for the "Teaching Tools" 2806, the User then sees Instructional Response Materials for the Skill of "Multiplication/Division—Problem Solving", shown in FIG. 30, 3002. Here, the User can obtain instructional information in that Skill.

Importantly, the suggested activities in that Skill are organized 3004 according to difficulty level using precisely the same Evaluation Statements that were used in the display of Performance in a Skill across Students 2802: Help with Fundamentals. This correspondence is important because it enables the User (and Educator in this case) to provide Students with different activities in a Skill, based on each Student's particular needs.

This correspondence is achieved because the content of the Instructional Response Materials are based on the "Content Requirements for Instructional Response Reports", which are approved by the Client as described in the Intake Module 102. These Content Requirements may specify the circumstances in which Instructional Response Materials should be disaggregated into difficulty levels, rather than at a single difficulty level. For example, referring to the XML document 1802 shown in FIG. 18 (which was generated from the Content Requirements and served as the basis for the Instructional Response Materials 3002 shown in FIG. 30), it can be seen that the Content Requirements in that case specified that the "activities" portion of the Instructional Response Materials should be disaggregated into three difficulty levels 1804, 1806, 1808.

In many cases, Users when presented with instructional material organized by difficulty level can more accurately respond to Student needs. Of course, the particular displays shown here are but one method of integrating Test Results with Instructional Response Materials, and those skilled in the art doubtless could make subtle modifications to the approach specified here.

For example, those skilled in the art can program the web application to enable the User to navigate directly between a display showing the Skill Profile for a Student 2218 and a display showing an entire packet of Instructional Response Materials, such that those materials are customized for that particular Student and appropriate to the Student's mastery level in each particular Skill. (According to the terminology used here, this functionality would be appropriate in the event that the User Electronic Display Rules, discussed above with respect to the Intake Module 102, specify that a User see an electronic display of a complete packet of Instructional Response Materials for each Student whose Test Results are displayed on the website.) Other such minor changes in navigation are possible as well.

Another Embodiment

Figure 33:
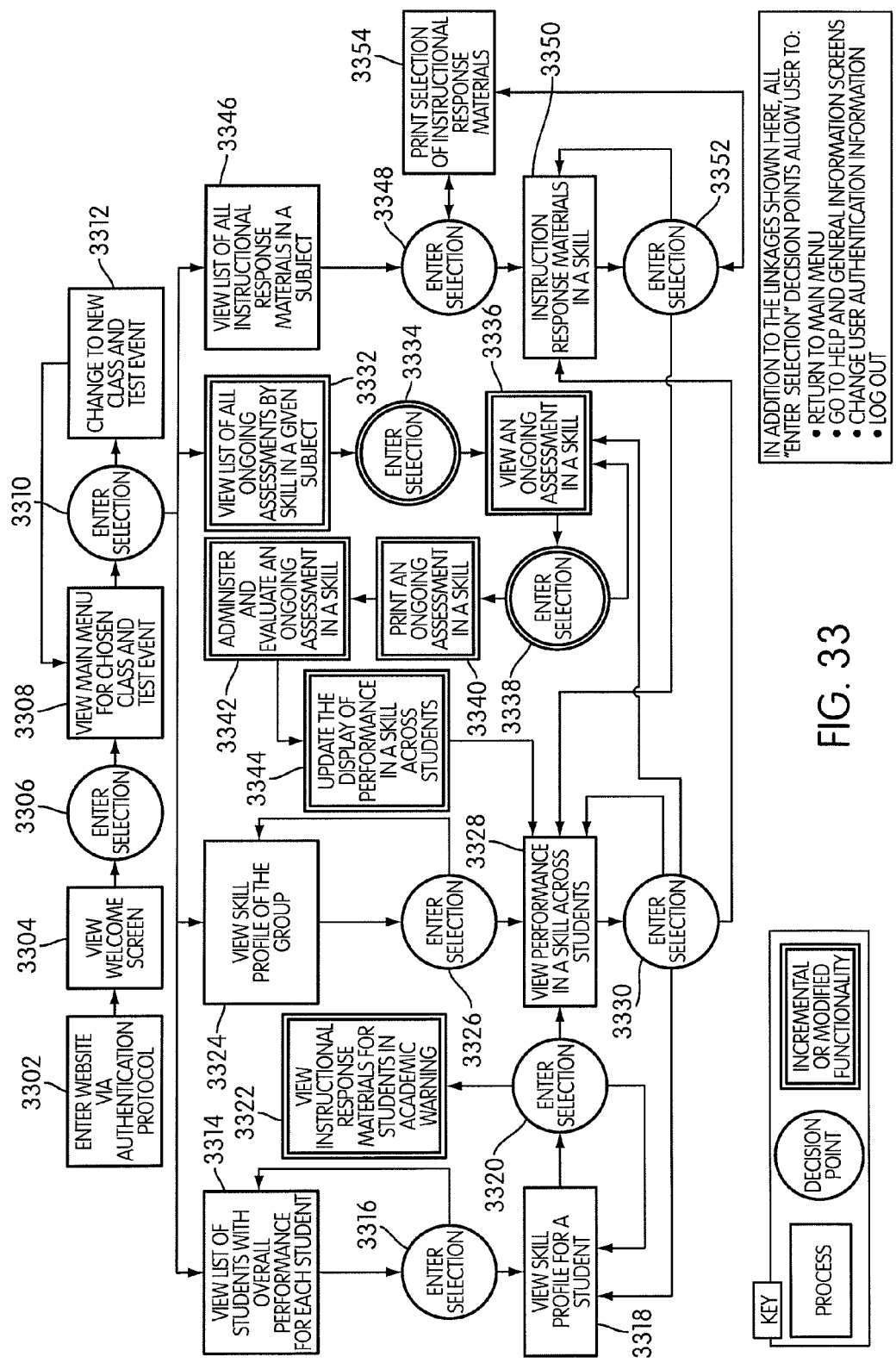
FIG. 33 is a flowchart illustrating the operation process of a Display Website with an Ongoing Assessment Component, described in the Display Module component of the system.

In another potential embodiment, FIG. 33 illustrates a website that advantageously provides Users with additional tools to examine Students' progress in various Skills and to keep track of students' mastery levels over time.

In many environments (both in K-12 education and other educational settings), standardized tests are given to Students only at periodic intervals, say once every year or once every few months. In the meantime, Educators have no organized way in which to track their Students' progress in particular Skills over time. Although some companies offer online testing programs so that Students can take online exams weekly or even daily, these options are not practical for many Educators because educational institutions (such as K-12 schools) rarely have sufficient computing resources for the Students.

It would be possible for Educators to adapt materials (such as commercially available workbooks or personally produced problem sets) to generate assessments for use in tracking Student progress in specific Skills. However, this is unrealistic for many Educators, who typically have broad responsibilities and little extra time to perform the work of adapting materials.

What is needed, therefore, is a system and method that provide Educators with an efficient manner of using non-computer-intensive means to track Students' progress in different Skills, particularly a method that maintains a common language between the standardized tests themselves and the ongoing assessment process.

FIG. 33 illustrates the flowchart of a website that provides Educators with this functionality. The steps 3332, 3334, 3336, 3338, 3340, 3342, 3344, and 3322 are the processes that have been added incrementally to the flowchart illustrated in FIG. 22.

The User navigates through the website shown in FIG. 33 in generally the same way as the User would navigate through the website shown in FIG. 22. However, when the User is viewing the Performance in a Skill across Students in step 3328, the User has available an important additional option in selection 3330: The User can view (step 3336) and then choose (3338) to print (step 3340) an Ongoing Assessment in that Skill. In step 3342, the User administers and evaluates the Ongoing Assessment printed in 3340.

FIG. 36 is a diagram of a "Performance in a Skill across Students" display for the Skill of Character, here known as a "Flexible Groupings" view. This diagram shows the hyperlink 3604 entitled "Ongoing Assessments in this topic". When pressed, this hyperlink enables the User to view the display 3336 of an Ongoing Assessment in the Skill of Character.

FIG. 38 illustrates a sample portion of an Ongoing Assessment in the Skill of Character 3802. (The Skill of analyzing character being a typical reading comprehension skill examined in grades K-12.) As shown, the Ongoing Assessment includes four questions that can be copied and given to students 3804, as well as a scoring guide 3806 that can be used by teachers to evaluate the results.

An Ongoing Assessment is one of the Instructional Response Materials generated by the Electronic Displayer 152. In order for Ongoing Assessments to be produced, the Content Manager 140 advantageously may ensure that the Content Repository 116 includes all of the appropriate components for Ongoing Assessments of each Skill: namely, Items, scoring guides for Items, total score metric, and teacher reference materials. The list of required components advantageously may be set forth as part of the Client-approved specifications about the instructional materials in the Intake Module 102 stage, which are known as "Content Requirements for Instructional Reports".

The Content Requirements for Instructional Response Reports also advantageously may specify that the scoring guides produce Evaluation Statements for Students are the same Evaluation Statement categories used to describe Students' Test Results. This last specification enables teachers to use Ongoing Assessment results in conjunction with the Test Results themselves; when the standardized test results and the Ongoing Assessment results are both expressed in terms of the same Evaluation Statements, teachers can easily track their Students' progress over time, even across multiple standardized tests and Ongoing Assessments.

FIG. 36 and FIG. 38 illustrate this point. In FIG. 36, each Student is categorized within one of three categories based on the Student's performance on the standardized test (here known as the ISAT 2002): These three categories are "Likely to Need Help with Fundamentals", "Likely to Require Additional Instruction and Practice", and "Likely to Be Ready for Advanced Work". These three categories are also employed in the scoring of the Ongoing Assessment 3802 in the following way: As shown in 3808, a teacher who uses this Ongoing Assessment is told that score of 0-1 points puts a Student in the "Fundamentals" column, 2-4 points puts a Student in the "Practice" column, and 5-6 points puts a Student in the "Advanced Work" column.

The User can then input the results of the Ongoing Assessment via the input page 3702 shown in FIG. 37 into the three categories of mastery described above 3704. As a result of this input the Flexible Groupings screen 3328 may now display the revised information about each Student's mastery level in the Skill, including if desired each Student's performance history in the Skill.

Figure 34:
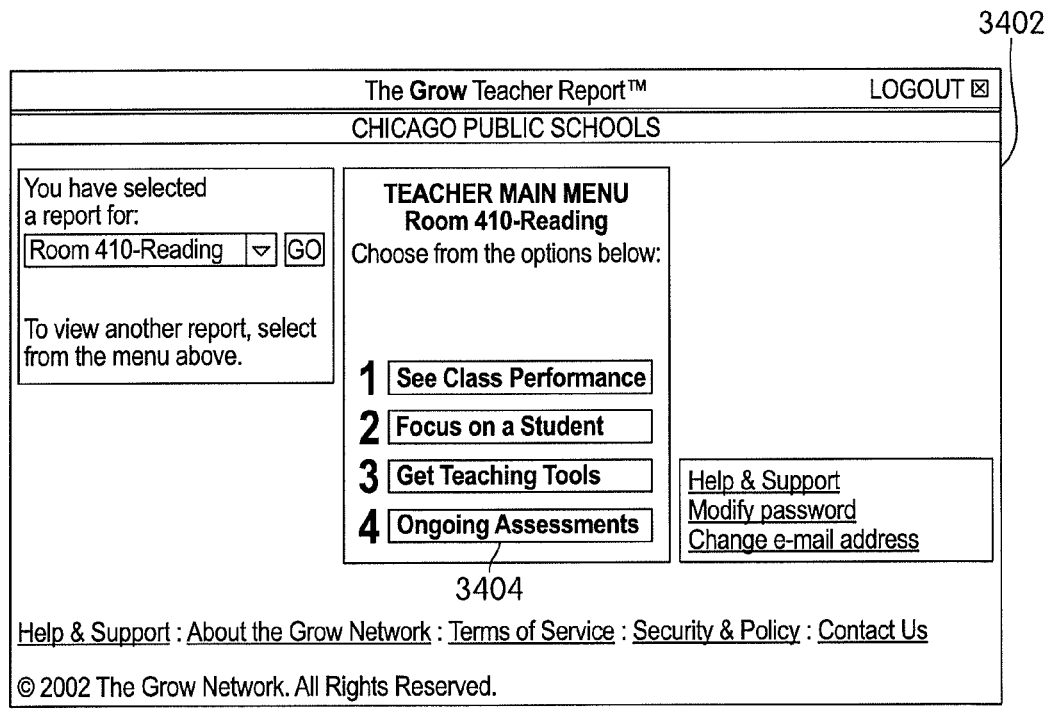
FIG. 34 is a diagram illustrating a "Welcome" Display for a Display Website with an Ongoing Assessment Component, described in the Display Module component of the system.

Users also can obtain Ongoing Assessments from the Main Menu as follows: From viewing the Main Menu in step 3308, the User can navigate in step 3310 to a listing of all the Ongoing Assessments by Skill in a given Subject in step 3322. Examples of a Main Menu screen and the Ongoing Assessments by Skill in a given Subject screen are shown in FIG. 34 and FIG. 35, as elements 3402 and 3502 respectively. From this view, the User can select in step 3334 to see an Ongoing Assessment in a particular Skill in step 3336. For example, if the User clicks on the word "Character" as seen in element 3504, then the User can, in step 3336, see an Ongoing Assessment in the Skill of analyzing character.

An important feature of the Ongoing Assessment system described in this embodiment is its ease of use. Students do not have to gain access to a computer to take the assessments (much less an Internet-connected computer). Teachers do not need late-version browser software to update and track their students' progress, thanks to the simplicity of the HTML form interface. And finally, teachers do not have to devote substantial time to administering or scoring the brief assessments, thanks to their three-tiered scoring system.

Those skilled in the art will further recognize that the embodiment described above can be supplemented with other types of particular functionality, depending upon the requirements of the Client:

In another embodiment, a Client might specify that Users be able to see certain Student information in addition to Test Result information, such as attendance data, course grades, homework assignments, etc. It will be evident to those skilled in the art that the core functionality of the website described above can easily be complemented with additional electronic data displays concerning these types of data, according to methods familiar to those skilled in the art of web design. For instance, it would be possible to show a Student's attendance and grade records on the same view as the view of the Skill Profile for a Student in step 2218, or in a display that is directly hyperlinked to that view.

Physically, the Electronic Displayer 152 may function, in one embodiment, as follows:

The Web Application Server 248 retrieves the Web Presentation Requirements from the Information Repository 114, which includes visual prototypes and text description. Based on these Requirements, the Electronic Display Operator operates the Report Publishing Computer 236, and creates Electronic Templates using languages familiar to those skilled in the art, such as Java Server Pages and XSL. The Electronic Report Publishing Computer 236 then stores these Web Templates as files on the Report Server 240.

The Web Application Server 248 uses common database methods and file-system operations to retrieve User Electronic Display Rules from the Information Repository 1634, as well as Print Templates, Results Reports, and Instructional Response Reports from the Report Repository 118. The Web Application Server 248 merges the Electronic Template with the reports, creating resulting documents in Hypertext Markup Language (HTML) format that include Test Results and Instructional Response Materials. These documents in HTML form can be transmitted over the Internet for presentation with commonly available web browsers.

The Web Application Servers 246 makes the reports on the Report Server 240 available to authorized users via the World Wide Web. To convert and serve the files in a human-friendly HTML format, a Web Application Server 246 may be placed between the Internet and the Report Server 240. The Firewall 202 may need to be configured to allow Internet access to the Web Application Servers 246 over the Hypertext Transfer Protocol (HTTP). A possible configuration of the Web Application Servers 246 may be a workstation-class UNIX server similar to the one used as the Print Converter Computer 244. One or more Web Application Servers 246 may be installed as a cluster for increased performance and fail-over in case of hardware or software failure. Report-specific code adds visual embellishments and hypertext navigation structure using a web template language such as JavaServer Pages™ (JSP). A JSP-compatible engine such as Apache Tomcat may be used on the Web Application Server 248.

Also, the Web Application Server 248 manages the User authentication process, ensuring that only authorized Users have access to the various electronic displays. The Web Application Server 248 accomplishes this by making queries to the Data Servers 214 using a protocol such as Lightweight Directory Access Protocol (LDAP) or Structured Query Language (SQL) to retrieve data stored about a User who is attempting to log on. The retrieved information consists of a unique Log In ID and password for a User, as well as the User Electronic Display Rules that define what a particular User is able to view.

Once the processing of the Electronic Displayer 152 is terminated, the Display Operator is notified. Once the Print Displayer 150 and the Electronic Displayer 152 have finished processing, the System Operator is notified and terminates the entire system.

CONCLUSION OF THE DESCRIPTION OF THE INVENTION

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The invention claimed is:

1. A computerized method for generating evaluative or formative statements for test-takers with respect to skills assessed on a test, the method comprising:
  (a) obtaining as inputs for a first probabilistic function the test-takers' overall scores on the test as a whole;
  (b) obtaining as inputs for the first probabilistic function a set of skills assessed on the test;
  (c) obtaining as inputs for first probabilistic function the test-takers' skill-by-skill scores on each skill assessed on the test, wherein said skill-by-skill scores are obtained by generating multiple potential skill sets, whereby each skill set includes one or more skills tested on the test;
  producing an item skill coding matrix for the test with respect to each of the skill sets, wherein each test item is assigned to a single skill of said skill set;
  implementing an iterative procedure in which pedagogical experts and statistical experts engage in a joint selection process whereby a single skill set and a single item skill coding matrix are selected from among the aforementioned skill sets and corresponding coding matrices; and
  applying the selected skill set and the selected item skill coding matrix to each test-taker's set of item responses in order to determine skill-by-skill scores for each test taker
  (d) obtaining as inputs for the first probabilistic function a score-to-statement mapping between (i) individual test-takers' possible scores on the test as a whole, and (ii) a set of overall evaluative or formative statements used to describe individual test-takers' overall performance on the test as a whole;
  (e) employing the first probabilistic function to select at least one of the overall evaluative or formative statements to describe each test-taker's performance on each skill assessed on the test, wherein the overall evaluative or formative statements are chosen based on the inputs obtained in (a) through (d); and
  (z) displaying at least one selected overall evaluative or formative statement.

2. The computerized method of claim 1 wherein the item skill coding matrices are non-binary and reflect assignments of each item to one or more skills in proportion to the extent to which the item is deemed tested by said skills.

3. The computerized method according to claim 1, further comprising:
  (f) obtaining as inputs for a second function the overall evaluative or formative statements describing each test-taker's performance on each skill assessed on the test, resulting from the first function;
  (g) obtaining as inputs for the second function a statement-to-statement mapping between (i) a set of overall evaluative or formative statements used to describe the individual test-takers' possible scores on the test as a whole, and (ii) a set of skill-appropriate evaluative or formative statements; and
  (h) employing the second function to select at least one skill-appropriate evaluative or formative statement for each test-taker's performance on each skill assessed on the test, wherein the at least one skill-appropriate evaluative or formative statement is chosen based on the inputs obtained in (f) and (g).

4. A computerized method for generating evaluative or formative statements for test-takers with respect to skills assessed on a test, the method comprising:
  (a) obtaining as inputs for a first probabilistic function the test-takers' overall scores on the test as a whole;
  (b) obtaining as inputs for the first probabilistic function a set of skills assessed on the test;
  (c) obtaining as inputs for first probabilistic function the test-takers' skill-by-skill scores on each skill assessed on the test;
  (d) obtaining as inputs for the first probabilistic function a score-to-statement mapping between (i) individual test-takers' possible scores on the test as a whole, and (ii) a set of overall evaluative or formative statements used to describe individual test-takers' overall performance on the test as a whole;
  (e) employing the first probabilistic function to select at least one of the overall evaluative or formative statements to describe each test-taker's performance on each skill assessed on the test, wherein the overall evaluative or formative statements are chosen based on the inputs obtained in (a) through (d);
  (f) with respect to a single skill, obtaining as inputs all assignments of evaluative or formative statements for individual test-takers based on their results on the test;

(g) with respect to that skill, calculating a number of times each evaluative or formative statement was assigned to individual test-takers in the group;

(h) with respect to that skill, assigning to the group the evaluative or formative statement assigned to the greatest number of test-takers in the group; and (z) displaying at least one of: at least one selected overall evaluative or formative statement used to describe individual test-takers' overall performance on the test as a whole, or the evaluative or formative statement assigned to the greatest number of test-takers in the group.

5. A system for generating evaluative or formative statements for test-takers with respect to skills assessed on a test, the system comprising:

a computer configured to obtaining as inputs for a first probabilistic function: the test-takers' overall scores on the test as a whole; a set of skills assessed on the test; the test-takers' skill-by-skill scores on each skill assessed on the test; a score-to-statement mapping between (i) individual test-takers' possible scores on the test as a whole, and (ii) a set of overall evaluative or formative statements used to describe individual test-takers' overall performance on the test as a whole;

said computer configured to employ the first probabilistic function to select at least one of the overall evaluative or formative statements to describe each test-taker's performance on each skill assessed on the test, wherein the overall evaluative or formative statements are chosen based on the inputs obtained in (a) through (d);

said computer configured to, with respect to a single skill, obtain as inputs all assignments of evaluative or formative statements for individual test-takers based on their results on the test; calculate a number of times each evaluative or formative statement was assigned to individual test-takers in the group; and, with respect to that skill, assign to the group the evaluative or formative statement assigned to the greatest number of test-takers in the group.

6. A computer readable storage medium having computer executable program instructions for generating evaluative or formative statements for test-takers with respect to skills assessed on a test, by performing the following operations:

(a) obtaining as inputs for a first probabilistic function the test-takers' overall scores on the test as a whole;

(b) obtaining as inputs for the first probabilistic function a set of skills assessed on the test;

(c) obtaining as inputs for first probabilistic function the test-takers' skill-by-skill scores on each skill assessed on the test;

(d) obtaining as inputs for the first probabilistic function a score-to-statement mapping between (i) individual test-takers' possible scores on the test as a whole, and (ii) a set of overall evaluative or formative statements used to describe individual test-takers' overall performance on the test as a whole;

(e) employing the first probabilistic function to select at least one of the overall evaluative or formative statements to describe each test-taker's performance on each skill assessed on the test, wherein the overall evaluative or formative statements are chosen based on the inputs obtained in (a) through (d);

(i) with respect to a single skill, obtaining as inputs all assignments of evaluative or formative statements for individual test-takers based on their results on the test;

(j) with respect to that skill, calculating a number of times each evaluative or formative statement was assigned to individual test-takers in the group; and (k) with respect to that skill, assigning to the group the evaluative or formative statement assigned to the greatest number of test-takers in the group.

* * * * *